US009748007B2

(12) United States Patent
Hyde et al.

(10) Patent No.: US 9,748,007 B2
(45) Date of Patent: Aug. 29, 2017

(54) METHOD, SYSTEM, AND APPARATUS FOR THE THERMAL STORAGE OF ENERGY GENERATED BY MULTIPLE NUCLEAR REACTOR SYSTEMS

(75) Inventors: Roderick A. Hyde, Redmond, WA (US); Muriel Y. Ishikawa, Livermore, CA (US); Clarence T. Tegreene, Bellevue, WA (US); Joshua C. Walter, Kirkland, WA (US); Lowell L. Wood, Jr., Bellevue, WA (US); Victoria Y. H. Wood, Livermore, CA (US)

(73) Assignee: TerraPower, LLC, Bellevue, WA (US)

( * ) Notice: Subject to any disclaimer, the term of this patent is extended or adjusted under 35 U.S.C. 154(b) by 1899 days.

(21) Appl. No.: 12/804,894

(22) Filed: Jul. 30, 2010

(65) Prior Publication Data
US 2011/0200158 A1    Aug. 18, 2011

Related U.S. Application Data

(63) Continuation-in-part of application No. 12/660,025, filed on Feb. 18, 2010, and a continuation-in-part of application No. 12/660,157, filed on Feb. 19, 2010.

(51) Int. Cl.
*G21D 7/00* (2006.01)
*G21D 3/00* (2006.01)
(Continued)

(52) U.S. Cl.
CPC ............... *G21D 3/001* (2013.01); *F01K 3/00* (2013.01); *F01K 3/181* (2013.01); *F01K 13/02* (2013.01);
(Continued)

(58) Field of Classification Search
CPC .. G21D 3/001; G21D 9/00; F01K 3/00; F01K 3/181; F01K 12/02; F02C 1/05; F05D 2240/40; Y02E 30/40
(Continued)

(56) References Cited

U.S. PATENT DOCUMENTS 3,848,416 A    11/1974  Bundy
3,974,029 A     8/1976  George et al.
(Continued)

FOREIGN PATENT DOCUMENTS

CN       1252606 A       5/2000
DE      10 40 713 B     10/1958
(Continued)

OTHER PUBLICATIONS

International Preliminary Report on Patentability, PCT/US2011/000302, Aug. 21, 2012.*
(Continued)

*Primary Examiner* — Frank J McGue

(57) ABSTRACT

A method, system, and apparatus for the thermal storage of energy generated by multiple nuclear reactor systems including diverting a first selected portion of energy from a portion of a first nuclear reactor system of a plurality of nuclear reactor systems to at least one auxiliary thermal reservoir, diverting at least one additional selected portion of energy from a portion of at least one additional nuclear reactor system of the plurality of nuclear reactor systems to the at least one auxiliary thermal reservoir, and supplying at least a portion of thermal energy from the auxiliary thermal reservoir to an energy conversion system of a nuclear reactor of the plurality of nuclear reactors.

62 Claims, 115 Drawing Sheets

(51) Int. Cl.
| | |
|---|---|
| *F01K 3/00* | (2006.01) |
| *F01K 3/18* | (2006.01) |
| *F01K 13/02* | (2006.01) |
| *F02C 1/05* | (2006.01) |
| *G21D 9/00* | (2006.01) |

(52) U.S. Cl.
CPC ................ *F02C 1/05* (2013.01); *G21D 9/00* (2013.01); *F05D 2240/40* (2013.01); *Y02E 30/40* (2013.01)

(58) Field of Classification Search
USPC .................................................. 376/322, 911
See application file for complete search history.

(56) References Cited

U.S. PATENT DOCUMENTS

| | | | |
|---|---|---|---|
| 3,998,695 | A | 12/1976 | Cahn et al. |
| 4,003,786 | A | 1/1977 | Cahn |
| 4,089,744 | A | 5/1978 | Cahn |
| 4,294,311 | A | 10/1981 | Denis et al. |
| 4,361,009 | A | 11/1982 | Schluderberg |
| 4,851,183 | A | 7/1989 | Hampel |
| 5,013,519 | A * | 5/1991 | Nakamura et al. ........... 376/179 |
| 5,120,494 | A | 6/1992 | Nazareno et al. |
| 5,636,512 | A | 6/1997 | Culver |
| 6,026,349 | A | 2/2000 | Heneman |
| 6,163,740 | A | 12/2000 | Beltracchi |
| 6,327,323 | B1 * | 12/2001 | Rohde et al. ................. 376/293 |
| 6,909,765 | B2 | 6/2005 | Lahoda |
| 2006/0266043 | A1 | 11/2006 | Jerome |
| 2008/0123797 | A1 | 5/2008 | Hyde et al. |
| 2009/0178409 | A1 | 7/2009 | Shinnar |
| 2012/0056125 | A1 | 3/2012 | Raade et al. |
| 2013/0180520 | A1 | 7/2013 | Raade et al. |
| 2014/0166924 | A1 | 6/2014 | Raade et al. |
| 2015/0010875 | A1 | 1/2015 | Raade et al. |

FOREIGN PATENT DOCUMENTS

| | | |
|---|---|---|
| DE | 3404853 A1 | 8/1985 |
| EP | 0 028 512 B1 | 6/1985 |
| JP | 58023208 A | 2/1983 |
| JP | 04140699 A | 5/1992 |
| JP | 07-011915 A | 1/1995 |
| JP | 08005785 A | 1/1996 |
| JP | 09-247872 A | 9/1997 |
| JP | 10-260294 A | 9/1998 |
| JP | 2002071884 A | 3/2002 |
| WO | 2014074930 A1 | 5/2014 |

OTHER PUBLICATIONS

FAS Military Analysis Network, "Nuclear Propulsion", Feb. 29, 2000.*

PCT International Search Report; International App. No. PCT/US2011/000302; Jan. 17, 2012; pp. 1-2.

PCT International Search Report; International App. No. PCT/US2011/000303; Nov. 22, 2011; pp. 1-2.

PCT International Search Report; International App. No. PCT/US2011/000304; Nov. 25, 2011; pp. 1-2.

PCT International Search Report; International App. No. PCT/US2011/000297; Nov. 25, 2011; pp. 1-2.

European Patent Office; Extended European Search Report; App. No. EP 11 78 0898; Jun. 17, 2013 (received by our agent on Jul. 1, 2013); 26 total pages.

"Nuclear Propulsion"; FAS Military Analysis Network; Feb. 29, 2000; 8 pages; located at: http://www.fas.org/man/dod-101/sys/ship/eng/reactor.html.

Supplemental Partial European Search Report for EP11780897, dated Mar. 31, 2017, 8 pages.

* cited by examiner

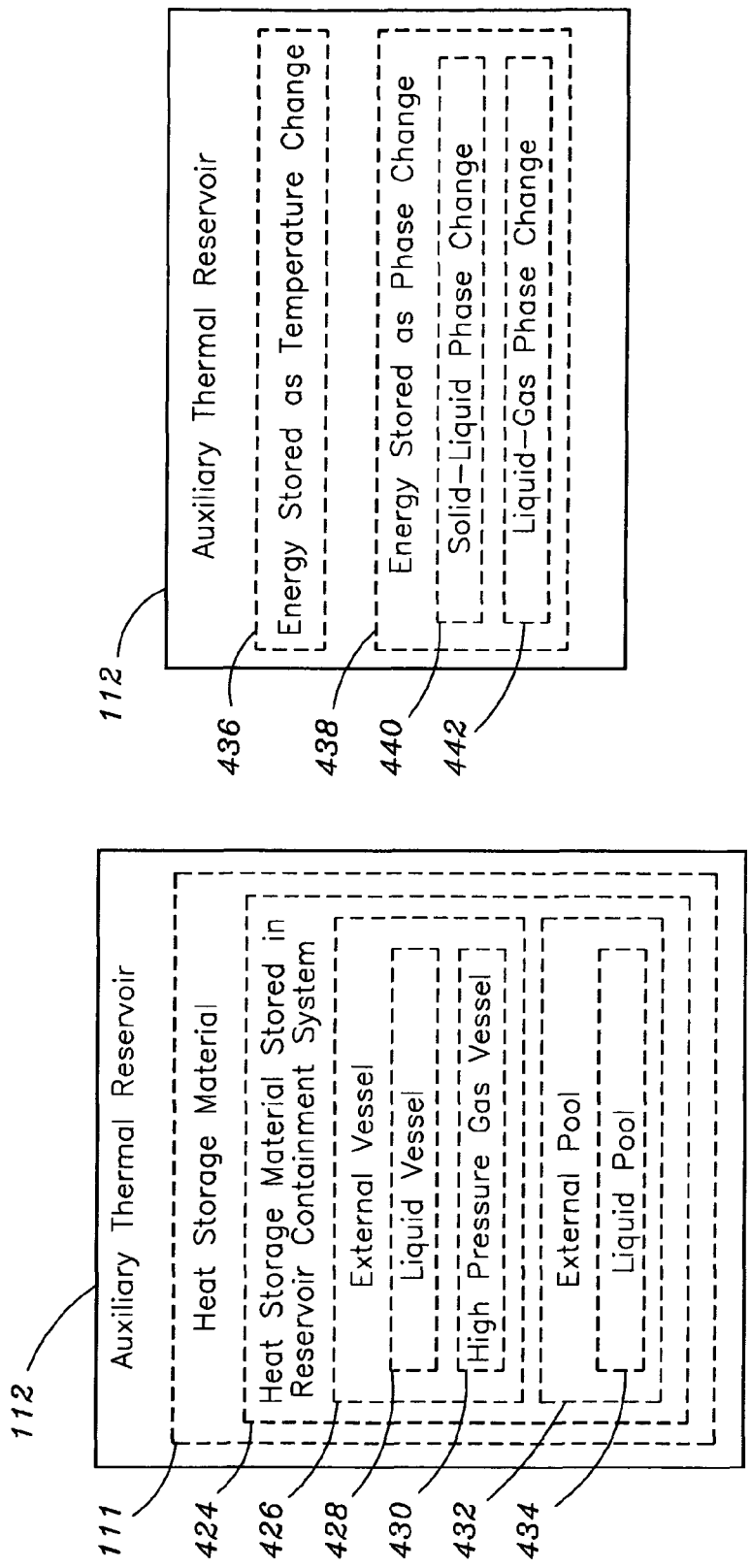

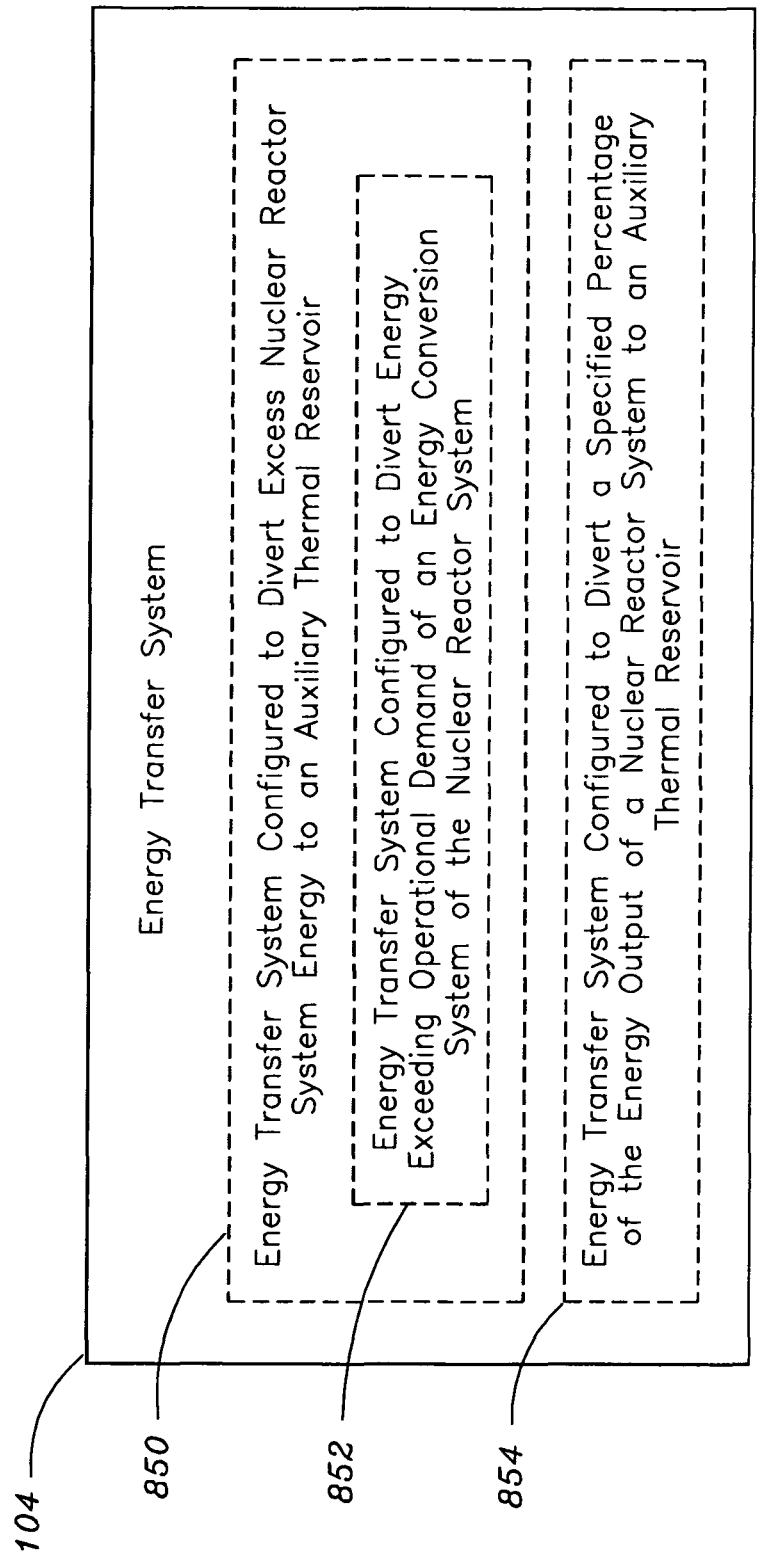

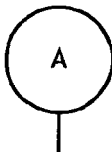

1030 supplying at least a portion of thermal energy from the at least one auxiliary thermal reservoir to at least one energy conversion system of at least one nuclear reactor system of the plurality of nuclear reactor systems 7802 responsive to at least one condition, supplying at least a portion of thermal energy from the at least one auxiliary thermal reservoir to at least one energy conversion system of at least one nuclear reactor system of the plurality of nuclear reactor systems 8202 responsive to a shutdown event of at least one nuclear reactor system of the plurality of nuclear reactor systems, supplying at least a portion of thermal energy from the at least one auxiliary thermal reservoir to at least one energy conversion system of at least one nuclear reactor system of the plurality of nuclear reactor systems 8602 responsive to a shutdown event established by at least one operation system of at least one nuclear reactor system of the plurality of nuclear reactor systems, supplying at least a portion of thermal energy from the at least one auxiliary thermal reservoir to at least one energy conversion system of at least one nuclear reactor system of the plurality of nuclear reactor systems 8604 responsive to a shutdown event established by at least one reactor control system of at least one nuclear reactor system of the plurality of nuclear reactor systems, supplying at least a portion of thermal energy from the at least one auxiliary thermal reservoir to at least one energy conversion system of at least one nuclear reactor system of the plurality of nuclear reactor systems 8606 responsive to a shutdown event established by at least one reactor control system responsive to at least one signal from at least one safety system of at least one nuclear reactor system of the plurality of nuclear reactor systems, supplying at least a portion of thermal energy from the at least one auxiliary thermal reservoir to at least one energy conversion system of at least one nuclear reactor system of the plurality of nuclear reactor systems 8608 responsive to a shutdown event established by at least one reactor control system responsive to at least one signal from from at least one safety system of at least one nuclear reactor system of the plurality of nuclear reactor systems, the safety system responsive to at least one sensed condition, supplying at least a portion of thermal energy from the at least one auxiliary thermal reservoir to at least one energy conversion system of at least one nuclear reactor system of the plurality of nuclear reactor systems

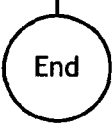

FIG. 86B

METHOD, SYSTEM, AND APPARATUS FOR THE THERMAL STORAGE OF ENERGY GENERATED BY MULTIPLE NUCLEAR REACTOR SYSTEMS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of United States Patent Application entitled METHOD, SYSTEM, AND APPARATUS FOR THE THERMAL STORAGE OF NUCLEAR REACTOR GENERATED ENERGY, naming RODERICK A. HYDE, MURIEL Y. ISHIKAWA, CLARENCE T. TEGREENE, JOSHUA C. WALTER, LOWELL L. WOOD, JR., AND VICTORIA Y. H. WOOD as inventors, filed Feb. 18, 2010, application Ser. No. 12/660,025, which is currently co-pending, or is an application of which a currently co-pending application is entitled to the benefit of the filing date.

For purposes of the USPTO extra-statutory requirements, the present application constitutes a continuation-in-part of United States Patent Application entitled METHOD, SYSTEM, AND APPARATUS FOR THE THERMAL STORAGE OF NUCLEAR REACTOR GENERATED ENERGY, naming RODERICK A. HYDE, MURIEL Y. ISHIKAWA, CLARENCE T. TEGREENE, JOSHUA C. WALTER, LOWELL L. WOOD, JR., AND VICTORIA Y. H. WOOD as inventors, filed Feb. 19, 2010, application Ser. No. 12/660,157, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

TECHNICAL FIELD

The present disclosure generally relates to the thermal storage and subsequent utilization of nuclear reactor generated energy.

SUMMARY

In one aspect, a method includes but is not limited to diverting a first selected portion of energy from a portion of a first nuclear reactor system of a plurality of nuclear reactor systems to at least one auxiliary thermal reservoir, diverting at least one additional selected portion of energy from a portion of at least one additional nuclear reactor system of the plurality of nuclear reactor systems to the at least one auxiliary thermal reservoir, and supplying at least a portion of thermal energy from the at least one auxiliary thermal reservoir to at least one energy conversion system of at least one nuclear reactor system of the plurality of nuclear reactor systems. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to means for diverting a first selected portion of energy from a portion of a first nuclear reactor system of a plurality of nuclear reactor systems to at least one auxiliary thermal reservoir, means for diverting at least one additional selected portion of energy from a portion of at least one additional nuclear reactor system of the plurality of nuclear reactor systems to the at least one auxiliary thermal reservoir, and means for supplying at least a portion of thermal energy from the at least one auxiliary thermal reservoir to at least one energy conversion system of at least one nuclear reactor system of the plurality of nuclear reactor systems. In addition to the foregoing, other system aspects are described in the claims, drawings, and text forming a part of the present disclosure.

In one aspect, an apparatus includes but is not limited to a first energy transfer system configured to divert a first selected portion of energy from a portion of a first nuclear reactor system of a plurality of nuclear reactor systems to at least one auxiliary thermal reservoir, at least one additional energy transfer system configured to divert at least one additional selected portion of energy from a portion of at least one additional nuclear reactor system of the plurality of nuclear reactor systems to the at least one auxiliary thermal reservoir, and a heat supply system configured to supply at least a portion of thermal energy from the at least one auxiliary thermal reservoir to at least one energy conversion system of at least one nuclear reactor system of the plurality of nuclear reactor systems. In addition to the foregoing, other system aspects are described in the claims, drawings, and text forming a part of the present disclosure.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIG. 4B is a flow diagram illustrating the types of reservoir containment systems suitable for containing the various heat storage materials of the auxiliary thermal reservoir;

FIG. 4C is a flow diagram illustrating the thermodynamic changes to the heat storage material suitable for thermal energy storage;

FIG. 8C is a flow diagram illustrating the diversion of excess nuclear reactor system energy from the nuclear reactor system to the auxiliary thermal reservoir;

FIG. 86B is a high-level flowchart depicting an alternate implementation of FIG. 10.

DETAILED DESCRIPTION

Figure 1:
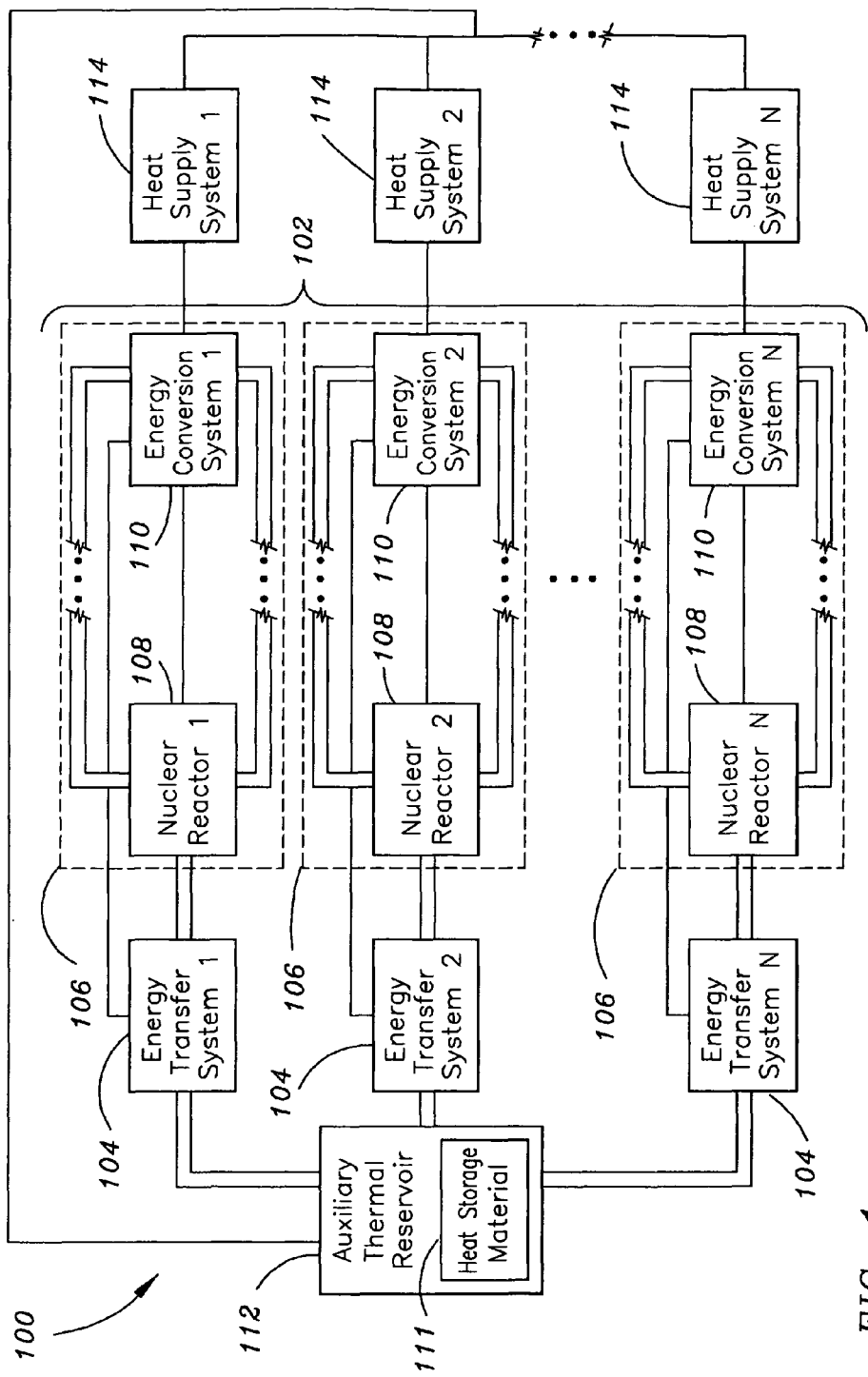
FIG. 1 is a schematic illustrating a system for the thermal storage of energy generated by multiple nuclear reactor systems.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring now to FIG. 1, a system 100 for storing and subsequently utilizing energy generated by a plurality of nuclear reactor systems 102 is described in accordance with the present disclosure. A first energy transfer system 104 may divert energy (e.g., thermal energy or electrical energy) from a portion (e.g., first nuclear reactor 108 or first energy conversion system 110) of a first nuclear reactor system 106 of a plurality of nuclear reactor systems 102 to one or more heat storage materials 111 of one or more auxiliary thermal reservoirs 112, and a second energy transfer system 104 may divert energy from a portion (e.g., second nuclear reactor 108 or second energy conversion system 108) of a second nuclear reactor system 106 of the plurality of nuclear reactor systems 102 to the one or more heat storage materials 111 of the one or more auxiliary thermal reservoirs 112. Further, an additional energy transfer system, up to and including an Nth energy transfer system 104, may divert energy from a portion (e.g., Nth nuclear reactor 108 or Nth energy conversion system 110) of an Nth nuclear reactor system 106 of the plurality of nuclear reactor systems 102 to the one or more heat storage materials 111 of the one or more auxiliary thermal reservoirs 112. Then, one or more heat supply systems 114 (e.g., first heat supply system 114, second heat supply system, or Nth heat supply system 114) may supply a portion of the thermal energy stored in the one or more auxiliary thermal reservoirs 112 to one or more energy conversion systems 110 of the one or more nuclear reactor systems 106 of the plurality of nuclear reactor systems 102. For instance, the energy conversion system 110 may include, but is not limited to, a first energy conversion system 110 associated with the first nuclear reactor system 106, a second energy conversion system 110 associated with the second nuclear reactor system 106, or an Nth energy conversion system 110 associated with the Nth nuclear reactor system 106.

It is further contemplated that the labeling of the various nuclear reactor systems 106 as the first nuclear reactor system 106, the second nuclear reactor system 106, the third nuclear reactor system 106, and the Nth nuclear reactor system 106 is for illustrative purposes only. As such, the first nuclear reactor system 106, the second nuclear reactor system 106, the third nuclear reactor system 106 and the Nth nuclear reactor system 106 are substantially interchangeable for the purposes described within the present disclosure. Similarly, it is contemplated that the labeling of the various energy conversion systems 110 as the first energy conversion system 110, the second energy conversion system 110, and the Nth energy conversion system 110 is for illustrative purposes only and, therefore, the first energy conversion system 110, the second energy conversion system 110, and the Nth energy conversion system 110 are substantially interchangeable for the purposes described in the present disclosure. Additionally, it is contemplated that the labeling of the various heat supply systems 114 as the first heat supply system 114, the second heat supply system 114, and the Nth heat supply system 114 is for illustrative purposes only and, therefore, the first heat supply system 114, the second heat supply system 114, and the Nth heat supply system 114 are substantially interchangeable for the purposes described in the present disclosure. It is further contemplated that the labeling of the various energy transfer systems 104 as the first energy transfer system 104, the second energy transfer system 104, and the Nth energy transfer system 104 is for illustrative purposes and therefore the first energy transfer system 104, the second energy transfer system 104, and the Nth energy transfer system 104 are substantially interchangeable for the purposes described in the present disclosure.

Figure 2:
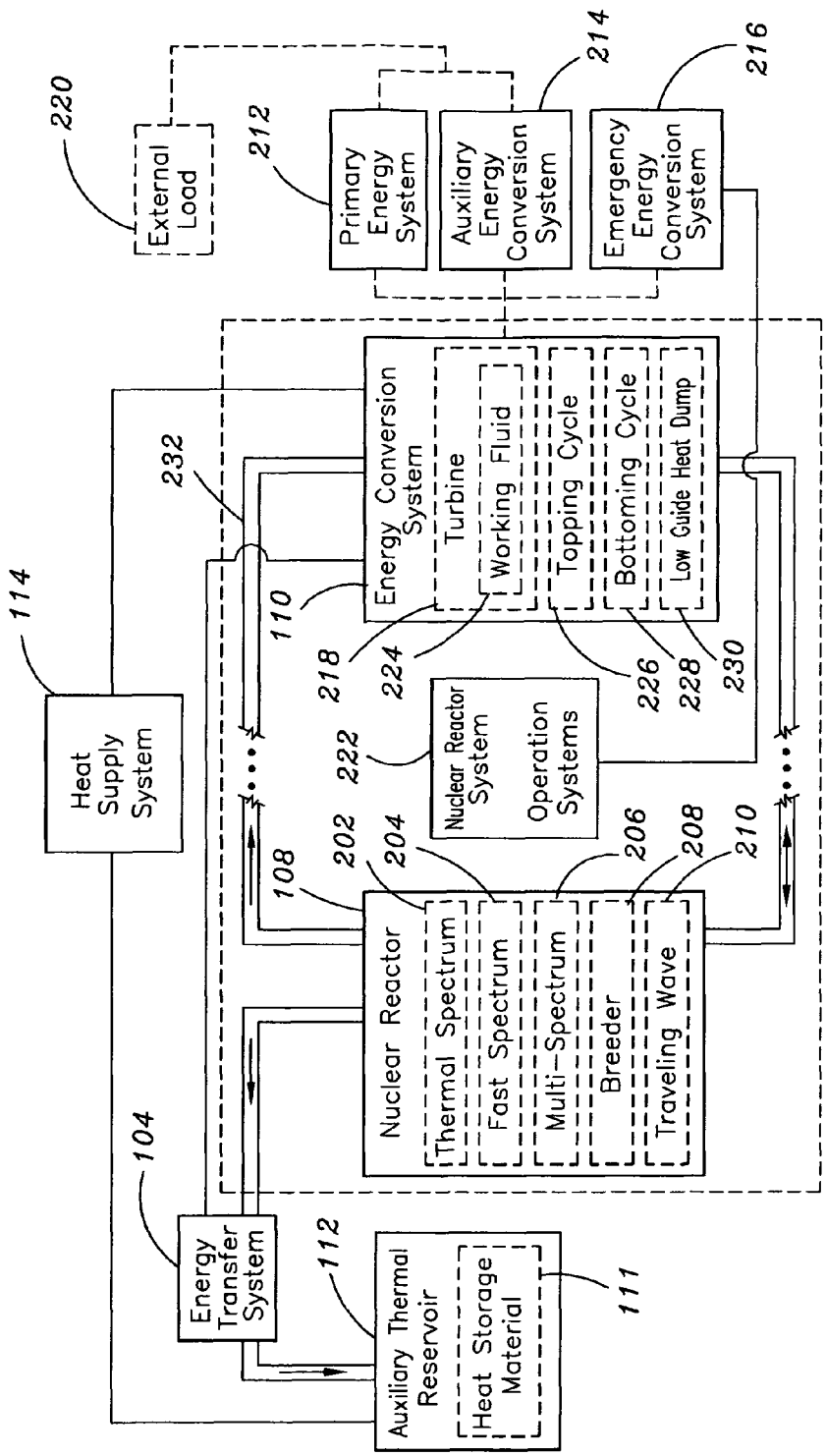
FIG. 2 is a schematic illustrating the types of nuclear reactors and energy conversion systems suitable to operate in a nuclear reactor system suitable of the multiple nuclear reactor system

Referring now to FIG. 2, one or more of the nuclear reactors 108 (i.e., the first nuclear reactor, the second nuclear reactor, or the Nth nuclear reactor) of one or more of the nuclear reactor systems 106 (i.e., first nuclear reactor system, second nuclear reactor system, or Nth nuclear reactor system) of the plurality of nuclear reactor systems 102 may include, but are not limited to, one or more thermal spectrum nuclear reactors 202, one or more fast spectrum nuclear reactors 204, one or more multi-spectrum nuclear reactors 206, one or more breeder nuclear reactors 208, or one or more traveling wave nuclear reactors 210. For example, the energy produced by a thermal spectrum nuclear reactor 202 of a nuclear reactor system 106 may be diverted from the thermal spectrum nuclear reactor 202 to one or more auxiliary thermal reservoirs 112 using an energy transfer system 104. Then, one or more heat supply systems 114 may supply a portion of the thermal energy stored in the one or more auxiliary thermal reservoirs 112 to one or more energy conversion systems 110 (e.g., the first energy conversion system, the second energy conversion system, or the Nth energy conversion system) of the nuclear reactor systems 106 of the plurality of nuclear reactor systems 102.

By way of further example, the energy produced by a traveling wave nuclear reactor 210 of a nuclear reactor system 106 may be diverted from the traveling wave nuclear reactor 210 to one or more auxiliary thermal reservoirs 112 using an energy transfer system 104. Then, one or more heat supply systems 114 may supply a portion of the thermal energy stored in the one or more auxiliary thermal reservoirs 112 to one or more energy conversion systems 110 of the nuclear reactor systems 106. Further, it will be recognized by those skilled in the art that the first nuclear reactor 108, the second nuclear reactor 108, and the Nth nuclear reactor 108 need not consist of the same type of nuclear reactor. For instance, the first nuclear reactor 108 may include a traveling wave nuclear reactor 210, the second nuclear reactor 108 may include a breeder nuclear reactor 208, and the Nth nuclear reactor 108 may include a thermal spectrum nuclear reactor 202.

In another aspect, one or more of the energy conversion systems 110 of the one or more nuclear reactor systems 106 of the plurality of nuclear reactors 102 may include, but are not limited to, one or more primary energy conversion systems 212, one or more auxiliary energy conversion systems 214, or one or more emergency energy conversion systems 216. For example, a heat supply system 114 may supply a portion of the thermal energy stored in the heat storage material 111 of the auxiliary thermal reservoir 112 to one or more primary energy conversion systems 212 of the one or more nuclear reactor systems 106 (e.g., the first nuclear reactor system, the second nuclear reactor system or the Nth nuclear reactor system) of the plurality of nuclear reactor systems 102 For instance, the primary energy conversion system 212 may include a turbine 218 coupled to an electric generator used to supply electrical power to the primary load 220 (e.g., electrical power grid) of one or more nuclear reactor systems 106. By way of an additional example, a heat supply system 114 may supply a portion of the thermal energy stored in the heat storage material 111 of the auxiliary thermal reservoir 112 to one or more auxiliary energy conversion systems 214 of one or more nuclear reactor systems 106 of the plurality of nuclear reactor systems 102. For instance, the auxiliary energy conversion system 214 may include an energy conversion system that supplements or replaces the output of the primary energy conversion system 212. For example, the auxiliary energy conversion system 214 may include a turbine 218 coupled to an electric generator used to provide supplemental or backup electric power to the primary load 220 of one or more nuclear reactor systems 106 of the plurality of nuclear reactor systems 102. By way of a further example, a heat supply system 114 may supply a portion of the thermal energy stored in the heat storage material 111 of the auxiliary thermal reservoir 112 to one or more emergency energy conversion systems 216 of one or more nuclear reactor systems 106 of the plurality of nuclear reactor systems 102. For instance, the emergency energy conversion system may include a turbine 218 coupled to an electric generator used to supply electric power to an operation system 222 (e.g., monitoring system, safety system, control system, coolant system or security system) of one or more nuclear reactor systems 106 (e.g., first nuclear reactor, second nuclear reactor, or Nth nuclear reactor) of the plurality of nuclear reactor systems 102. It will be appreciated by those skilled in the art that the emergency energy conversion system 216 may be configured to operate at temperatures lower than the operational temperature of the primary energy conversion system 212, allowing the emergency energy conversion system 216 to supply electrical energy to various operation systems 222 of one or more nuclear reactors 106 of the plurality of nuclear reactors 102 during emergency situations when grid power is unavailable. Further, it will be recognized by those skilled in the art that the first energy conversion system 110, the second energy conversion system 110, and the Nth energy conversion system need not consist of the same type of energy conversion system. For instance, the first energy conversion system 110 may include a primary energy conversion system 212, the second energy conversion system 110 may include an auxiliary energy conversion system 214, and the Nth energy conversion system 110 may include an emergency energy conversion system 216.

In another aspect, one or more of the energy conversion systems 110 may include, but are not limited to, one or more turbines 218 of the one or more nuclear reactor systems 106 of the plurality of nuclear reactor systems 102. For example, a heat supply system 114 may supply a portion of the thermal energy stored in the heat storage material 111 of the auxiliary thermal reservoir 112 to one or more turbines 218 of one or more nuclear reactors 106 of the plurality of nuclear reactors 102. By way of further example, a heat supply system 114 may supply a portion of the thermal energy stored in the heat storage material 111 of the auxiliary thermal reservoir 112 to a working fluid 224 of one or more turbines 218 of the one or more nuclear reactor systems 106 of the plurality of nuclear reactor systems 102. For instance, the heat supply system 114 may supply a portion of the thermal energy stored in the heat storage material 111 of the auxiliary thermal reservoir 112 to a pressurized steam working fluid 224 of one or more turbines 218 of the one or more nuclear reactor systems 106. It will be appreciated by those skilled in the art that the thermal energy supplied from the auxiliary thermal reservoir 112, via the one or more heat supply systems 114, to the working fluid 224 of one or more turbines 218 of the one or more nuclear reactor systems 106 may be used to augment the thermal energy supplied to the working fluid 224 of the one or more turbines 218 from the one or more nuclear reactors 108 of the one or more nuclear reactor systems 106.

In another aspect, one or more of the energy conversion systems 110 of the one or more nuclear reactor systems 106 of the plurality of nuclear reactor systems 102 may include, but are not limited to, one or more topping cycles 226, one or more bottoming cycles 228, or one or more low grade heat dumps 230. For example, a heat supply system 114 may supply a portion of the thermal energy stored in the heat storage material 111 of the auxiliary thermal reservoir 112 to one or more topping cycles 226 of one or more of the nuclear reactor systems 106. By way of another example, a heat supply system 114 may supply a portion of the thermal energy stored in the heat storage material 111 of the auxiliary thermal reservoir 112 to one or more bottoming cycles 228 of one or more of the nuclear reactor systems 106. By way of further example, a heat supply system 114 may supply a portion of the thermal energy stored in the heat storage material 111 of the auxiliary thermal reservoir 112 to one or more low grade heat dumps of one or more of the nuclear reactor systems 106. For instance, the low grade heat dump may include a portion of the surrounding environment (e.g., surrounding soil or atmosphere).

It will be recognized by those skilled in the art that the low grade environmental heat dump serves as the ultimate heat sink, allowing for the effective removal of reactor core decay heat in the event the primary heat removal system(s) fail. In this context, the auxiliary thermal reservoir may serve as a thermal capacitor, residing upstream of the more thermally resistive low grade heat dump, such as the surrounding soil or surrounding atmosphere. As the reactor decay heat falls of exponentially, the auxiliary thermal reservoir, acting as a thermal capacitor, may act to absorb the high initial heat load, while the heat is dissipated at a lower rate to the low grade environmental heat dump.

Further, it will be recognized by those skilled in the art that the first energy conversion system 110, the second energy conversion system 110, and the Nth energy conversion system 110 need not consist of the same type of energy conversion system. For instance, the first energy conversion system 110 may include a topping cycle 226 of the first nuclear reactor system 106, the second energy conversion system 110 may include a bottoming cycle 228 of the second nuclear reactor system 106, and the Nth energy conversion system 110 may include a low grade heat dump 230 of the Nth nuclear reactor system 106.

In another aspect, a heat supply system 114 may supply a portion of the thermal energy stored in the heat storage material 111 of the auxiliary reservoir 112 to one or more boiling loops 232 of the one or more nuclear reactor systems 106, wherein the one or more boiling loops 232 of the one or more nuclear reactor systems 106 are in thermal communication with one or more energy conversion systems 110 of the one or more nuclear reactor systems 106. For example, a heat supply system 114 may supply a portion of the thermal energy stored in the heat storage material 111 of an auxiliary reservoir 112 to a boiling loop 232 in thermal communication with a turbine 218 of one or more nuclear reactor systems 106. By way of further example, the boiling loop 232 may be in thermal communication with one or more topping cycles 226, one or more bottoming cycle 228 or one or more low grade heat dumps 230 of the one or more nuclear reactor systems 106. It will be appreciated by those skilled in the art that the thermal energy supplied to the boiling loop 232 of the one or more nuclear reactor systems 106 from the one or more auxiliary thermal reservoirs 112 may be used to augment the thermal energy supplied to the one or more boiling loops 232 from the one or more nuclear reactors 108 of the one or more nuclear reactor systems 106 of the plurality of nuclear reactor systems 102.

Figure 3:
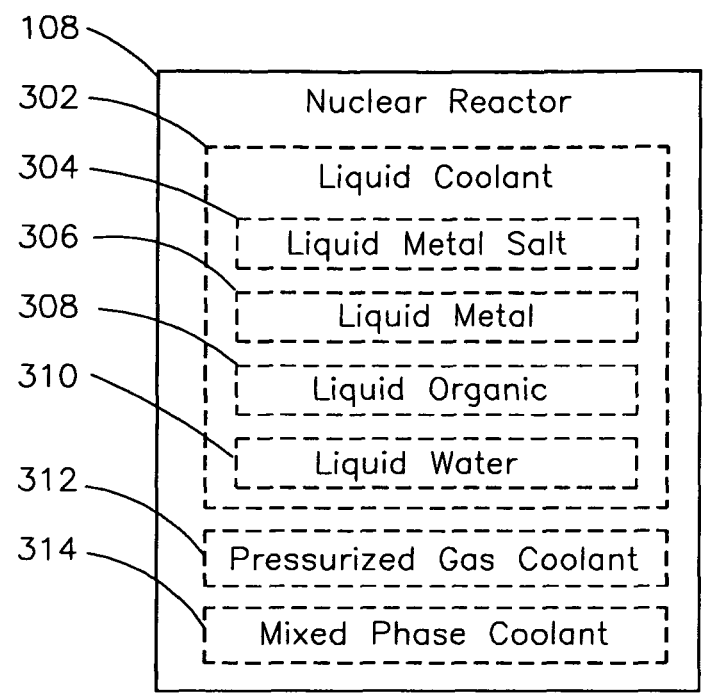
FIG. 3 is a flow diagram illustrating the types of nuclear reactor coolants suitable for use when providing nuclear reactor generated energy to an auxiliary thermal reservoir.

Referring now to FIG. 3, one or more of the nuclear reactors 108 of the one or more nuclear reactor systems 106 of the plurality of nuclear reactor systems 102 may include a nuclear reactor having a liquid coolant 302. For example, the liquid coolant 302 of one or more of the nuclear reactors 108 may include, but is not limited to, a liquid metal salt coolant 304 (e.g., lithium fluoride, beryllium fluoride or other fluoride salts), a liquid metal coolant 306 (e.g., sodium, lead, or lead bismuth), a liquid organic coolant 308 (e.g., diphenyl with diphenyl oxide), or a liquid water coolant 310. For instance, an energy transfer system 104 may divert energy from a portion of a liquid sodium cooled nuclear reactor of a nuclear reactor system 106 of the plurality of nuclear reactor systems 102 to an auxiliary thermal reservoir 112. In another instance, the energy transfer system 104 may divert energy from a portion of a liquid water cooled nuclear reactor 220 of a nuclear reactor system 106 of the plurality of nuclear reactor systems 102 to an auxiliary thermal reservoir 112. In an additional instance, the energy transfer system 104 may divert energy from a portion of a lithium fluoride cooled nuclear reactor of a nuclear reactor system 106 of the plurality of the nuclear reactor systems to an auxiliary thermal reservoir 112. Then, a heat supply system 114 may supply a portion of the thermal energy stored in the auxiliary thermal reservoir 112 to one or more energy conversion systems 110 of the one or more nuclear reactor systems 106 of the plurality of nuclear reactor systems 102.

In another aspect, one or more of the nuclear reactors 108 of the one or more nuclear reactor systems 106 of the plurality of nuclear reactor systems 102 may include one or more nuclear reactors having a pressurized gas coolant 312. For example, the pressurized gas coolant 222 may include, but is not limited to, pressurized helium gas or pressurized carbon dioxide gas. For instance, the energy transfer system 104 may divert energy from a portion of a pressurized helium cooled nuclear reactor 312 of a nuclear reactor system 106 of the plurality of nuclear reactor systems 102 to an auxiliary thermal reservoir 112. Then, a heat supply system 114 may supply a portion of the thermal energy stored in the auxiliary thermal reservoir 112 to one or more energy conversion systems 110 of the one or more nuclear reactor systems 106 of the plurality of nuclear reactor systems 102.

In another aspect, one or more of the nuclear reactors 108 of the one or more nuclear reactor systems 106 of the plurality of nuclear reactor systems 102 may include one or more nuclear reactors having a mixed phase coolant 314. For example, the mixed phase coolant 314 may include, but is not limited to, a gas-liquid mixed phase material (e.g., steam water-liquid water). For instance, the energy transfer system 104 may divert energy from a portion of a steam water-liquid water cooled nuclear reactor 314 of a nuclear reactor system 106 of the plurality of nuclear reactors 102 to an auxiliary thermal reservoir 112. Then, a heat supply system 114 may supply a portion of the thermal energy stored in the auxiliary thermal reservoir 112 to one or more energy conversion systems 110 of the one or more nuclear reactor systems 106 of the plurality of nuclear reactor systems 102.

Figure 4A:
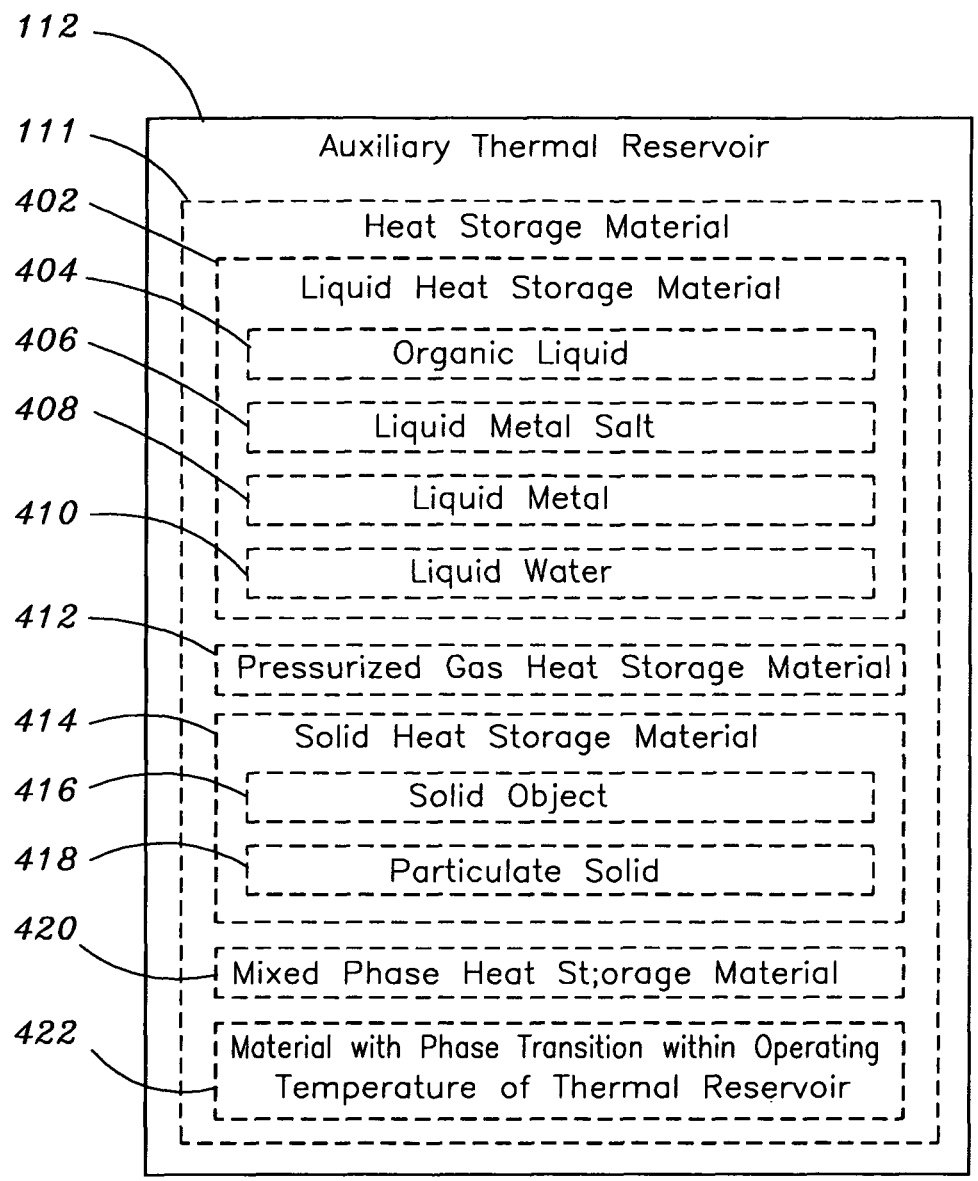
FIG. 4A is a flow diagram illustrating the types of heat storage materials suitable for the thermal storage of energy in an auxiliary thermal reservoir.

Referring now to FIG. 4A, one or more energy transfer systems 104 may divert energy from a portion of one or more nuclear reactor systems 106 of the plurality of nuclear reactor systems 102 to a liquid heat storage material 402 of one or more auxiliary thermal reservoirs 112. For example, the liquid heat storage material 402 may include, but is not limited to, an organic liquid 404 (e.g., diphenyl with diphenyl oxide), a liquid metal salt 406 (e.g., lithium fluoride, beryllium fluoride or other fluoride salts), a liquid metal 408 (e.g., sodium, lead, or lead bismuth), or liquid water 410. For instance, one or more energy transfer systems 104 may divert energy from a portion of one or more nuclear reactor systems 106 of the plurality of nuclear reactor systems 102 to a mass of liquid sodium of an auxiliary thermal reservoir 112. In another instance, one or more energy transfer systems 104 may divert energy from a portion of one or more nuclear reactor systems 106 of the plurality of nuclear reactor systems to a mass of liquid water 410 of an auxiliary thermal reservoir 112. Then, a heat supply system 114 may supply a portion of the thermal energy stored in the liquid heat storage material 402 of the one or more auxiliary thermal reservoirs 112 to one or more energy conversion systems 110 of the one or more nuclear reactor systems 106 of the plurality of nuclear reactor systems 102.

In another embodiment, one or more energy transfer systems 104 may divert energy from a portion of one or more nuclear reactor systems 106 of the plurality of nuclear reactor systems 102 to a pressurized gas heat storage material 412 of one or more auxiliary thermal reservoirs 112. For example, the pressurized gas material 412 suitable for heat storage may include, but is not limited to, pressurized helium gas or pressurized carbon dioxide gas. For instance, one or more energy transfer systems 104 may divert energy from a portion of one or more nuclear reactor systems 106 of the plurality of nuclear reactor systems 102 to a mass of pressurized helium of an auxiliary thermal reservoir 112. Then, a heat supply system 114 may supply a portion of the thermal energy stored in the pressurized gas material 412 of the one or more auxiliary thermal reservoirs 112 to one or more energy conversion systems 110 of the one or more nuclear reactor systems 106 of the plurality of nuclear reactor systems 102.

In another embodiment, one or more energy transfer systems 104 may divert energy from a portion of one or more nuclear reactor systems 106 of the plurality of nuclear reactor systems 102 to a solid heat storage material 414 of one or more auxiliary thermal reservoirs 112. In one aspect, the solid heat storage material 414 may include a continuous solid material forming a solid object 416. For example, the solid object 416 suitable for heat storage may include, but is not limited to, a three dimensional monolithic object (e.g., a brick), a three dimensional porous object (e.g., a brick containing pores suitable for fluid flow), a three dimensional channeled object (e.g. a brick containing channels suitable for fluid flow), or a three dimensional engineered object (e.g., an object containing an engineered honeycomb pattern for increased heat transfer). For instance, one or more energy transfer systems 104 may divert energy from a portion of one or more nuclear reactor systems 106 of the plurality of nuclear reactor systems 102 to one or more solid monolithic objects, such as a brick, a rod, or a sheet of material. In another instance, one or more energy transfer systems 104 may divert energy from a portion of one or more nuclear reactor systems 106 of the plurality of nuclear reactor systems 102 to a solid engineered object, such as an object constructed of a high heat capacity honeycomb structured material. Further, the solid object 416 may include, but is not limited to, a ceramic solid object, such as a carbide ceramic (e.g., titanium carbide or silicon carbide) or a boride ceramic, a metal solid (e.g., iron or steel) object, or an environmentally present solid (e.g., rock or stone) object. For example, one or more energy transfer systems 104 may divert energy from a portion of one or more nuclear reactor systems 106 of the plurality of nuclear reactor systems 102 to a ceramic solid object. By way of further example, one or more energy transfer systems 104 may divert energy from a portion of one or more nuclear reactor systems 106 of the plurality of nuclear reactor systems 102 to an environmentally preexisting rock or stone structure located in close proximity to one or more nuclear reactor systems 106 of the plurality of nuclear reactor systems 102.

In another aspect, the solid heat storage material 414 may include a particulate solid material 418. For example, the particulate solid material 418 may include, but is not limited to, a granular material (e.g. sand) or a powder material. For instance, one or more energy transfer systems 104 may divert energy from a portion of one or more nuclear reactor systems 106 of the plurality of nuclear reactor systems 102 to a mass of sand located in close proximity to one or more nuclear reactor systems 106 of the plurality of nuclear reactor systems 102. Further, one or more energy transfer systems 104 may divert energy from a portion of one or more nuclear reactor systems 106 of the plurality of nuclear reactor systems 102 to a mass of sand via heat pipes, wherein one portion of the heat pipes is in thermal communication with a portion of one or more nuclear reactors 108 of one or more nuclear reactor systems 106 and a second portion of the heat pipes is embedded in a volume of sand located in close proximity to one or more nuclear reactor systems 106. It will be recognized by those skilled in the art that the volume of the sand, and like solid materials, need not be constrained by the volume of a reservoir containment system 122, in that uncontained sand, stone, and like heat trapping materials surrounding one or more nuclear reactor systems 106 of the plurality of nuclear reactor systems 102 may serve as a suitable heat storage material 111. Then, a heat supply system 114 may supply a portion of the thermal energy stored in the solid heat storage material 414 of the one or more auxiliary thermal reservoirs 112 to one or more energy conversion systems 110 of the one or more nuclear reactor systems 106 of the plurality of nuclear reactor systems 102.

In another embodiment, one or more energy transfer systems 104 may divert energy from a portion of one or more nuclear reactor systems 106 of the plurality of nuclear reactor systems 102 to a mixed phase heat storage material 420 of one or more auxiliary thermal reservoir 112. For example, the mixed phase material 420 suitable for heat storage may include, but is not limited to a gas-liquid mixed phase material (e.g., steam water-liquid water) or a liquid-solid mixed phase material (e.g. liquid sodium-solid sodium). For instance, one or more energy transfer systems 104 may divert energy from a portion of one or more nuclear reactor systems 106 of the plurality of nuclear reactor systems 102 to a mass of steam water-liquid water. Then, a heat supply system 114 may supply a portion of the thermal energy stored in the mixed phase heat storage material 420 of the one or more auxiliary thermal reservoirs 112 to one or more energy conversion systems 110 of one or more of the nuclear reactor systems 106 of the plurality of nuclear reactor systems 102.

In another embodiment, one or more energy transfer systems 104 may divert energy from a portion of one or more nuclear reactor systems 106 of the plurality of nuclear reactor systems 102 to a mass of a heat storage material having a phase transition within the operating temperature 422 of the auxiliary thermal reservoir 112. For example, an auxiliary thermal reservoir 112 having a heat storage material 116 with a phase transition at approximately 100° C. may continuously operate at temperatures above and below the phase transition at 100° C. Those skilled in the art will recognize that this allows the heat supply system 114 to supply thermal energy from the auxiliary thermal reservoir 112 to one or more energy conversion systems 110 of one or more of the nuclear reactor systems 106 of the plurality of nuclear reactor systems 102 at reservoir temperatures above, below and at the phase transition temperature of the heat storage material 111. For instance, given that sodium has an approximate melting temperature of 97.7° C., a sodium based auxiliary thermal reservoir 112 may operate in the liquid phase at temperatures above 97.7° C. and in the solid phase at temperatures below 97.7° C. Then, a heat supply system 114 may supply a portion of the thermal energy stored in the heat storage material 111 having a phase transition within the operating temperature 422 of the auxiliary thermal reservoir 112 to one or more energy conversion systems 110 of one or more the nuclear reactor systems 106 of the plurality of nuclear reactor systems 102.

Referring now to FIG. 4B, one or more energy transfer systems 104 may divert energy from a portion of one or more nuclear reactor systems 106 of the plurality of nuclear reactor systems 102 to a mass of a heat storage material 111 contained in a reservoir containment system 424. For example, the reservoir containment system 424 may include, but is not limited to, an external vessel 426 or an external pool 432. By way of further example, the external vessel 426 may include, but is not limited to an external liquid vessel 428 or an external high pressure gas vessel 430. For instance, the one or more energy transfer systems 104 may divert energy from a portion of one or more nuclear reactor systems 106 of the plurality of nuclear reactor systems 102 to a mass of liquid metal 408 (e.g. liquid sodium) contained in an external liquid vessel 428. In another instance, the one or more energy transfer systems 104 may divert energy from a portion of one or more nuclear reactor systems 106 of the plurality of nuclear reactor systems 102 to a mass of pressurized gas 412 (e.g. pressurized helium) contained in an external high pressure vessel 430. By way of further example, the external pool 432 may include, but is not limited to, a liquid pool 434. For instance, the one or more energy transfer systems 104 may divert energy from a portion of one or more nuclear reactor systems 106 of the plurality of nuclear reactor systems 102 to a mass of liquid metal 408 (e.g. liquid sodium) contained in an external liquid pool 434. Then, a heat supply system 114 may supply a portion of the thermal energy stored in the heat storage material 111 contained in the reservoir containment system 424 to one or more energy conversion systems 110 of one or more of the nuclear reactor systems 106 of the plurality of nuclear reactor systems 102.

Referring now to FIG. 4C, the one or more auxiliary thermal reservoirs 112 may store the energy diverted from the one or more nuclear reactor systems 106 of the plurality of nuclear reactor systems 102 in the form of a temperature change 436 in the heat storage material 111 of the one or more auxiliary thermal reservoirs 112. For example, the energy diverted from the one or more nuclear reactor systems 106 to the heat storage material 111 of an auxiliary thermal reservoir 112 may cause the temperature of the heat storage material 111 to increase. For instance, the energy diverted from the one or more nuclear reactor systems 106 to the heat storage material 111 of an auxiliary thermal reservoir 112 may cause the temperature of the heat storage material 111, such as a liquid metal 408 (e.g., liquid sodium), to increase from an initial temperature of approximately 100° C. to a temperature of approximately 500° C. Then, a heat supply system 114 may supply a portion of the thermal energy stored in the heat storage material 111 as a temperature increase 436 to one or more energy conversion systems 110 of the one or more nuclear reactor systems 106 of the plurality of nuclear reactor systems 102.

In another aspect, the one or more auxiliary thermal reservoirs 112 may store the energy diverted from the one or more nuclear reactor systems 106 of the plurality of nuclear reactor systems 102 in the form of a phase change 438 in the heat storage material 111 of the one or more auxiliary thermal reservoirs 112. For example, the phase change 438 in the heat storage material 111 may include a solid-liquid phase change 440 or a liquid-gas phase change 442. For instance, the energy diverted from the one or more nuclear reactor systems 106 to a solid heat storage material 414 of an auxiliary thermal reservoir 112 may be stored in the heat storage material 111 by melting the heat storage material 111. For example, the energy diverted from the one or more nuclear reactor systems 106 to a mass of solid sodium may liquefy the mass of sodium via a melting transition at approximately 97.7° C., thus storing a portion of the diverted energy in the liquid phase of the mass of sodium. It will be appreciated by those skilled in the art that the energy required to transform the heat storage material 111 from one phase (e.g. solid) to a new phase (e.g., liquid) is the heat of transformation (i.e., the "latent heat"). Then, a heat supply system 114 may supply a portion of the heat of transformation stored as thermal energy in the heat storage material 111 to one or more energy conversion systems 110 of the one or more nuclear reactor systems 106 of the plurality of nuclear reactors 102.

Figure 4D:
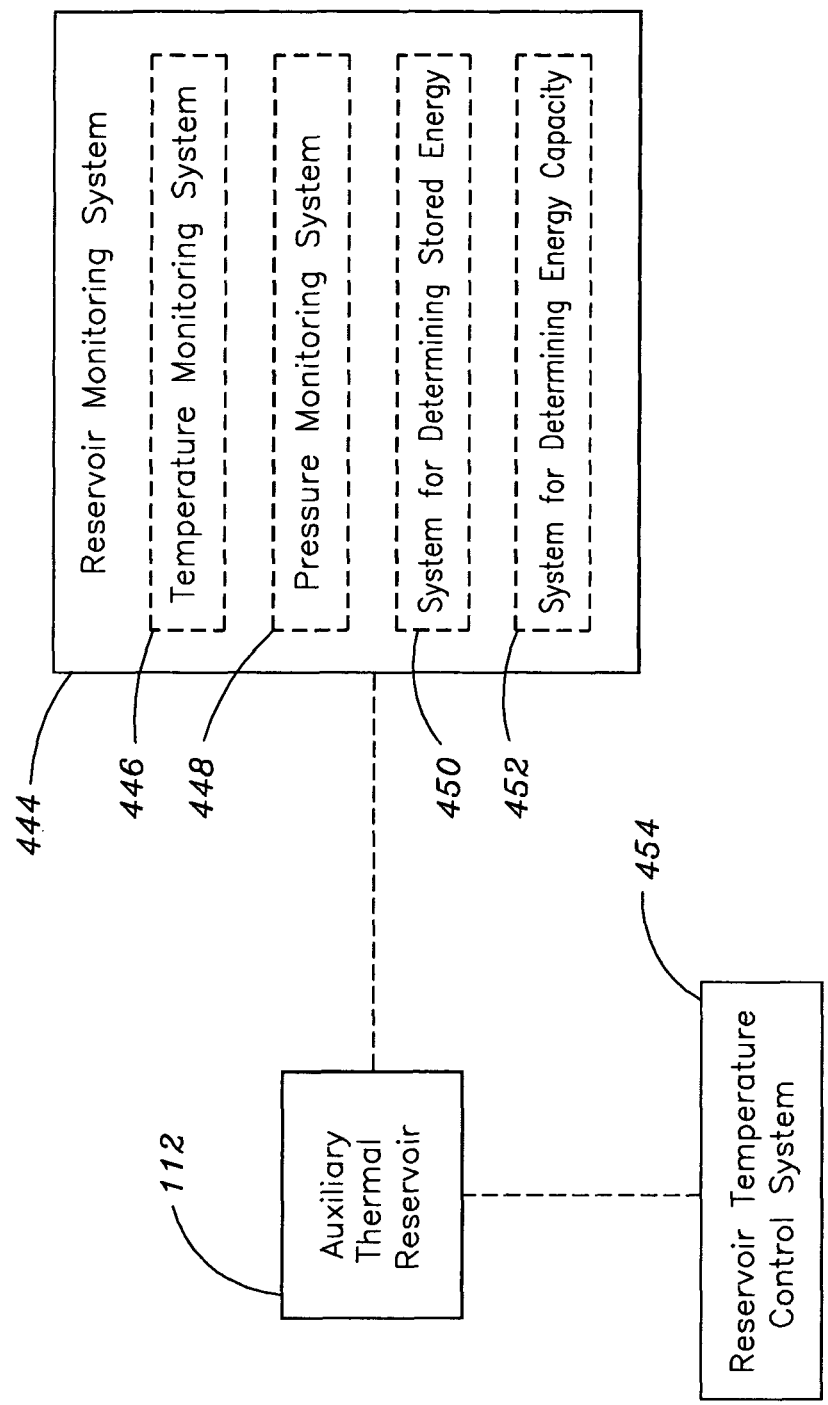
FIG. 4D is a flow diagram illustrating the types of reservoir monitoring systems suitable for monitoring the auxiliary thermal reservoir.

Referring now to FIG. 4D, the operational status of the auxiliary thermal reservoir 112 may be monitored using one or more reservoir monitoring systems 444. For example, the reservoir monitoring system 444 may include a temperature monitoring system 446, a pressure monitoring system 448, a system configured to determine the amount of energy stored in the thermal reservoir 450 or a system configured to determine the amount of available energy capacity of the thermal reservoir 452. For instance, a system configured to determine the amount of energy stored in the thermal reservoir 450 may include thermal and pressure monitoring devices configured to probe the temperature and pressure of the heat storage material 111 of the auxiliary thermal reservoir 112. Further, the thermal and pressure monitoring devices may be interfaced with a computer processing system configured to apply an established algorithm (e.g., established equation-of-state for the storage material in question) to the data outputs of the thermal and pressure monitoring devices, thus relating the temperature and pressure of the heat storage material 111 to the internal energy of the heat storage material 111 (e.g., liquid metal or pressurized gas).

In another aspect, the temperature of the auxiliary thermal reservoir 112 may be controlled using a reservoir temperature control system 454. For example, the reservoir temperature control system 454 may be used to increase or decrease the temperature of the auxiliary thermal reservoir 112. For instance, in situations where the internal temperature of the auxiliary thermal reservoir reaches levels outside the predefined operational limits, the reservoir temperature control system 454 may signal the heat supply system 114 to transfer a portion of the thermal energy stored in the auxiliary thermal reservoir 112 to the one or more energy conversion systems 110 of the nuclear reactor systems 106, such as a turbine 218 or a low grade heat dump 230.

Figure 5A:
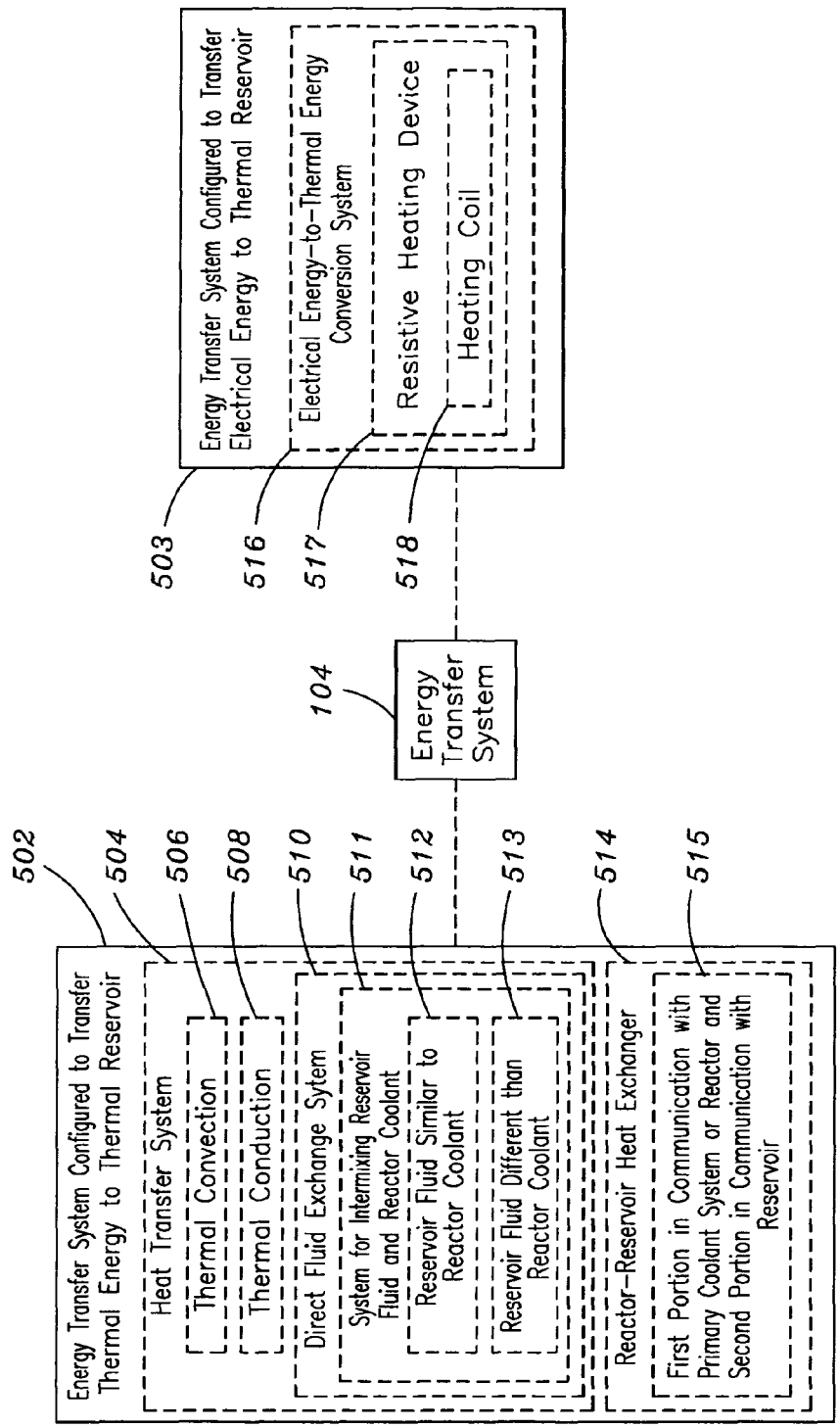
FIG. 5A is a flow diagram illustrating the types of energy transfer systems suitable for transferring energy from a nuclear reactor system to an auxiliary thermal reservoir.

Referring now to FIG. 5A, one or more of the energy transfer systems 104 may include, but are not limited to, an energy transfer system configured to transfer thermal energy 502 from a portion of one or more nuclear reactor systems 106 of the plurality of the nuclear reactor systems 102 to one or more auxiliary thermal reservoirs 112. For example, an energy transfer system configured to transfer thermal energy 502 from a portion (e.g., primary coolant system) of a nuclear reactor system 106 of the plurality of nuclear reactor systems 102 to the auxiliary thermal reservoir 112 may divert thermal energy from a portion of a nuclear reactor system 106 to an auxiliary thermal reservoir 112. Then, a heat supply system 114 may supply a portion of the thermal energy stored in the auxiliary thermal reservoir 112 to one or more energy conversion systems 110 of the one or more nuclear reactor systems 106 of the plurality of nuclear reactor systems 102.

Further, one or more of the energy transfer systems configured to transfer thermal energy 502 from a portion of one or more nuclear reactor systems 106 of the plurality of the nuclear reactor systems 102 to one or more auxiliary thermal reservoirs 112 may include, but are not limited to, one or more heat transfer systems 504. For example, a heat transfer system 504 may transfer thermal energy from a portion of a nuclear reactor system 106 of the plurality of nuclear reactor systems 102 to an auxiliary thermal reservoir 112. For instance, the heat transfer system 504 may transfer thermal energy from a portion of a nuclear reactor system 106 to an auxiliary thermal reservoir 112 via thermal convection 506 (e.g., natural convection or forced convection via coolant pump(s)). In another instance, the heat transfer system 504 may transfer thermal energy from a portion of a nuclear reactor system 106 to an auxiliary thermal reservoir 112 via thermal conduction 508 (e.g., using a heat exchanger). Those having skill in the art will recognize that the one or more heat transfer systems 504 may be configured to transfer thermal energy from a portion of one or more of the nuclear reactor systems 106 of the plurality of nuclear reactor systems 102 to one or more auxiliary thermal reservoirs 112 using both thermal conduction 506 and thermal convection 508. Then, a heat supply system 114 may supply a portion of the thermal energy stored in the one or more auxiliary thermal reservoirs 112 to one or more energy conversion systems 110 of the one or more nuclear reactor systems 106 of the plurality of nuclear reactor systems 102.

Further, the one or more heat transfer systems 504 may include, but are not limited to, one or more direct fluid exchange heat transfer systems 510. For example, a direct fluid exchange heat transfer system 510 may transfer thermal energy from a portion of a nuclear reactor system 106 of the plurality of nuclear reactor systems 102 to an auxiliary thermal reservoir 112. The direct fluid exchange heat transfer system 510 may include a system configured to intermix the coolant of a nuclear reactor 108 of a nuclear reactor system 106 with the fluidic heat storage material 111 contained in the reservoir containment system 424. For instance, a fluid carrying loop may couple a primary coolant system of a nuclear reactor system 106 and the reservoir fluid containment system 424, allowing for the intermixing of the two fluids. The rate of reactor coolant-reservoir fluid intermixing may be controlled by the direct fluid exchange transfer system 510. For instance, a valve system and/or fluid pumps (e.g., mechanical pumps or magnetohydrodynamic pumps) may be employed to volumetrically limit the exchange of material between the reactor coolant system of a nuclear reactor system 106 and the reservoir fluid containment system 424. Moreover, the reservoir fluid and the reactor coolant may consist of identical or substantially similar materials. For example, both the reservoir fluid and the reactor coolant may consist of an identical liquid metal, such as liquid sodium. Additionally, the reservoir fluid and the reactor coolant may consist of different materials. For example, the reservoir fluid may consist of a liquid organic, such as diphenyl with diphenyl oxide, while the reactor coolant may consist of liquid sodium.

Further, the one or more heat transfer systems 504 may include, but are not limited to, one or more reactor-reservoir heat exchangers 514. For example, a reactor-reservoir heat exchanger 514 may transfer thermal energy from a portion of a nuclear reactor system 106 of the plurality of nuclear reactor systems 102 to an auxiliary thermal reservoir 112. For instance, the reactor-to-reservoir heat exchanger 514 may include a heat exchanger 515 having a first portion in thermal communication with the primary coolant system of the nuclear reactor system 106 and a second portion in thermal communication with the auxiliary thermal reservoir 112. Further, the heat transfer system 504 may include more than one reactor-reservoir heat exchanger 514. For example, a first portion of a first heat exchanger may be in thermal communication with the primary coolant system of the nuclear reactor system 106, while a second portion of the first heat exchanger may be in thermal communication with a heat exchange loop. Further, a first portion of a second heat exchanger may be in thermal communication with the auxiliary thermal reservoir 112, while a second portion of the second heat exchanger may be in thermal communication with the heat exchange loop. Collectively, the first heat exchanger-heat exchange loop-second heat exchanger system acts to transfer thermal energy from the primary coolant system of the nuclear reactor system 106 to the auxiliary thermal reservoir 112.

In another aspect, one or more of the energy transfer systems 104 may include, but are not limited to, an energy transfer system configured to transfer electrical energy 503 from a portion of one or more of the nuclear reactor systems 106 of the plurality of the nuclear reactor systems 102 to one or more auxiliary thermal reservoirs 112. For example, an energy transfer system configured to transfer electrical energy 503 from a portion of a nuclear reactor system 106 of the plurality of nuclear reactor systems 102 to the auxiliary thermal reservoir 112 may transfer electrical energy from a portion (e.g., energy conversion system 110) of the nuclear reactor system 106 to the auxiliary thermal reservoir 112. Then, a heat supply system 114 may supply a portion of the thermal energy stored in the auxiliary thermal reservoir 112 to one or more energy conversion system 110 of the one or more nuclear reactor systems 106 of the plurality of nuclear reactor systems 102.

Further, one or more of the energy transfer systems configured to transfer electrical energy 503 from a portion of one or more nuclear reactor systems 106 of the plurality of the nuclear reactor systems 102 to one or more auxiliary thermal reservoirs 112 may include, but are not limited to, an electrical energy-to-thermal energy conversion system 516. For example, an electrical energy-to-thermal energy conversion system 516, such as a resistive heating device 517 (e.g., a heating coil 518), may convert a portion of the electrical energy produced by an energy conversion system 110 of a nuclear reactor system 106 to thermal energy. It will be recognized by those skilled in the art that the system for transferring electrical energy 503 from a portion of a nuclear reactor system 106 to an auxiliary thermal reservoir 112 may be utilized to convert excess electrical energy produced by an energy conversion system 110 of the nuclear reactor system 106 to thermal energy. Subsequently, a portion of that thermal energy may be transferred to and stored in the auxiliary thermal reservoir 112. Then, a heat supply system 114 may supply a portion of the thermal energy stored in the auxiliary thermal reservoir 112 to one or more energy conversion systems 110 of the one or more nuclear reactor systems 106 of the plurality of nuclear reactor systems 102.

Figure 5B:
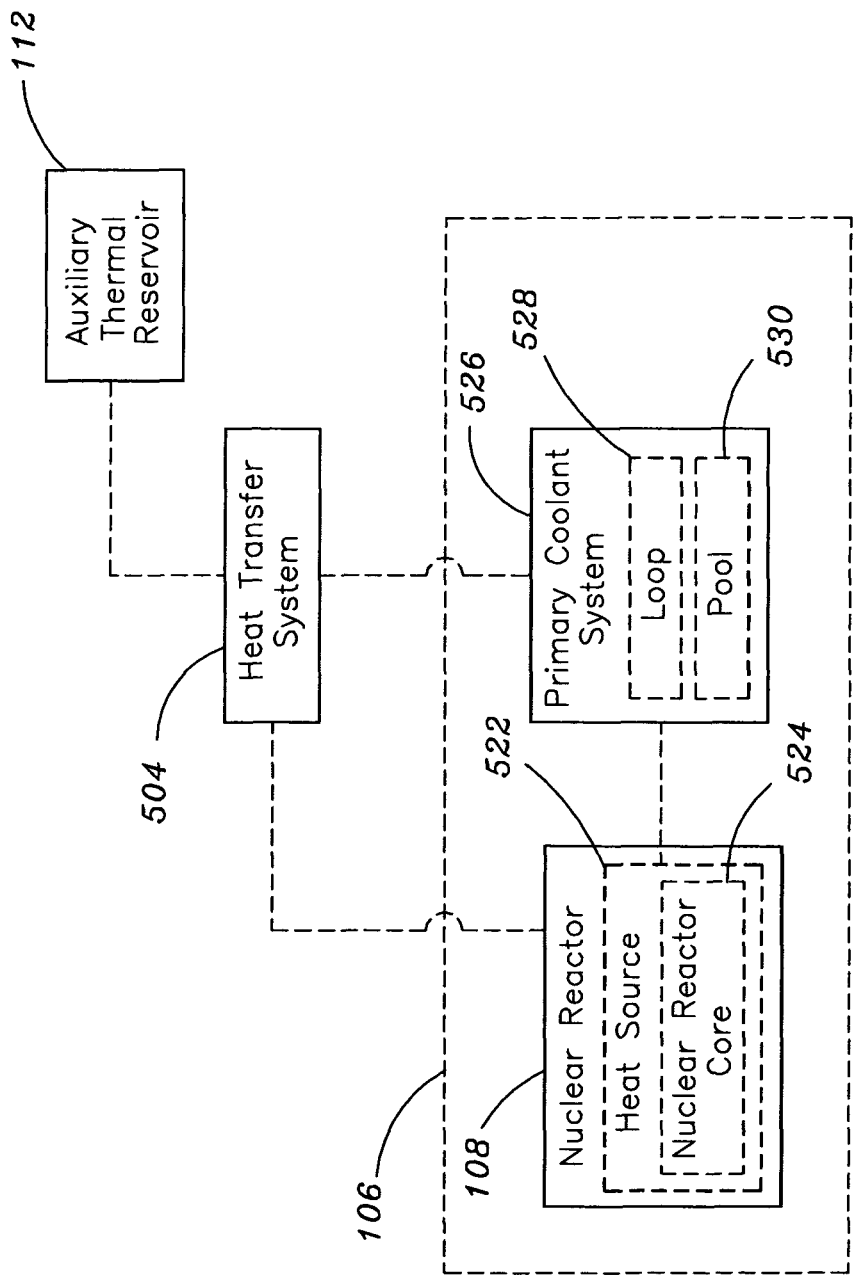
FIG. 5B is a schematic illustrating the thermal coupling of the auxiliary thermal reservoir to a heat source of the nuclear reactor system via a heat transfer system.

Referring now to FIG. 5B, one or more heat transfer systems 504 may transfer thermal energy from a portion of one or more nuclear reactor systems 106 of the plurality of nuclear reactor systems 102 to one or more auxiliary thermal reservoirs 112, wherein the portion of a nuclear reactor system 106 is in thermal communication with a heat source 522 of the nuclear reactor system 106. For example, a heat transfer system 504 may transfer thermal energy from a portion of a nuclear reactor system 106 in thermal communication with the nuclear reactor core 524 of a nuclear reactor 108 of the nuclear reactor system 106 to an auxiliary thermal reservoir 112. Further, the portion of the nuclear reactor system 106 in thermal communication with the nuclear reactor core 524 may include, but is not limited to, a portion of the primary coolant system 526 (e.g., portion of the primary coolant loop 528 or portion of the primary coolant pool 530). For example, a heat transfer system 504 may transfer thermal energy from a primary coolant system 526 of a nuclear reactor system 106 to an auxiliary thermal reservoir 112. Then, a heat supply system 114 may supply a portion of the thermal energy stored in the auxiliary thermal reservoir 112 to one or more energy conversion systems 110 of the one ore more nuclear reactor systems 106 of the plurality of nuclear reactor systems 102.

Figure 5C:
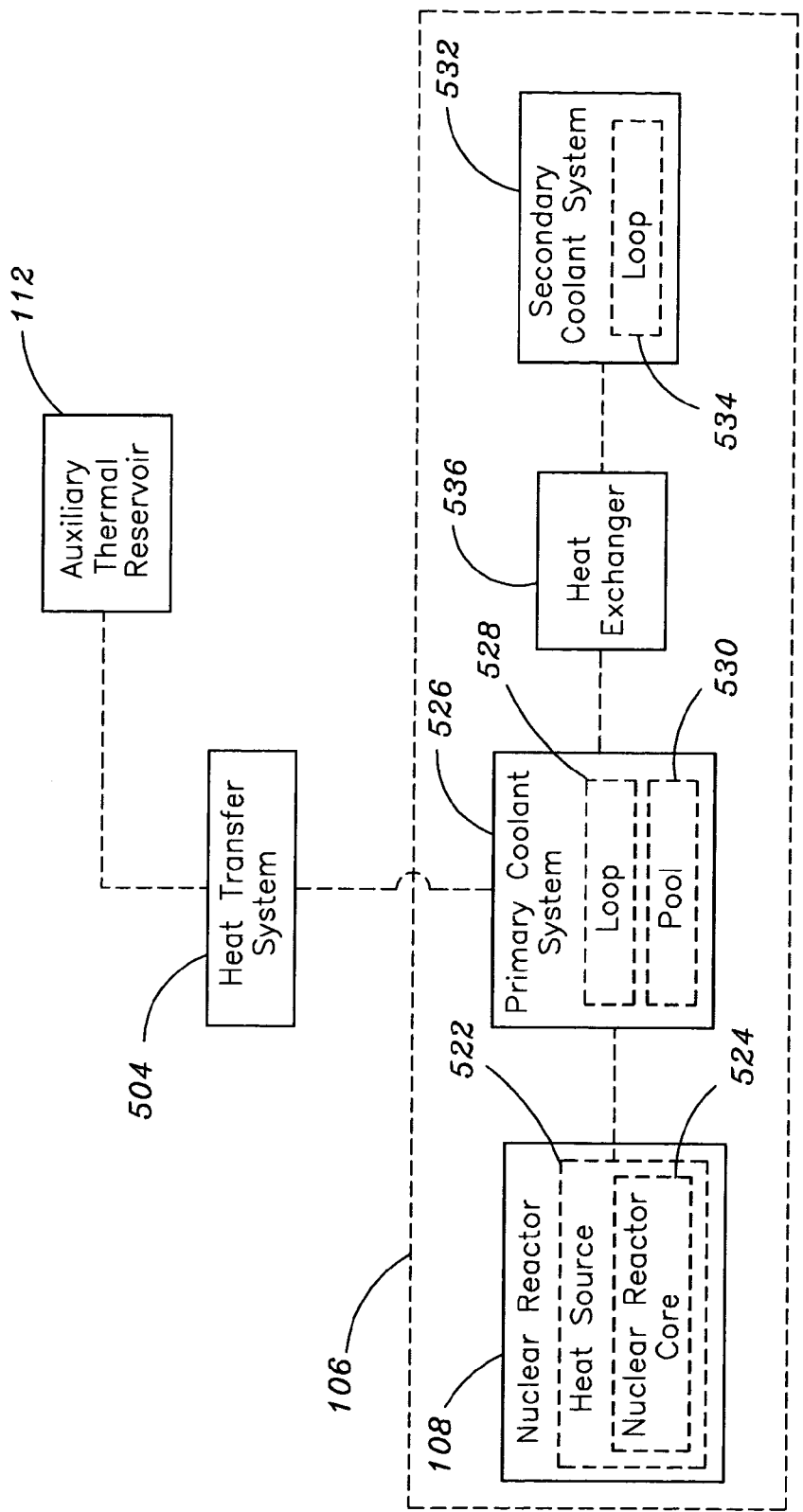
FIG. 5C is a schematic illustrating the thermal coupling of the auxiliary thermal reservoir system to the primary coolant system of the nuclear reactor system heat transfer.

Referring now to FIG. 5C, one or more heat transfer systems 504 may transfer thermal energy from a primary coolant system 526 of one or more nuclear reactor systems 106 of the plurality of nuclear reactor systems 102 to an auxiliary thermal reservoir 112, wherein the primary coolant system 526 is in thermal communication (e.g., thermally communicating via a primary coolant system-secondary coolant system heat exchanger 536) with a secondary coolant system not in thermal communication 532 with the auxiliary thermal reservoir 112. For example, the auxiliary thermal reservoir 112 may be thermally coupled via a heat transfer system 504 to a primary coolant loop 528 of the primary coolant system 526. By way of further example, the auxiliary thermal reservoir 112 may be thermally coupled via a heat transfer system 504 to a primary coolant pool 530 of the primary coolant system 526. Then, a heat supply system 114 may supply a portion of the thermal energy stored in the auxiliary thermal reservoirs 112 to one or more energy conversion systems 110 of the one or more nuclear reactor systems 106 of the plurality of nuclear reactor systems.

Figure 5D:
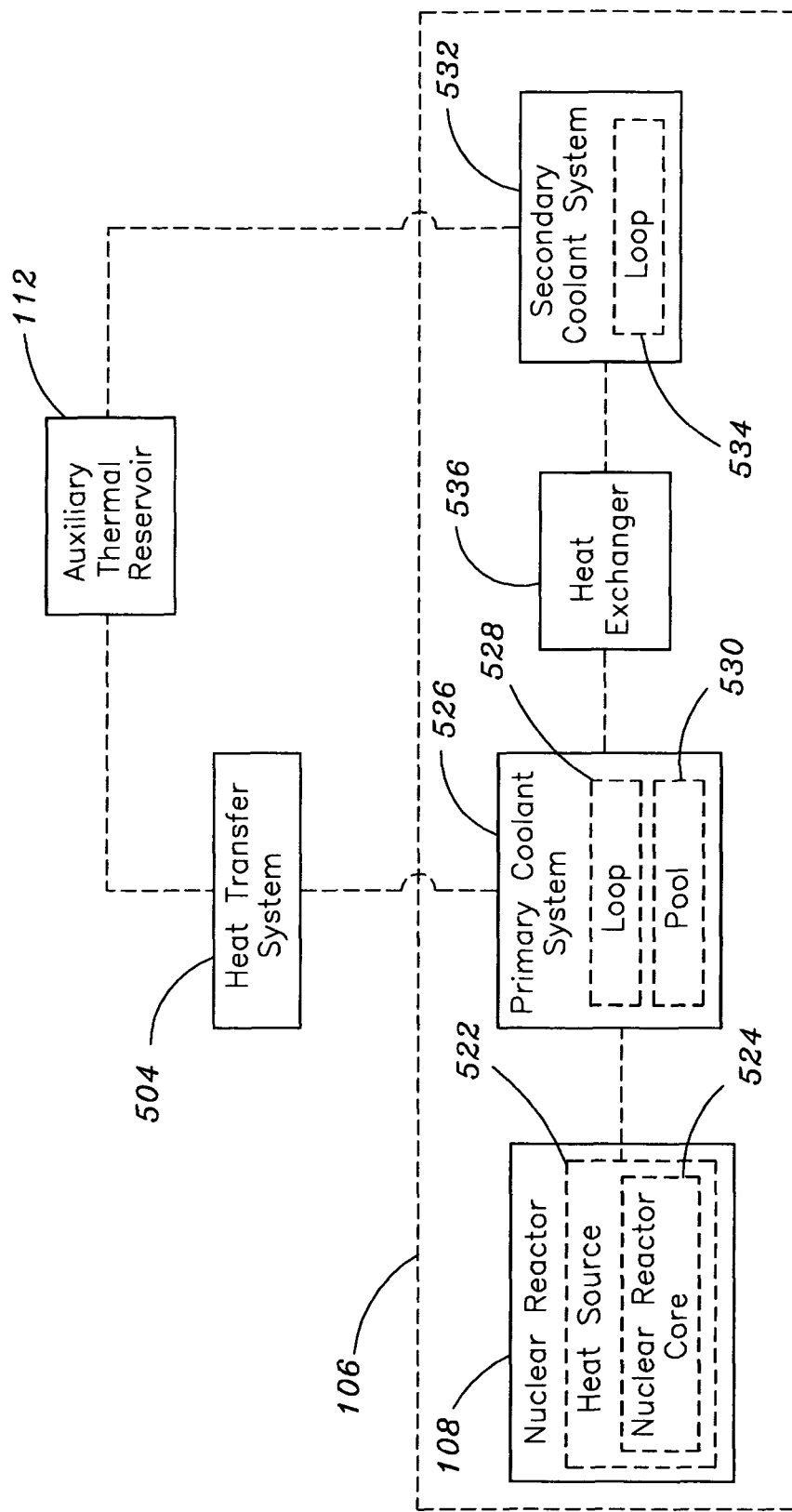
FIG. 5D is a schematic illustrating the thermal coupling of the auxiliary thermal reservoir to the primary coolant system and the secondary coolant system of the nuclear reactor system.

Referring now to FIG. 5D, one or more heat transfer systems 504 may transfer thermal energy from a primary coolant system 526 of one or more nuclear reactor systems 106 to one or more auxiliary thermal reservoirs 112, wherein the primary coolant system 526 and a secondary coolant system 532 of the one or more nuclear reactor systems 106 are both in thermal communication with the auxiliary thermal reservoir 112. For example, the auxiliary thermal reservoir 112 may be thermally coupled to both a primary coolant loop 528 of the primary coolant system 526 of a nuclear reactor system 106 and a secondary coolant loop 534 of a secondary coolant system 532 of the nuclear reactor system 106, such that the thermal path coupling the primary coolant loop 526, the auxiliary thermal reservoir 112, and the secondary coolant loop 532 is parallel to the thermal path coupling the primary coolant loop 526, the primary-secondary coolant system heat exchanger 536, and the secondary coolant loop 532. Then, a heat supply system 114 may supply a portion of the thermal energy stored in the auxiliary thermal reservoir 112 to one or more energy conversion systems 110 of the one or more nuclear reactor systems 106 of the plurality of nuclear reactor systems 102.

Figure 6:
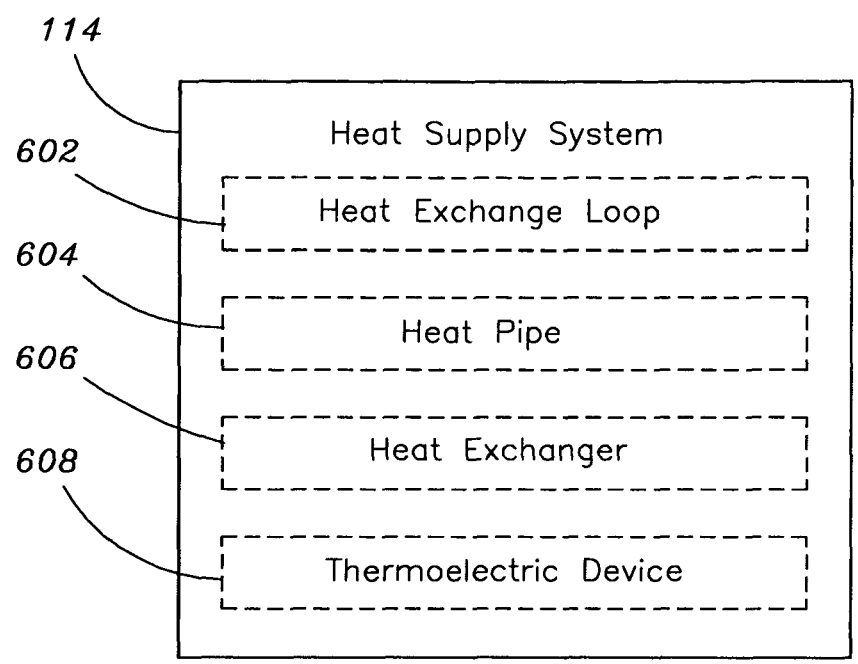
FIG. 6 is a flow diagram illustrating the types of thermal transfer components utilized in the heat supply system.

Referring now to FIG. 6, the heat supply system 114 may include, but is not limited to, a heat exchange loop 602. For example, a first portion of a heat exchange loop 602 may be in thermal communication with a portion of the auxiliary thermal reservoir 112 and a second portion of the heat exchange loop 602 may be in thermal communication with an energy conversion system 110 of one or more nuclear reactor systems 106 of the plurality of nuclear reactor systems 102. Then, in response to a shutdown event of one or more nuclear reactor systems 106 of the plurality of nuclear reactor systems 102, the heat exchange loop 602 may supply a portion of the thermal energy stored in the one or more auxiliary thermal reservoirs 112 to at least one energy conversion system 110 of the one or more nuclear reactor systems 106 of the plurality of nuclear reactor systems 102.

In another aspect, the heat supply system 114 may include, but is not limited to, one or more heat pipes 604. For example, a first portion of a heat pipe 604 may be in thermal communication with a portion of the auxiliary thermal reservoir 112 and a second portion of the heat pipe 604 may be in thermal communication with an energy conversion system 110 of one or more nuclear reactor systems 106 of the plurality of nuclear reactor systems 102. Then, in response to a shutdown event of one or more nuclear reactor systems 106 of the plurality of nuclear reactor systems 102, the heat pipe 604 may supply a portion of the thermal energy stored in the one or more auxiliary thermal reservoirs 112 to at least one energy conversion system 110 of the one or more nuclear reactor systems 106 of the plurality of nuclear reactor systems 102.

In another aspect, the heat supply system 114 may include, but is not limited to, one or more heat exchangers 606. For example, a first portion of a first heat exchanger 608 may be in thermal communication with a portion of the auxiliary thermal reservoir 112 and a second portion of the first heat exchanger 606 may be in thermal communication with an energy conversion system 110 of one or more nuclear reactor systems 106 of the plurality of nuclear reactor systems 102. Then, the heat pipe 604 may supply a portion of the thermal energy stored in the one or more auxiliary thermal reservoirs 112 to at least one energy conversion system 110 of one or more nuclear reactor systems 106 of the plurality of nuclear reactor systems 102.

It will be recognized by those skilled in the art that a combination of heat exchange loops 602, heat exchangers 606, and heat pipes 604 may be used in conjunction to supply heat from the auxiliary thermal reservoir 112 to an energy conversion system 110 of one or more nuclear reactor systems 106 of the plurality of nuclear reactor systems 102. For example, a first heat exchanger 606, containing a number of heat pipes 604, may be used to thermally couple the auxiliary thermal reservoir 112 and a first portion of a heat exchange loop 602. Moreover, a second heat exchanger 606, also containing numerous heat pipes 604, may be used to thermally couple a portion of an energy conversion system 110 of a nuclear reactor system 106 of the plurality of nuclear reactor systems 102 to the heat exchange loop 602. Then, thermal energy may be supplied from the auxiliary thermal 112 reservoir to the energy conversion system 110 via the heat exchange loop-heat exchanger circuit.

In another aspect, the heat supply system 114 may include, but is not limited to, one or more thermoelectric devices 608. For example, a first portion of a thermoelectric device 608 (e.g., p-type/n-type semiconductor thermoelectric junction) may be placed in thermal communication with the auxiliary thermal reservoir 112, while a second portion of the thermoelectric device 608 may be placed in thermal communication with a cold reservoir (e.g., an environmental reservoir or any portion of the nuclear reactor system at a temperature lower than the auxiliary thermal reservoir) of one or more nuclear reactor systems 106 of the plurality of nuclear reactor systems 102. Then, the electrical power produced by the thermoelectric conversion of the thermal energy stored in the auxiliary thermal reservoir 112 may be used to supplement or replace the electrical output of an energy conversion system 110 of one or more nuclear reactor systems 106 of the plurality of nuclear reactor systems 102.

Figure 7:
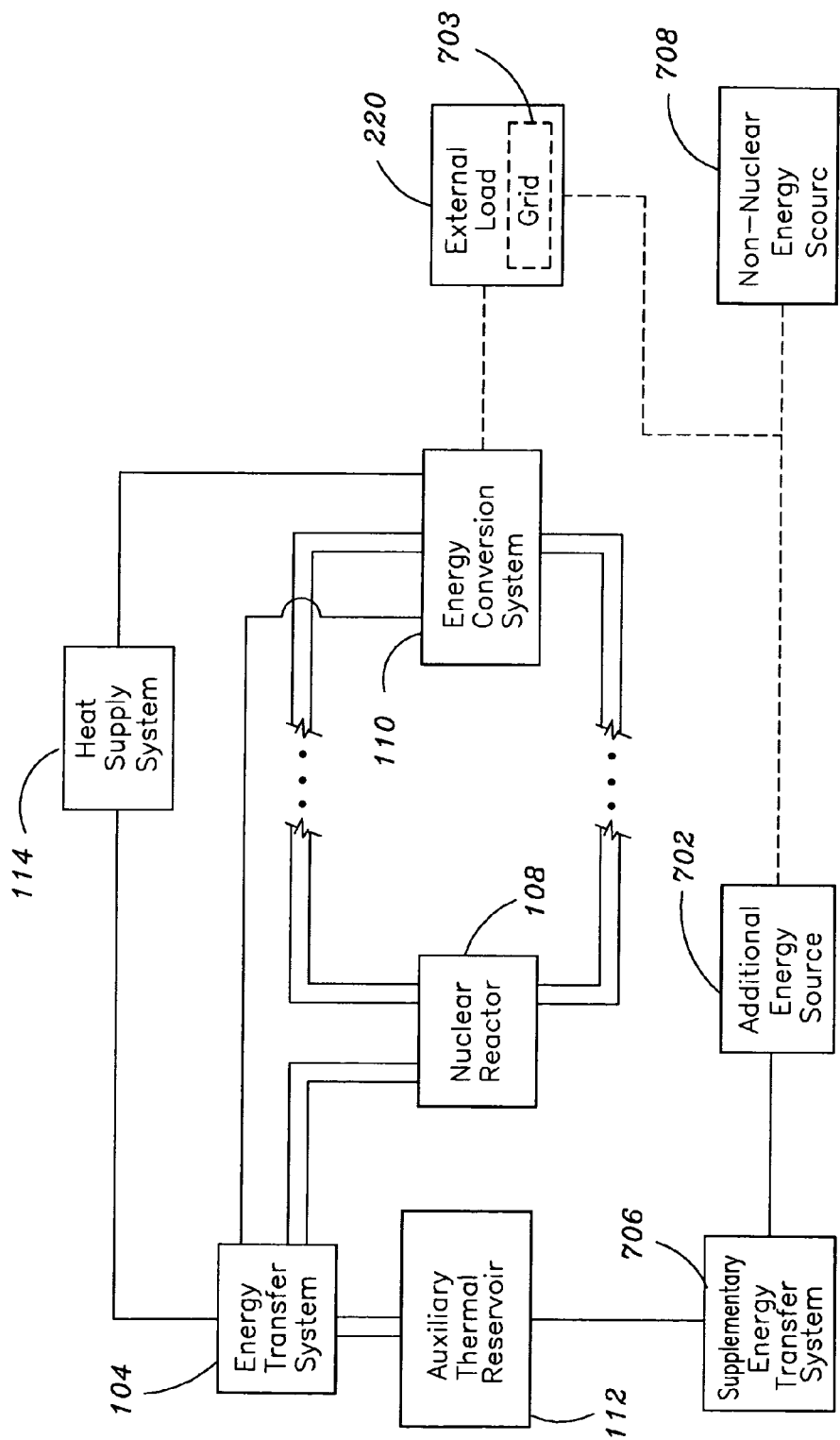
FIG. 7 is a schematic illustrating the supplementing of the auxiliary thermal reservoir with additional energy from an additional energy source.

Referring now to FIG. 7, an additional energy source 702 may supplement the auxiliary thermal reservoir 112 with an additional portion of energy. For example, excess energy from the load 220 (e.g., the external grid 703) of one or more of the nuclear reactor systems 106 may be used to provide supplemental energy to the auxiliary thermal reservoir 112. For instance, when grid requirements are such that an energy conversion system 110 is producing excess electrical power, the excess power may be converted to thermal energy via an electrical-to-thermal energy conversion process (e.g., heating coil) and transferred to the auxiliary thermal reservoir 112 using a supplementary energy transfer system 704, thus supplementing the energy transferred to the auxiliary thermal reservoir 112 via the energy transfer systems 104 during normal operation.

By way of another example, the additional energy source 702 may include, but is not limited to, a non-nuclear reactor energy source 708, such as coal powered generator, a solar array, or wind powered turbine. For instance, electrical energy produced from a coal powered generator may be converted to thermal energy via an electrical-to-thermal energy conversion process and transferred to the auxiliary thermal reservoir 112 using a supplementary energy transfer system 704, thus supplementing the energy transferred to the auxiliary thermal reservoir 112 via the energy transfer systems 104 during normal operation. In another instance, excess electrical energy from a solar array or wind powered turbine may be converted to thermal energy via an electrical-to-thermal energy conversion process and transferred to the auxiliary thermal reservoir 112 using a supplementary energy transfer system 704, thus supplementing the energy transferred to the auxiliary thermal reservoir 112 via the energy transfer systems 104 during normal operation.

In an additional instance, thermal energy produced by a coal generator may be transferred directly to the auxiliary thermal reservoir 112 via a supplementary energy transfer system 704, thus supplementing the energy transferred to the auxiliary thermal reservoir 112 via the primary energy transfer systems 104 during normal operation. It will be recognized by those skilled in the art that the supplemental energy supplied to the auxiliary thermal reservoir 112 by an additional energy source may be used to superheat the reservoir material of the auxiliary thermal reservoir to temperatures beyond normal operational capability.

Figure 8A:
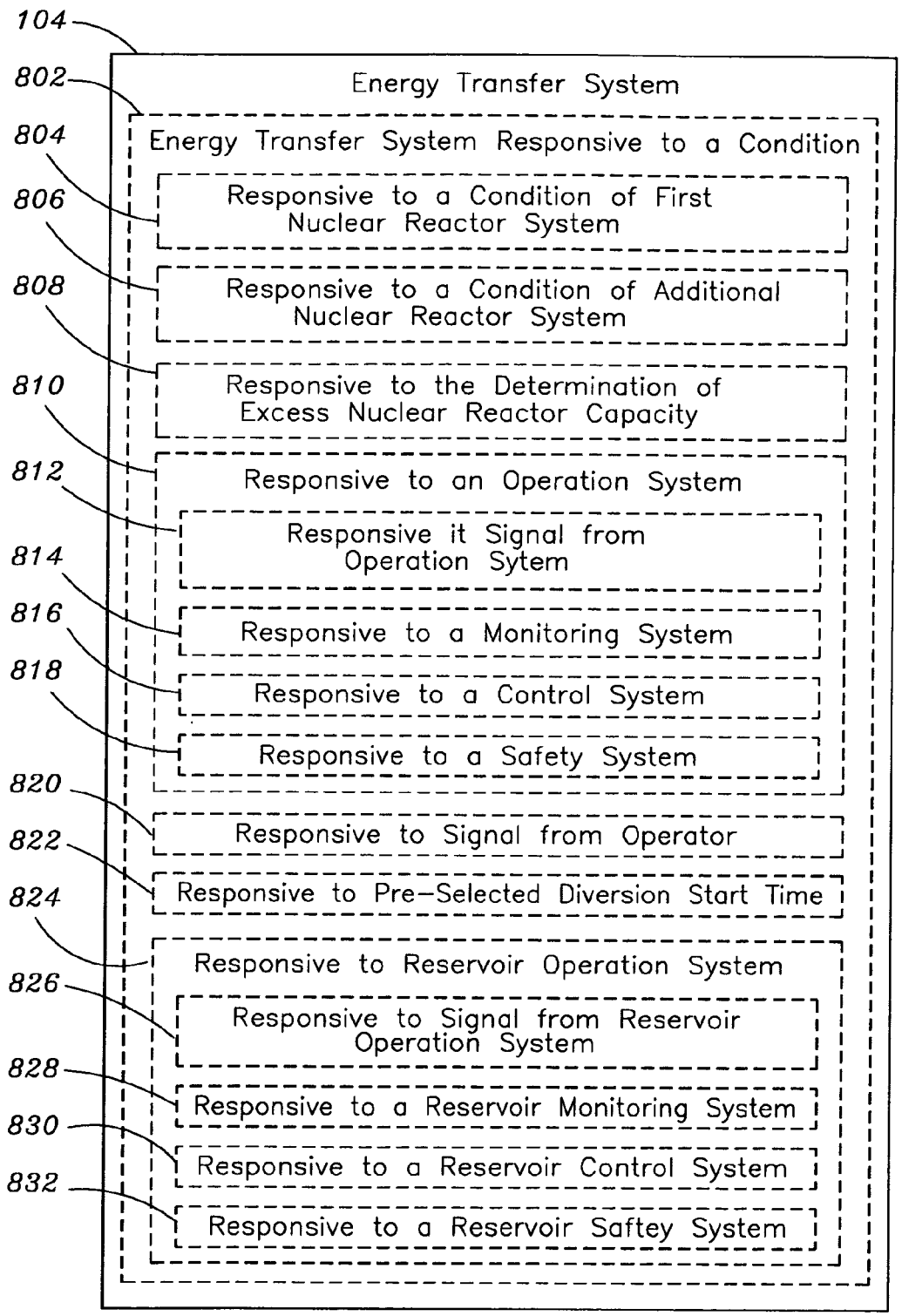
FIGS. 8A and 8B are flow diagrams illustrating the types of conditions the energy transfer system is responsive to when initiating diversion of energy from the nuclear reactor system to the auxiliary thermal reservoir.

Referring now to FIG. 8A, one or more of the energy transfer systems 104 may include, but are not limited to, an energy transfer system responsive to a condition 802. The conditions with which the energy transfer system is responsive may include, but are not limited to, nuclear reactor operational conditions (e.g., temperature, rate of change of temperature, pressure or rate of change of pressure, nuclear reactor capacity), power demand on the one or more nuclear reactor systems (e.g., electrical power requirements of the grid), nuclear reactor system operation system conditions (e.g., control system, monitoring system, or safety system (e.g., heat sink status or coolant pump status)). For example, in response to a coolant pump malfunction of one of the nuclear reactor systems 106, an energy transfer system 104 may divert energy from a portion of the nuclear reactor system 106 to the auxiliary thermal reservoir 112. By way of further example, at or near a specified operating temperature of a portion of a nuclear reactor system 106 (e.g., nuclear reactor core or nuclear reactor coolant fluid), an energy transfer system 104 may initiate transfer of thermal energy from the nuclear reactor 108 of the nuclear reactor system 106 to the auxiliary thermal reservoir 112. Then, a heat supply system 114 may supply a portion of the thermal energy stored in the one or more auxiliary thermal reservoirs 112 to one or more of the energy conversion systems 110 of one or more of the nuclear reactor systems 106 of the plurality of nuclear reactor systems 102.

Further, an energy transfer system associated with a first nuclear reactor 106 of the plurality of nuclear reactor systems 102 may include an energy transfer system responsive to a condition of a first nuclear reactor system 804. For example, in response to a coolant pump malfunction of a first nuclear reactor system 106 of the plurality of nuclear reactor systems 102, an energy transfer system configured to respond to a condition of the first nuclear reactor system 804 may divert energy from a portion of the first nuclear reactor system 106 to the auxiliary thermal reservoir 112. Then, a heat supply system 114 may supply a portion of the thermal energy stored in the one or more auxiliary thermal reservoirs 112 to one or more of the energy conversion systems 110 of one or more of the nuclear reactor systems 106 of the plurality of nuclear reactor systems 102.

Additionally, an energy transfer system associated with a first nuclear reactor 106 of the plurality of nuclear reactor systems 102 may include an energy transfer system responsive to a condition of an additional nuclear reactor system 806 of the plurality of nuclear reactor systems 102. For example, in response to a drop in the energy output of a second nuclear reactor system 106 of the plurality of nuclear reactor systems, the energy transfer system configured to respond to a condition of an additional nuclear reactor system 806 may divert energy from a portion of the first nuclear reactor system 106 of the plurality of nuclear reactor system 102 to the auxiliary thermal reservoir 112. By way of further example, in response to a drop in the energy output of the second and third nuclear reactor systems 106 (e.g., a drop in both the individual outputs of the second nuclear reactor system and third nuclear reactor system or a drop in the collective output of the second and third nuclear reactors systems) of the plurality of nuclear reactor systems 102, the energy transfer system configured to respond to a condition of an additional nuclear reactor system 806 may divert energy from a portion of the first nuclear reactor system 106 of the plurality of nuclear reactor system 102 to the auxiliary thermal reservoir 112. Further, in response to a drop in the energy output of the Nth nuclear reactor system 106 of the plurality of nuclear reactor systems 102, the energy transfer system configured to respond to a condition of an additional nuclear reactor system 806 may divert energy from a portion of the first nuclear reactor system 106 of the plurality of nuclear reactor system 102 to the auxiliary thermal reservoir 112. More generally, in response to a condition of the Nth nuclear reactor system 106 of the plurality of nuclear reactor systems 102, the corresponding energy transfer systems configured to respond to a condition of an additional nuclear reactor system 806 may divert energy from a portion of the first nuclear reactor system 106, the second nuclear system 106, or up the (N−1) nuclear reactor system 106 of the plurality of nuclear reactor system 102 to the auxiliary thermal reservoir 112. Then, a heat supply system 114 may supply a portion of the thermal energy stored in the one or more auxiliary thermal reservoirs 112 to one or more of the energy conversion systems 110 of one or more of the nuclear reactor systems 106 of the plurality of nuclear reactor systems 102.

In another aspect, one or more of the energy transfer systems 104 may include, but are not limited to, an energy transfer system responsive to the determination of excess capacity 808 of one or more of the nuclear reactor systems of the plurality of the nuclear reactor systems 102. For example, in the event one or more of the nuclear reactor systems 106 is producing more energy than is required by the load (e.g., external electrical power grid) of the energy conversion system 110 of the nuclear reactor system 106, the energy transfer system may initiate transfer of thermal or electrical energy from a portion of one or more of the nuclear reactor systems 106 (e.g., a first nuclear reactor system 106, a second nuclear reactor system 106 or a Nth nuclear system 106) to the auxiliary thermal reservoir 112. For instance, in the event a first nuclear reactor system 106 is producing more energy than is required by the load (e.g., external electrical power grid) of the energy conversion system 110 of the first nuclear reactor system 106, the energy transfer system 104 may initiate transfer of thermal or electrical energy from a portion of the first nuclear reactor system 106, the second nuclear reactor system 106 or the Nth nuclear reactor system 106 to the auxiliary thermal reservoir 112. Then, a heat supply system 114 may supply a portion of the thermal energy stored in the one or more auxiliary thermal reservoirs 112 to at least one energy conversion system 110 of one or more of the nuclear reactor systems 106 of the plurality of the nuclear reactor systems 102.

In an additional aspect, one or more of the energy transfer systems 104 may include, but are not limited to, an energy transfer system responsive to an operation system 810 of one or more of the nuclear reactor systems 106 of the plurality of the nuclear reactor systems 102. For example, the energy transfer system responsive to an operation system 810 may include, but is not limited to, an energy transfer system responsive to a signal from an operation system 812. For example, in response to a signal, such as a remote wireless signal (e.g., radio frequency signal) or remote wireline signal (e.g., copper wire signal or fiber optic cable signal), from an operation system (e.g., shutdown system, warning system, or security system) of one or more of the nuclear reactor systems 106, an energy transfer system responsive to a signal from an operation system 812 may initiate transfer of energy from a portion of one or more of the nuclear reactor systems 106 of the plurality of the nuclear reactor systems 102 to the auxiliary thermal reservoir 112. Further, the energy transfer system responsive to an operation system 810 may include, but is not limited to, an energy transfer system responsive to a monitoring system 808 (e.g., temperature monitoring system or pressure monitoring system), an energy transfer system responsive to a control system 810, or an energy transfer system responsive to safety system 812. For instance, in response to a signal from a monitoring system 814 of one or more of the nuclear reactor systems 106 of the plurality of the nuclear reactor systems 102, one or more of the energy transfer systems 104 may initiate transfer of energy from a portion of one or more of the nuclear reactor systems 106 to the auxiliary thermal reservoir 112. In another instance, in response to a signal from a control system 816 of one or more of the nuclear reactor systems 106 of the plurality of the nuclear reactor systems 102, one or more of the energy transfer systems 104 may initiate transfer of energy from a portion of one or more of the nuclear reactor systems 106 to the auxiliary thermal reservoir 112. Further, in response to a signal from a safety system 818 of one or more of the nuclear reactor systems 106 of the plurality of the nuclear reactor systems 102, one or more of the energy transfer systems 104 may initiate transfer of energy from a portion of one or more of the nuclear reactor systems 106 to the auxiliary thermal reservoir 112. Then, a heat supply system 114 may supply a portion of the thermal energy stored in the one or more auxiliary thermal reservoirs 112 to one or more of the one energy conversion systems 110 of one or more of the nuclear reactor systems 106 of the plurality of the nuclear reactor systems 102.

Further, an energy transfer system associated with a first nuclear reactor 106 of the plurality of nuclear reactor systems 102 may include an energy transfer system responsive to a signal from an operation system of the first nuclear reactor system. For example, in response to a signal from an operation system of the first nuclear reactor system 106 of the plurality of nuclear reactor systems 102, an energy transfer system configured to respond to a signal of an operation system of the first nuclear reactor system may divert energy from a portion of the first nuclear reactor system 106 to the auxiliary thermal reservoir 112. For instance, in response to a signal from the monitoring system of the first nuclear reactor system the energy transfer system may divert energy from a portion of the first nuclear reactor system 106 to the auxiliary thermal reservoir 112. Then, a heat supply system 114 may supply a portion of the thermal energy stored in the one or more auxiliary thermal reservoirs 112 to one or more of the energy conversion systems 110 of one or more of the nuclear reactor systems 106 of the plurality of nuclear reactor systems 102.

Moreover, an energy transfer system associated with a first nuclear reactor system 106 of the plurality of nuclear reactor systems 102 may include an energy transfer system responsive to a signal from an operation system of an additional nuclear reactor system. For example, in response to a signal from an operation system of an additional nuclear reactor system 106 (e.g., second nuclear reactor system 106, third nuclear reactor system 106, or Nth nuclear reactor system 106) of the plurality of nuclear reactor systems 102, the energy transfer system configured to respond to a signal from an operation system of an additional nuclear reactor system may divert energy from a portion of the first nuclear reactor system 106 of the plurality of nuclear reactor system 102 to the auxiliary thermal reservoir 112. For instance, in response to a signal from a monitoring system of an additional nuclear reactor system, the energy transfer system may divert energy from a portion of the first nuclear reactor system 106 to the auxiliary thermal reservoir 112. Then, a heat supply system 114 may supply a portion of the thermal energy stored in the one or more auxiliary thermal reservoirs 112 to one or more of the energy conversion systems 110 of one or more of the nuclear reactor systems 106 of the plurality of nuclear reactor systems 102.

In another aspect, one or more of the energy transfer systems 104 may include, but are not limited to, an energy transfer system responsive to a signal from an operator 820 of one or more of the nuclear reactor systems 106 of the plurality of the nuclear reactor systems 102. For example, in response to a signal from an operator (e.g., human user or human controlled system, such as a programmed computer system), one or more energy transfer systems responsive to a signal from an operator 820 may initiate transfer of energy from a portion of one or more of the nuclear reactor systems 106 of the plurality of the nuclear reactor systems 102 to the auxiliary thermal reservoir 112. For instance, an energy transfer system responsive to a signal from an operator 820, in response to a remote signal, such as a wireline or wireless signal from a computer terminal controlled by an operator, may initiate transfer of thermal energy from a nuclear reactor 108 of one or more of the nuclear reactor systems 106 to the auxiliary thermal reservoir 112. Then, a heat supply system 114 may supply a portion of the thermal energy stored in the one or more auxiliary thermal reservoirs 112 to one or more of the energy conversion systems 110 of one or more of the nuclear reactor systems 106 of the plurality of the nuclear reactor systems 102.

In an additional aspect, one or more of the energy transfer systems 104 may include, but are not limited to, an energy transfer system responsive to a pre-selected diversion start time 822. For example, the pre-selected diversion start time may include a time of elapse (e.g., time of elapse measured relative to a specific event, such as a shutdown event or satisfaction of grid demand requirements) or an absolute time. For instance, an energy transfer system responsive to a pre-selected diversion start time 822, at a pre-selected absolute time (e.g., 2:00 a.m. eastern standard time) may initiate transfer of energy from a nuclear reactor system 106 of the plurality of the nuclear reactor systems 102 to the auxiliary thermal reservoir 112. It will be recognized by those skilled in the art that historical grid power demand data may be utilized to determine the appropriate time in which to begin diversion of nuclear reactor generated energy to the auxiliary thermal reservoir 112. In another instance, the energy transfer system responsive to a pre-selected diversion start time 822, upon elapse of a pre-selected amount of time from a specific event, such as a nuclear reactor shutdown or achievement of power production in excess of external demand, may initiate transfer of energy from a portion of one or more of the nuclear reactor systems 106 of the plurality of the nuclear reactor systems 102 to the auxiliary thermal reservoir 112. Then, a heat supply system 114 may supply a portion of the thermal energy stored in the one or more auxiliary thermal reservoirs 112 to at least one energy conversion system 110 of one or more of the nuclear reactor systems 106 of the plurality of the nuclear reactor systems 102.

In another aspect, one or more of the energy transfer systems 104 may include, but are not limited to, an energy transfer system responsive to a reservoir operation system 824 of one or more auxiliary thermal reservoirs 112. For example, an energy transfer system responsive to a reservoir operation system 824 may include, but is not limited to, an energy transfer system responsive to a signal from a reservoir operation system 826. For example, in response to a signal, such as a remote wireless signal (e.g., radio frequency signal) or remote wireline signal (e.g., copper wire signal or fiber optic cable signal), from a reservoir operation system of the auxiliary thermal reservoir 112, the energy transfer system responsive to a signal from a reservoir operation system 826 may initiate transfer of energy from a portion of a nuclear reactor system 106 of the plurality of nuclear reactor systems 102. Further, the energy transfer system responsive to a reservoir operation system 824 may include, but is not limited to, an energy transfer system responsive to a reservoir monitoring system 828 (e.g., temperature monitoring system, pressure monitoring system, system for monitoring amount of stored energy, or system for monitoring the amount of available storage capacity), an energy transfer system responsive to a reservoir control system 830, or an energy transfer system responsive to a reservoir safety system 832. For instance, in response to a signal from a reservoir monitoring system, the energy transfer system responsive to a reservoir monitoring system 828 may initiate transfer of energy from a portion of a nuclear reactor system 106 of the plurality of nuclear reactor systems 102 to the auxiliary thermal reservoir 112. In another instance, in response to a signal from a reservoir control system, the energy transfer system responsive to a reservoir control system 830 may initiate transfer of energy from a portion of a nuclear reactor system 106 of the plurality of nuclear reactor systems 102 to the auxiliary thermal reservoir 112. Further, in response to a signal from a reservoir safety system, the energy transfer system responsive to a reservoir safety system 8832 may initiate transfer of energy from a portion of a nuclear reactor system 106 of the plurality of nuclear reactor systems 102 to the auxiliary thermal reservoir 112. Then, a heat supply system 114 may supply a portion of the thermal energy stored in the one or more auxiliary thermal reservoirs 112 to at least one energy conversion system 110 of one or more of the nuclear reactor systems 106 of the plurality of nuclear reactor systems 102.

Figure 8B:
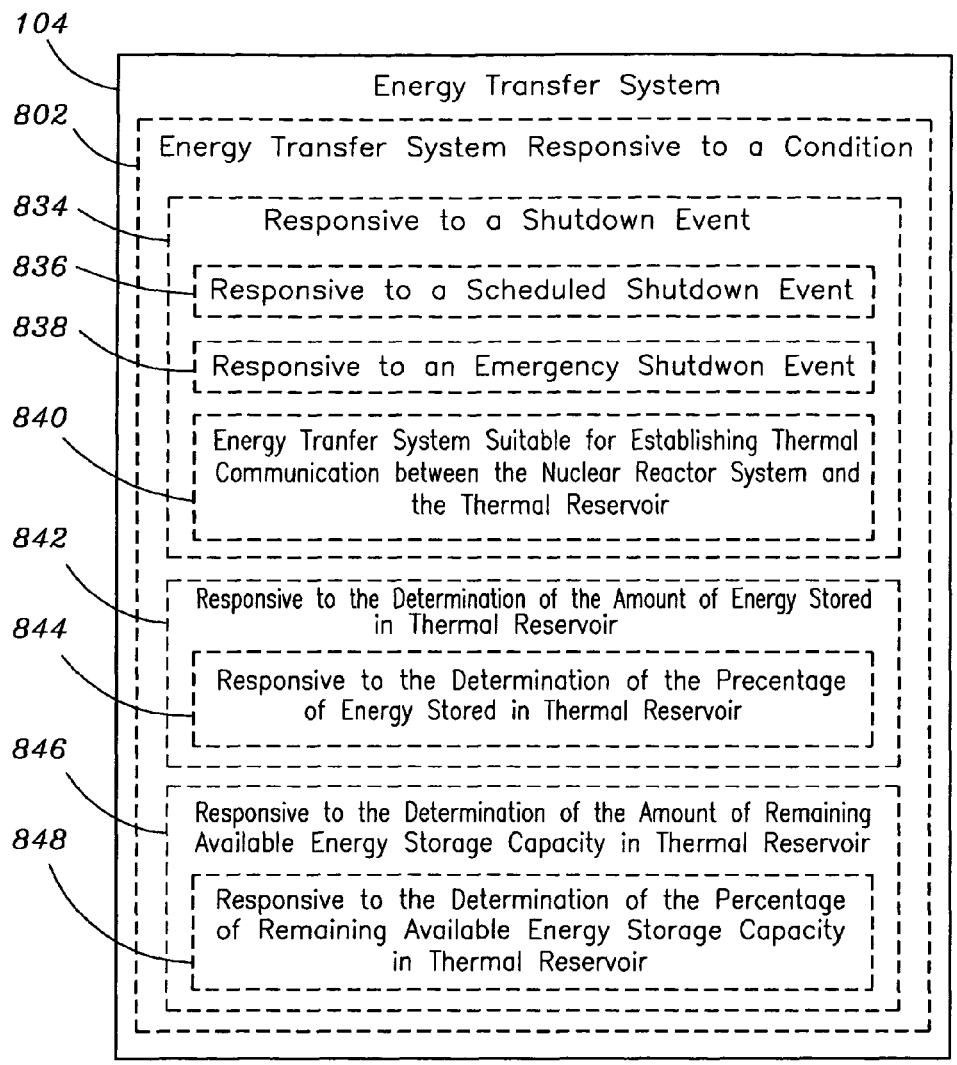

Referring now to FIG. 8B, one or more of the energy transfer systems 104 may include, but are not limited to, an energy transfer system responsive to a shutdown event 834 of one or more of the nuclear reactor systems 106 of the plurality of the nuclear reactor systems 102. For example, an energy transfer system responsive to a shutdown event 834 of one or more of the nuclear reactor systems 106 of the plurality of the nuclear reactor systems 102 may include, but is not limited to, an energy transfer system responsive to a scheduled shutdown event 834 of one or more of the nuclear reactor systems 106 or an energy transfer system responsive to an emergency shutdown event 838 of one or more of the nuclear reactor systems 106. For instance, in response to a schedule shutdown event (e.g., routine maintenance), one or more of the energy transfer systems responsive to a scheduled shutdown event 836 of one or more of the nuclear reactors 106 may initiate transfer of energy from a portion of one or more of the nuclear reactor system 106 to the auxiliary thermal reservoir 112. In another instance, in response to an emergency shutdown event (e.g., SCRAM), one or more of the energy transfer systems responsive to an emergency shutdown event 838 of one or more of the nuclear reactors 106 may initiate transfer of energy from a portion of one or more of the nuclear reactor system 106 to the auxiliary thermal reservoir 112. Then, a heat supply system 114 may supply a portion of the thermal energy stored in the auxiliary thermal reservoir 112 to at least one energy conversion system 110 of one or more of the nuclear reactor systems 106 of the plurality of nuclear reactor systems 102. It will be recognized by those skilled in the art that, in response to a shutdown event of a nuclear reactor system 106 of the plurality of nuclear reactor systems 102, energy may be diverted from a portion of the nuclear reactor system 106 to the auxiliary thermal reservoir 112 prior to, during, and following the shutdown of the nuclear reactor 108 of the nuclear reactor system 106, as part of the steps required to facilitate the nuclear reactor system 106 shutdown.

Further, an energy transfer system associated with a first nuclear reactor 106 of the plurality of nuclear reactor systems 102 may include an energy transfer system responsive to a shutdown event of the first nuclear reactor system. For example, in response to a shutdown event of the first nuclear reactor system 106 of the plurality of nuclear reactor systems 102, an energy transfer system configured to respond to a shutdown event of the first nuclear reactor system may divert energy from a portion of the first nuclear reactor system 106 to the auxiliary thermal reservoir 112. For instance, in response to an emergency shutdown event of the first nuclear reactor system the energy transfer system may divert energy from a portion of the first nuclear reactor system 106 to the auxiliary thermal reservoir 112. Then, a heat supply system 114 may supply a portion of the thermal energy stored in the one or more auxiliary thermal reservoirs 112 to one or more of the energy conversion systems 110 of one or more of the nuclear reactor systems 106 of the plurality of nuclear reactor systems 102.

Moreover, an energy transfer system associated with a first nuclear reactor system 106 of the plurality of nuclear reactor systems 102 may include an energy transfer system responsive to a shutdown event of an additional nuclear reactor system. For example, in response to a shutdown event of an additional nuclear reactor system 106 (e.g., second nuclear reactor system 106, third nuclear reactor system 106, or Nth nuclear reactor system 106) of the plurality of nuclear reactor systems 102, the energy transfer system configured to respond to a shutdown event of an additional nuclear reactor system may divert energy from a portion of the first nuclear reactor system 106 of the plurality of nuclear reactor system 102 to the auxiliary thermal reservoir 112. For instance, in response to a scheduled shutdown event of an additional nuclear reactor system, the energy transfer system may divert energy from a portion of the first nuclear reactor system 106 to the auxiliary thermal reservoir 112. Then, a heat supply system 114 may supply a portion of the thermal energy stored in the one or more auxiliary thermal reservoirs 112 to one or more of the energy conversion systems 110 of one or more of the nuclear reactor systems 106 of the plurality of nuclear reactor systems 102.

In another aspect, one or more of the energy transfer systems 104 may include, but are not limited to, an energy transfer system suitable for establishing thermal communication between a nuclear reactor system and the auxiliary thermal reservoir 840. For example, in response to a condition, the energy transfer system suitable for establishing thermal communication between the nuclear reactor system and the auxiliary thermal reservoir 840 may establish a thermal pathway between a portion of a nuclear reactor 108 (e.g., primary coolant system) of the nuclear reactor system 106 and the auxiliary thermal reservoir 112. For instance, in the case of a direct fluid exchange heat transfer system 510, a control valve may be used to initiate the intermixing of the reactor coolant and reservoir fluid. In another instance, in the case of a heat transfer system employing a reactor-reservoir heat exchanger 514, a control valve may be used to initiate reactor coolant flow through the heat exchanger.

In another aspect, one or more of the energy transfer systems 104 may include, but are not limited to, an energy transfer system responsive to the determination of the amount of energy stored in the auxiliary thermal reservoir 842. For example, in response to the determination of energy currently stored in the auxiliary thermal reservoir 112, the energy transfer system responsive to the determination of the amount of energy stored in the auxiliary thermal reservoir 842 may initiate transfer of energy from a portion of one or more of the nuclear reactor systems 106 of the plurality of nuclear reactor systems 102 to the auxiliary thermal reservoir 112. Further, the energy transfer system responsive to the determination of the amount of energy stored in the auxiliary thermal reservoir 842 may include an energy transfer system responsive to the determination of the percentage of energy stored, relative to the overall storage capacity, in the auxiliary thermal reservoir 844. For example, in response to a determination of a set percentage level of stored energy (e.g., 25% of energy storage capacity is being utilized), the energy transfer system responsive to the determination of the percentage of stored energy 842 may initiate transfer of energy from a portion a nuclear reactor system 106 of the plurality of nuclear reactor systems 102 to the auxiliary thermal reservoir 112. Then, a heat supply system 114 may supply a portion of the thermal energy stored in the one or more auxiliary thermal reservoirs 112 to at least one energy conversion system 110 of one or more of the nuclear reactor systems 106 of the plurality of nuclear reactor systems 102.

In an additional aspect, one or more of the energy transfer systems 104 may include, but are not limited to, an energy transfer system responsive to the determination of the amount of available storage capacity in the auxiliary thermal reservoir 846. For example, in response to the determination of available energy storage capacity, the energy transfer system responsive to the determination of the amount of available storage capacity in the auxiliary thermal reservoir 846 may initiate transfer of energy from a portion of a nuclear reactor system 106 of the plurality of nuclear reactor systems 102 to the auxiliary thermal reservoir 112. Further, the energy transfer system responsive to the determination of the amount of available storage capacity in the auxiliary thermal reservoir 846 may include an energy transfer system responsive to the determination of the percentage of available energy storage capacity in the auxiliary thermal reservoir 848. For example, in response to a determination of a set level of available energy storage (e.g., 75% storage capacity remains), the energy transfer system responsive to the determination of the percentage of available energy storage capacity 848 may initiate transfer of energy from a portion of a nuclear reactor system 106 of the plurality of nuclear reactor systems 102 to the auxiliary thermal reservoir 112. Then, a heat supply system 114 may supply a portion of the thermal energy stored in the one or more auxiliary thermal reservoirs 112 to at least one energy conversion system 110 of one or more of the nuclear reactor systems 106 of the plurality of nuclear reactor systems 102.

Referring now to FIG. 8C, one or more of the energy transfer systems 104 may include, but are not limited to, an energy transfer system suitable for diverting excess energy from a nuclear reactor system of the plurality of nuclear reactor systems to an auxiliary thermal reservoir 850. For example, an energy transfer system suitable for diverting excess energy from a nuclear reactor system to an auxiliary thermal reservoir 850 may transfer energy exceeding operational demand of an energy conversion system 852. For instance, in the event a turbine-generator system of a nuclear reactor system 106 of the plurality of nuclear reactor systems 102 is producing electrical power in excess of grid demand, the energy transfer system 104 may transfer energy (e.g., thermal or electrical) from a portion of a nuclear reactor system 106 to an auxiliary thermal reservoir 112. Further, one or more of the energy transfer systems 104 may include an energy transfer system configured to divert a specified percentage of the energy output of a nuclear reactor system to an auxiliary thermal reservoir 854. For example, a control system or operator may choose to transfer a pre-selected percentage of a nuclear reactor system 106 output and transfer at least a portion of that energy to the auxiliary thermal reservoir 112. It will be recognized by those skilled in the art that the level of energy output pre-selected to be transferred to the auxiliary thermal reservoir may be a function of time and may be derived from historic external power demand curves. For example, in times of day or times of year historically displaying relatively low grid demand, the control system or operator may choose to divert a larger percentage of the output of one or more of the nuclear reactor systems 106 to the auxiliary thermal reservoir than the percentage transferred during periods of higher demand.

Figure 9A:
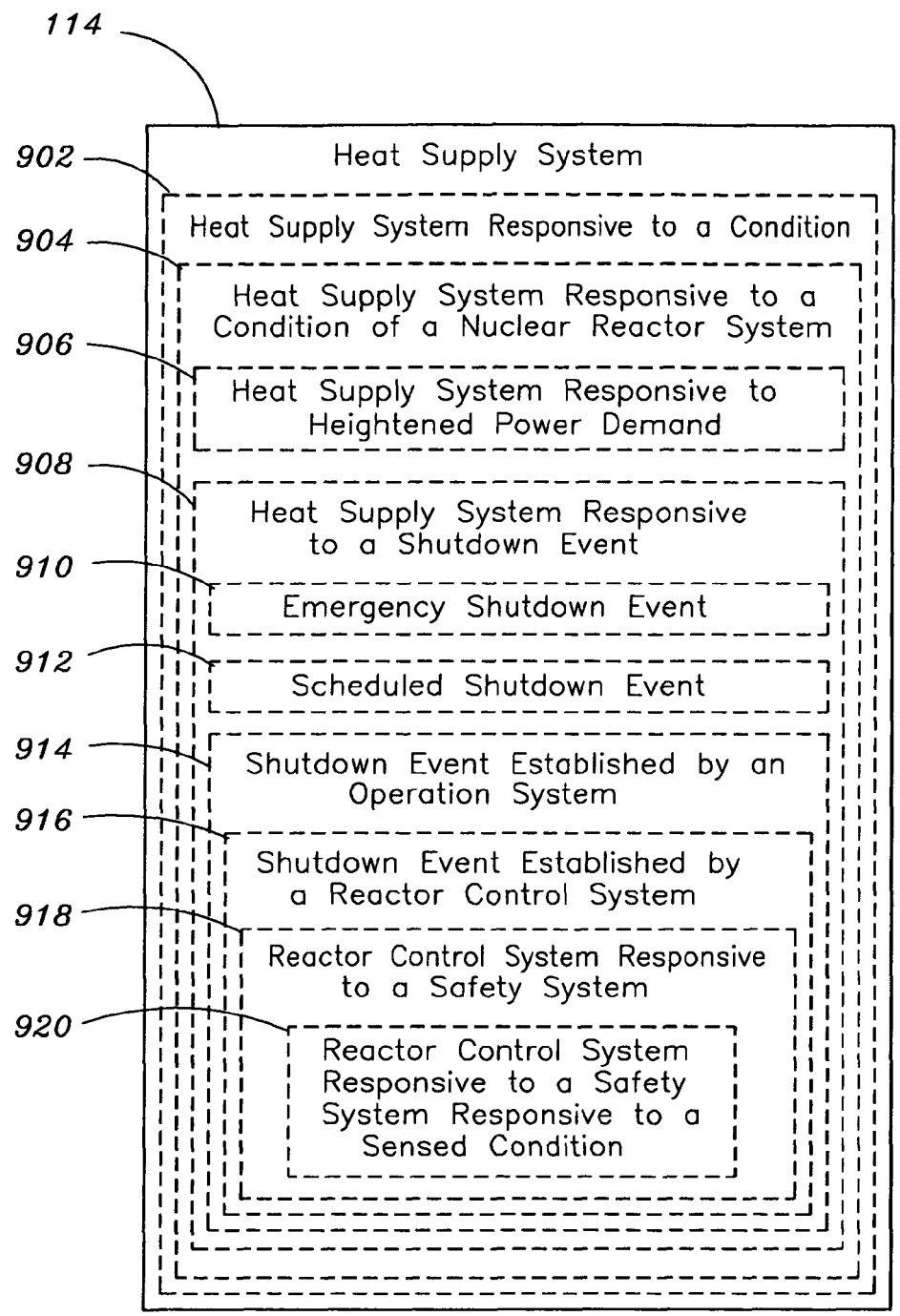
FIGS. 9A, 9B, and 9C are flow diagrams illustrating the types of conditions the heat supply system is responsive to when initiating transfer of the thermal energy stored in the auxiliary thermal reservoir to the energy conversion system of a nuclear reactor system.

Referring now to FIG. 9A, one or more of the heat supply systems 114 may include, but are not limited to a heat supply system responsive to a condition 902. The conditions with which one or more of the heat supply systems are responsive may include, but are not limited to, nuclear reactor operational conditions (e.g., temperature, rate of change of temperature, pressure or rate of change of pressure, nuclear reactor capacity), power demand on the one or more nuclear reactor systems (e.g., electrical power requirements of the grid), nuclear reactor system operation system conditions (e.g., control system, monitoring system, or safety system (e.g., heat sink status or coolant pump status)), or reservoir operational conditions (e.g., temperature, rate of change of temperature, pressure or rate of change of pressure). For example, in response to a condition of one or more of the nuclear reactor systems 106, a heat supply system configured to respond to a condition of one or more of the nuclear reactor systems 904 may supply a portion of the thermal energy stored in the one or more auxiliary thermal reservoirs 112 to an energy conversion system 110 of one or more of the nuclear reactor systems 106 of the plurality of nuclear reactor systems 102. For instance, in response to heightened power demand on a the nuclear reactor systems 106, a heat supply system responsive to heightened power demand on one or more of the nuclear reactor systems 906 may supply a portion of the thermal energy stored in the one or more auxiliary thermal reservoirs 112 to an energy conversion system 110 of one or more of the nuclear reactor systems 106 of the plurality of nuclear reactor systems 102.

In another aspect, one or more of the heat supply systems responsive to a condition 902 may include, but are not limited to a heat supply system responsive to a shutdown event 908. For example, in response to an emergency shutdown event (e.g., SCRAM), a heat supply system responsive to an emergency shutdown event 910 may supply a portion of the thermal energy stored in the one or more auxiliary thermal reservoirs 112 to an energy conversion system 110 of one or more of the nuclear reactor systems 106 of the plurality of nuclear reactor systems 102. By way of another example, in response to a scheduled shutdown event (e.g., routine maintenance), a heat supply system responsive to a schedule shutdown event 912 may supply a portion of the thermal energy stored in the one or more auxiliary thermal reservoirs 112 to an energy conversion system 110 of one or more of the nuclear reactor systems 106 of the plurality of nuclear reactor systems 102. It will be recognized by those skilled in the art that, in response to a shutdown event of one or more of the nuclear reactor systems 106 of the plurality of nuclear reactor systems 102, the thermal energy stored in the auxiliary thermal reservoir 112 may be transferred from the auxiliary thermal reservoir 112 to an energy conversion system 110 of one or more nuclear reactor systems 106 prior to, during, and following the shutdown of a nuclear reactor system 106 as part of the steps required to facilitate the nuclear reactor system 106 shutdown.

In another aspect, one or more of the heat supply systems responsive to a shutdown event 908, may include, but are not limited to, a heat supply system responsive to a shutdown event established by an operation system 914. For example, in response to a shutdown event established by an operation system (e.g., shutdown system) of one or more of the nuclear reactor systems 106, a heat supply system responsive to a shutdown event established by an operation system 914 may initiate transfer of the thermal energy stored in the one or more auxiliary thermal reservoirs 112 to an energy conversion system 110 of one or more of the nuclear reactor systems 106 of the plurality of nuclear reactor systems 102. By way of further example, a heat supply system responsive to a shutdown event established by a reactor control system 916 may initiate transfer of the thermal energy stored in the one or more auxiliary thermal reservoirs 112 to an energy conversion system 110 of one or more of the nuclear reactor systems of the plurality of nuclear reactor systems. Further, the reactor control system may include a reactor control system responsive to a signal from one or more reactor safety systems 918. For example, a heat supply system responsive to a shutdown event established by a reactor control system responsive to a signal from a safety system 918 may initiate transfer of the thermal energy stored in the one or more auxiliary thermal reservoirs 112 to an energy conversion system 110 of one or more of the nuclear reactor systems 106 of the plurality of the nuclear reactor systems 102. Even further, the safety system may include a safety system responsive to one or more sensed conditions of one or more of the nuclear reactor systems 106 (e.g., external conditions or internal conditions) 920. For instance, a safety system of one o more of the nuclear reactor systems 106, upon sensing a loss of heat sink, may send a signal to a reactor control system of one of the nuclear reactor systems 106. In turn, the reactor control system may establish a nuclear reactor system 106 shutdown and send a corresponding signal to a heat supply system responsive to a shutdown event established by a reactor control system. Then, the heat supply system responsive to a shutdown event established by a reactor control system may initiate transfer of the thermal energy stored in the one or more auxiliary thermal reservoirs 112 to an energy conversion system 110 of one or more of the nuclear reactor systems 106 of the plurality of nuclear reactor systems 102.

Figure 9B:
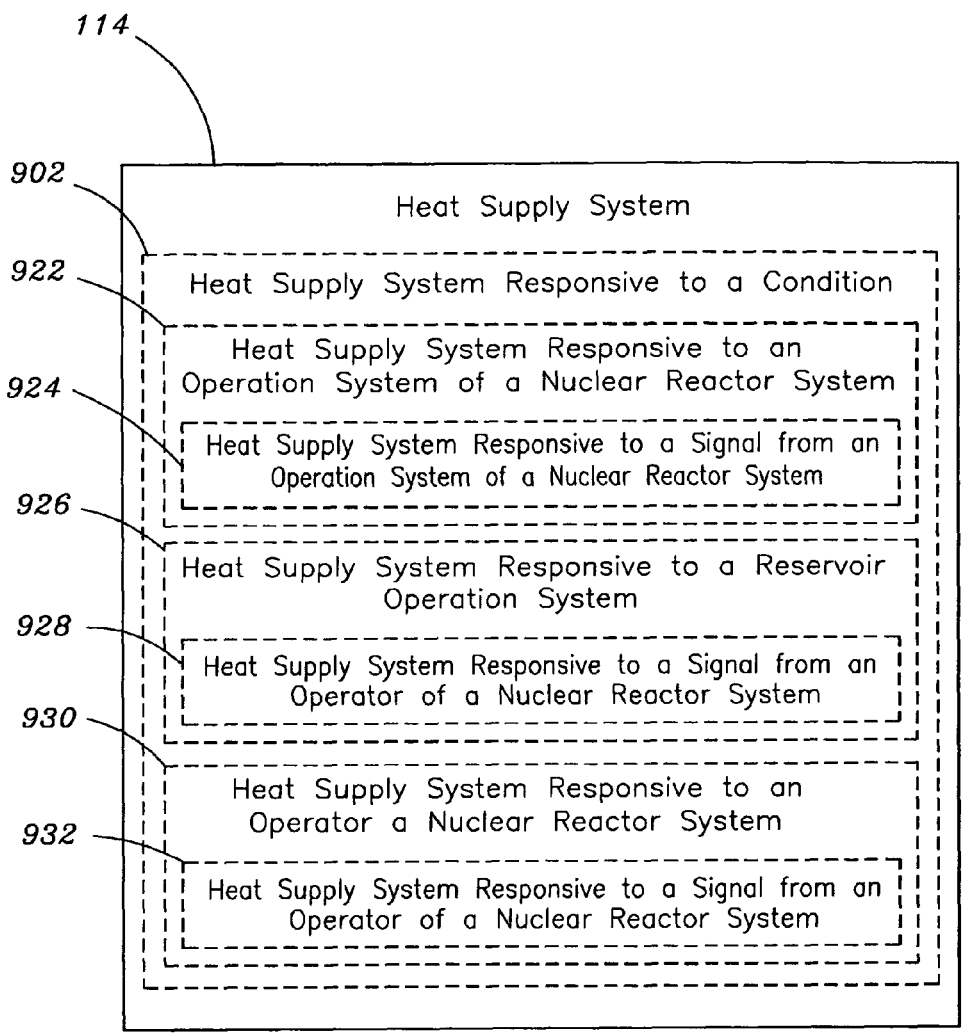

Referring now to FIG. 9B, one or more of the heat supply systems responsive to a condition 902 may include, but are not limited to, a heat supply system responsive to an operation system 922 of one or more of the nuclear reactor systems 106 of the plurality of nuclear reactor systems 102. For example, in response to a signal, such as a remote wireless signal (e.g., radio frequency signal) or remote wireline signal (e.g., copper wire signal or fiber optic cable signal), from an operation system (e.g., control system, safety system, monitoring system, shutdown system, warning system, or security system) of one or more of the nuclear reactor systems, the heat supply system responsive to a signal from an operation system 924 may initiate transfer of the thermal energy stored in the one or more auxiliary thermal reservoirs 112 to an energy conversion system 110 of one or more of the nuclear reactor systems 106 of the plurality of nuclear reactor systems 102. For instance, upon receiving a signal from a monitoring system a nuclear reactor system 106 indicating the shutdown of the nuclear reactor system 106, a heat supply system responsive to a signal from an operation system 924 of one or more of the nuclear reactor systems 106 may initiate transfer of the thermal energy stored in the one or more auxiliary thermal reservoirs 112 to an energy conversion system 110 of one or more of the nuclear reactor systems 106 of the plurality of nuclear reactor systems 102.

In another aspect, one or more of the heat supply systems responsive to a condition 902 may include, but are not limited to, a heat supply system responsive to a reservoir operation system 926 of one or more of the auxiliary thermal reservoirs 112. For example, in response to a signal, such as a remote wireless signal (e.g., radio frequency signal) or remote wireline signal (e.g., copper wire signal or fiber optic cable signal), from a reservoir operation system (e.g., control system, safety system, monitoring system) of one or more of the auxiliary thermal reservoirs 112, a heat supply system responsive to a signal from a reservoir operation system 928 may initiate transfer of the thermal energy stored in the one or more auxiliary thermal reservoirs 112 to an energy conversion system 110 of one or more of the nuclear reactor systems 106 of the plurality of nuclear reactor systems 102. For instance, upon receiving a signal from a monitoring system of an auxiliary thermal reservoir 112 indicating the shutdown of a nuclear reactor system 106 (e.g., energy no longer being diverted to thermal reservoir), the heat supply system responsive to a signal from a reservoir operation system 928 may initiate transfer of the thermal energy stored in the one or more auxiliary thermal reservoirs 112 to an energy conversion system 110 of one of more of the nuclear reactor systems 106 of the plurality of nuclear reactor systems 102.

In an additional aspect, one or more of the heat supply systems responsive to a condition 902 may include, but are not limited to, a heat supply system responsive to an operator 930 of one or more of the nuclear reactor systems 106 of the plurality of nuclear reactor systems 102. For example, in response to a signal from an operator (e.g., human user or human controlled system, such as a programmed computer system), a heat supply system responsive to a signal from an operator 932 may initiate transfer of the thermal energy stored in the one or more auxiliary thermal reservoirs 112 to an energy conversion system 110 of one or more of the nuclear reactor systems 106 of the plurality of nuclear reactor systems 102. For instance, a heat supply system responsive to a signal from an operator 932, in response to a remote signal, such as wireline or wireless signal from a computer terminal controlled by an operator, may initiate transfer of the thermal energy stored in the one or more auxiliary thermal reservoirs 112 to an energy conversion system 110 of one or more of the nuclear reactor systems 106 of the plurality of nuclear reactor systems 102.

Figure 9C:
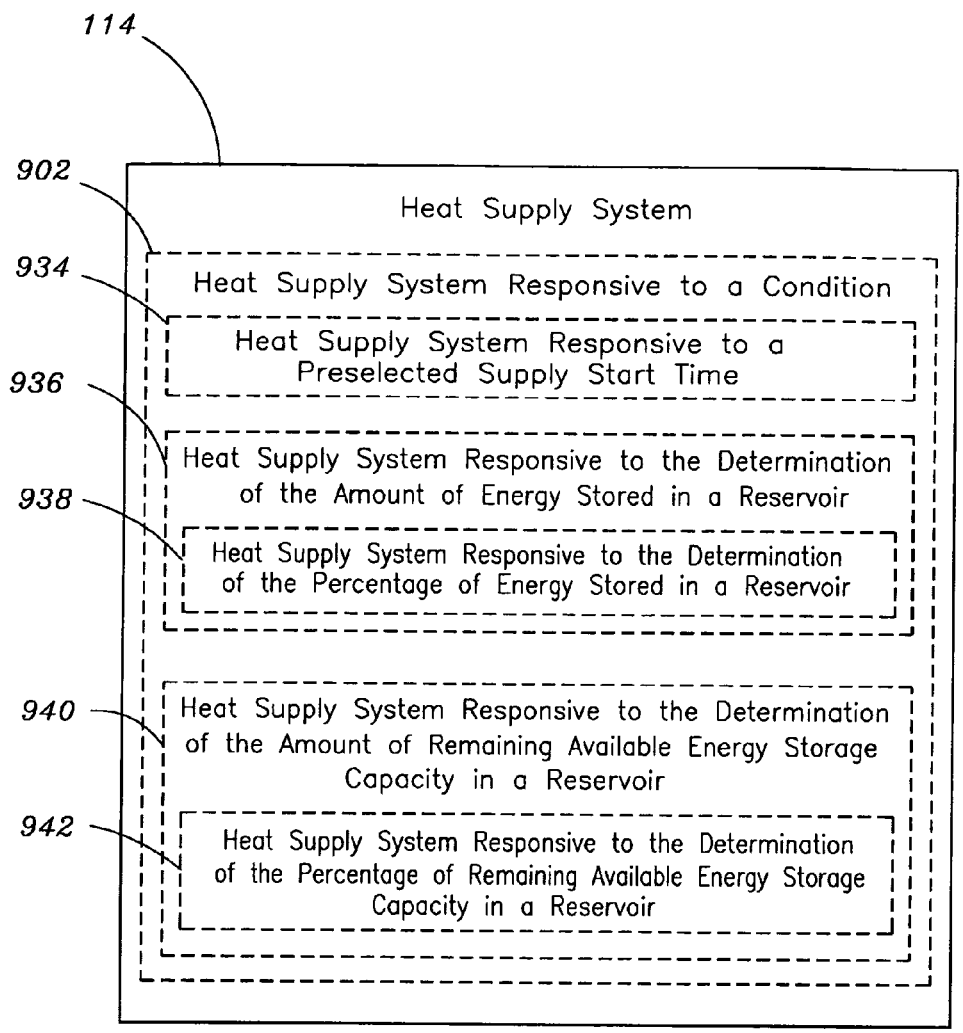

Referring now to FIG. 9C, one or more of the heat supply systems responsive to a condition 902 may include, but are not limited to, a heat supply system responsive to a pre-selected supply start time 934. For example, the pre-selected supply start time may include the amount of elapsed time relative to a specific event (e.g., shutdown event) or an absolute time. For instance, a heat supply system responsive to a pre-selected supply start time 934, at a pre-selected absolute time (e.g., 5:00 p.m. eastern standard time), may initiate transfer of the thermal energy stored in the one or more auxiliary thermal reservoirs 112 to an energy conversion system 110 of one or more of the nuclear reactor systems 106 of the plurality of nuclear reactor systems 102. It will be recognized by those skilled in the art that historical grid power demand data may be utilized to determine the appropriate time in which to begin transfer of the thermal energy stored in the one or more auxiliary thermal reservoirs 112 to at least one energy conversion system 110 of one or more of the nuclear reactor systems 106 of the plurality of nuclear reactor systems 102. In another instance, a heat supply system responsive to a pre-selected supply start time 934, upon elapse of a pre-selected amount of time from a specific event, such as a nuclear reactor 108 shutdown, may initiate transfer of the thermal energy stored in the one or more auxiliary thermal reservoirs 112 to an energy conversion system 110 of one or more of the nuclear reactor systems 106 of the plurality of nuclear reactor systems 102.

In another aspect, one or more of the heat supply systems responsive to a condition 902 may include, but are not limited to, a heat supply system responsive to the determination of the amount of energy stored in one or more of the auxiliary thermal reservoirs 936. For example, in response to the determination of energy currently stored in an auxiliary thermal reservoir 112, a heat supply system responsive to the determination of the amount of energy stored in the auxiliary thermal reservoir 936 may initiate transfer of the thermal energy stored in the auxiliary thermal reservoirs 112 to an energy conversion system 110 of one or more of the nuclear reactor systems 106 of the plurality of nuclear reactor systems 102. Further, the heat supply system responsive to the determination of the amount of energy stored in the auxiliary thermal reservoir 936 may include a heat supply system responsive to the determination of the percentage of energy stored, relative to the overall storage capacity, in the auxiliary thermal reservoir 938. For example, in response to the determination of a set percentage level of stored energy (e.g., 80% of energy storage capacity is being utilized), a heat supply system responsive to the determination of the percentage of stored energy 938 may initiate transfer of the thermal energy stored in one or more auxiliary thermal reservoirs 112 to an energy conversion system 110 of one or more of the nuclear reactor systems 106 of the plurality of nuclear reactor systems 102.

In an additional aspect, one or more of the heat supply systems responsive to a condition 902 may include, but are not limited to, a heat supply system responsive to the determination of the amount of available storage capacity in one or more of auxiliary thermal reservoirs 940. For example, in response to the determination of available energy storage capacity, a heat supply system responsive to the determination of the amount of available storage capacity in an auxiliary thermal reservoir 940 may initiate transfer of the thermal energy stored the auxiliary thermal reservoirs 112 to an energy conversion system 110 of one or more of the nuclear reactor systems 106 of the plurality of nuclear reactor systems 102. Further, the heat supply system responsive to the determination of the amount of available storage capacity in the auxiliary thermal reservoir 940 may include a heat supply system responsive to the determination of the percentage of available energy storage capacity in an auxiliary thermal reservoir 942. For example, in response to the determination of a set percentage level of available energy storage (e.g., 20% storage capacity remains), a heat supply system responsive to the determination of the percentage of available energy storage capacity 942 of an auxiliary thermal reservoir 112 may initiate transfer of the thermal energy stored in the auxiliary thermal reservoir 112 to an energy conversion system 110 of one or more of the nuclear reactor systems 106 of the plurality of nuclear reactor systems 102.

Figure 9D:
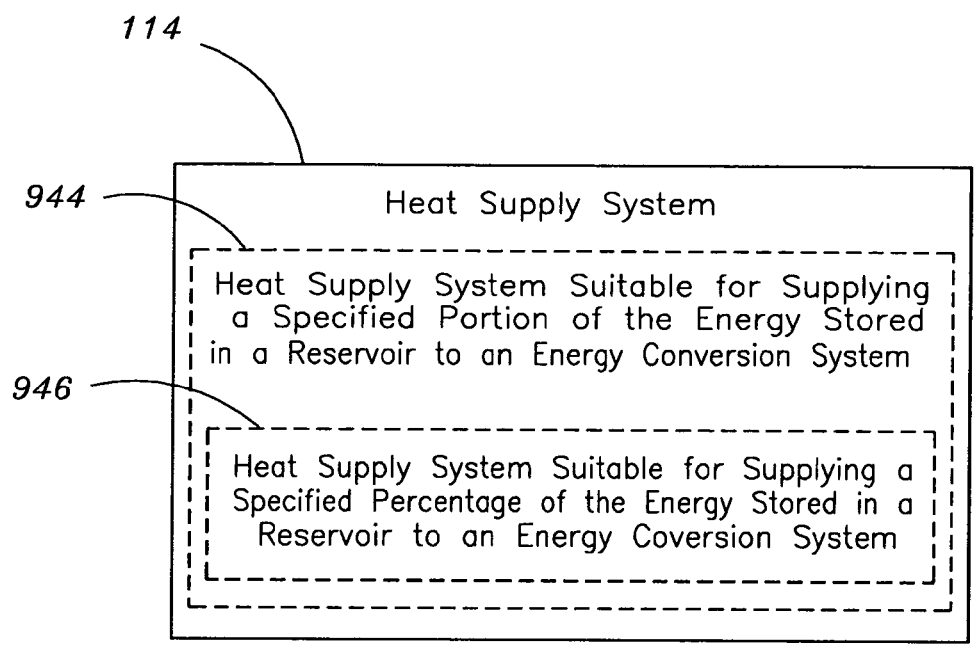
FIG. 9D is a flow diagram illustrating the supplying of a specified portion of the energy stored in the auxiliary thermal reservoir to an energy conversion system.

Referring now to FIG. 9D, one or more of the heat supply systems 114 may include, but are not limited to, a heat supply system suitable for supplying a specified portion of the energy stored in one or more of auxiliary thermal reservoirs to an energy conversion system of one or more of the nuclear reactor systems of the plurality of nuclear reactor systems 944. For example, a heat supply system suitable for supplying a specified portion of the energy stored in an auxiliary thermal reservoir 944 may be utilized to transfer a specified amount of the thermal energy stored in an auxiliary thermal reservoir 112 to an energy conversion system 110 of one or more of the nuclear reactor systems 106 of the plurality of nuclear reactor systems 102. For instance, the amount of energy transferred from an auxiliary thermal reservoir 112 to an energy conversion system 110 may be based on current load demand (e.g., grid demand), where a control system or operator may choose the amount of energy to be transferred to the energy conversion system based on the level of demand that the energy conversion system is currently undergoing. Further, the heat supply system suitable for supplying a specified portion of the energy stored in an auxiliary thermal reservoir to the energy conversion system 944 may include a heat supply system suitable for supplying a specified percentage of the energy stored in the auxiliary thermal reservoir to the energy conversion system 946. For example, a heat supply system suitable for supplying a specified percentage of the energy stored in the auxiliary thermal reservoir to the energy conversion system 946 may be utilized by a control system or operator to transfer a chosen percentage (e.g., 50% of the stored energy) of the energy stored in the auxiliary thermal reservoir 112 to an energy conversion system 110 of one or more of the nuclear reactor systems 106 of the plurality of nuclear reactor systems 102.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either subcomponent operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 10:
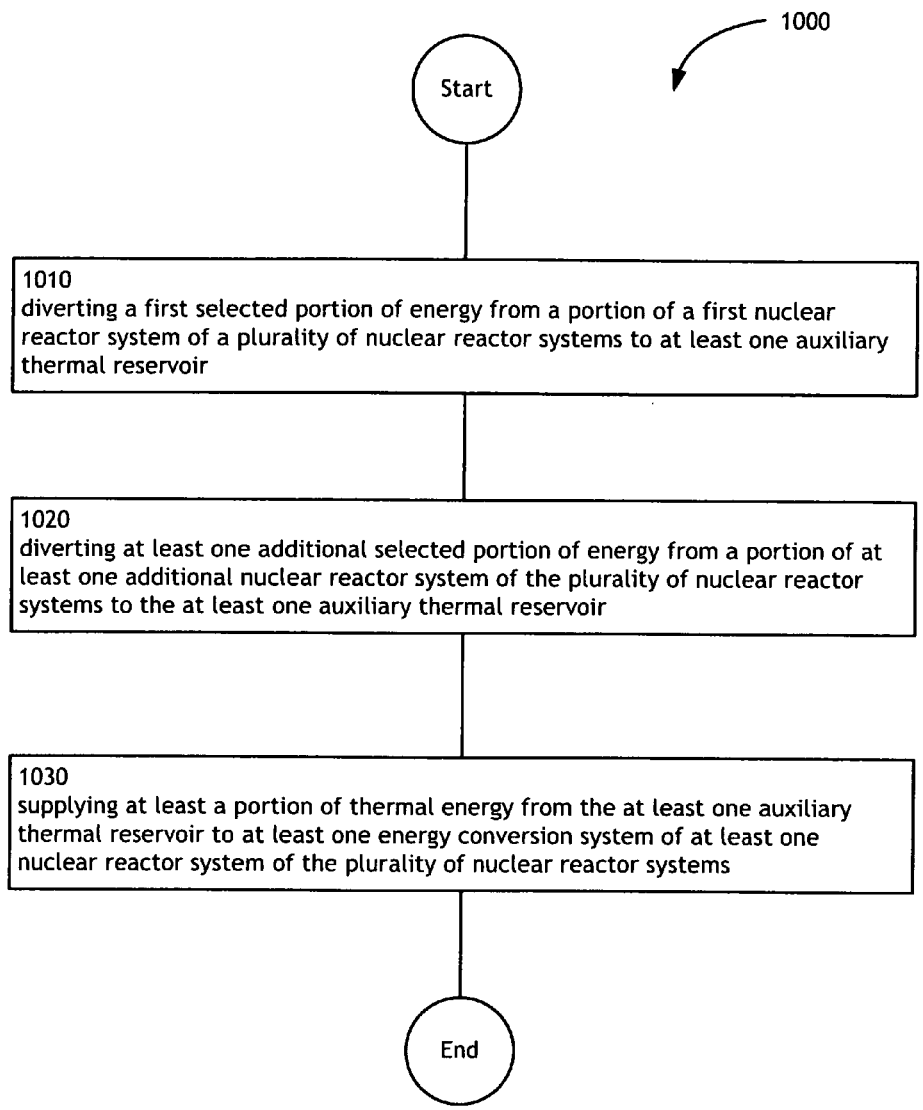
FIG. 10 is a high-level flowchart of a method for the thermal storage of energy generated by multiple nuclear reactors in an auxiliary thermal reservoir.

FIG. 10 illustrates an operational flow 1000 representing example operations related to the storage and utilization of energy generated by a plurality of nuclear reactor systems In FIG. 10 and in following figures that include various examples of operational flows, discussion and explanation may be provided with respect to the above-described examples of FIGS. 1 through 9D, and/or with respect to other examples and contexts. However, it should be understood that the operational flows may be executed in a number of other environments and contexts, and/or in modified versions of FIGS. 1 through 9D. Also, although the various operational flows are presented in the sequence(s) illustrated, it should be understood that the various operations may be performed in other orders than those which are illustrated, or may be performed concurrently.

After a start operation, the operational flow 1000 moves to a first diverting operation 1010. The first diverting operation 1010 depicts diverting a first selected portion of energy from a portion of a first nuclear reactor system of a plurality of nuclear reactor systems to at least one auxiliary thermal reservoir. For example, as shown in FIGS. 1 through 9D, a first energy transfer system 104 may transfer energy from a portion of a first nuclear reactor system 106 of the plurality of nuclear reactor systems 102 to one or more auxiliary thermal reservoirs 112.

Then, the additional diverting operation 1020 depicts diverting at least one additional selected portion of energy from a portion of at least one additional nuclear reactor system of the plurality of nuclear reactor systems to the at least one auxiliary thermal reservoir. For example, as shown in FIGS. 1 through 9D, a second energy transfer system 104 may transfer energy from a portion of a second nuclear reactor system 106 of the plurality of nuclear reactor systems 102 to the one or more auxiliary thermal reservoirs 112. More generally, an Nth energy transfer system 104 may transfer energy from a portion of an Nth nuclear reactor system 106 of the plurality of nuclear reactor systems 102 to the one or more auxiliary thermal reservoirs 112.

Then, the supplying operation 1030 depicts supplying at least a portion of thermal energy from the at least one auxiliary thermal reservoir to at least one energy conversion system of at least one nuclear reactor system of the plurality of nuclear reactor systems. For example, as shown in FIGS. 1 through 9D, one or more heat supply systems 114 may supply a portion of the thermal energy stored in an auxiliary thermal reservoir 112 to one or more of energy conversion systems 110 of one or more of the nuclear reactor systems 106 of the plurality of nuclear reactor systems.

Figure 11:
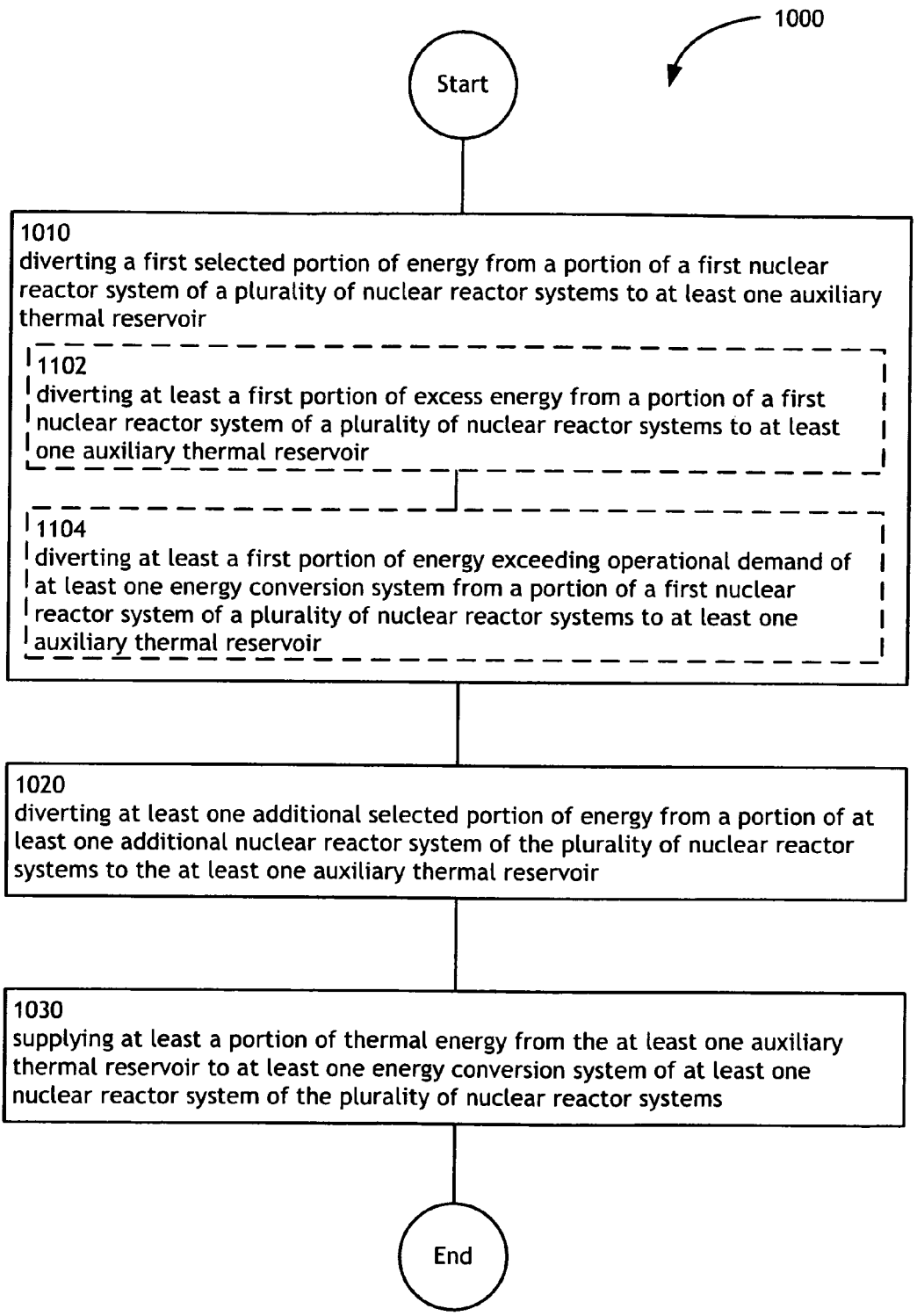
FIG. 11 is a high-level flowchart depicting an alternate implementation of FIG. 10.

FIG. 11 illustrates alternative embodiments of the example operational flow 1000 of FIG. 10. FIG. 11 illustrates example embodiments where the first diverting operation 1010 may include at least one additional operation. Additional operations may include an operation 1102, and/or an operation 1104.

Operation 1102 illustrates diverting at least a first portion of excess energy from a portion of a first nuclear reactor system of a plurality of nuclear reactor systems to at least one auxiliary thermal reservoir. For example, as shown in FIGS. 1 through 9D, a first energy transfer system 104 may transfer excess energy from a portion of a first nuclear reactor system 106 of the plurality of nuclear reactor systems 102 to an auxiliary thermal reservoir 112.

Further, the operation 1104 illustrates diverting at least a first portion of energy exceeding operational demand of at least one energy conversion system from a portion of a first nuclear reactor system of a plurality of nuclear reactor systems to at least one auxiliary thermal reservoir. For example, as shown in FIGS. 1 through 9D, a first energy transfer system 104 may transfer energy exceeding operational demand (e.g., energy in excess of grid requirements) of an energy conversion system associated with a first nuclear reactor system 106 of a plurality of nuclear reactor systems 102 from a portion of the first nuclear reactor system 106 to an auxiliary thermal reservoir 112.

Figure 12:
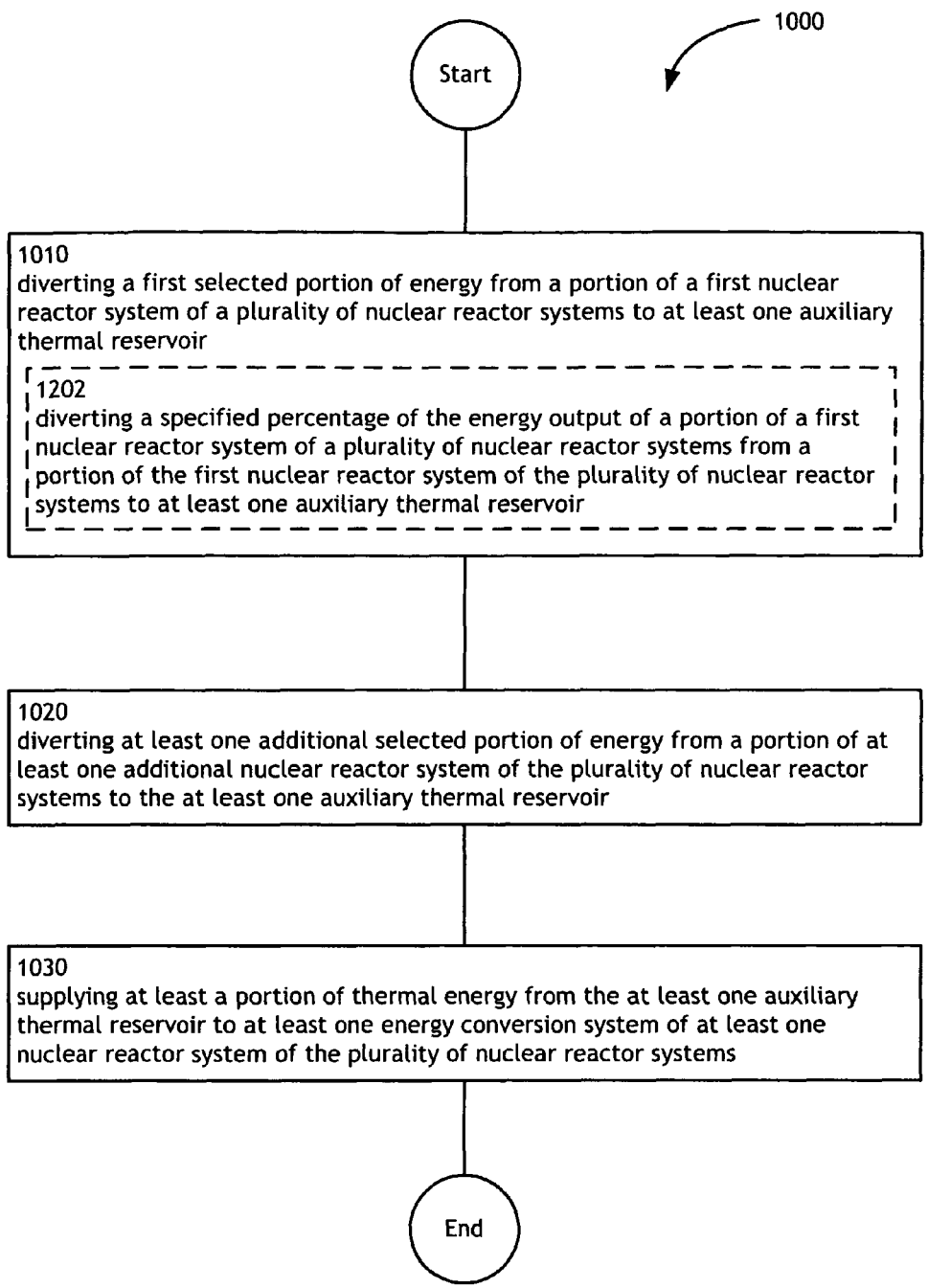
FIG. 12 is a high-level flowchart depicting an alternate implementation of FIG. 10.

FIG. 12 illustrates alternative embodiments of the example operational flow 1000 of FIG. 10. FIG. 12 illustrates example embodiments where the first diverting operation 1010 may include at least one additional operation. Additional operations may include an operation 1202.

Operation 1202 illustrates diverting a specified percentage of the energy output of a portion of a first nuclear reactor system of a plurality of nuclear reactor systems from a portion of the first nuclear reactor system of the plurality of nuclear reactor systems to at least one auxiliary thermal reservoir. For example, as shown in FIGS. 1 through 9D, a first energy transfer system 104 may transfer a specified percentage of the energy output of a portion (e.g., nuclear reactor core or portion of nuclear reactor system in thermal communication with the nuclear reactor core, such as the primary coolant system) of a first nuclear reactor system 106 of a plurality of nuclear reactor systems 102 from a portion of the first nuclear reactor system 106 to an auxiliary thermal reservoir 112.

Figure 13A:
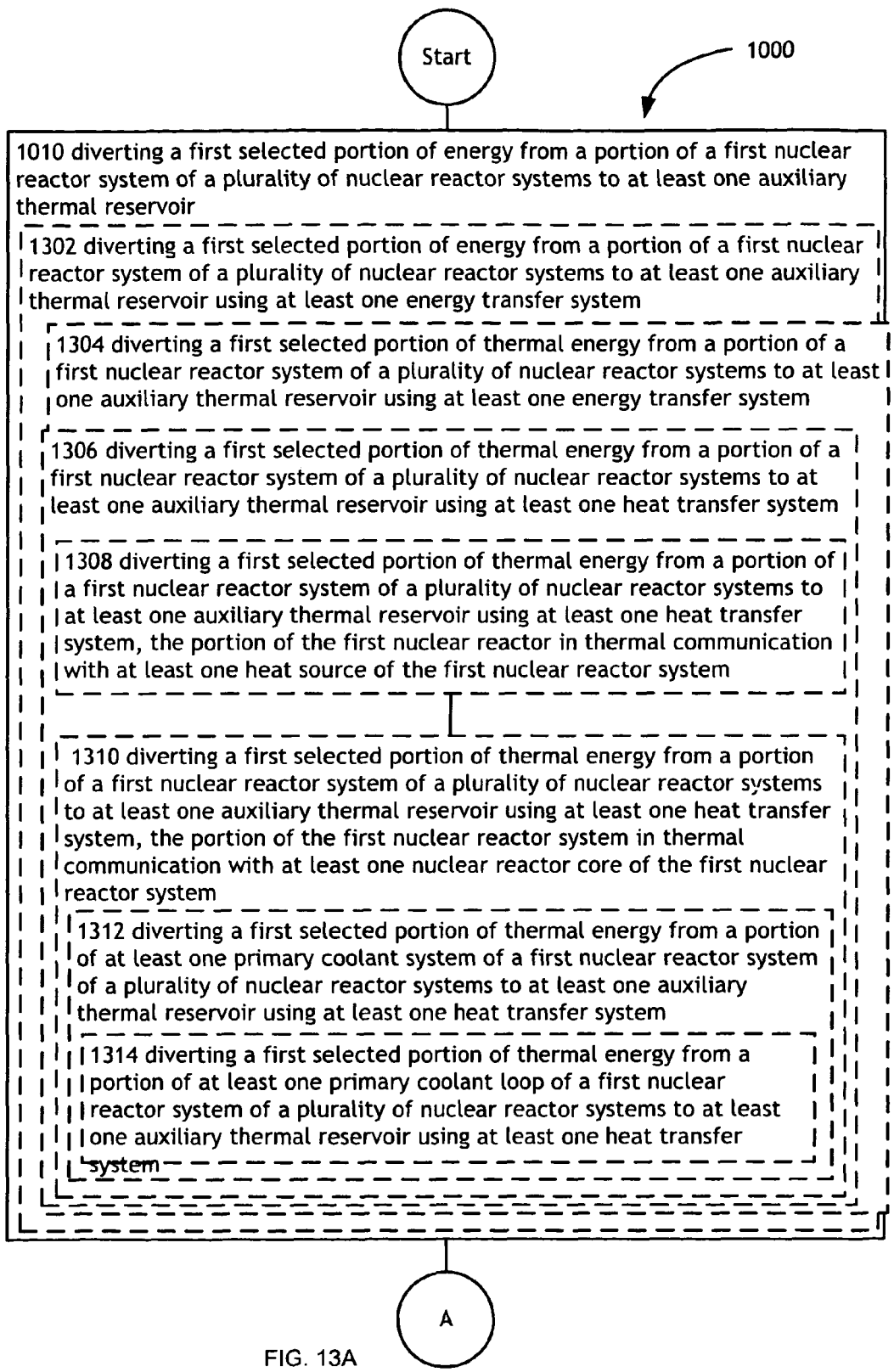
FIG. 13A is a high-level flowchart depicting an alternate implementation of FIG. 10.
Figure 13B:
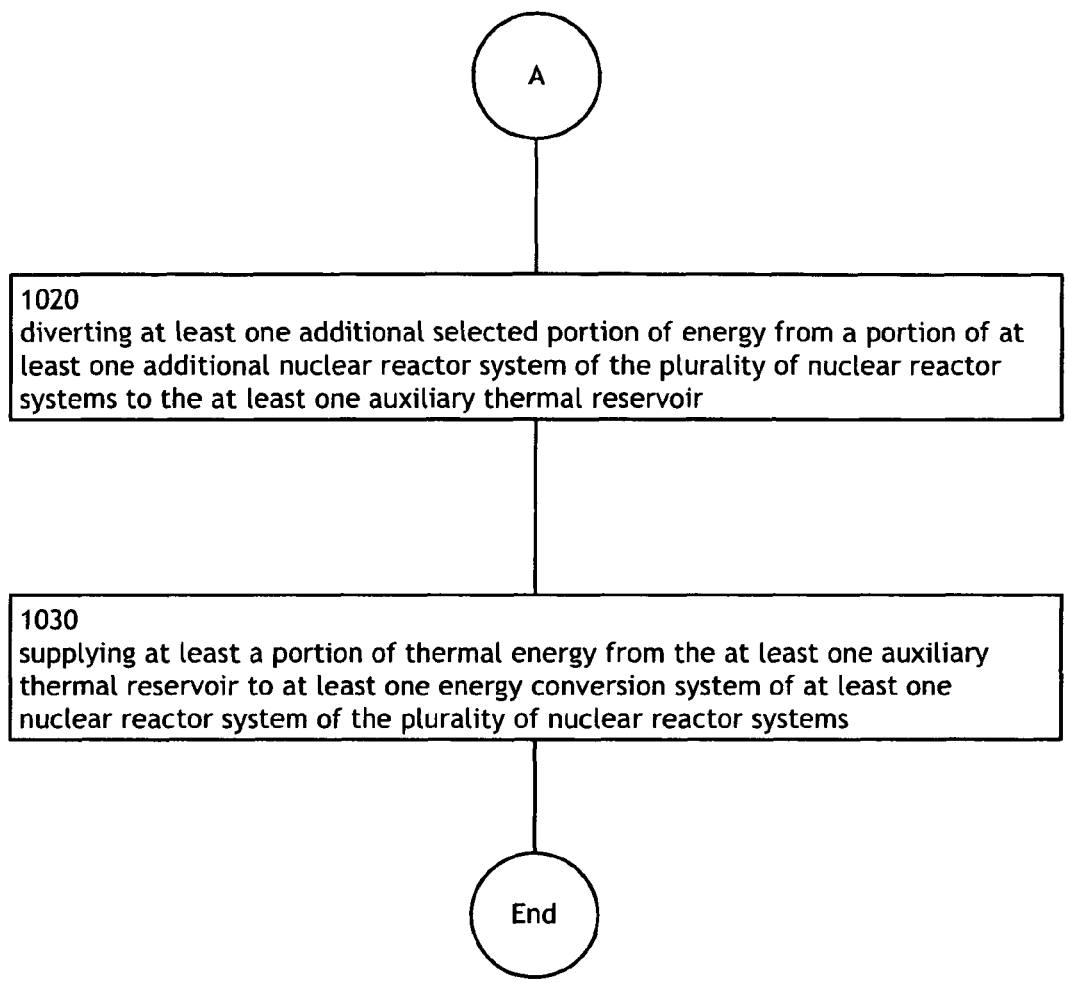
FIG. 13B is a high-level flowchart depicting an alternate implementation of FIG. 10.

FIGS. 13A and 13B illustrate alternative embodiments of the example operational flow 1000 of FIG. 10. FIG. 13 illustrates example embodiments where the first diverting operation 1010 may include at least one additional operation. Additional operations may include an operation 1302, an operation 1304, an operation 1306, an operation 1308, an operation 1310, an operation 1312, and/or an operation 1314.

Operation 1302 illustrates diverting a first selected portion of energy from a portion of a first nuclear reactor system of a plurality of nuclear reactor systems to at least one auxiliary thermal reservoir using at least one energy transfer system. For example, as shown in FIGS. 1 through 9D, a first energy transfer system 104 may transfer energy from a portion of a first nuclear reactor system 106 of a plurality of nuclear reactor systems 102 to an auxiliary thermal reservoir 112.

Further, the operation 1304 illustrates diverting a first selected portion of thermal energy from a portion of a first nuclear reactor system of a plurality of nuclear reactor systems to at least one auxiliary thermal reservoir using at least one energy transfer system. For example, as shown in FIG. 5A, one or more of the energy transfer systems 104 may be suitable for transferring thermal energy 502. For instance, as shown in FIGS. through 9D, a first energy transfer system 104 may transfer thermal energy from a portion of a first nuclear reactor system 106 of a plurality of nuclear reactor systems 102 to an auxiliary thermal reservoir 112.

Further, the operation 1306 illustrates diverting a first selected portion of thermal energy from a portion of a first nuclear reactor system of a plurality of nuclear reactor systems to at least one auxiliary thermal reservoir using at least one heat transfer system. For example, as shown in FIG. 5A, one or more of energy transfer systems 104 may include a heat transfer system 504. For instance, as shown in FIG. 1 through 9D, a first heat transfer system 504 may transfer thermal energy from a portion of a first nuclear reactor system 106 of a plurality of nuclear reactor systems to an auxiliary thermal reservoir 112.

Further, the operation 1308 illustrates diverting a first selected portion of thermal energy from a portion of a first nuclear reactor system of a plurality of nuclear reactor systems to at least one auxiliary thermal reservoir using at least one heat transfer system, the portion of the first nuclear reactor in thermal communication with at least one heat source of the first nuclear reactor system. For example, as shown in FIG. 5B, heat may be transferred from a portion of a first nuclear reactor system 106 of a plurality of nuclear reactor systems 102 to an auxiliary thermal reservoir 112, wherein the portion of the first nuclear reactor system 106 is in thermal communication with a heat source 522 of the first nuclear reactor system 106. For instance, as shown in FIGS. 1 through 9D, a first heat transfer system 504 may transfer thermal energy from a portion of a first nuclear reactor system 106 (e.g., coolant system of the nuclear reactor system) in thermal communication with a heat source 522 of the first nuclear reactor system 106 to an auxiliary thermal reservoir 112.

Further, the operation 1310 illustrates diverting a first selected portion of thermal energy from a portion of a first nuclear reactor system of a plurality of nuclear reactor systems to at least one auxiliary thermal reservoir using at least one heat transfer system, the portion of the first nuclear reactor system in thermal communication with at least one nuclear reactor core of the first nuclear reactor system. For example, as shown in FIG. 5B, the heat source 522 of a first nuclear reactor system 106 of a plurality of nuclear reactor systems 102 may include a nuclear reactor core 524. For instance, as shown in FIGS. 1 through 9D, a heat transfer system 504 of a first nuclear reactor system 106 may transfer thermal energy from a portion of the first nuclear reactor system 106 in thermal communication with the nuclear reactor core 524 of the first nuclear reactor system 106 to an auxiliary thermal reservoir 112.

Further, the operation 1312 illustrates diverting a first selected portion of thermal energy from a portion of at least one primary coolant system of a first nuclear reactor system of a plurality of nuclear reactor systems to at least one auxiliary thermal reservoir using at least one heat transfer system. For example, as shown in FIG. 5B, the portion of the first nuclear reactor system 106 in thermal communication with the nuclear reactor core 524 of the first nuclear reactor system 106 may include a portion of the primary coolant system 526 of the first nuclear reactor system 106. For instance, as shown in FIGS. 1 through 9D, a first heat transfer system 504 may transfer thermal energy from a portion of a primary coolant system 526 of a first nuclear reactor system 106 of a plurality of nuclear reactor systems 102 to an auxiliary thermal reservoir 112.

Further, the operation 1314 illustrates diverting a first selected portion of thermal energy from a portion of at least one primary coolant loop of a first nuclear reactor system of a plurality of nuclear reactor systems to at least one auxiliary thermal reservoir using at least one heat transfer system. For example, as shown in FIG. 5B, the portion of the primary coolant system of the first nuclear reactor system 106 may include a portion of a primary coolant loop 528 of the first nuclear reactor system 106. For instance, as shown in FIGS. 1 through 9D, a first heat transfer system 504 may transfer thermal energy from a portion of a primary coolant loop 528 of a first nuclear reactor system 106 of a plurality of nuclear reactor systems 102 to the auxiliary thermal reservoir 112.

Figure 14A:
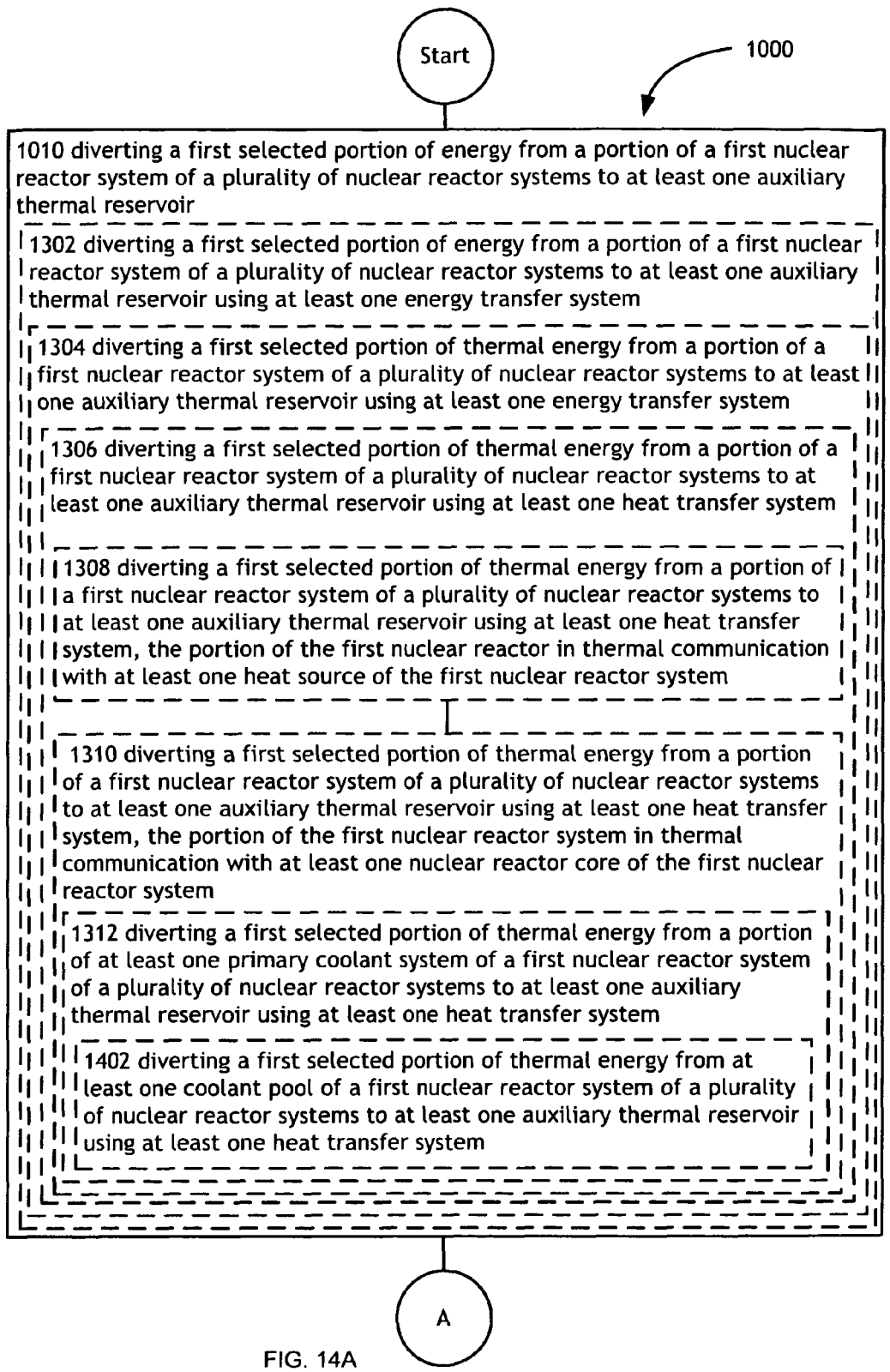
FIG. 14A is a high-level flowchart depicting an alternate implementation of FIG. 10.
Figure 14B:
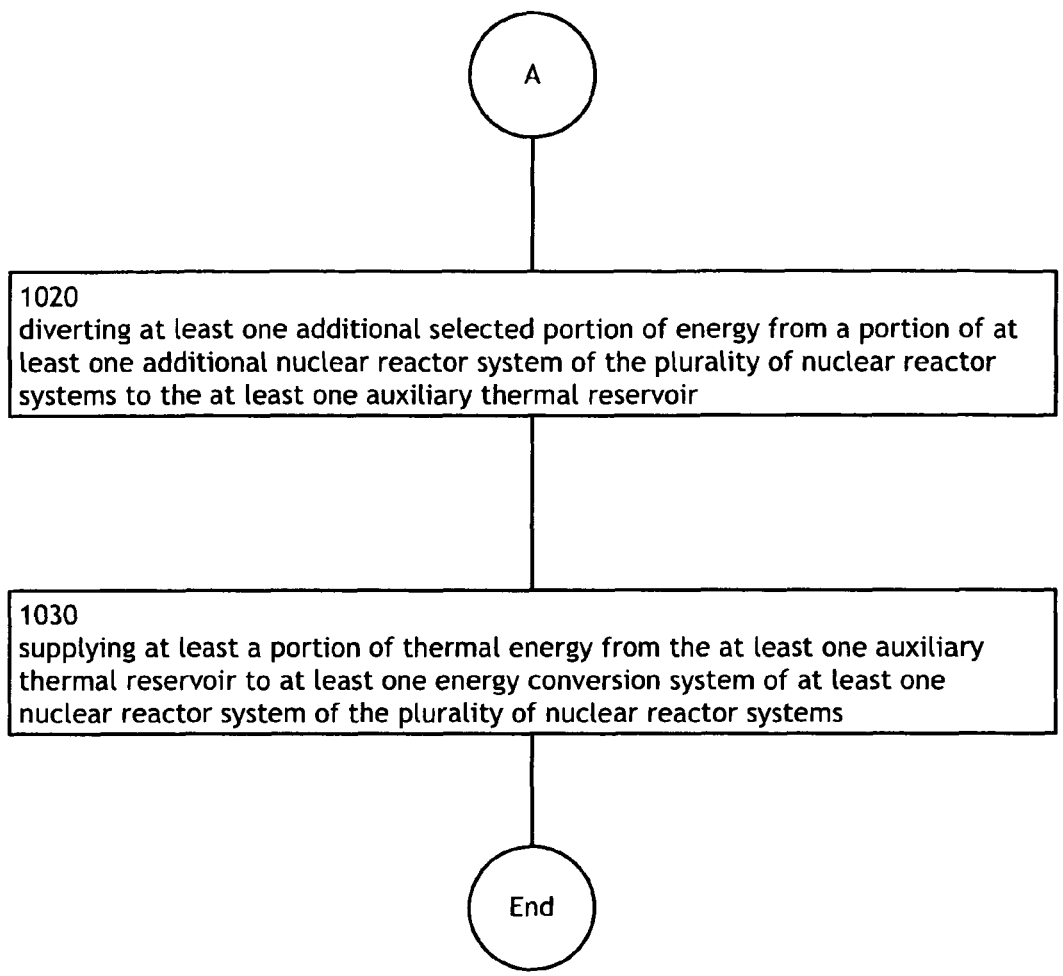
FIG. 14B is a high-level flowchart depicting an alternate implementation of FIG. 10.

FIGS. 14A and 14B illustrate alternative embodiments of the example operational flow 1000 of FIG. 10. FIG. 14 illustrates example embodiments where the first diverting operation 1010 may include at least one additional operation. Additional operations may include an operation 1402.

Operation 1402 illustrates diverting a first selected portion of thermal energy from at least one coolant pool of a first nuclear reactor system of a plurality of nuclear reactor systems to at least one auxiliary thermal reservoir using at least one heat transfer system. For example, as shown in FIG. 5B, the portion of the primary coolant system of the first nuclear reactor system 106 may include a portion of a primary coolant pool 530, such as a liquid metal pool (e.g. liquid sodium) or a liquid metal salt pool (e.g., lithium fluoride pool), of the first nuclear reactor system 106. For instance, as shown in FIGS. 1 through 9D, a first heat transfer system 504 may transfer thermal energy from a portion of a primary coolant pool 530 of a first nuclear reactor system 106 of a plurality of nuclear reactor systems 102 to the auxiliary thermal reservoir 112.

Figure 15A:
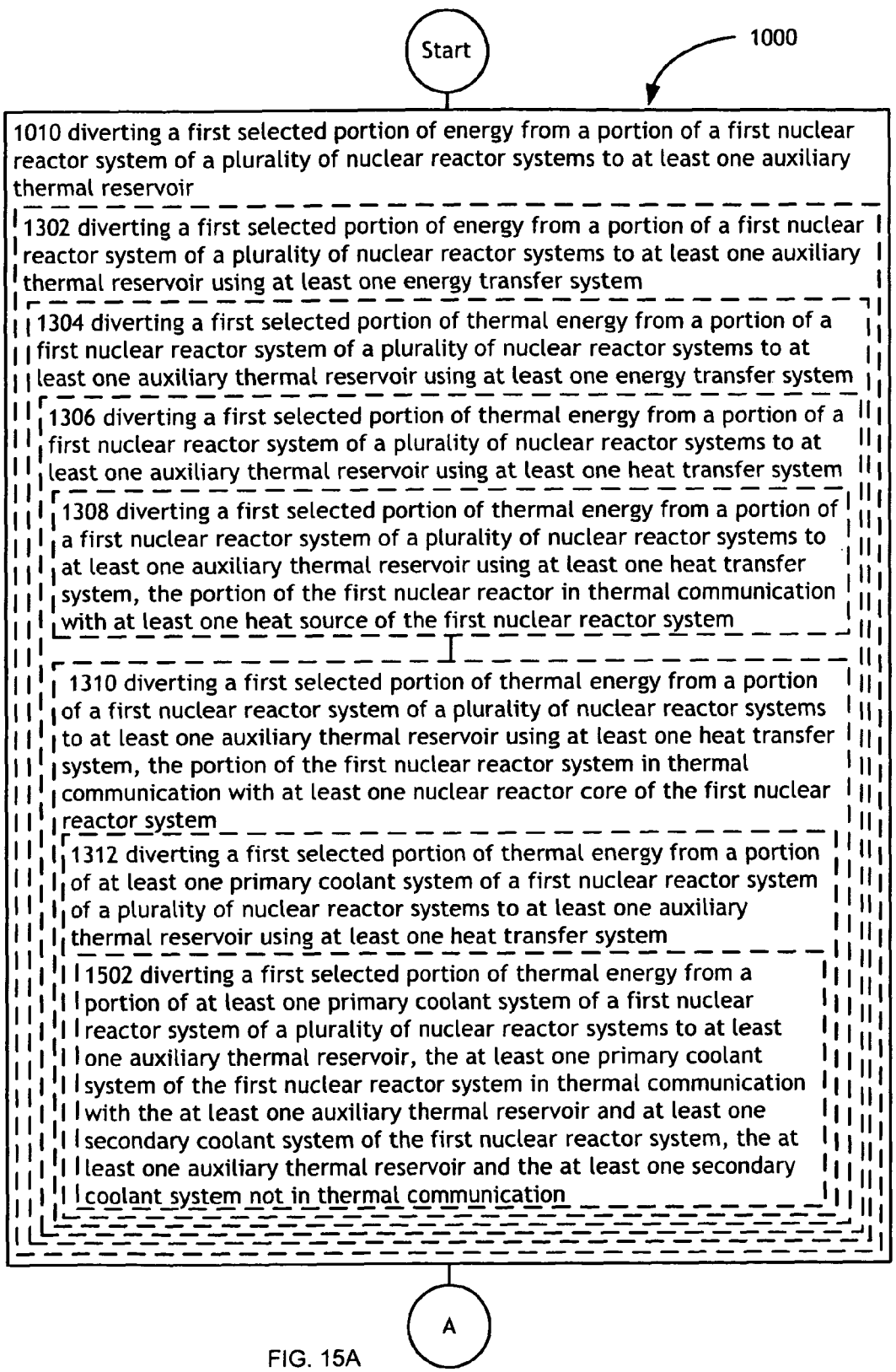
FIG. 15A is a high-level flowchart depicting an alternate implementation of FIG. 10.
Figure 15B:
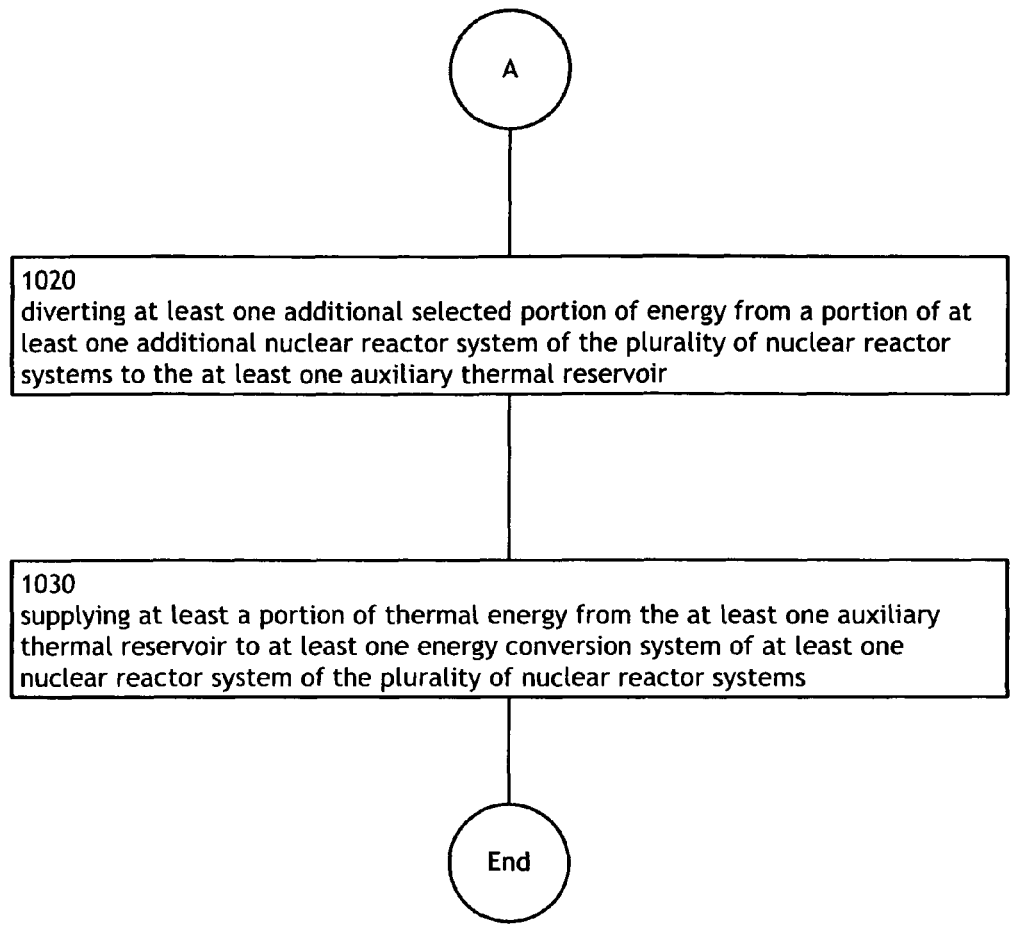
FIG. 15B is a high-level flowchart depicting an alternate implementation of FIG. 10.

FIGS. 15A and 15B illustrate alternative embodiments of the example operational flow 1000 of FIG. 10. FIG. 15 illustrates example embodiments where the first diverting operation 1010 may include at least one additional operation. Additional operations may include an operation 1502.

Operation 1502 illustrates diverting a first selected portion of thermal energy from a portion of at least one primary coolant system of a first nuclear reactor system of a plurality of nuclear reactor systems to at least one auxiliary thermal reservoir, the at least one primary coolant system of the first nuclear reactor system in thermal communication with the at least one auxiliary thermal reservoir and at least one secondary coolant system of the first nuclear reactor system, the at least one auxiliary thermal reservoir and the at least one secondary coolant system not in thermal communication. For example, as shown in FIG. 5C, the primary coolant system 526 of the first nuclear reactor system 106 may include a primary coolant system 526 in thermal communication with both an auxiliary thermal reservoir 112 and a secondary coolant system 532 of the first nuclear reactor system 106, wherein the auxiliary thermal reservoir 112 and the secondary coolant system 532 are not in thermal communication with each other. For instance, a first heat transfer system 504 may transfer thermal energy from a portion of a primary coolant system 526 of a first nuclear reactor system 106 of a plurality of nuclear reactor systems 102 to an auxiliary thermal reservoir 112, wherein the primary coolant system 526 is in thermal communication with both the auxiliary thermal reservoir 112 and a secondary coolant system 532 of the first nuclear reactor system 106, while the auxiliary thermal reservoir 112 and the at least one secondary coolant 532 system are not in thermal communication.

Figure 16A:
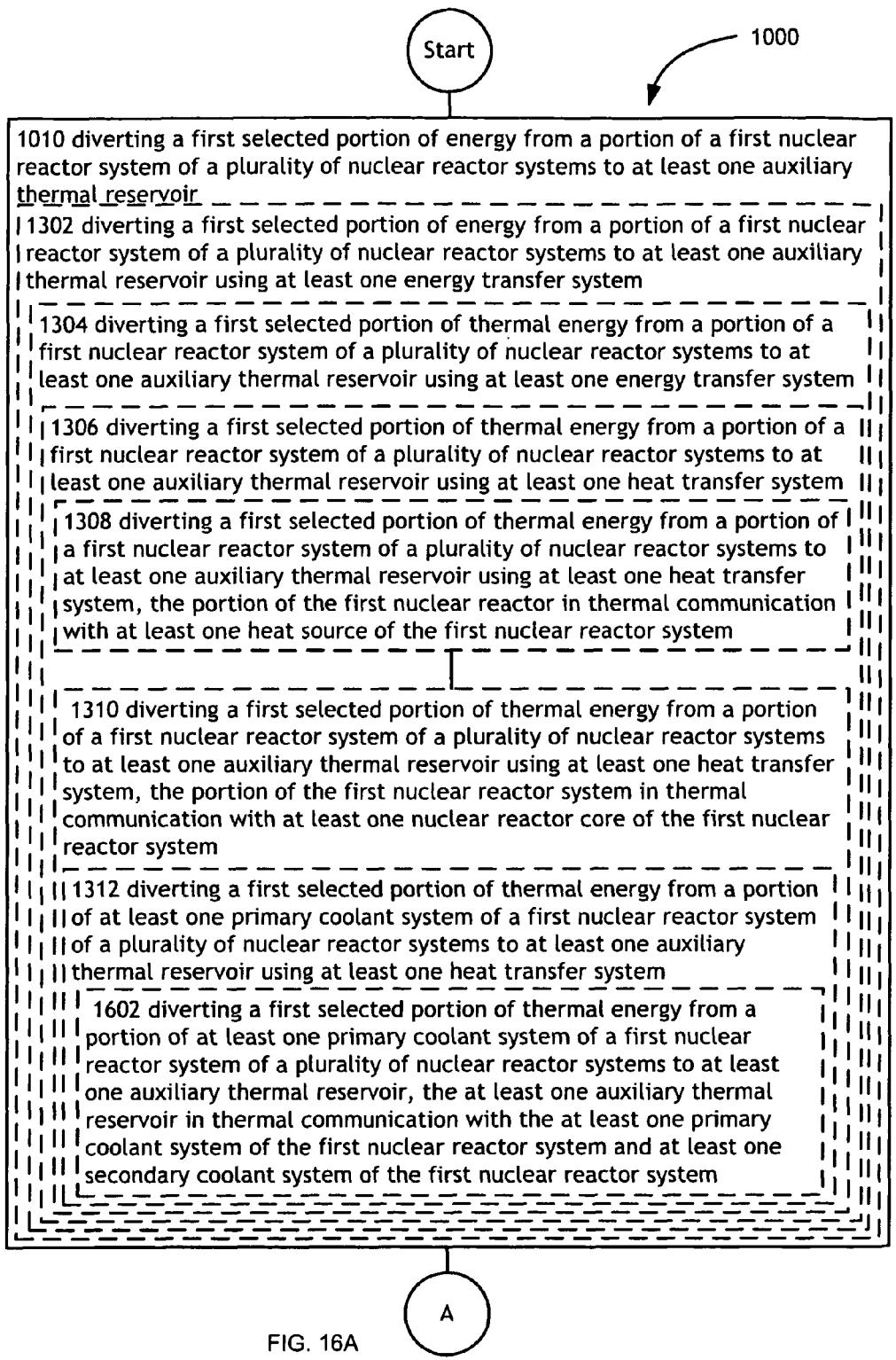
FIG. 16A is a high-level flowchart depicting an alternate implementation of FIG. 10.
Figure 16B:
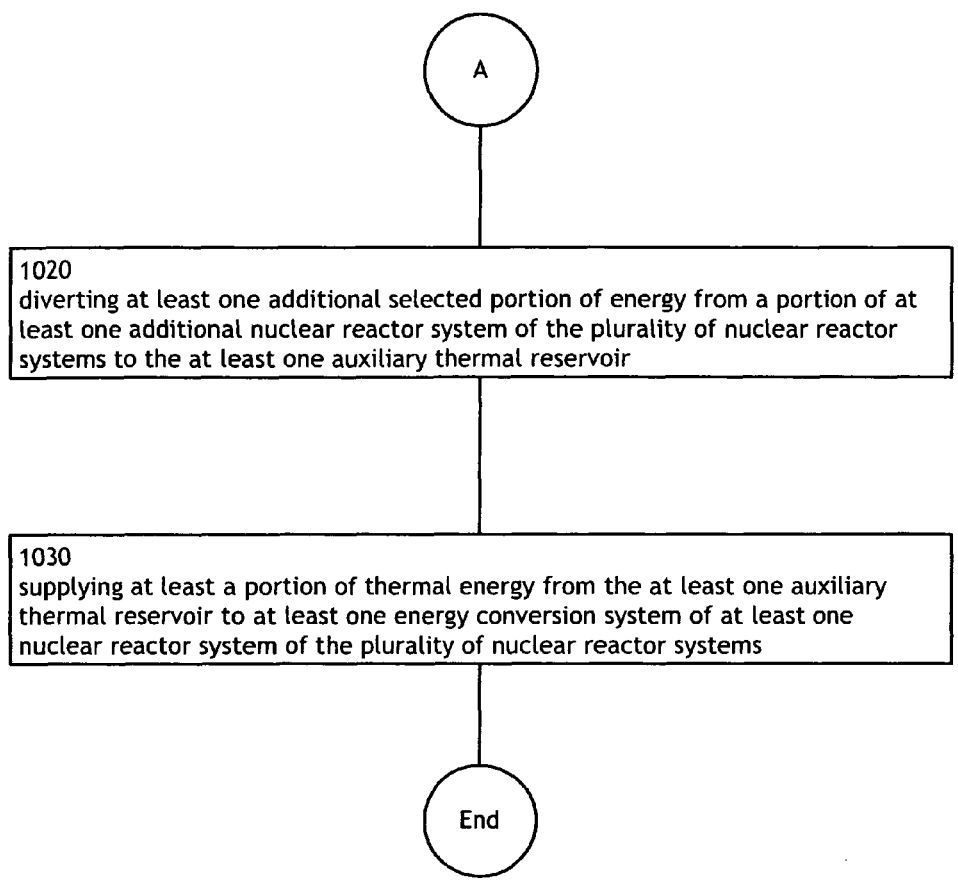
FIG. 16B is a high-level flowchart depicting an alternate implementation of FIG. 10.

FIGS. 16A and 16B illustrate alternative embodiments of the example operational flow 1000 of FIG. 10. FIG. 16 illustrates example embodiments where the first diverting operation 1010 may include at least one additional operation. Additional operations may include an operation 1602.

Further, operation 1602 illustrates diverting a first selected portion of thermal energy from a portion of at least one primary coolant system of a first nuclear reactor system of a plurality of nuclear reactor systems to at least one auxiliary thermal reservoir, the at least one auxiliary thermal reservoir in thermal communication with the at least one primary coolant system of the first nuclear reactor system and at least one secondary coolant system of the first nuclear reactor system. For example, as shown in FIG. 5D, the primary coolant system 526 of the first nuclear reactor system 106 may include a primary coolant system in thermal communication with both an auxiliary thermal reservoir 112 and a secondary coolant system 532 of the first nuclear reactor system 106, wherein the auxiliary thermal reservoir 112 is in thermal communication with the primary coolant system 526 of the nuclear reactor system 106 and the secondary coolant system 532 of the nuclear reactor system 106. For instance, a first heat transfer system 504 may transfer thermal energy from a portion of a primary coolant system 526 of a first nuclear reactor system 106 of a plurality of nuclear reactor systems 102 to an auxiliary thermal reservoir 112, wherein the auxiliary thermal reservoir 112 is in thermal communication with both the primary coolant system 526 of the nuclear reactor system 106 and a secondary coolant system 532 of the nuclear reactor system 106.

Figure 17A:
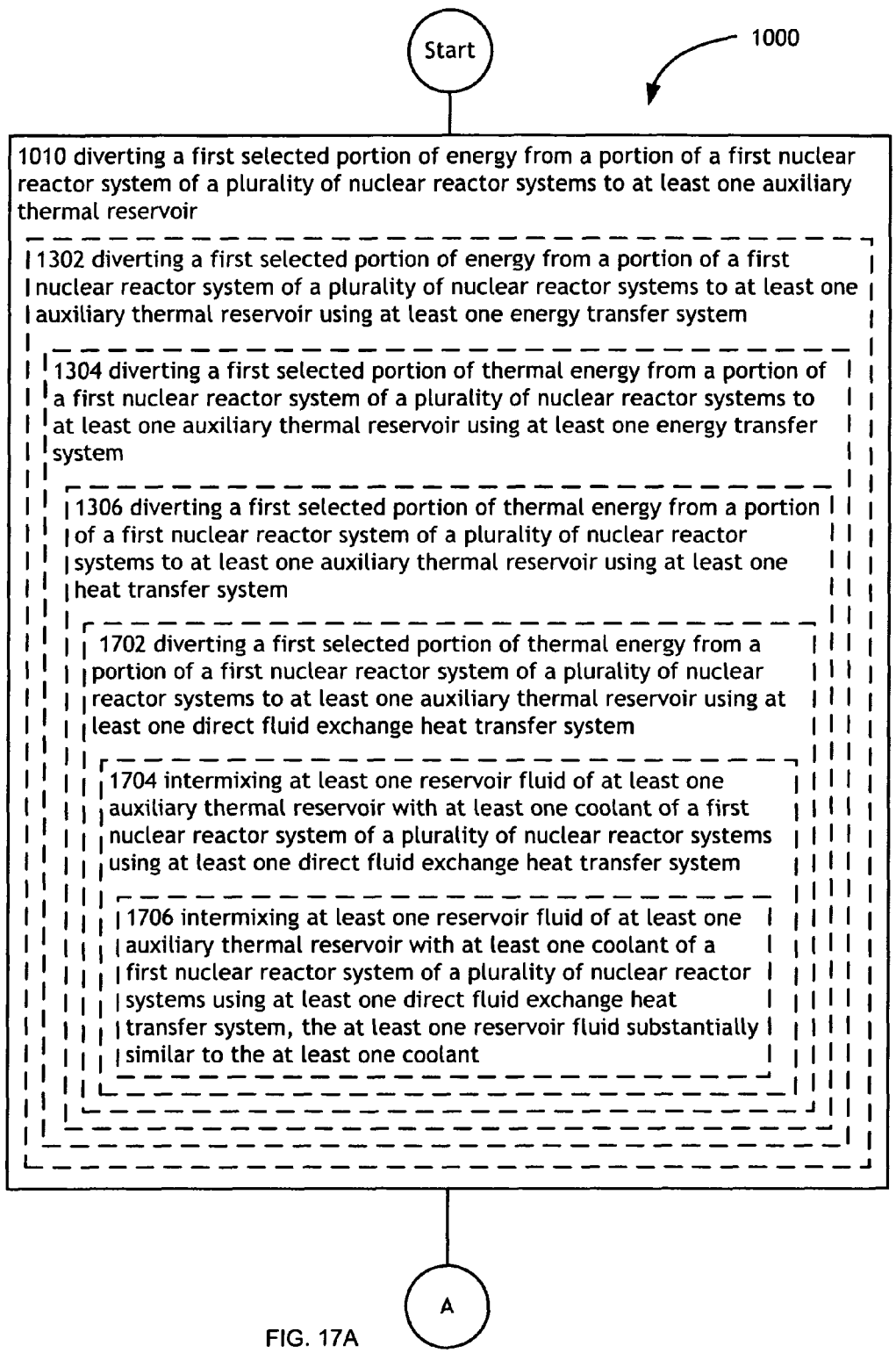
FIG. 17A is a high-level flowchart depicting an alternate implementation of FIG. 10.
Figure 17B:
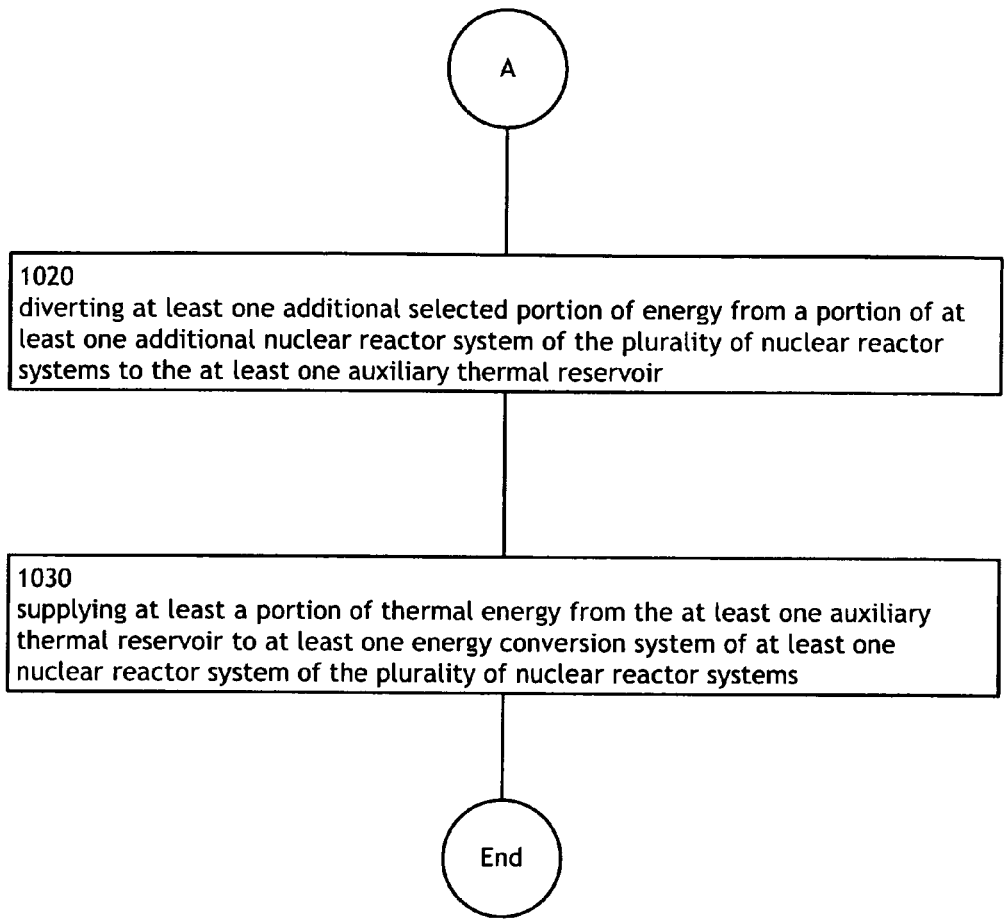
FIG. 17B is a high-level flowchart depicting an alternate implementation of FIG. 10.

FIGS. 17A and 17B illustrate alternative embodiments of the example operational flow 1000 of FIG. 10. FIG. 17 illustrates example embodiments where the first diverting operation 1010 may include at least one additional operation. Additional operations may include an operation 1702, an operation 1704, and/or an operation 1706.

Further, the operation 1702 illustrates diverting a first selected portion of thermal energy from a portion of a first nuclear reactor system of a plurality of nuclear reactor systems to at least one auxiliary thermal reservoir using at least one direct fluid exchange heat transfer system. For example, as shown in FIG. 5A, a first energy transfer system 104 of a first nuclear reactor system 106 may include a direct fluid exchange heat transfer system 510. For instance, as shown in FIGS. 1 through 9D, a first direct fluid exchange system 510 may transfer thermal energy from a portion of a first nuclear reactor system 106 of a plurality of nuclear reactor systems 102 to an auxiliary thermal reservoir 112.

Further, the operation 1704 illustrates intermixing at least one reservoir fluid of at least one auxiliary thermal reservoir with at least one coolant of a first nuclear reactor system of a plurality of nuclear reactor systems using at least one direct fluid exchange heat transfer system. For example, as shown in FIG. 5A, a first direct fluid exchange system 510 of a first nuclear reactor system 106 may include a system configured to intermix 511 the reservoir fluid of an auxiliary thermal reservoir 112 and the coolant of a nuclear reactor 108 of the first nuclear reactor system 106. For instance, as shown in FIGS. 1 through 9D, a system for intermixing 511 the reservoir fluid of an auxiliary thermal reservoir 112 and the reactor coolant of a first nuclear reactor system 106 of a plurality of nuclear reactor systems 102 may transfer thermal energy from the first nuclear reactor system 106 to the auxiliary thermal reservoir 112 by directly mixing the two fluids.

Further, the operation 1706 illustrates intermixing at least one reservoir fluid of at least one auxiliary thermal reservoir with at least one coolant of a first nuclear reactor system of a plurality of nuclear reactor systems using at least one direct fluid exchange heat transfer system, the at least one reservoir fluid substantially similar to the at least one coolant. For example, as shown in FIG. 5A, the auxiliary thermal reservoir fluid and the coolant of the first nuclear reactor system 106 may be substantially similar 512. For instance, the reservoir fluid and the nuclear reactor coolant of a first nuclear reactor system 106 of a plurality of nuclear reactor systems 102 may both comprise the same liquid metal, such as liquid sodium, liquid lead, or liquid lead bismuth. In another instance, the reservoir fluid and the nuclear reactor coolant may both comprise the same liquid organic, such as diphenyl with diphenyl oxide.

Figure 18A:
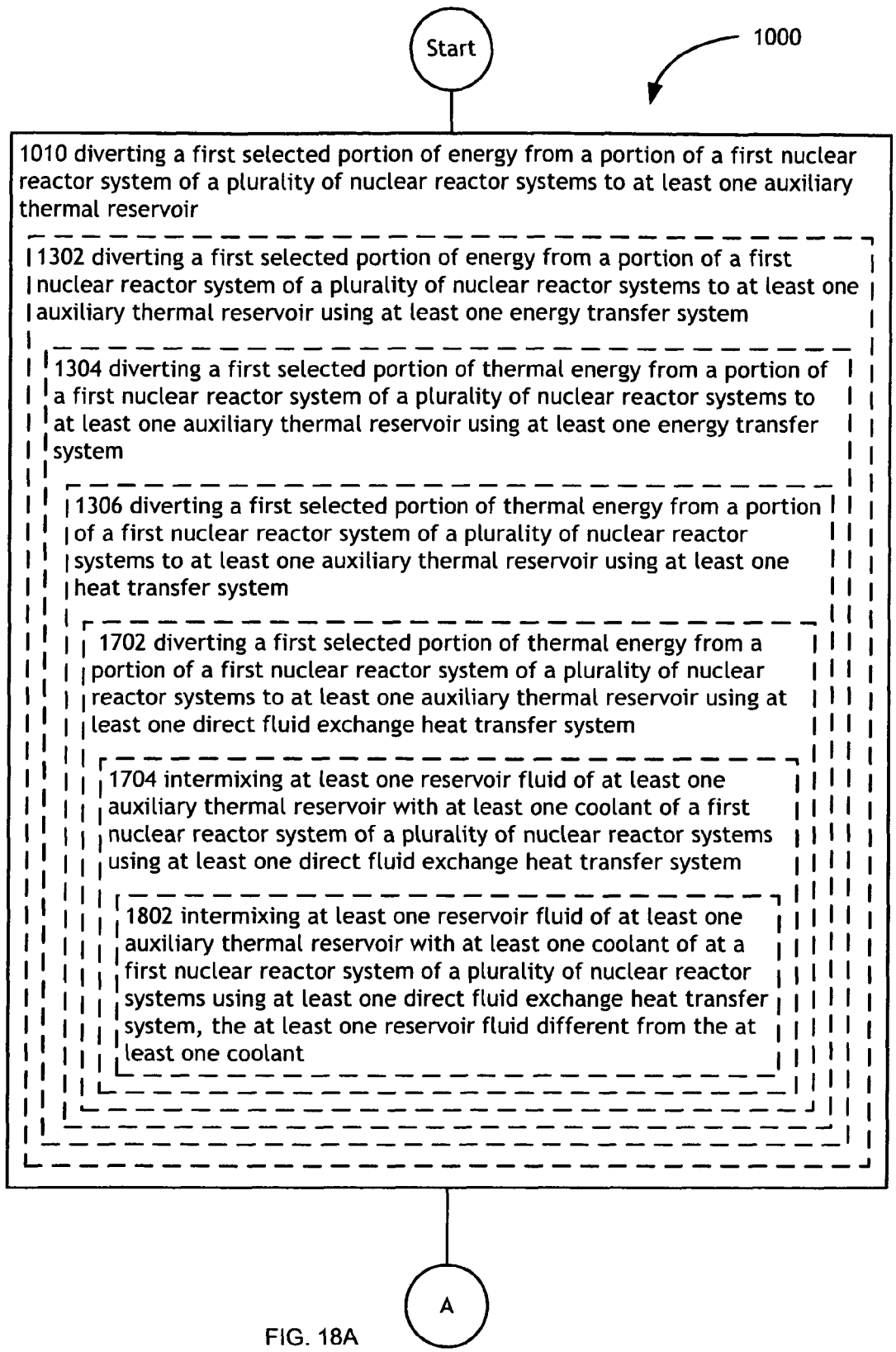
FIG. 18A is a high-level flowchart depicting an alternate implementation of FIG. 10.
Figure 18B:
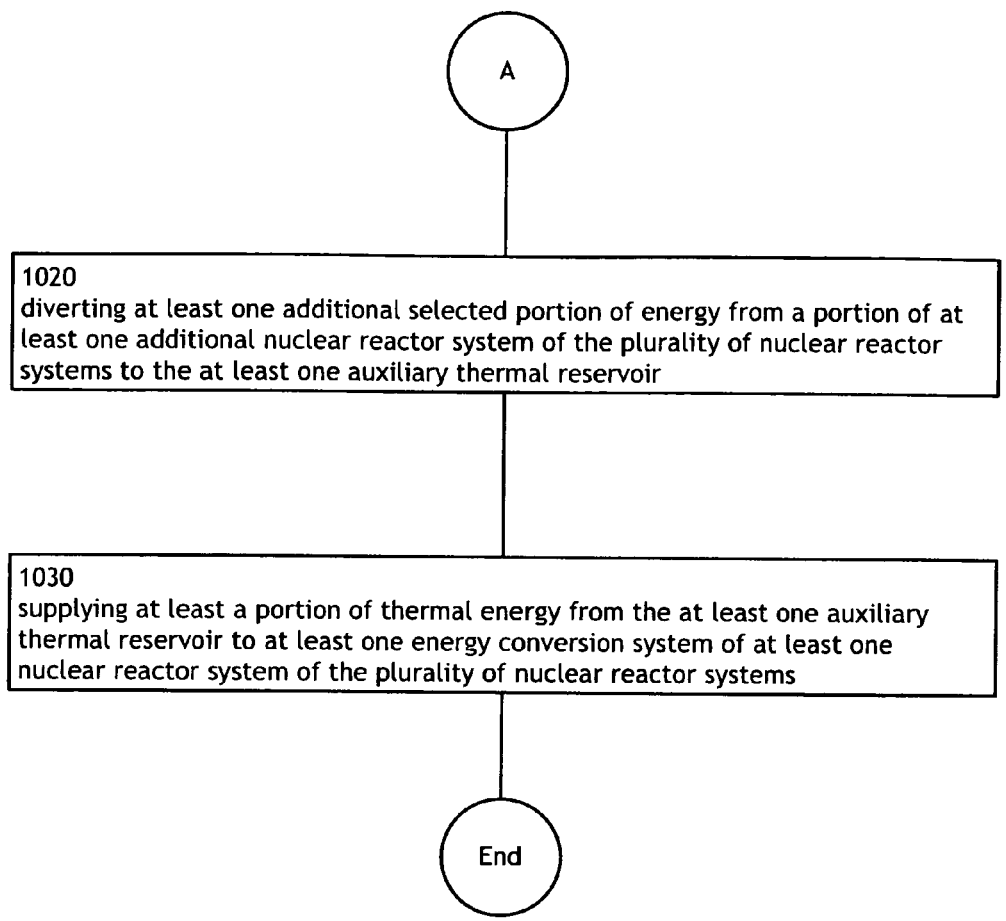
FIG. 18B is a high-level flowchart depicting an alternate implementation of FIG. 10.

FIGS. 18A and 18B illustrate alternative embodiments of the example operational flow 1000 of FIG. 10. FIG. 18 illustrates example embodiments where the first diverting operation 1010 may include at least one additional operation. Additional operations may include an operation 1802.

Further, the operation 1802 illustrates intermixing at least one reservoir fluid of at least one auxiliary thermal reservoir with at least one coolant of at a first nuclear reactor system of a plurality of nuclear reactor systems using at least one direct fluid exchange heat transfer system, the at least one reservoir fluid different from the at least one coolant. For example, as shown in FIG. 5A, the auxiliary thermal reservoir fluid and the coolant of the first nuclear reactor system 106 may be different 513. For instance, the reservoir fluid may comprise a liquid organic fluid (e.g., diphenyl with diphenyl oxide), while the nuclear reactor coolant of a first nuclear reactor system 106 of a plurality of nuclear reactor systems may comprise a liquid metal coolant (e.g., liquid sodium, lead, or lead bismuth). Similarly, the reservoir fluid may comprise a first liquid metal coolant, such as liquid sodium, while the nuclear reactor coolant may comprise a second liquid metal coolant, such as liquid lead.

Figure 19A:
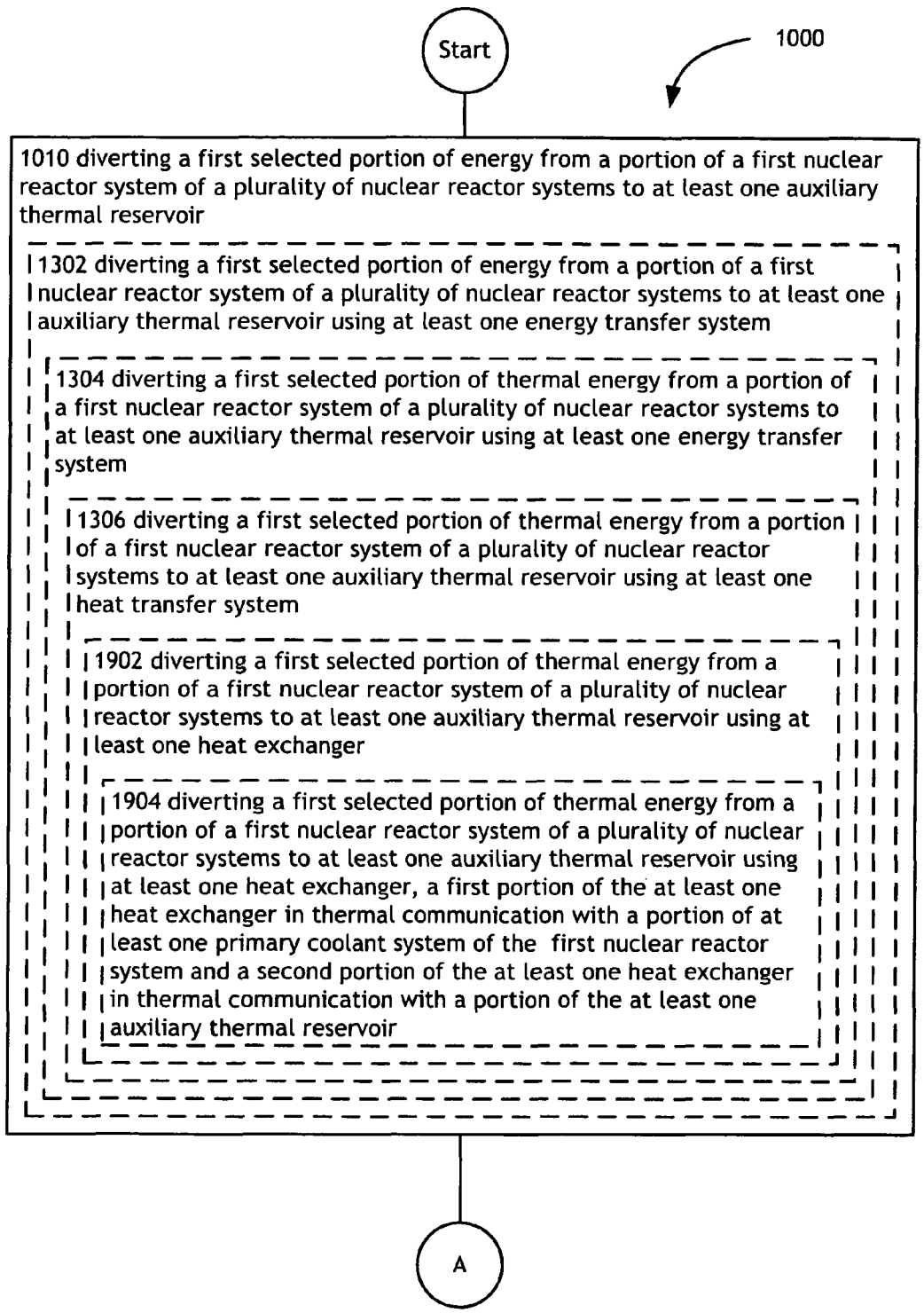
FIG. 19A is a high-level flowchart depicting an alternate implementation of FIG. 10.
Figure 19B:
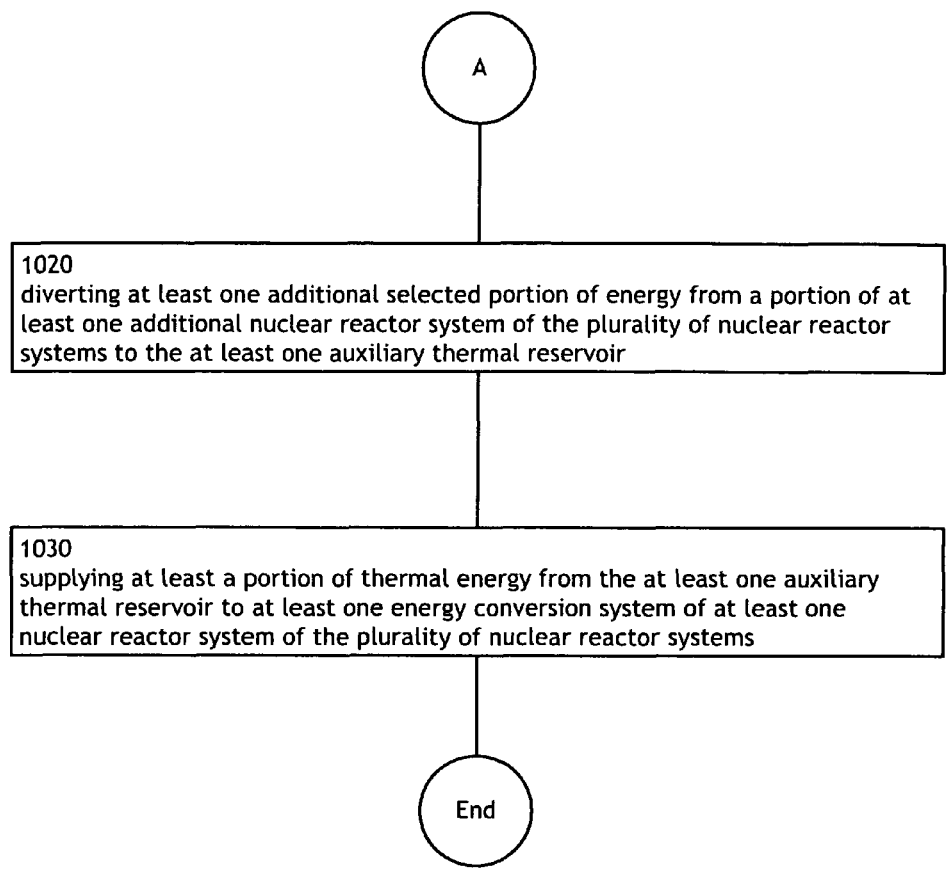
FIG. 19B is a high-level flowchart depicting an alternate implementation of FIG. 10.

FIGS. 19A and 19B illustrate alternative embodiments of the example operational flow 1000 of FIG. 10. FIG. 19 illustrates example embodiments where the first diverting operation 1010 may include at least one additional operation. Additional operations may include an operation 1902, and/or an operation 1904.

Operation 1902 illustrates diverting a first selected portion of thermal energy from a portion of a first nuclear reactor system of a plurality of nuclear reactor systems to at least one auxiliary thermal reservoir using at least one heat exchanger. For example, as shown in FIG. 5A, a first energy transfer system configured to transfer thermal energy 502 may transfer thermal energy from a portion of the nuclear reactor system 101 to the auxiliary thermal reservoir 112 using one or more reactor-to-reservoir heat exchangers 514.

Further, operation 1904 illustrates diverting a first selected portion of thermal energy from a portion of a first nuclear reactor system of a plurality of nuclear reactor systems to at least one auxiliary thermal reservoir using at least one heat exchanger, a first portion of the at least one heat exchanger in thermal communication with a portion of at least one primary coolant system of the first nuclear reactor system and a second portion of the at least one heat exchanger in thermal communication with a portion of the at least one auxiliary thermal reservoir. For example, the reactor-to-reservoir heat exchanger 514 may include a heat exchanger 515 having a first portion in communication with a primary coolant system of the first nuclear reactor system 106 and a second portion in thermal communication with an auxiliary thermal reservoir 112. For instance, the energy transfer system configured to transfer thermal energy 502 may transfer energy from the first nuclear reactor system 106 of a plurality of nuclear reactor systems 102 to an auxiliary thermal reservoir 112 using a heat exchanger 515 having a first portion in communication with the primary coolant system of the first nuclear reactor system 106 and a second portion in thermal communication with the auxiliary thermal reservoir 112.

Figure 20:
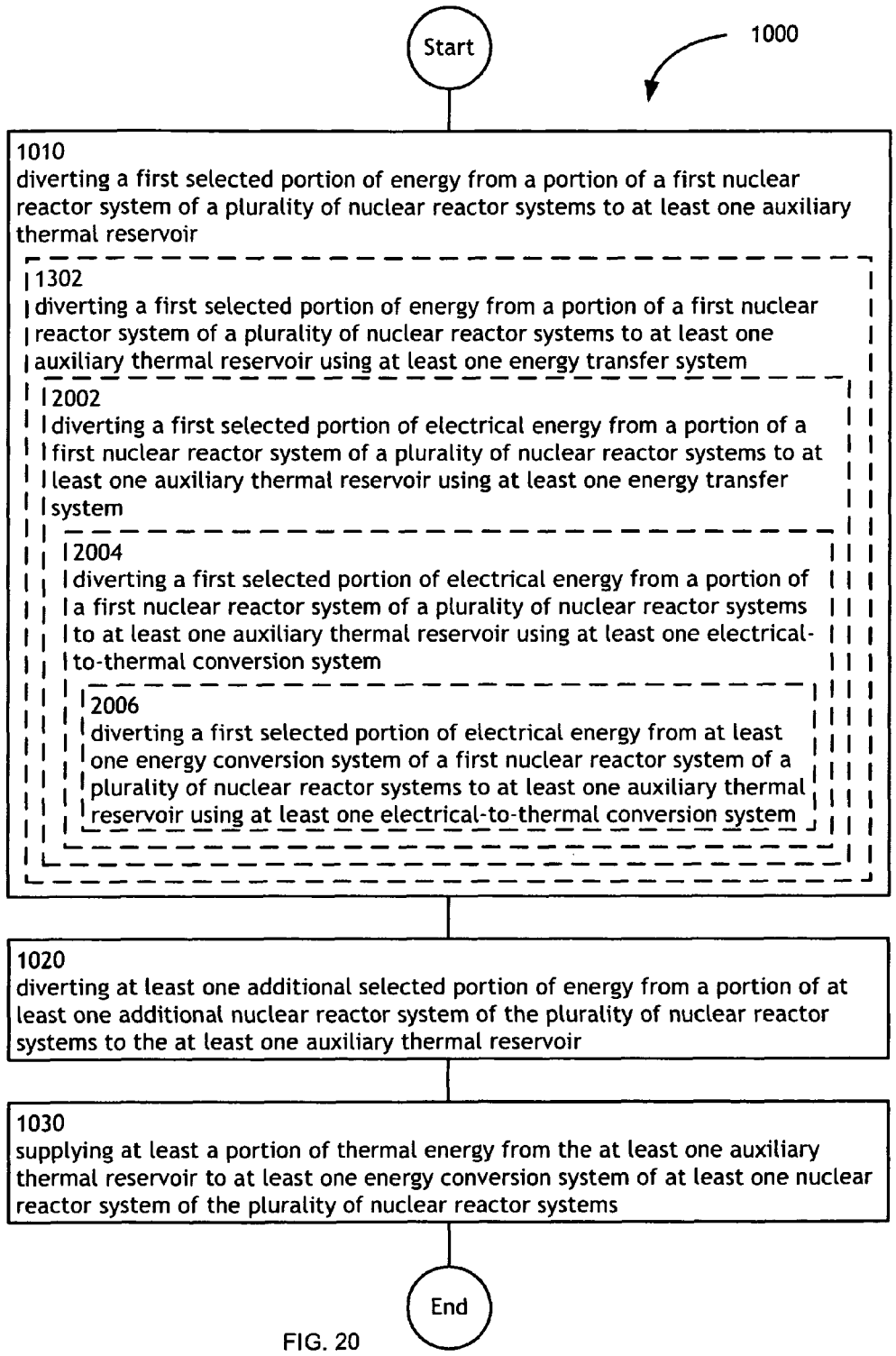
FIG. 20 is a high-level flowchart depicting an alternate implementation of FIG. 10.

FIG. 20 illustrates alternative embodiments of the example operational flow 1000 of FIG. 10. FIG. 20 illustrates example embodiments where the first diverting operation 1010 may include at least one additional operation. Additional operations may include an operation 2002, an operation 2004, and/or an operation 2006.

Operation 2002 illustrates diverting a first selected portion of electrical energy from a portion of a first nuclear reactor system of a plurality of nuclear reactor systems to at least one auxiliary thermal reservoir using at least one energy transfer system. For example, as shown in FIG. 5A, a first energy transfer system 104 may include an energy transfer system configured to transfer electrical energy 503 from a portion of a first nuclear reactor system 106 (e.g., an energy conversion system 110 of the first nuclear reactor system 106) to an auxiliary thermal reservoir 112. For instance, an energy transfer system configured to transfer electrical energy 503 from a first nuclear reactor system 106 of a plurality of nuclear reactor systems 102 to an auxiliary thermal reservoir 112 may be used to transfer electrical energy from a portion of the first nuclear reactor system 106 to the auxiliary thermal reservoir 112. Those skilled in the art will recognize that in the transfer process the electrical energy originating from a portion of the first nuclear reactor system 106 must be converted to thermal energy in order to be stored in the auxiliary thermal reservoir 112.

Further, the operation 2004 illustrates diverting a first selected portion of electrical energy from a portion of a first nuclear reactor system of a plurality of nuclear reactor systems to at least one auxiliary thermal reservoir using at least one electrical-to-thermal conversion system. For example, as shown in FIG. 5A, the energy transfer system suitable for transferring electrical energy 503 from a first nuclear reactor system 106 to an auxiliary thermal reservoir 112 may include an electrical energy-to-thermal energy conversion device 516. For instance, an electrical energy-to-thermal energy conversion device 516 may be used to convert electrical energy produced by a portion of a first nuclear reactor system 106 of a plurality of nuclear reactor systems 102. The thermal energy may then be transferred to the auxiliary thermal reservoir 112.

Further, the operation 2006 illustrates diverting a first selected portion of electrical energy from at least one energy conversion system of a first nuclear reactor system of a plurality of nuclear reactor systems to at least one auxiliary thermal reservoir using at least one electrical-to-thermal conversion system. For example, as shown in FIG. 5A, the energy transfer system suitable for transferring electrical energy 503 from a first nuclear reactor system 106 to an auxiliary thermal reservoir 112 may include an electrical energy-to-thermal energy conversion device configured to transfer electrical energy from an energy conversion device 110 of the first nuclear reactor system 106 to the auxiliary thermal reservoir 112. For instance, an electrical energy-to-thermal energy conversion device configured to transfer electrical energy from an energy conversion device 110 to the auxiliary thermal reservoir 112 may be used to convert electrical energy from the electrical output of an energy conversion device 110 (e.g., turbine-generator system) of the first nuclear reactor system 106 to thermal energy. The thermal energy may then be transferred to the auxiliary thermal reservoir 112.

Figure 21:
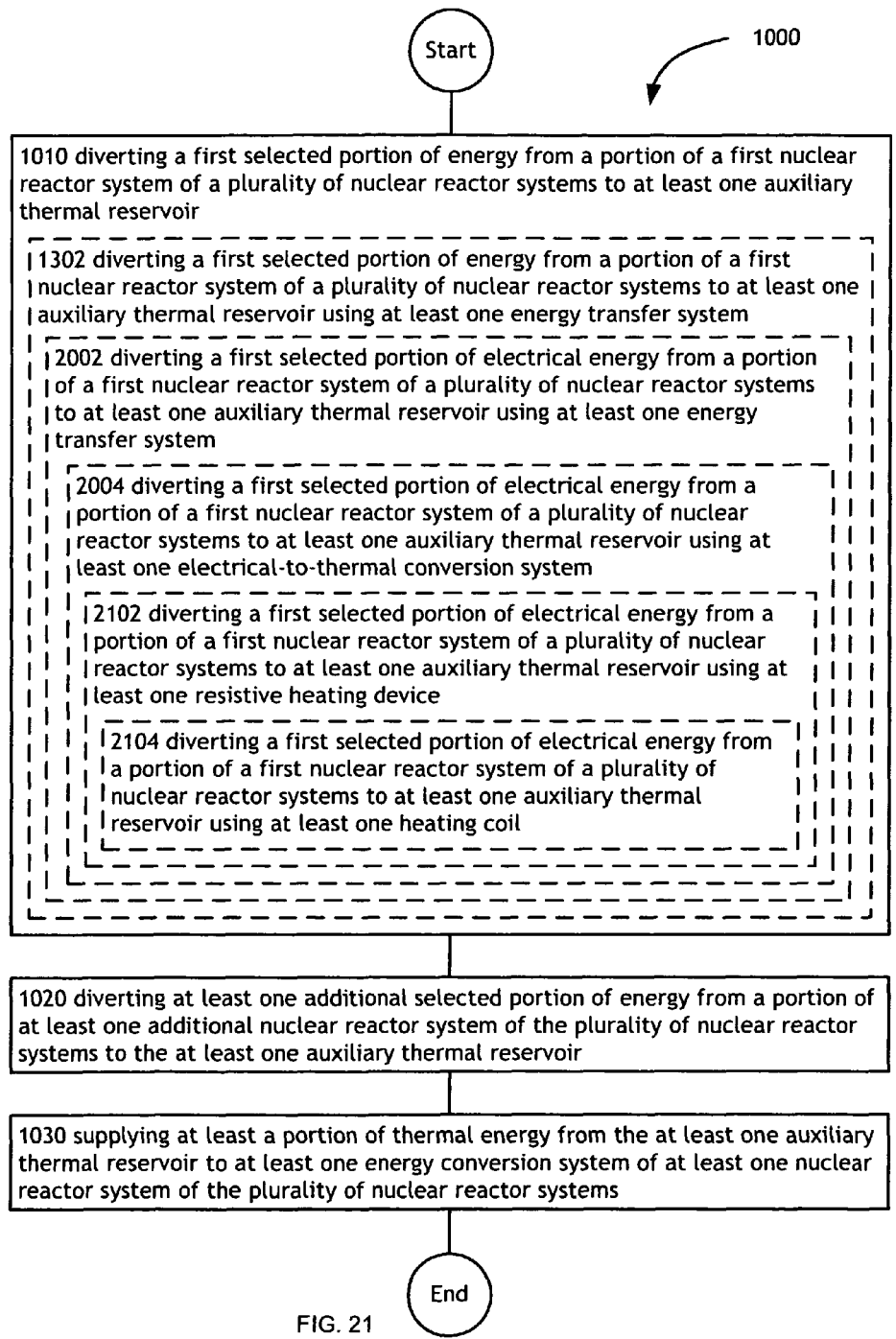
FIG. 21 is a high-level flowchart depicting an alternate implementation of FIG. 10.

FIG. 21 illustrates alternative embodiments of the example operational flow 1000 of FIG. 10. FIG. 21 illustrates example embodiments where the first diverting operation 1010 may include at least one additional operation. Additional operations may include an operation 2102, and/or an operation 2104.

Operation 2102 illustrates diverting a first selected portion of electrical energy from a portion of a first nuclear reactor system of a plurality of nuclear reactor systems to at least one auxiliary thermal reservoir using at least one resistive heating device. For example, as shown in FIG. 5A, the electrical energy-to-thermal energy conversion device may include one or more than one resistive heating devices 517. For instance, a resistive heating device 517 may be utilized to convert electrical energy from a portion of a first nuclear reactor system 106 of a plurality of nuclear reactor systems 102 to thermal energy. The thermal energy may then be transferred to an auxiliary thermal reservoir 112.

Further, the operation 2104 illustrates diverting a first selected portion of electrical energy from a portion of a first nuclear reactor system of a plurality of nuclear reactor systems to at least one auxiliary thermal reservoir using at least one heating coil. For example, as shown in FIG. 5A, the resistive heating device 517 may include one or more heating coils. For instance, a heating coil 518 may be used to convert electrical energy from a portion of a first nuclear reactor system 106 of a plurality of nuclear reactor systems 102 to thermal energy. The thermal energy may then be transferred to an auxiliary thermal reservoir 112.

Figure 22:
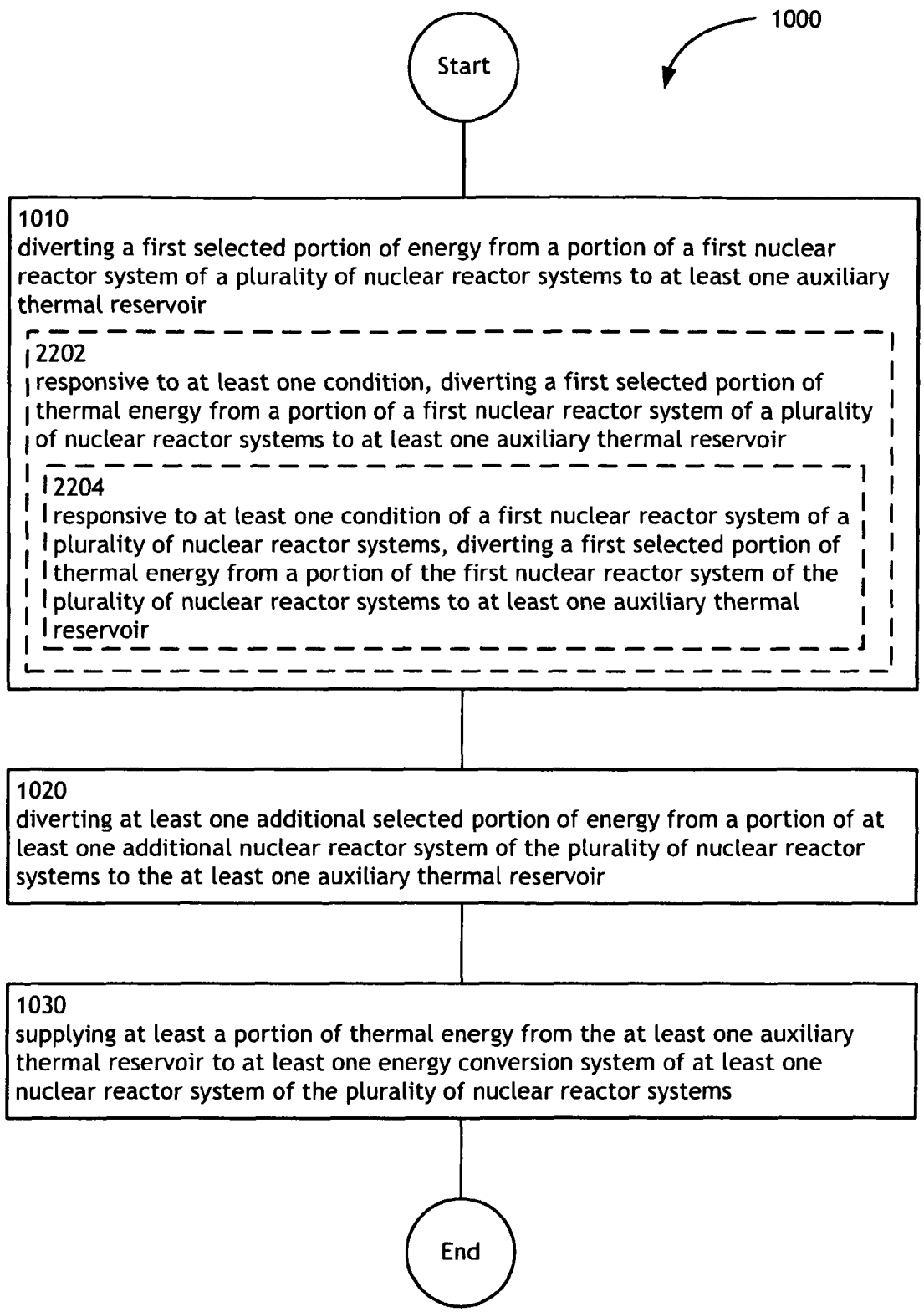
FIG. 22 is a high-level flowchart depicting an alternate implementation of FIG. 10.

FIG. 22 illustrates alternative embodiments of the example operational flow 1000 of FIG. 10. FIG. 22 illustrates example embodiments where the first diverting operation 1010 may include at least one additional operation. Additional operations may include an operation 2202, and/or an operation 2204.

Operation 2202 illustrates, responsive to at least one condition, diverting a first selected portion of thermal energy from a portion of a first nuclear reactor system of a plurality of nuclear reactor systems to at least one auxiliary thermal reservoir. For example, as shown in FIGS. 1 through 9D, in response to a condition (e.g., power demands on a nuclear reactor system, state of readiness of auxiliary thermal reservoir, thermal properties of nuclear reactor or thermal properties of reservoir), an energy transfer system responsive to a condition 802 may initiate transfer of energy from a portion of a first nuclear reactor system 106 of a plurality of nuclear reactor systems 102 to an auxiliary thermal reservoir 112.

Further, the operation 2204 illustrates responsive to at least one condition of a first nuclear reactor system of a plurality of nuclear reactor systems, diverting a first selected portion of thermal energy from a portion of the first nuclear reactor system of the plurality of nuclear reactor systems to at least one auxiliary thermal reservoir. For example, as shown in FIGS. 1 through 9D, in response to a condition of a first nuclear reactor system, an energy transfer system responsive to a condition of the first nuclear reactor system 804 may initiate transfer of energy from a portion of a first nuclear reactor system 106 of a plurality of nuclear reactor systems 102 to an auxiliary thermal reservoir 112.

Figure 23:
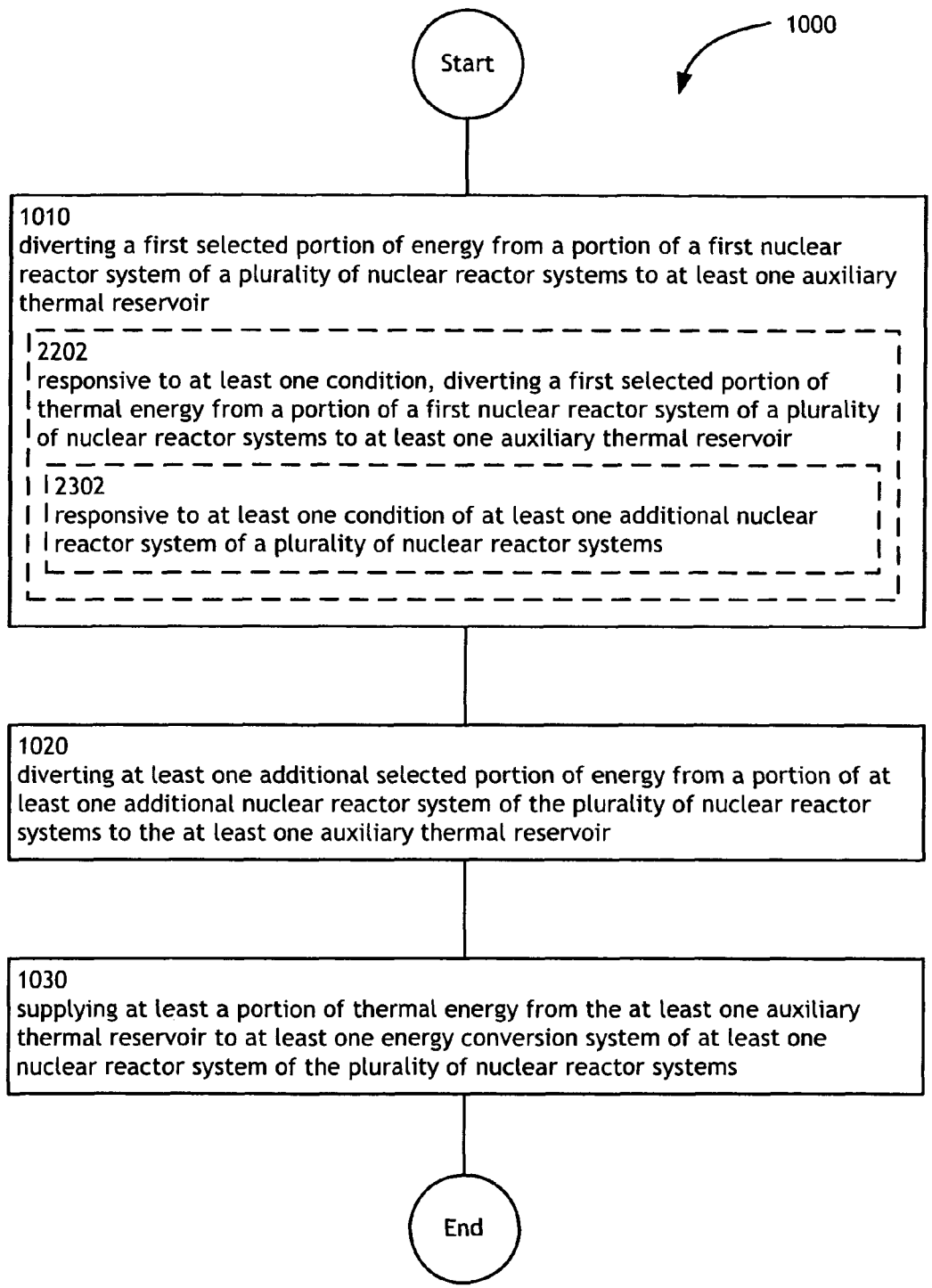
FIG. 23 is a high-level flowchart depicting an alternate implementation of FIG. 10.

FIG. 23 illustrates alternative embodiments of the example operational flow 1000 of FIG. 10. FIG. 23 illustrates example embodiments where the first diverting operation 1010 may include at least one additional operation. Additional operations may include an operation 2302.

Operation 2302 illustrates, responsive to at least one condition of at least one additional nuclear reactor system of a plurality of nuclear reactor systems, diverting a first selected portion of thermal energy from a portion of the first nuclear reactor system of the plurality of nuclear reactor systems to at least one auxiliary thermal reservoir. For example, as shown in FIGS. 1 through 9D, in response to a condition of an additional nuclear reactor system, an energy transfer system responsive to a condition of an additional nuclear reactor system 806, such as a 2nd nuclear reactor system, a 3rd nuclear reactor system, or up to and including an Nth nuclear reactor system, may initiate transfer of energy from a portion of a first nuclear reactor system 106 of a plurality of nuclear reactor systems 102 to an auxiliary thermal reservoir 112.

Figure 24:
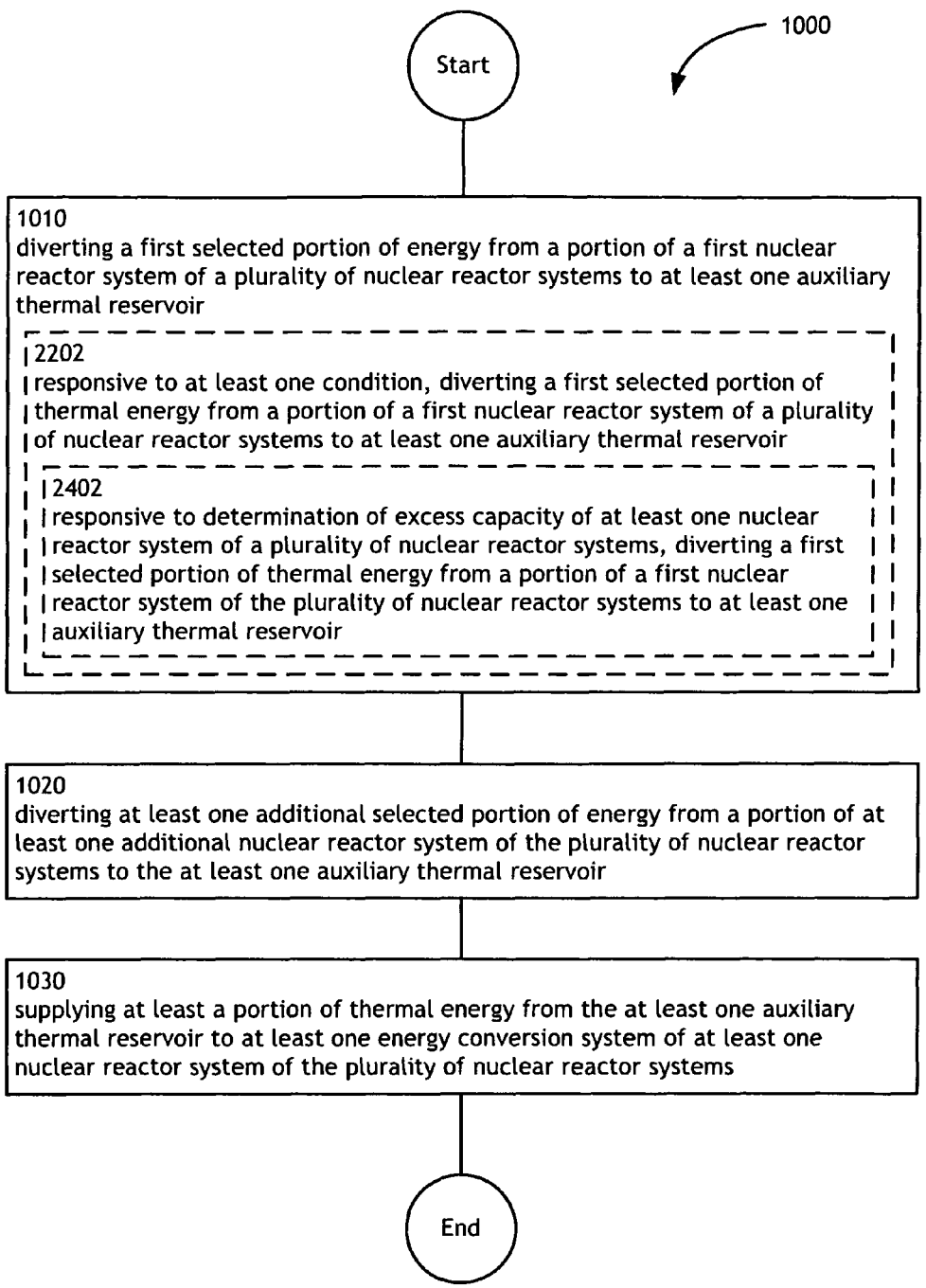
FIG. 24 is a high-level flowchart depicting an alternate implementation of FIG. 10.

FIG. 24 illustrates alternative embodiments of the example operational flow 1000 of FIG. 10. FIG. 24 illustrates example embodiments where the first diverting operation 1010 may include at least one additional operation. Additional operations may include an operation 2402.

Operation 2402 illustrates, responsive to determination of excess capacity of at least one nuclear reactor system of a plurality of nuclear reactor systems, diverting a first selected portion of thermal energy from a portion of a first nuclear reactor system of the plurality of nuclear reactor systems to at least one auxiliary thermal reservoir. For example, as shown in FIGS. 1 through 9D, in response to the determination of excess capacity of at least one nuclear reactor system 106 of a plurality of nuclear reactor systems 102 (e.g., determination that current nuclear reactor power production exceeds current grid demand), an energy transfer system responsive to the determination of excess nuclear reactor capacity 808 may initiate transfer of energy from a portion of a first nuclear reactor system 106 of a plurality of nuclear reactor systems 102 to an auxiliary thermal reservoir 112.

Figure 25:
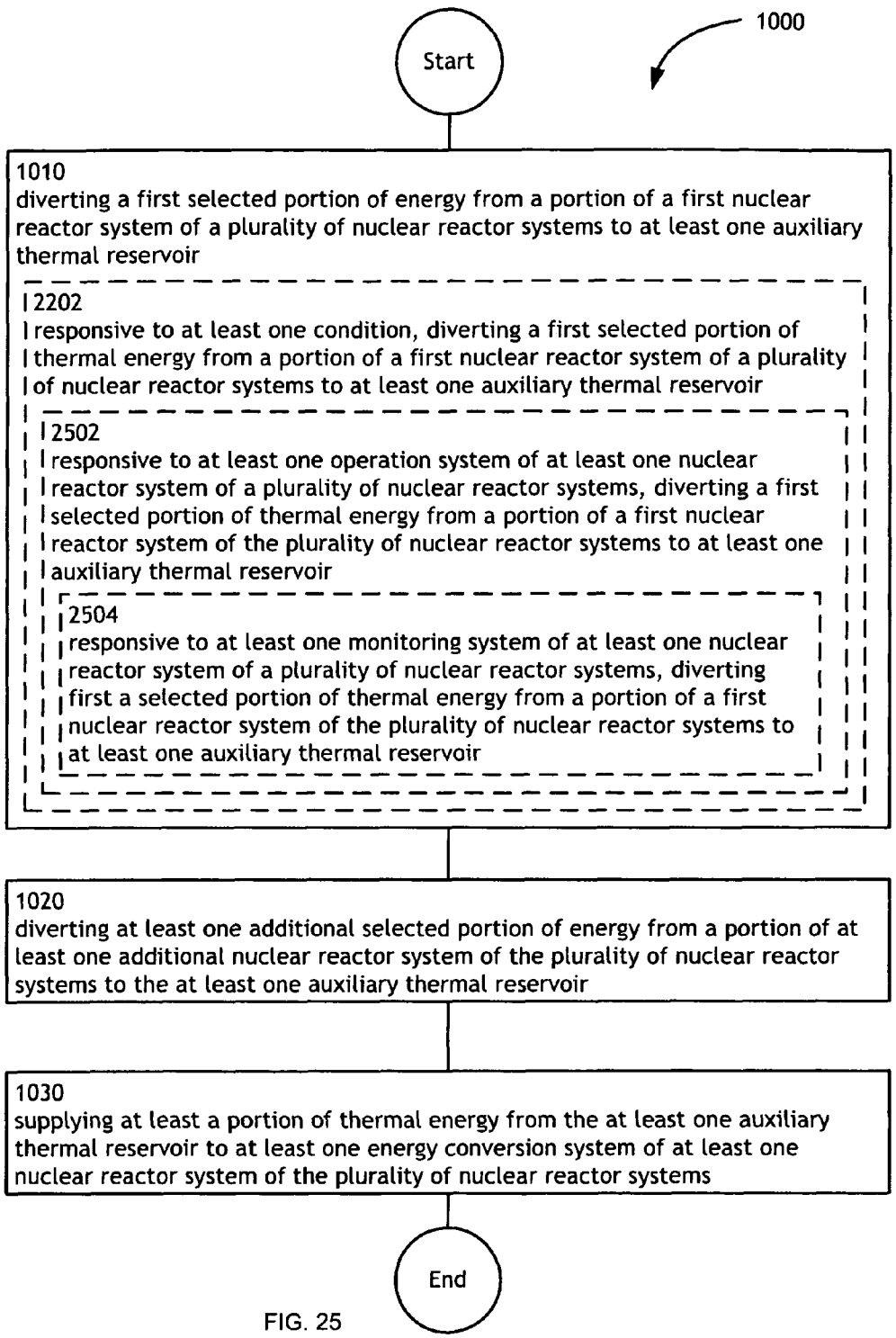
FIG. 25 is a high-level flowchart depicting an alternate implementation of FIG. 10.

FIG. 25 illustrates alternative embodiments of the example operational flow 1000 of FIG. 10. FIG. 25 illustrates example embodiments where the first diverting operation 1010 may include at least one additional operation. Additional operations may include an operation 2502, and/or an operation 2504.

Operation 2502 illustrates, responsive to at least one operation system of at least one nuclear reactor system of a plurality of nuclear reactor systems, diverting a first selected portion of thermal energy from a portion of a first nuclear reactor system of the plurality of nuclear reactor systems to at least one auxiliary thermal reservoir. For example, as shown in FIGS. 1 through 9D, in response to an operation system (e.g., warning system, security system, or shutdown system) of a nuclear reactor system 106 (e.g., first nuclear reactor system 106, second nuclear reactor system 106, or up to and including the Nth nuclear reactor system 106) of a plurality of nuclear reactor systems 102, an energy transfer system responsive to an operation system 810 may initiate transfer of energy from a portion of a first nuclear reactor system 106 of a plurality of nuclear reactor systems 102 to an auxiliary thermal reservoir 112.

Further, the operation 2504 illustrates, responsive to at least one monitoring system of at least one nuclear reactor system of a plurality of nuclear reactor systems, diverting first a selected portion of thermal energy from a portion of a first nuclear reactor system of the plurality of nuclear reactor systems to at least one auxiliary thermal reservoir. For example, as shown in FIGS. 1 through 9D, in response to a monitoring system of a nuclear reactor system 106 (e.g., first nuclear reactor system 106, second nuclear reactor system 106, or up to and including the Nth nuclear reactor system 106) of a plurality of nuclear reactor systems 102, an energy transfer system responsive to a monitoring system 814 may initiate transfer of energy from a portion of a first nuclear reactor system 106 of the plurality of nuclear reactor systems 102 to an auxiliary thermal reservoir 112.

Figure 26:
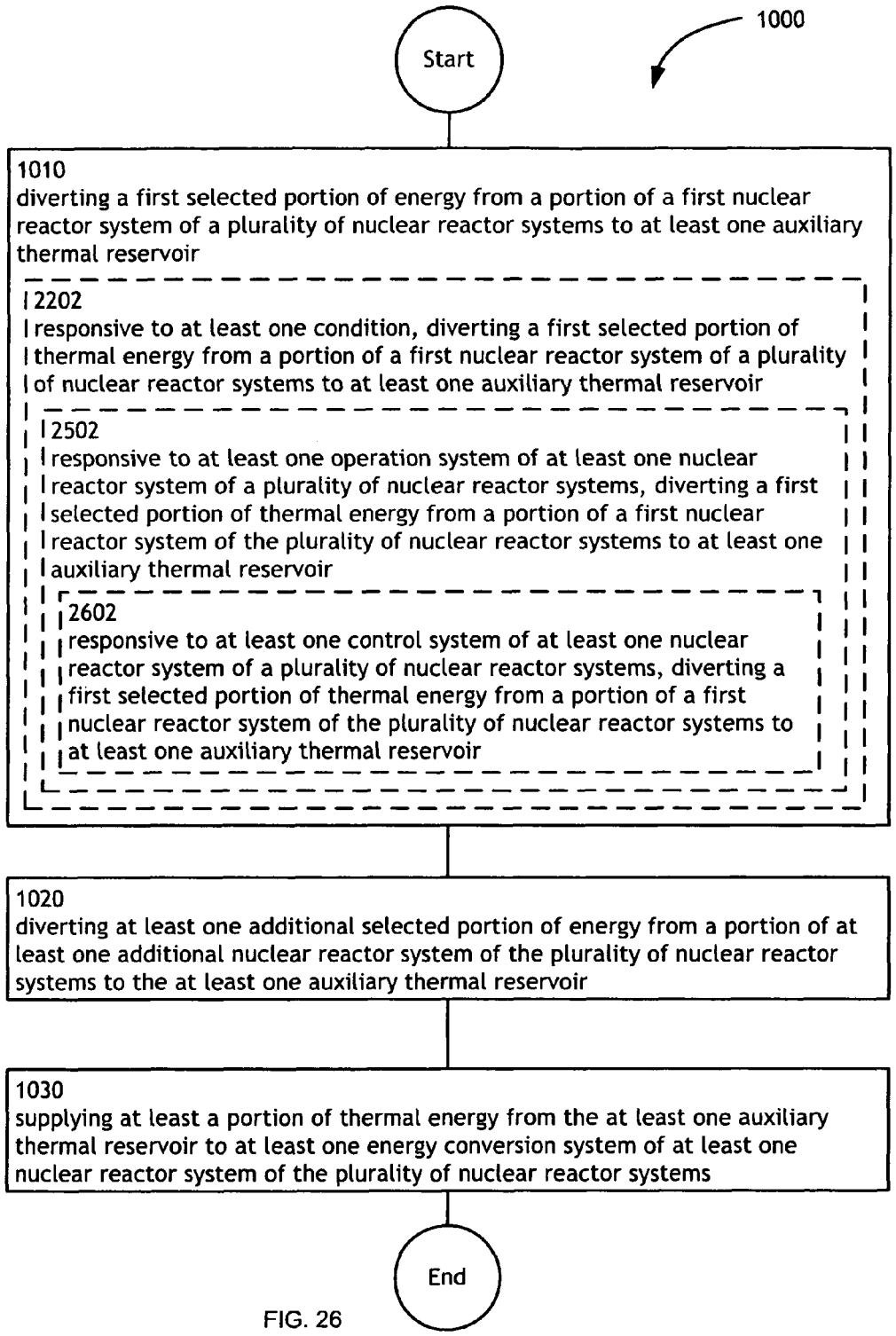
FIG. 26 is a high-level flowchart depicting an alternate implementation of FIG. 10.

FIG. 26 illustrates alternative embodiments of the example operational flow 1000 of FIG. 10. FIG. 26 illustrates example embodiments where the first diverting operation 1010 may include at least one additional operation. Additional operations may include an operation 2602.

Operation 2602 illustrates, responsive to at least one control system of at least one nuclear reactor system of a plurality of nuclear reactor systems, diverting a first selected portion of thermal energy from a portion of a first nuclear reactor system of the plurality of nuclear reactor systems to at least one auxiliary thermal reservoir. For example, as shown in FIGS. 1 through 9D, in response to a control system of a nuclear reactor system 106 (e.g., first nuclear reactor system 106, second nuclear reactor system 106, or up to and including the Nth nuclear reactor system 106) of a plurality of nuclear reactor systems 102, an energy transfer system responsive to a control system 816 may initiate transfer of energy from a portion of a first nuclear reactor system 106 of the plurality of nuclear reactor systems 102 to an auxiliary thermal reservoir 112.

Figure 27:
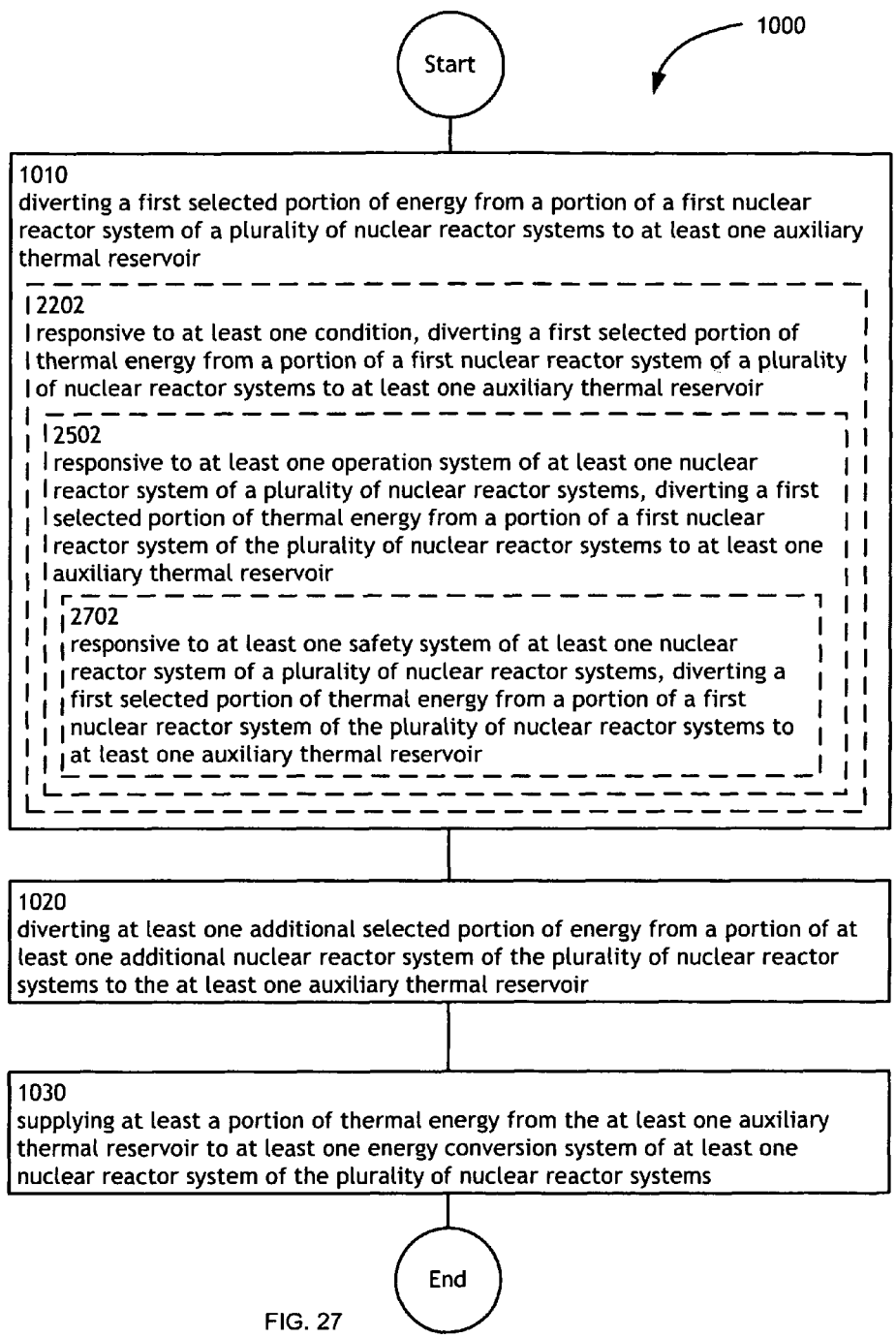
FIG. 27 is a high-level flowchart depicting an alternate implementation of FIG. 10.

FIG. 27 illustrates alternative embodiments of the example operational flow 1000 of FIG. 10. FIG. 27 illustrates example embodiments where the first diverting operation 1010 may include at least one additional operation. Additional operations may include an operation 2702.

Operation 2702 illustrates, responsive to at least one safety system of at least one nuclear reactor system of a plurality of nuclear reactor systems, diverting a first selected portion of thermal energy from a portion of a first nuclear reactor system of the plurality of nuclear reactor systems to at least one auxiliary thermal reservoir. For example, as shown in FIGS. 1 through 9D, in response to a safety system of a nuclear reactor system 106 (e.g., first nuclear reactor system 106, second nuclear reactor system 106, or up to and including the Nth nuclear reactor system 106) of a plurality of nuclear reactor systems 102, an energy transfer system responsive to a safety system 818 may initiate transfer of energy from a portion of a first nuclear reactor system 106 of the plurality of nuclear reactor systems 102 to an auxiliary thermal reservoir 112.

Figure 28:
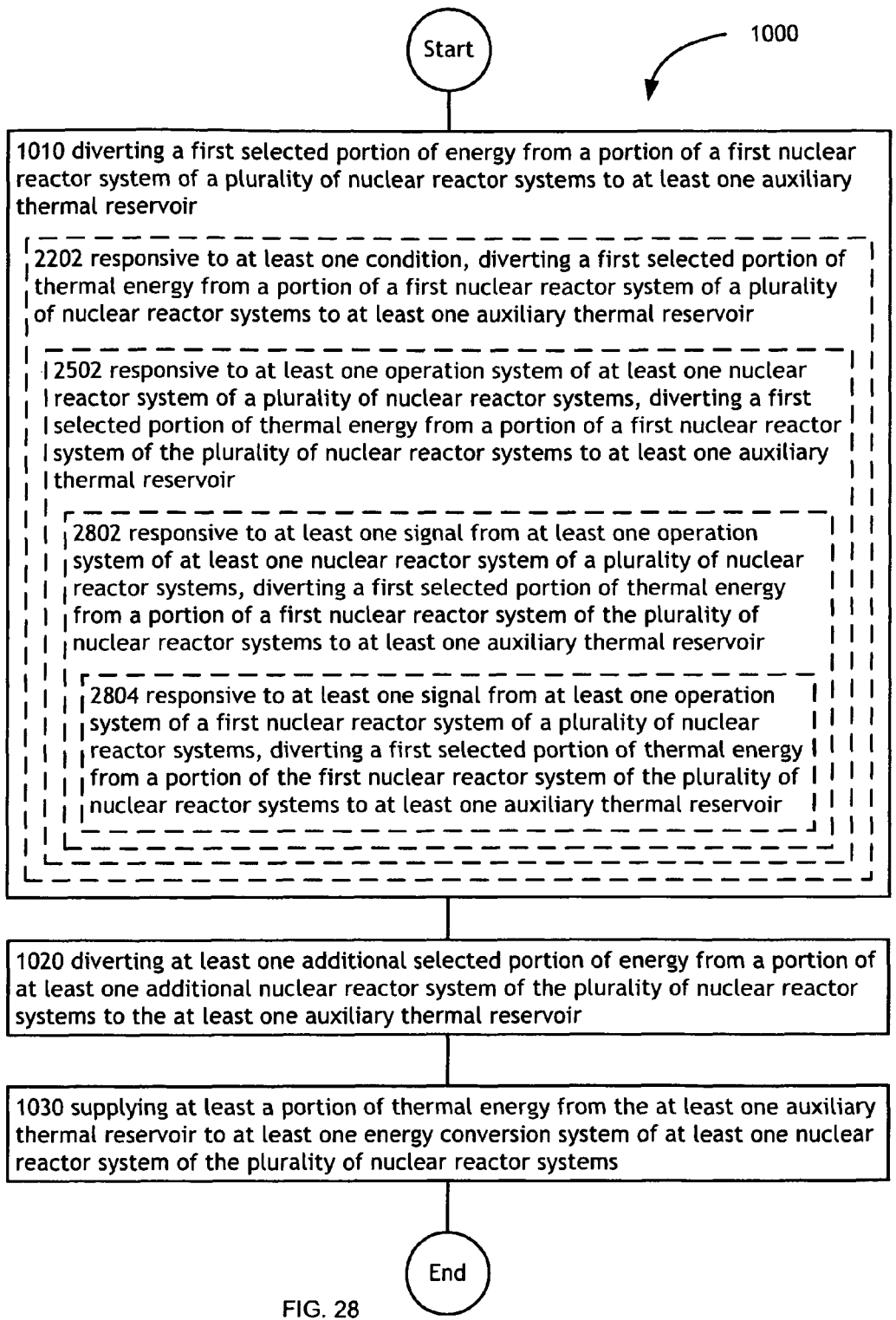
FIG. 28 is a high-level flowchart depicting an alternate implementation of FIG. 10.

FIG. 28 illustrates alternative embodiments of the example operational flow 1000 of FIG. 10. FIG. 28 illustrates example embodiments where the first diverting operation 1010 may include at least one additional operation. Additional operations may include an operation 2802, and/or an operation 2804.

Operation 2802 illustrates, responsive to at least one signal from at least one operation system of at least one nuclear reactor system of a plurality of nuclear reactor systems, diverting a first selected portion of thermal energy from a portion of a first nuclear reactor system of the plurality of nuclear reactor systems to at least one auxiliary thermal reservoir. For example, as shown in FIGS. 1 through 9D, in response to a signal (e.g., a digital wireline signal, an analog wireline signal, a digital wireless signal, or an analog wireless signal) from an operation system of a nuclear reactor system 106 (e.g., first nuclear reactor system 106, second nuclear reactor system 106, or up to and including the Nth nuclear reactor system 106) of a plurality of nuclear reactor systems 102, an energy transfer system responsive to a signal from an operation system 812 may initiate transfer of energy from a portion of a first nuclear reactor system 106 of the plurality of nuclear reactor systems 102 to an auxiliary thermal reservoir 112.

Further, the operation 2804 illustrates, responsive to at least one signal from at least one operation system of a first nuclear reactor system of a plurality of nuclear reactor systems, diverting a first selected portion of thermal energy from a portion of the first nuclear reactor system of the plurality of nuclear reactor systems to at least one auxiliary thermal reservoir. For example, as shown in FIGS. 1 through 9D, in response to a signal from an operation system of a first nuclear reactor system 106 of a plurality of nuclear reactor systems 102, an energy transfer system responsive to a signal from an operation system 812 may initiate transfer of energy from a portion of a first nuclear reactor system 106 of the plurality of nuclear reactor systems 102 to an auxiliary thermal reservoir 112.

Figure 29:
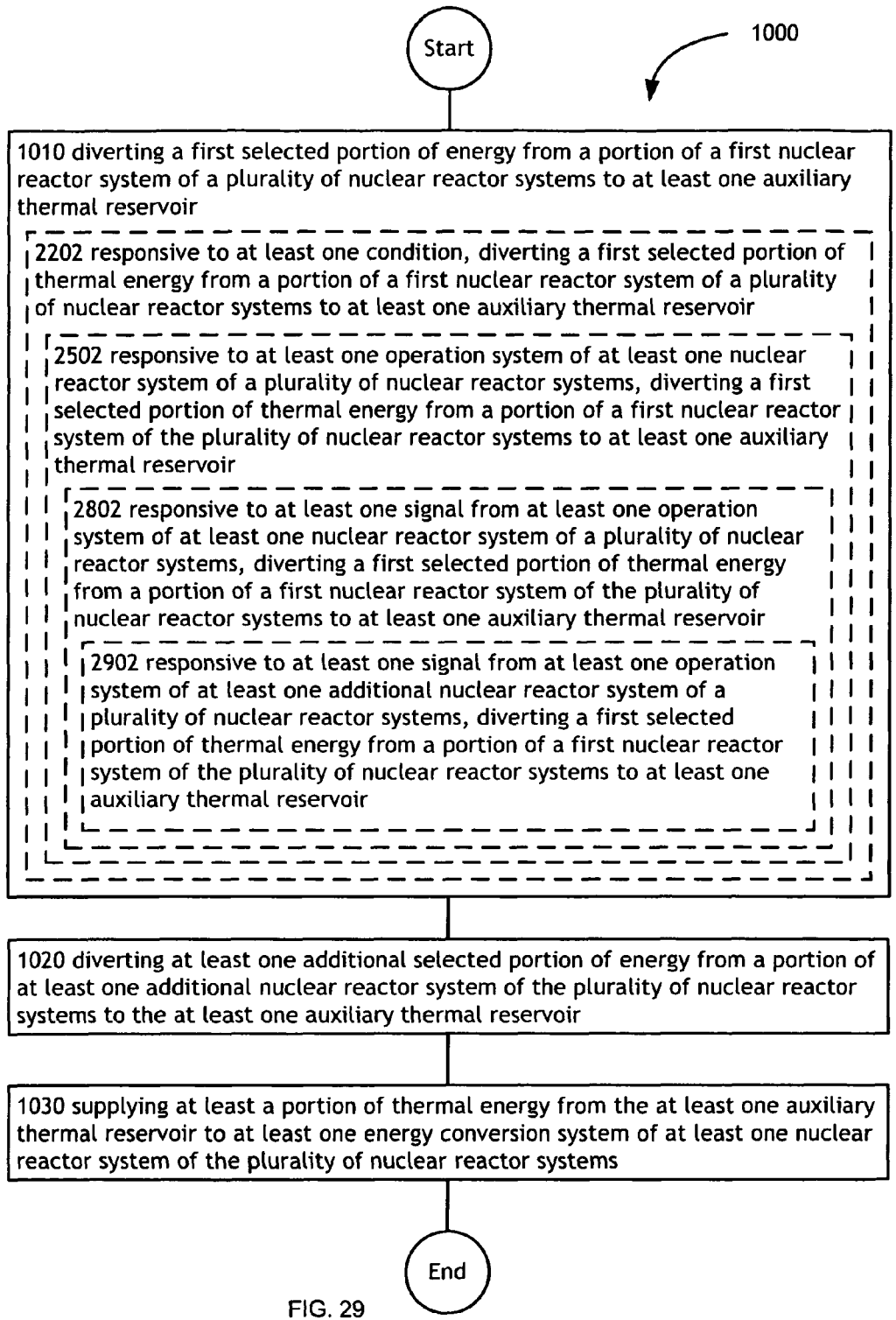
FIG. 29 is a high-level flowchart depicting an alternate implementation of FIG. 10.

FIG. 29 illustrates alternative embodiments of the example operational flow 1000 of FIG. 10. FIG. 29 illustrates example embodiments where the first diverting operation 1010 may include at least one additional operation. Additional operations may include an operation 2902.

Operation 2902 illustrates, responsive to at least one signal from at least one operation system of at least one additional nuclear reactor system of a plurality of nuclear reactor systems, diverting a first selected portion of thermal energy from a portion of a first nuclear reactor system of the plurality of nuclear reactor systems to at least one auxiliary thermal reservoir. For example, as shown in FIGS. 1 through 9D, in response to a signal from an operation system of an additional nuclear reactor system 106 (e.g., second nuclear reactor system 106, third nuclear reactor system, or up to an including the Nth nuclear reactor system 106) of a plurality of nuclear reactor systems 102, an energy transfer system responsive to a signal from an operation system 812 may initiate transfer of energy from a portion of a first nuclear reactor system 106 of the plurality of nuclear reactor systems 102 to an auxiliary thermal reservoir 112.

Figure 30:
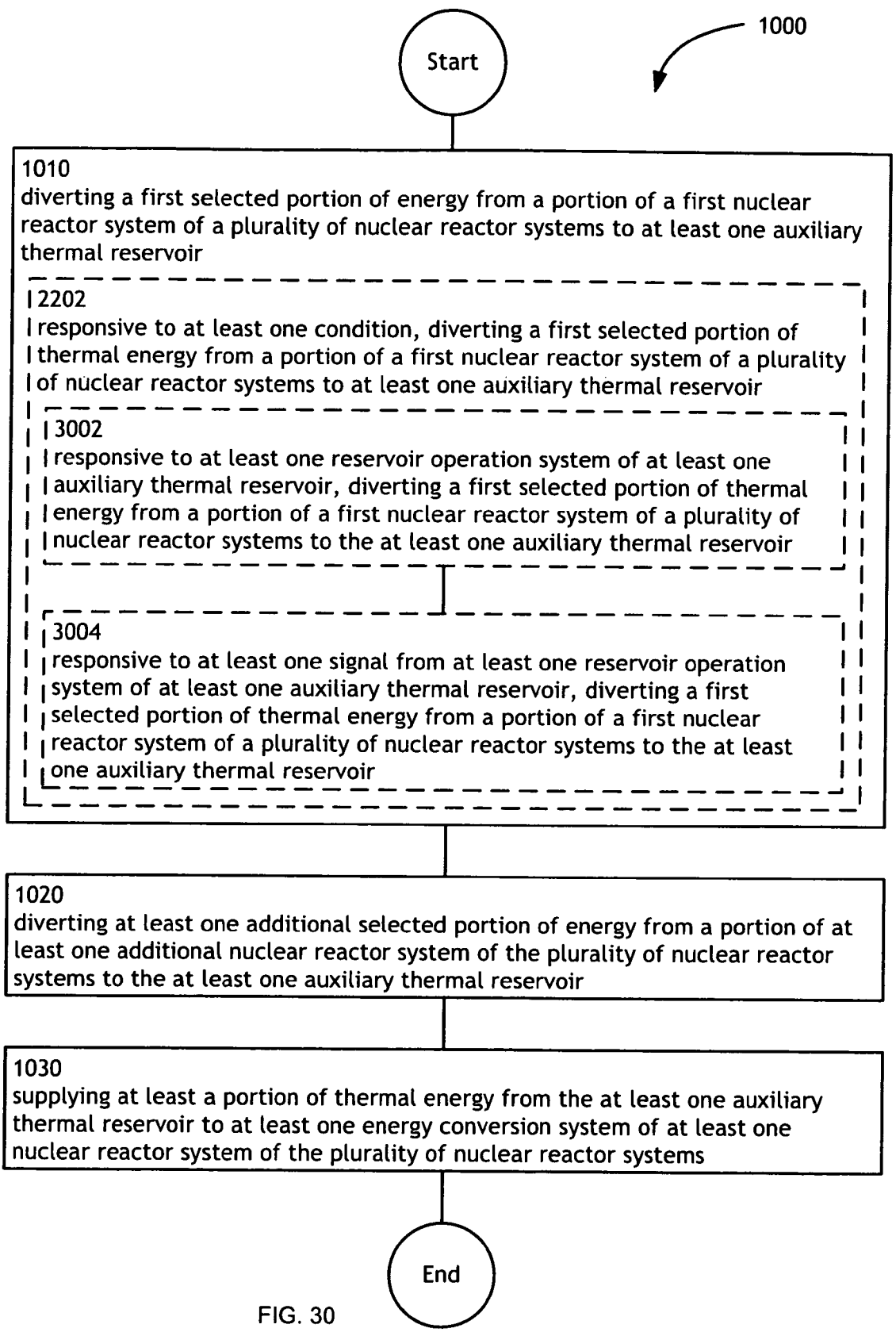
FIG. 30 is a high-level flowchart depicting an alternate implementation of FIG. 10.

FIG. 30 illustrates alternative embodiments of the example operational flow 1000 of FIG. 10. FIG. 30 illustrates example embodiments where the first diverting operation 1010 may include at least one additional operation. Additional operations may include an operation 3002, and/or an operation 3004.

Operation 3002 illustrates, responsive to at least one reservoir operation system of at least one auxiliary thermal reservoir, diverting a first selected portion of thermal energy from a portion of a first nuclear reactor system of a plurality of nuclear reactor systems to the at least one auxiliary thermal reservoir. For example, as shown in FIGS. 1 through 9D, in response to a reservoir operation system (e.g., monitoring system, warning system, or control system) of an auxiliary thermal reservoir, an energy transfer system responsive to a reservoir operation system 824 may initiate transfer of energy from a portion of a first nuclear reactor system 106 of the plurality of nuclear reactor systems 102 to an auxiliary thermal reservoir 112.

Further, the operation 3004 illustrates, responsive to at least one signal from at least one reservoir operation system of at least one auxiliary thermal reservoir, diverting a first selected portion of thermal energy from a portion of a first nuclear reactor system of a plurality of nuclear reactor systems to the at least one auxiliary thermal reservoir. For example, as shown in FIGS. 1 through 9D, in response to a signal (e.g., a digital wireline signal, an analog wireline signal, a digital wireless signal, or an analog wireless signal) from a reservoir operation system of an auxiliary thermal reservoir, an energy transfer system responsive to a signal from a reservoir operation system 826 may initiate transfer of energy from a portion of a first nuclear reactor system 106 of the plurality of nuclear reactor systems 102 to an auxiliary thermal reservoir 112.

Figure 31:
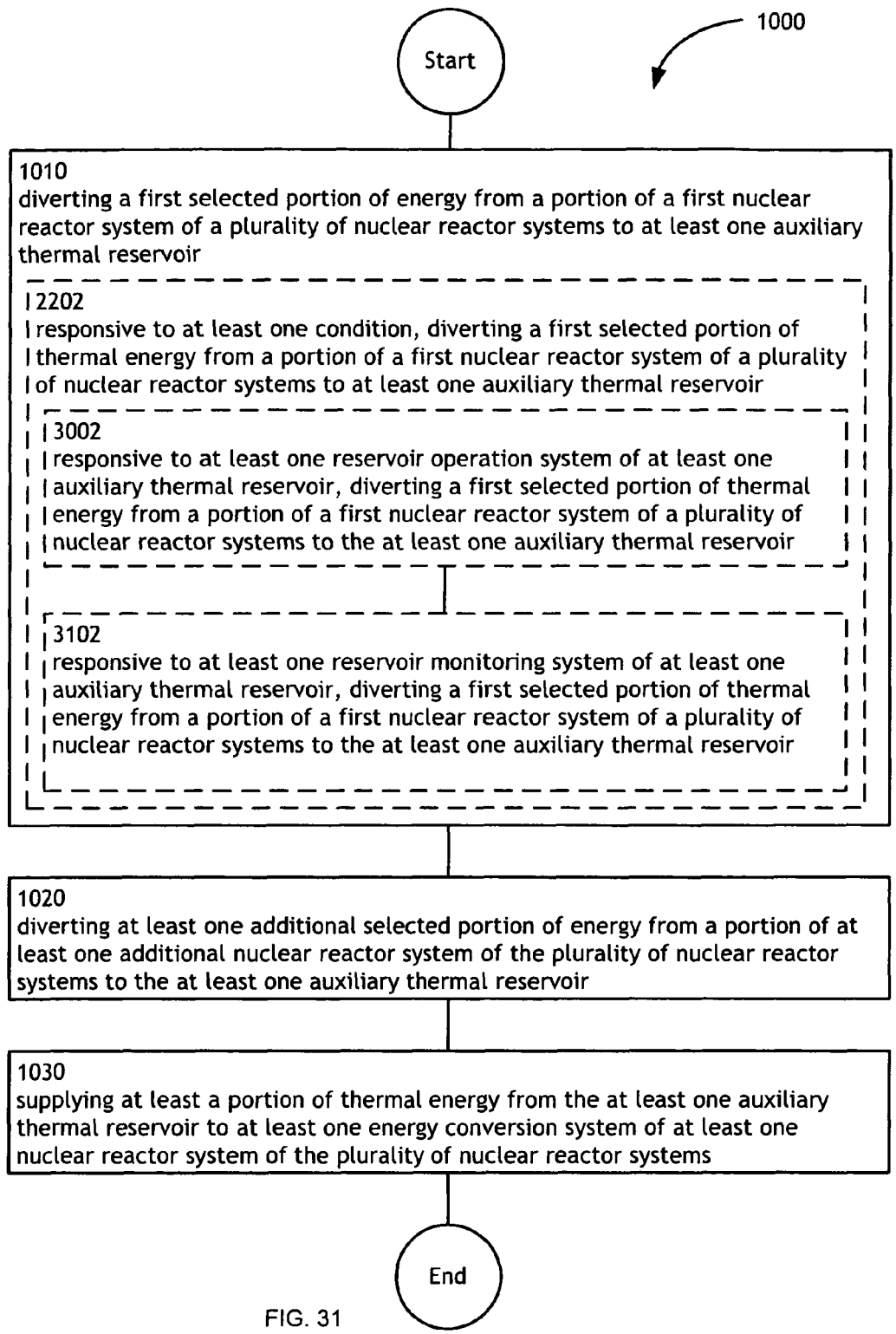
FIG. 31 is a high-level flowchart depicting an alternate implementation of FIG. 10.

FIG. 31 illustrates alternative embodiments of the example operational flow 1000 of FIG. 10. FIG. 31 illustrates example embodiments where the first diverting operation 1010 may include at least one additional operation. Additional operations may include an operation 3102.

Operation 3102 illustrates, responsive to at least one reservoir monitoring system of at least one auxiliary thermal reservoir, diverting a first selected portion of thermal energy from a portion of a first nuclear reactor system of a plurality of nuclear reactor systems to the at least one auxiliary thermal reservoir. For example, as shown in FIGS. 1 through 9D, in response to a reservoir monitoring system (e.g., thermal monitoring system) of an auxiliary thermal reservoir, an energy transfer system responsive to a reservoir monitoring system 828 may initiate transfer of energy from a portion of a first nuclear reactor system 106 of the plurality of nuclear reactor systems 102 to an auxiliary thermal reservoir 112.

Figure 32:
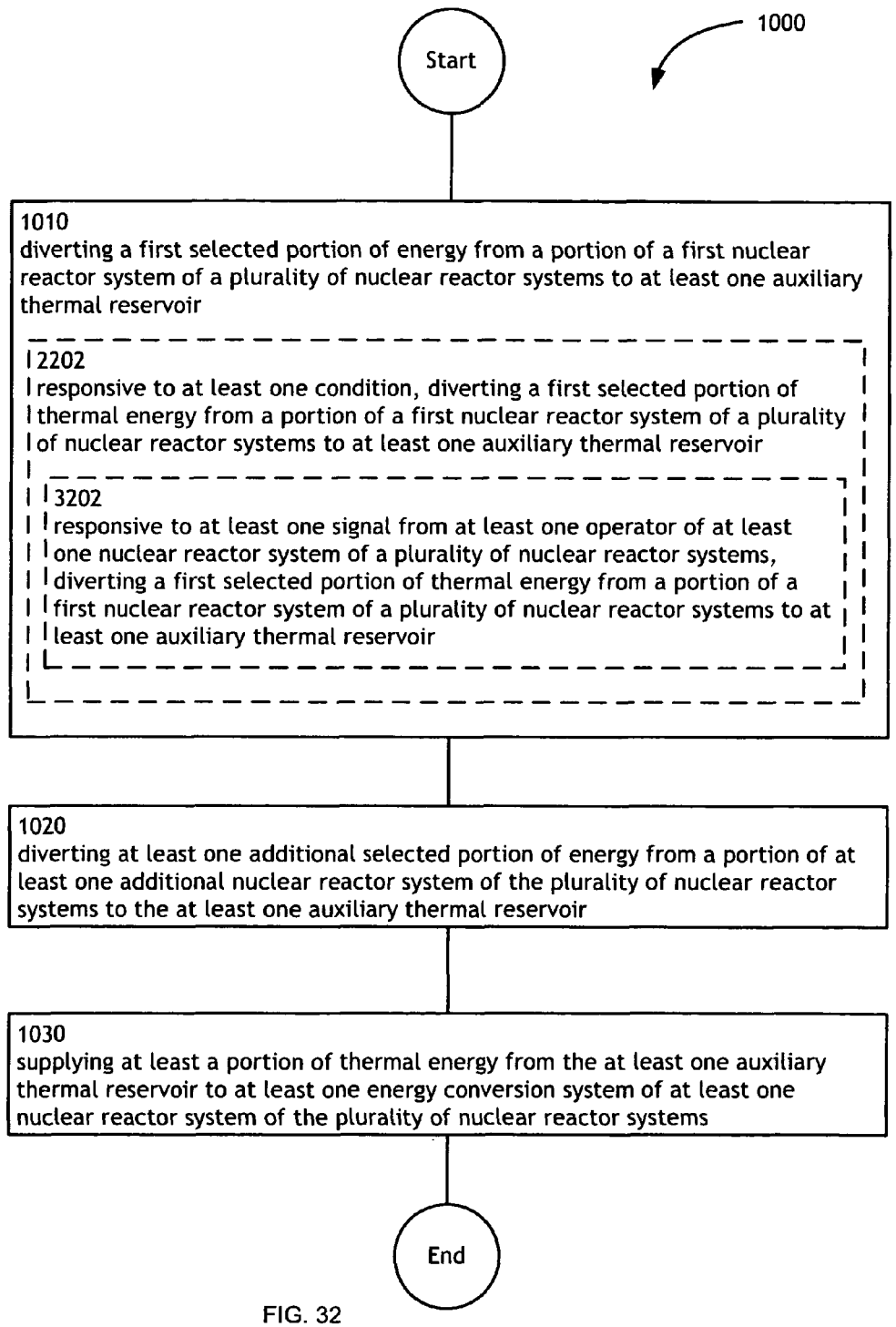
FIG. 32 is a high-level flowchart depicting an alternate implementation of FIG. 10.

FIG. 32 illustrates alternative embodiments of the example operational flow 1000 of FIG. 10. FIG. 32 illustrates example embodiments where the first diverting operation 1010 may include at least one additional operation. Additional operations may include an operation 3202.

Operation 3202 illustrates, responsive to at least one signal from at least one operator of at least one nuclear reactor system of a plurality of nuclear reactor systems, diverting a first selected portion of thermal energy from a portion of a first nuclear reactor system of a plurality of nuclear reactor systems to at least one auxiliary thermal reservoir. For example, as shown in FIGS. 1 through 9D, in response to at least one signal from an operator of a nuclear reactor system 106 of a plurality of nuclear reactor systems 102, an energy transfer system responsive to a signal (e.g., wireless or wireline signal) from an operator 820 (e.g., human user or human controlled programmable computer system) may initiate transfer of energy from a portion of a first nuclear reactor system 106 of the plurality of nuclear reactor systems 102 to an auxiliary thermal reservoir 112.

Figure 33:
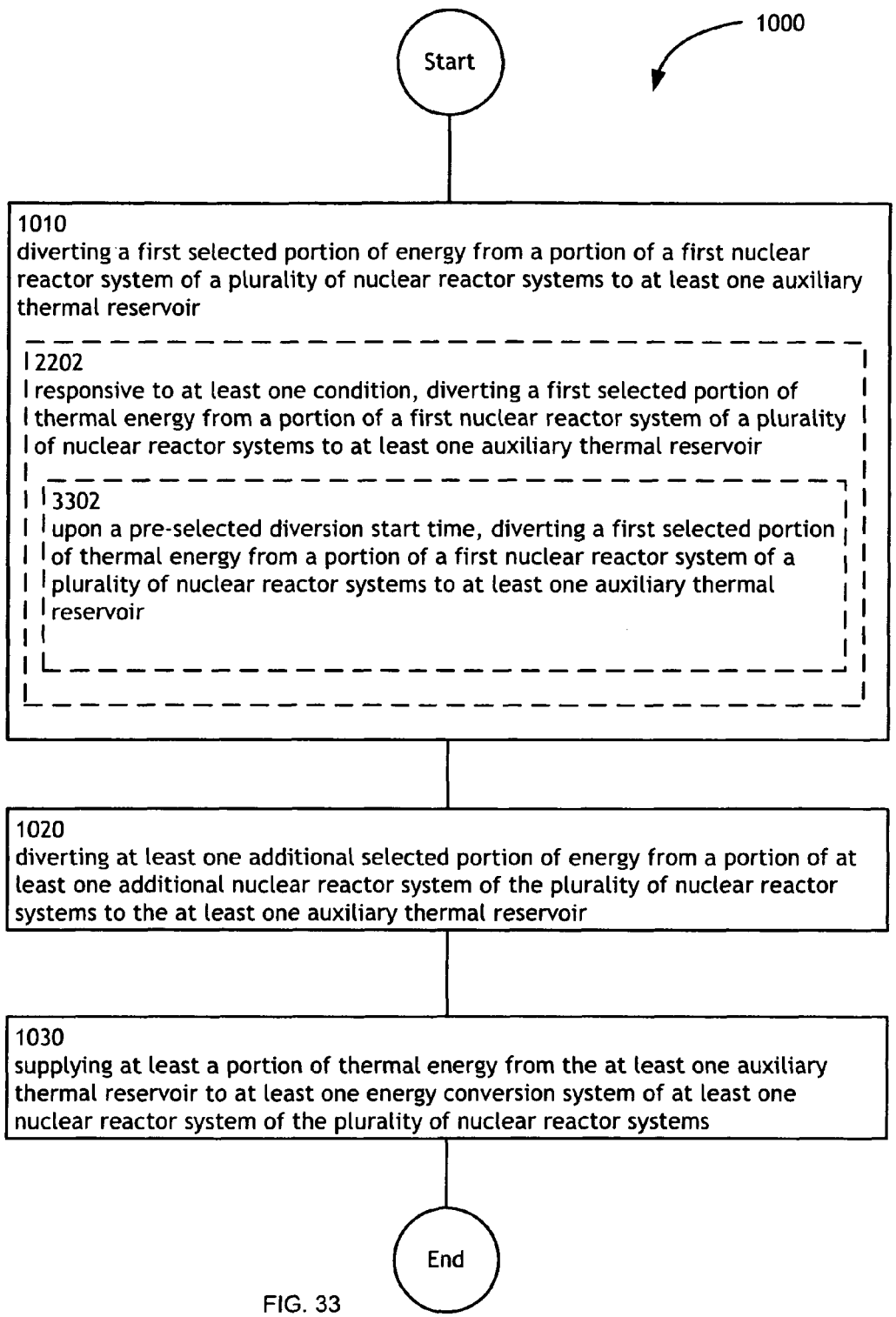
FIG. 33 is a high-level flowchart depicting an alternate implementation of FIG. 10.

FIG. 33 illustrates alternative embodiments of the example operational flow 1000 of FIG. 10. FIG. 33 illustrates example embodiments where the first diverting operation 1010 may include at least one additional operation. Additional operations may include an operation 3302.

Further, the operation 3302 illustrates, upon a preselected diversion start time, diverting a first selected portion of thermal energy from a portion of a first nuclear reactor system of a plurality of nuclear reactor systems to at least one auxiliary thermal reservoir. For example, as shown in FIGS. 1 through 9D, upon a preselected diversion start time (e.g., absolute time or time of elapse relative to the occurrence of a predetermined event), an energy transfer system responsive to a preselected diversion start time 822 may initiate the transfer of energy from a portion of a first nuclear reactor system 106 of a plurality of nuclear reactor systems 102 to an auxiliary thermal reservoir 112.

Figure 34:
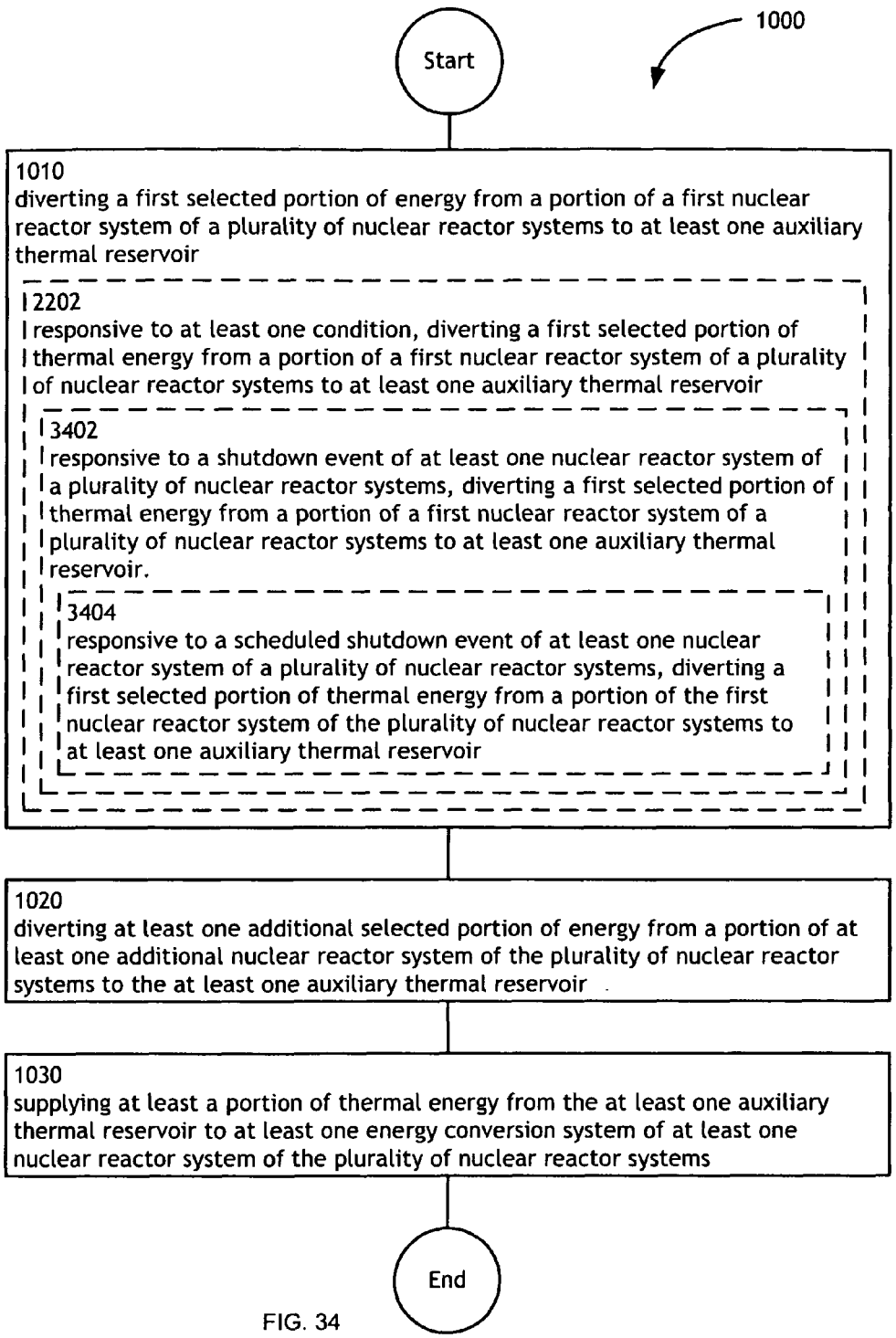
FIG. 34 is a high-level flowchart depicting an alternate implementation of FIG. 10.

FIG. 34 illustrates alternative embodiments of the example operational flow 1000 of FIG. 10. FIG. 34 illustrates example embodiments where the first diverting operation 1010 may include at least one additional operation. Additional operations may include an operation 3402, and/or an operation 3404.

Operation 3402 illustrates, responsive to a shutdown event of at least one nuclear reactor system of a plurality of nuclear reactor systems, diverting a first selected portion of thermal energy from a portion of a first nuclear reactor system of a plurality of nuclear reactor systems to at least one auxiliary thermal reservoir. For example, as shown in FIGS. 1 through 9D, in response to a shutdown event of a nuclear reactor system 106 (e.g., first nuclear reactor system 106, second nuclear reactor system 106, or up to and including the Nth nuclear reactor system 106) of a plurality of nuclear reactor systems 102, an energy transfer system responsive to a shutdown event 834 may initiate transfer of energy from a portion of a first nuclear reactor system 106 of the plurality of nuclear reactor systems 102 to an auxiliary thermal reservoir 112.

Further, the operation 3404 illustrates, responsive to a scheduled shutdown event of at least one nuclear reactor system of a plurality of nuclear reactor systems, diverting a first selected portion of thermal energy from a portion of the first nuclear reactor system of the plurality of nuclear reactor systems to at least one auxiliary thermal reservoir. For example, as shown in FIGS. 1 through 9D, in response to a scheduled shutdown event (e.g., shutdown for routine maintenance) of a nuclear reactor system 106 of a plurality of nuclear reactor systems 102, an energy transfer system responsive to a scheduled shutdown event 836 may initiate transfer of energy from a portion of a first nuclear reactor system 106 of the plurality of nuclear reactor systems 102 to an auxiliary thermal reservoir 112.

Figure 35:
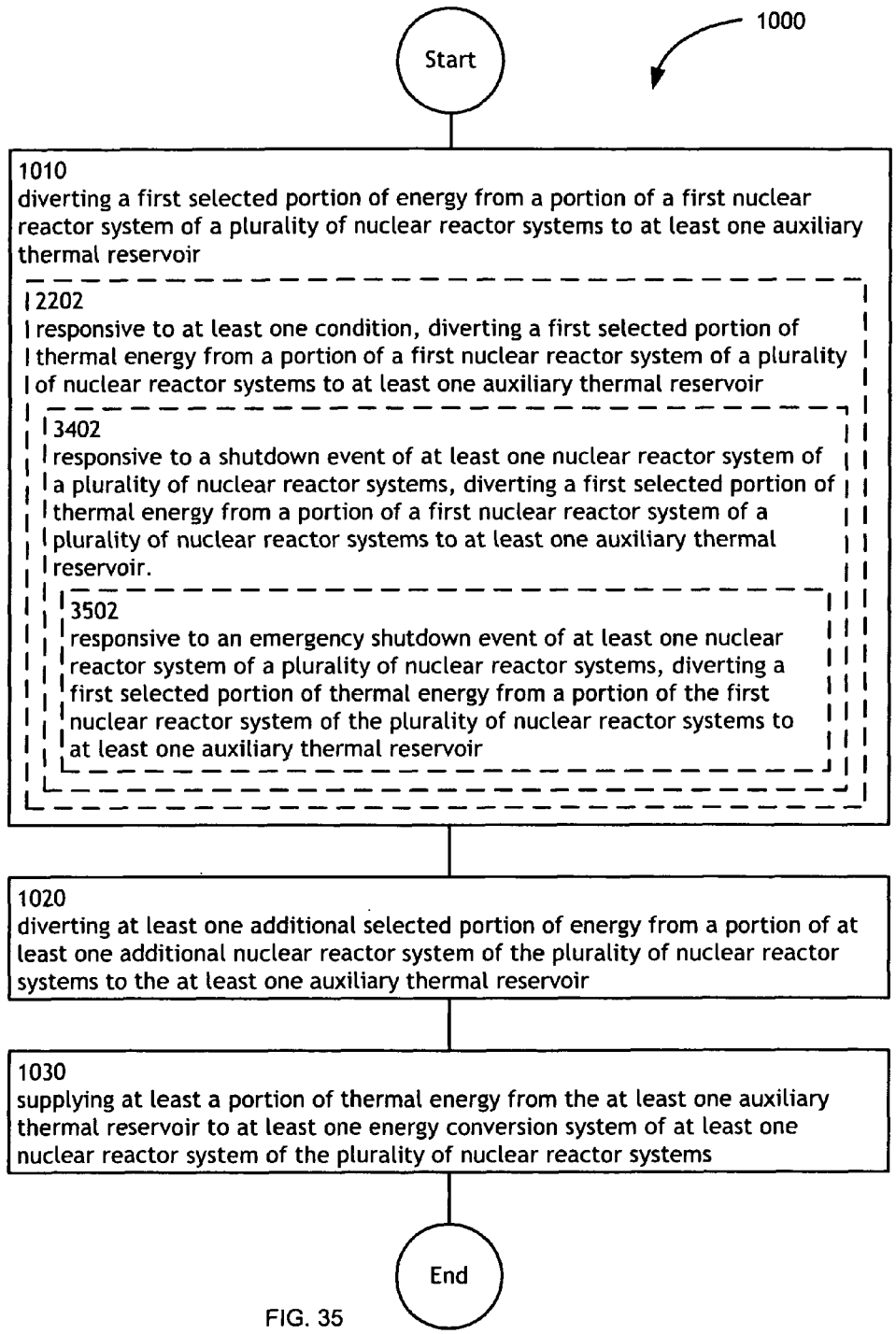
FIG. 35 is a high-level flowchart depicting an alternate implementation of FIG. 10.

FIG. 35 illustrates alternative embodiments of the example operational flow 1000 of FIG. 10. FIG. 35 illustrates example embodiments where the first diverting operation 1010 may include at least one additional operation. Additional operations may include an operation 3502.

Operation 3502 illustrates, responsive to an emergency shutdown event of at least one nuclear reactor system of a plurality of nuclear reactor systems, diverting a first selected portion of thermal energy from a portion of the first nuclear reactor system of the plurality of nuclear reactor systems to at least one auxiliary thermal reservoir. For example, as shown in FIGS. 1 through 9D, in response to an emergency shutdown event (e.g., SCRAM) of a nuclear reactor system 106 of a plurality of nuclear reactor systems 102, an energy transfer system responsive to an emergency shutdown event 838 may initiate transfer of energy from a portion of a first nuclear reactor system 106 of the plurality of nuclear reactor systems 102 to an auxiliary thermal reservoir 112.

Figure 36:
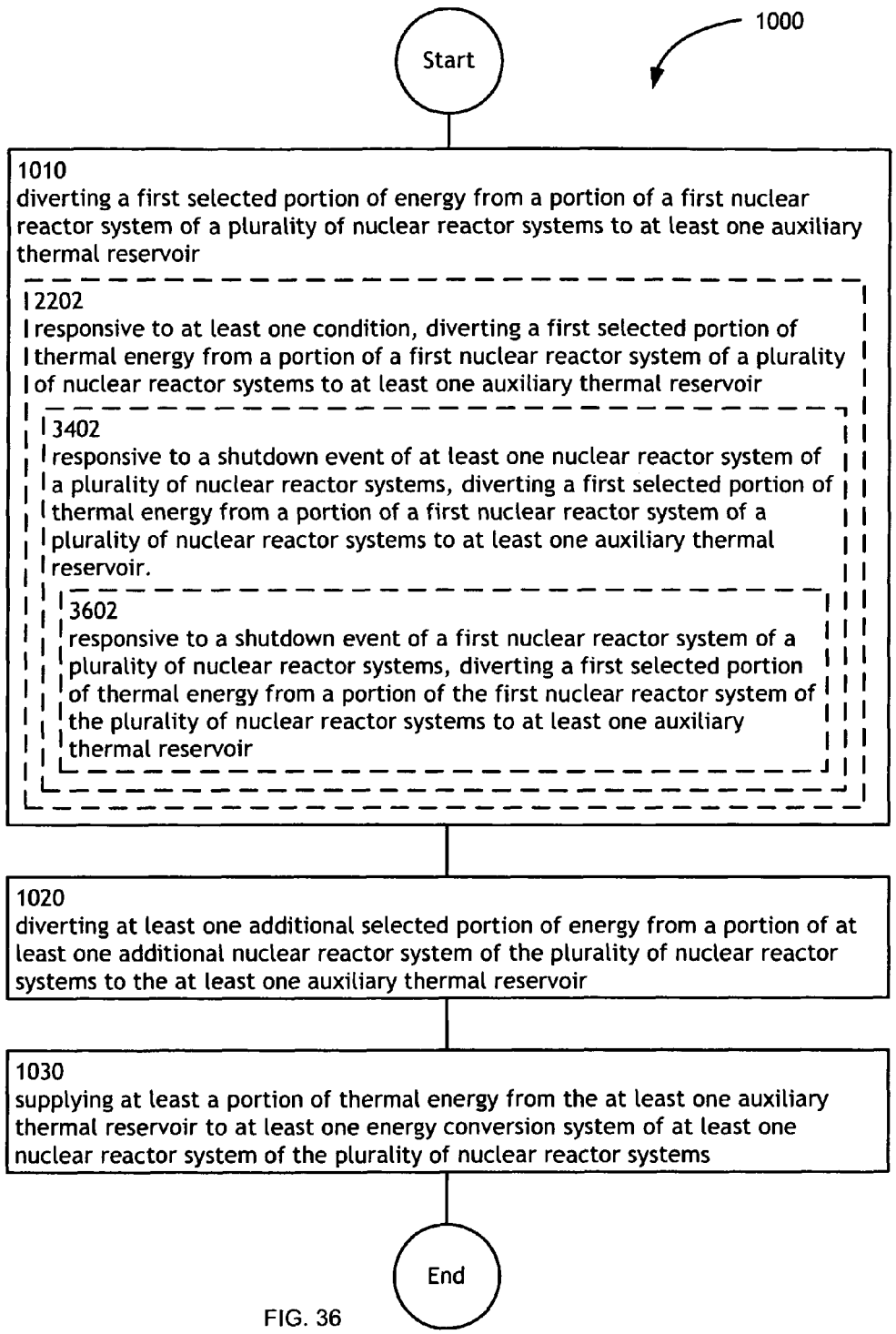
FIG. 36 is a high-level flowchart depicting an alternate implementation of FIG. 10.

FIG. 36 illustrates alternative embodiments of the example operational flow 1000 of FIG. 10. FIG. 36 illustrates example embodiments where the first diverting operation 1010 may include at least one additional operation. Additional operations may include an operation 3602.

Operation 3602 illustrates, responsive to a shutdown event of a first nuclear reactor system of a plurality of nuclear reactor systems, diverting a first selected portion of thermal energy from a portion of the first nuclear reactor system of the plurality of nuclear reactor systems to at least one auxiliary thermal reservoir. For example, as shown in FIGS. 1 through 9D, in response to a shutdown event of a first nuclear reactor system 106 of a plurality of nuclear reactor systems 102, an energy transfer system responsive to a shutdown event 834 of the first nuclear reactor system 106 may initiate transfer of energy from a portion of a first nuclear reactor system 106 of the plurality of nuclear reactor systems 102 to an auxiliary thermal reservoir 112.

Figure 37:
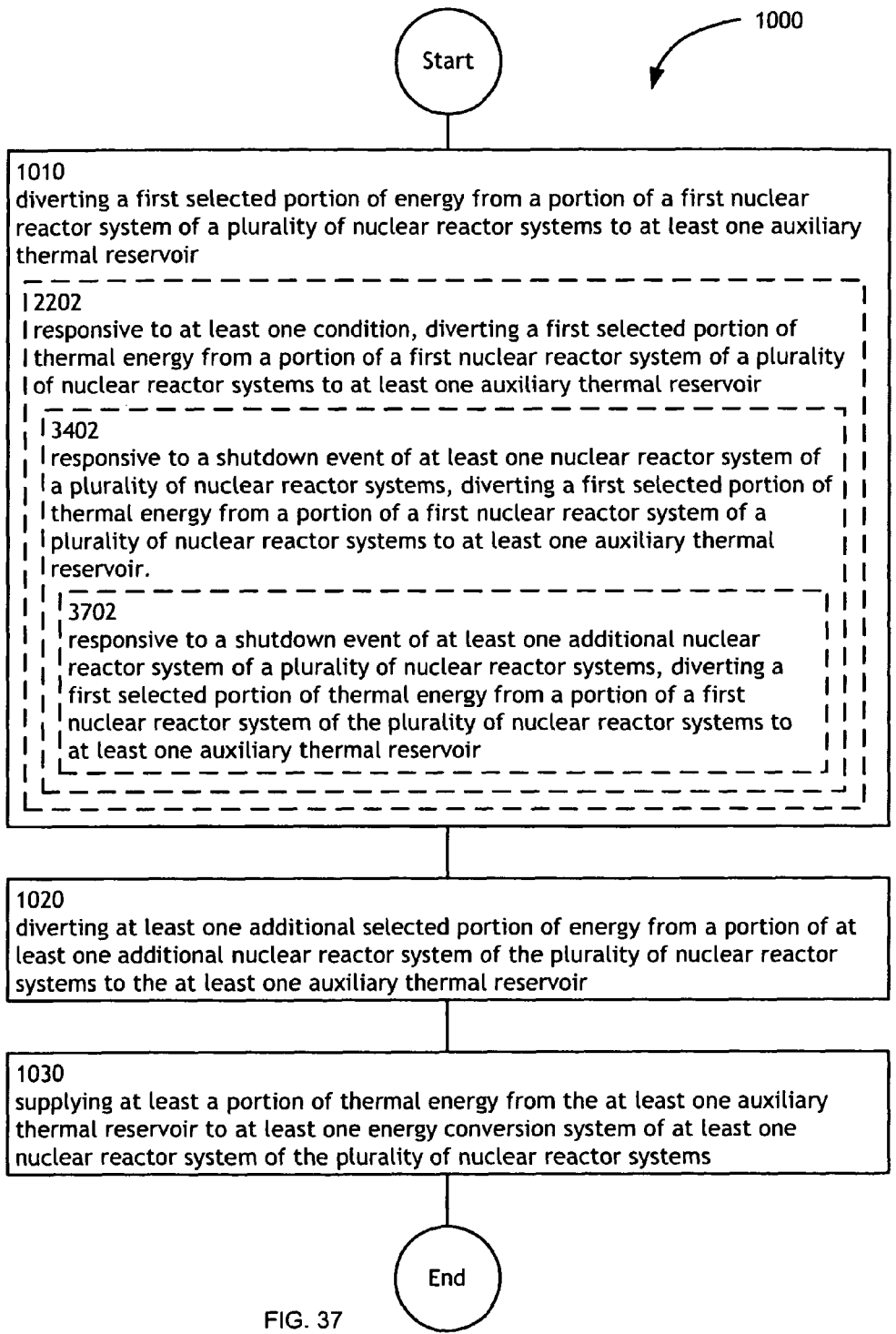
FIG. 37 is a high-level flowchart depicting an alternate implementation of FIG. 10.

FIG. 37 illustrates alternative embodiments of the example operational flow 1000 of FIG. 10. FIG. 37 illustrates example embodiments where the first diverting operation 1010 may include at least one additional operation. Additional operations may include an operation 3702.

Operation 3702 illustrates, responsive to a shutdown event of at least one additional nuclear reactor system of a plurality of nuclear reactor systems, diverting a first selected portion of thermal energy from a portion of a first nuclear reactor system of the plurality of nuclear reactor systems to at least one auxiliary thermal reservoir. For example, as shown in FIGS. 1 through 9D, in response to a shutdown event of an additional nuclear reactor system 106 (e.g., the second nuclear reactor system, the third nuclear reactor system 106, or up to an including the Nth nuclear reactor system 106) of a plurality of nuclear reactor systems 102, an energy transfer system responsive to a shutdown event 834 of the additional nuclear reactor system 106 may initiate transfer of energy from a portion of the first nuclear reactor system 106 of the plurality of nuclear reactor systems 102 to an auxiliary thermal reservoir 112.

Figure 38:
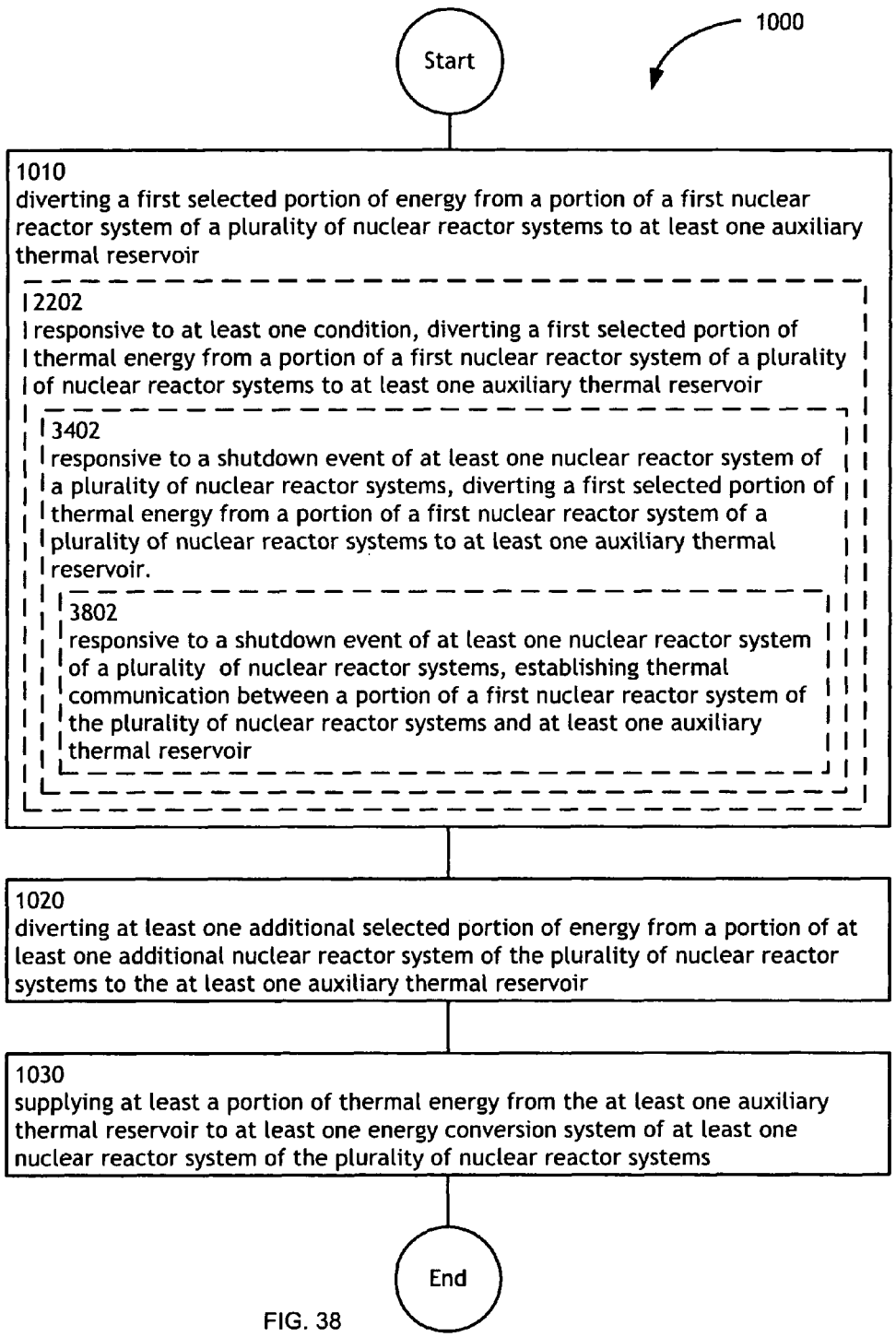
FIG. 38 is a high-level flowchart depicting an alternate implementation of FIG. 10.

FIG. 38 illustrates alternative embodiments of the example operational flow 1000 of FIG. 10. FIG. 38 illustrates example embodiments where the first diverting operation 1010 may include at least one additional operation. Additional operations may include an operation 3802.

Further, the operation 3802 illustrates, responsive to a shutdown event of at least one nuclear reactor system of a plurality of nuclear reactor systems, establishing thermal communication between a portion of a first nuclear reactor system of the plurality of nuclear reactor systems and at least one auxiliary thermal reservoir. For example, as shown in FIGS. 1 through 9D, in response to a shutdown event of a nuclear reactor system 106 of a plurality of nuclear reactor systems 102, an energy transfer system configured to establish thermal communication between a first nuclear reactor system and an auxiliary thermal reservoir 840 may establish thermal communication between a portion of the first nuclear reactor system (e.g., primary coolant system) of the plurality of nuclear reactor systems and the auxiliary thermal reservoir 112.

Figure 39:
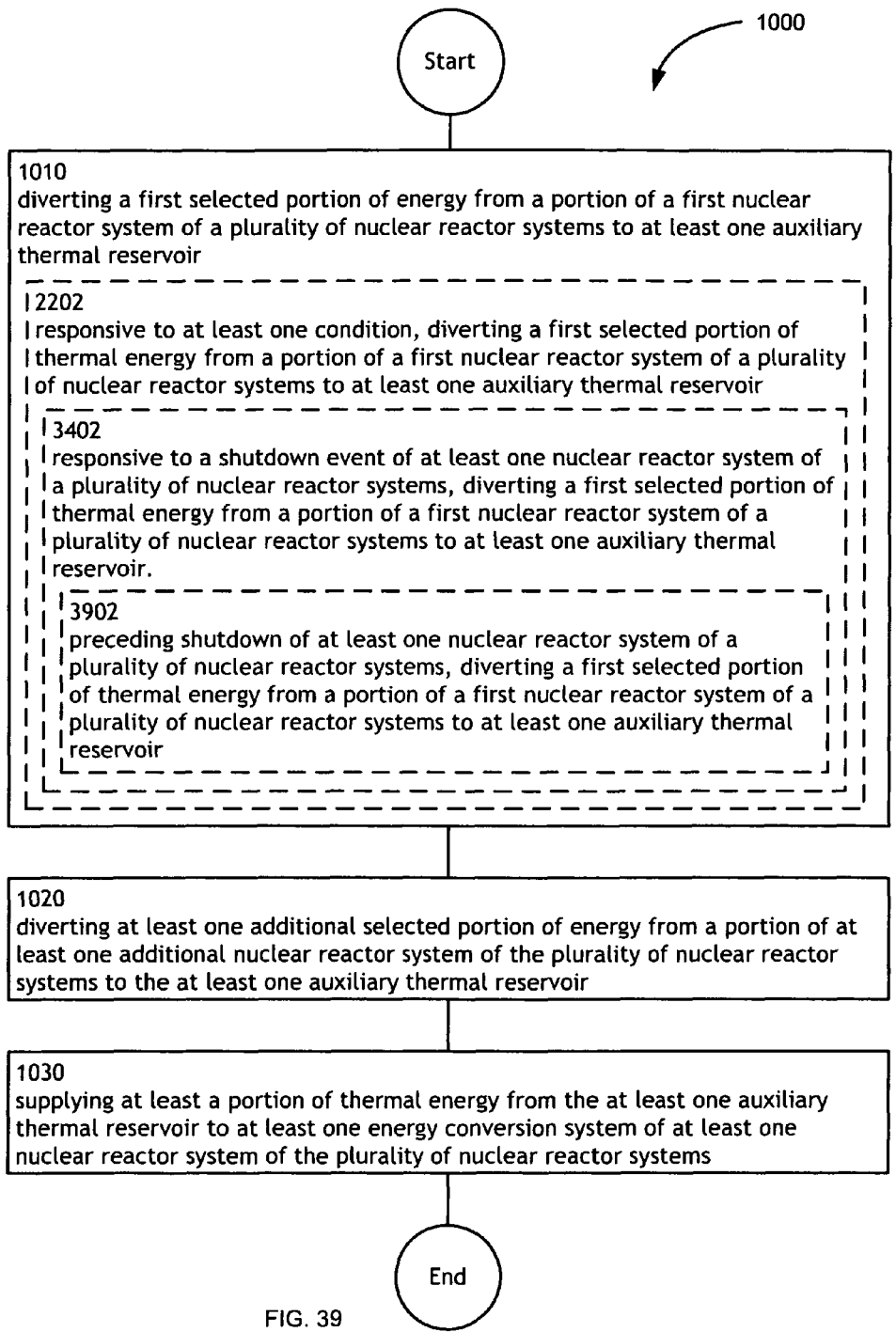
FIG. 39 is a high-level flowchart depicting an alternate implementation of FIG. 10.

FIG. 39 illustrates alternative embodiments of the example operational flow 1000 of FIG. 10. FIG. 39 illustrates example embodiments where the first diverting operation 1010 may include at least one additional operation. Additional operations may include an operation 3902.

Operation 3902 illustrates, preceding shutdown of at least one nuclear reactor system of a plurality of nuclear reactor systems, diverting a first selected portion of thermal energy from a portion of a first nuclear reactor system of a plurality of nuclear reactor systems to at least one auxiliary thermal reservoir. For example, as shown in FIGS. 1 through 9D, prior to shutdown of a nuclear reactor 108 of a nuclear reactor system 106, an energy transfer system responsive to a shutdown event 834 of the nuclear reactor system 106 may initiate the transfer of energy from a portion of a nuclear reactor system 106 of a plurality of nuclear reactor systems 102 to the auxiliary thermal reservoir 112.

Figure 40:
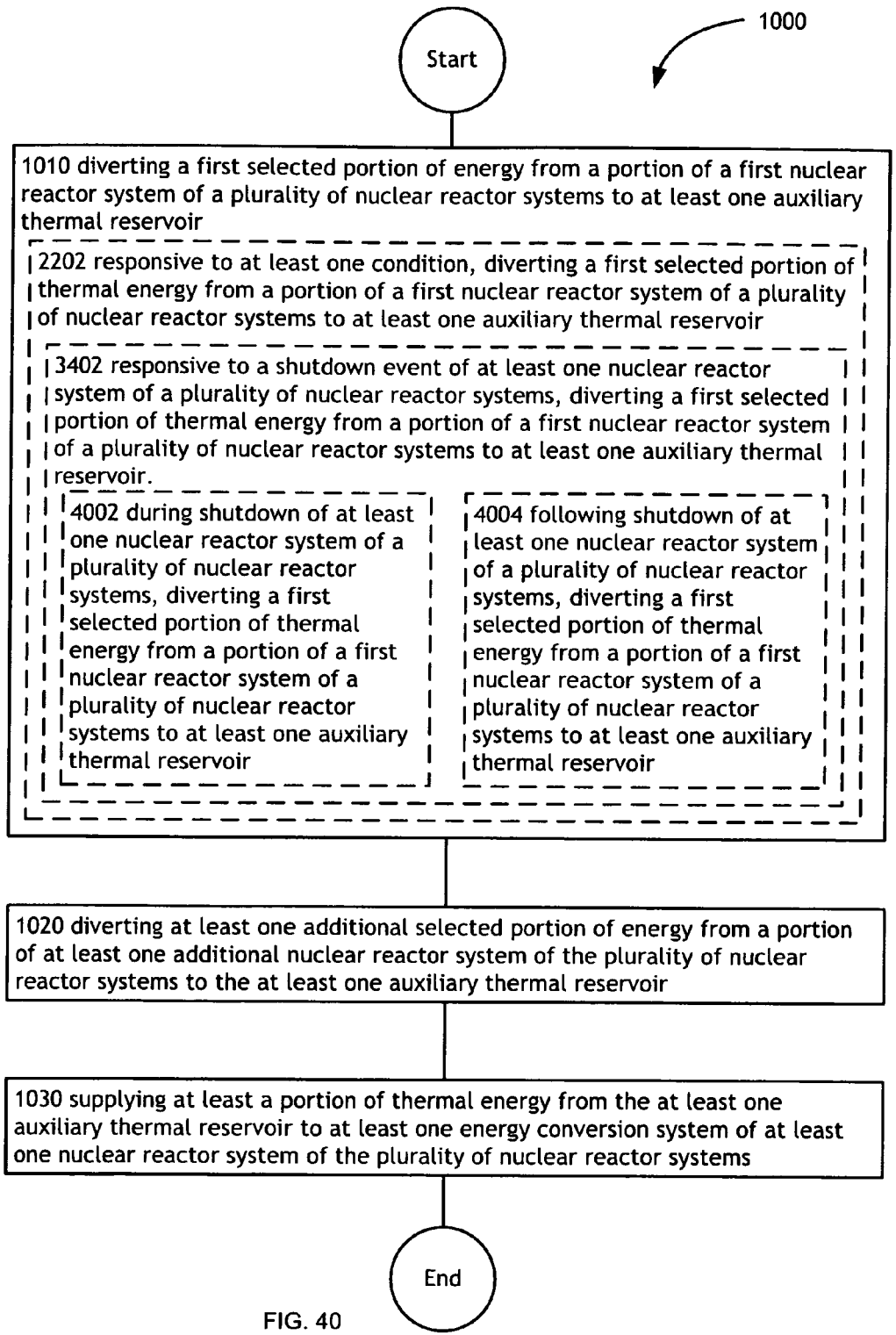
FIG. 40 is a high-level flowchart depicting an alternate implementation of FIG. 10.

FIG. 40 illustrates alternative embodiments of the example operational flow 1000 of FIG. 10. FIG. 40 illustrates example embodiments where the first diverting operation 1010 may include at least one additional operation. Additional operations may include an operation 4002, and/or an operation 4004.

Operation 4002 illustrates, during shutdown of at least one nuclear reactor system of a plurality of nuclear reactor systems, diverting a first selected portion of thermal energy from a portion of a first nuclear reactor system of a plurality of nuclear reactor systems to at least one auxiliary thermal reservoir. For example, as shown in FIGS. 1 through 9D, during shutdown of a nuclear reactor 108 of a nuclear reactor system 106, an energy transfer system responsive to a shutdown event 834 of the nuclear reactor system 106 may initiate the transfer of energy from a portion of a nuclear reactor system 106 of a plurality of nuclear reactor systems 102 to the auxiliary thermal reservoir 112.

Further, the operation 4004 illustrates, following shutdown of at least one nuclear reactor system of a plurality of nuclear reactor systems, diverting a first selected portion of thermal energy from a portion of a first nuclear reactor system of a plurality of nuclear reactor systems to at least one auxiliary thermal reservoir. For example, as shown in FIGS. 1 through 9D, following shutdown of a nuclear reactor 108 of a nuclear reactor system 106, an energy transfer system responsive to a shutdown event 834 of the nuclear reactor system 106 may initiate the transfer of energy from a portion of a nuclear reactor system 106 of a plurality of nuclear reactor systems 102 to the auxiliary thermal reservoir 112.

Figure 41:
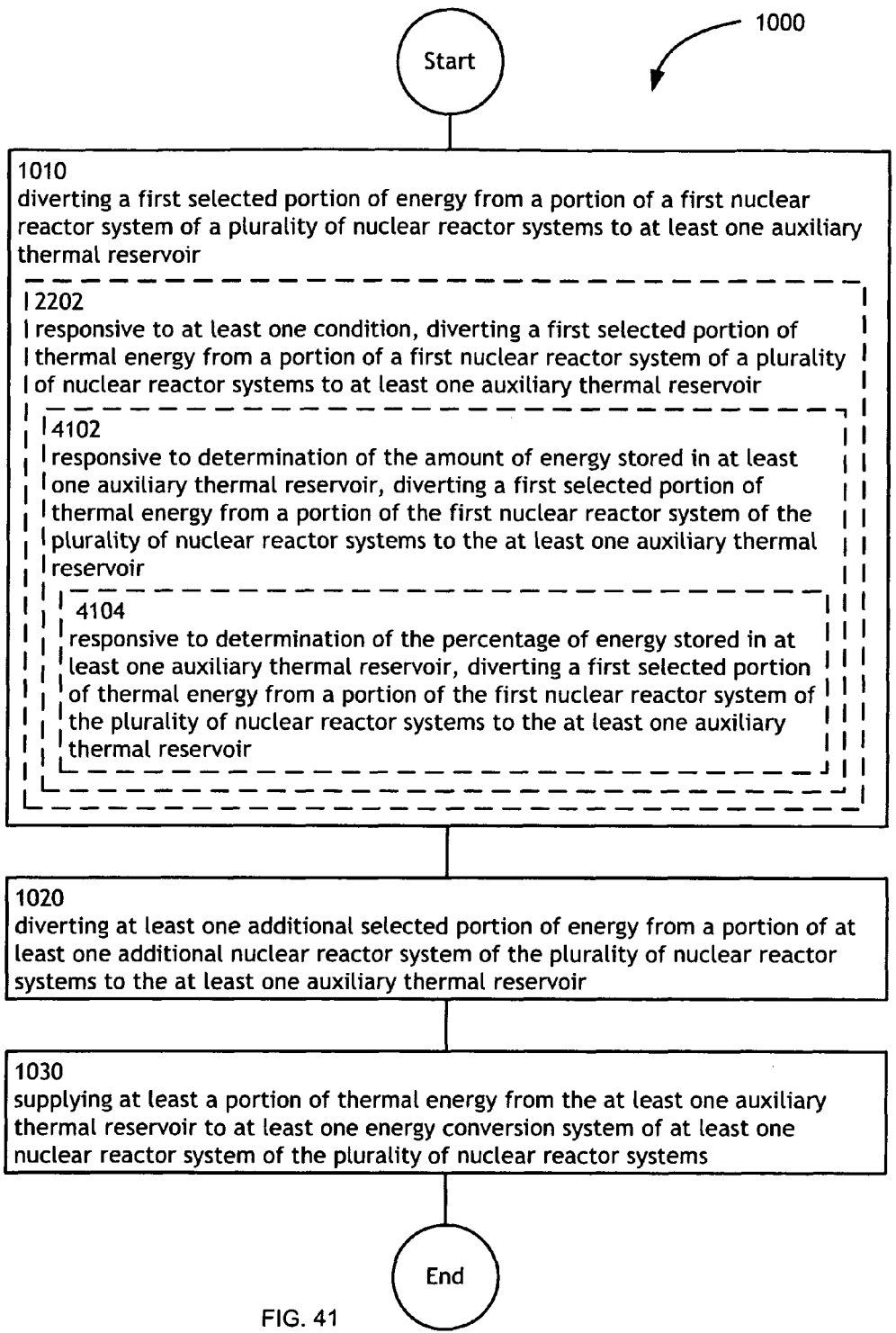
FIG. 41 is a high-level flowchart depicting an alternate implementation of FIG. 10.

FIG. 41 illustrates alternative embodiments of the example operational flow 1000 of FIG. 10. FIG. 41 illustrates example embodiments where the first diverting operation 1010 may include at least one additional operation. Additional operations may include an operation 4102, and/or an operation 4104.

Operation 4102 illustrates, responsive to determination of the amount of energy stored in at least one auxiliary thermal reservoir, diverting a first selected portion of thermal energy from a portion of the first nuclear reactor system of the plurality of nuclear reactor systems to the at least one auxiliary thermal reservoir. For example, as shown in FIGS. 1 through 9D, an energy transfer system responsive to determination of the amount of energy stored in an auxiliary thermal reservoir 842 may initiate the transfer of energy from a portion of a first nuclear reactor system 106 of a plurality of nuclear reactor systems 102 to an auxiliary thermal reservoir 112.

Further, the operation 4104 illustrates, responsive to determination of the percentage of energy stored in at least one auxiliary thermal reservoir, diverting a first selected portion of thermal energy from a portion of the first nuclear reactor system of the plurality of nuclear reactor systems to the at least one auxiliary thermal reservoir. For example, as shown in FIGS. 1 through 9D, an energy transfer system responsive to determination of the percentage of energy stored in an auxiliary thermal reservoir 844 may initiate the transfer of energy from a portion of a first nuclear reactor system 106 of a plurality of nuclear reactor systems 102 to an auxiliary thermal reservoir 112.

Figure 42:
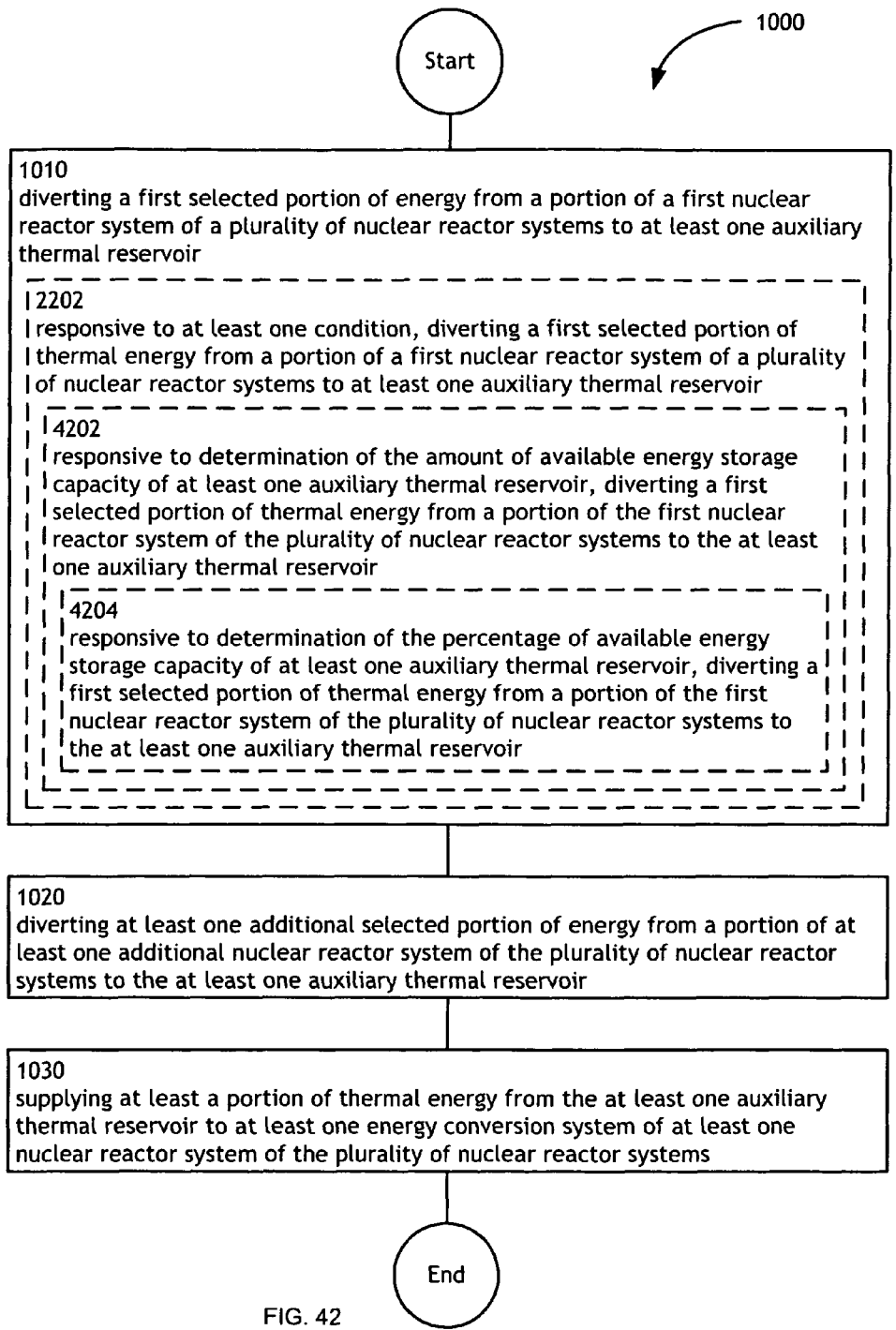
FIG. 42 is a high-level flowchart depicting an alternate implementation of FIG. 10.

FIG. 42 illustrates alternative embodiments of the example operational flow 1000 of FIG. 10. FIG. 42 illustrates example embodiments where the first diverting operation 1010 may include at least one additional operation. Additional operations may include an operation 4202, and/or an operation 4204.

Operation 4202 illustrates, responsive to determination of the amount of available energy storage capacity of at least one auxiliary thermal reservoir, diverting a first selected portion of thermal energy from a portion of the first nuclear reactor system of the plurality of nuclear reactor systems to the at least one auxiliary thermal reservoir. For example, as shown in FIGS. 1 through 9D, an energy transfer system responsive to determination of the amount of available energy storage capacity of at least one auxiliary thermal reservoir 846 may initiate the transfer of energy from a portion of a first nuclear reactor system 106 of a plurality of nuclear reactor systems 102 to an auxiliary thermal reservoir 112.

Further, the operation 4204 illustrates, responsive to determination of the percentage of available energy storage capacity of at least one auxiliary thermal reservoir, diverting a first selected portion of thermal energy from a portion of the first nuclear reactor system of the plurality of nuclear reactor systems to the at least one auxiliary thermal reservoir. For example, as shown in FIGS. 1 through 9D, an energy transfer system responsive to determination of the percentage of available energy storage capacity of at least one auxiliary thermal reservoir 848 may initiate the transfer of energy from a portion of a first nuclear reactor system 106 of a plurality of nuclear reactor systems 102 to an auxiliary thermal reservoir 112.

Figure 43:
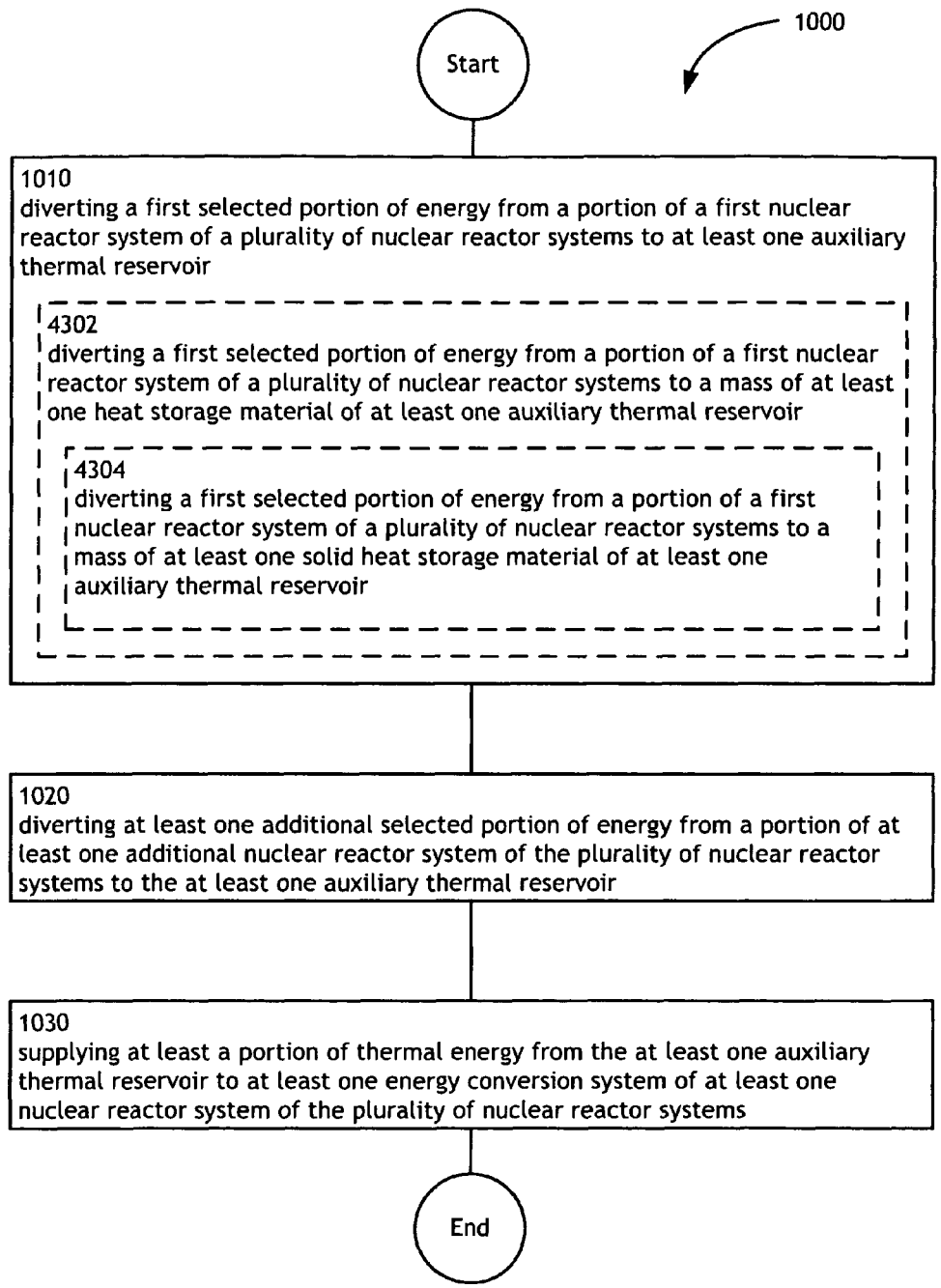
FIG. 43 is a high-level flowchart depicting an alternate implementation of FIG. 10.

FIG. 43 illustrates alternative embodiments of the example operational flow 1000 of FIG. 10. FIG. 43 illustrates example embodiments where the first diverting operation 1010 may include at least one additional operation. Additional operations may include an operation 4302, and/or an operation 4304.

The operation 4302 illustrates diverting a first selected portion of energy from a portion of a first nuclear reactor system of a plurality of nuclear reactor systems to a mass of at least one heat storage material of at least one auxiliary thermal reservoir. For example, as shown in FIGS. 1 through 9D, an energy transfer system 104 may transfer a selected portion of energy from a portion of a first nuclear reactor system 106 of a plurality of nuclear reactor systems 102 to a mass of heat storage material 111 of an auxiliary thermal reservoir 112.

Further, the operation 4304 illustrates diverting a first selected portion of energy from a portion of a first nuclear reactor system of a plurality of nuclear reactor systems to a mass of at least one solid heat storage material of at least one auxiliary thermal reservoir. For example, as shown in FIGS. 1 through 9D, an energy transfer system 104 may transfer a selected portion of energy from a portion of a first nuclear reactor system 106 of a plurality of nuclear reactor systems 102 to a mass of a solid heat storage material 414, such a solid object (e.g., solid ceramic object, solid metal object, or solid stone object) or a particulate solid (e.g., sand), of an auxiliary thermal reservoir 112.

Figure 44:
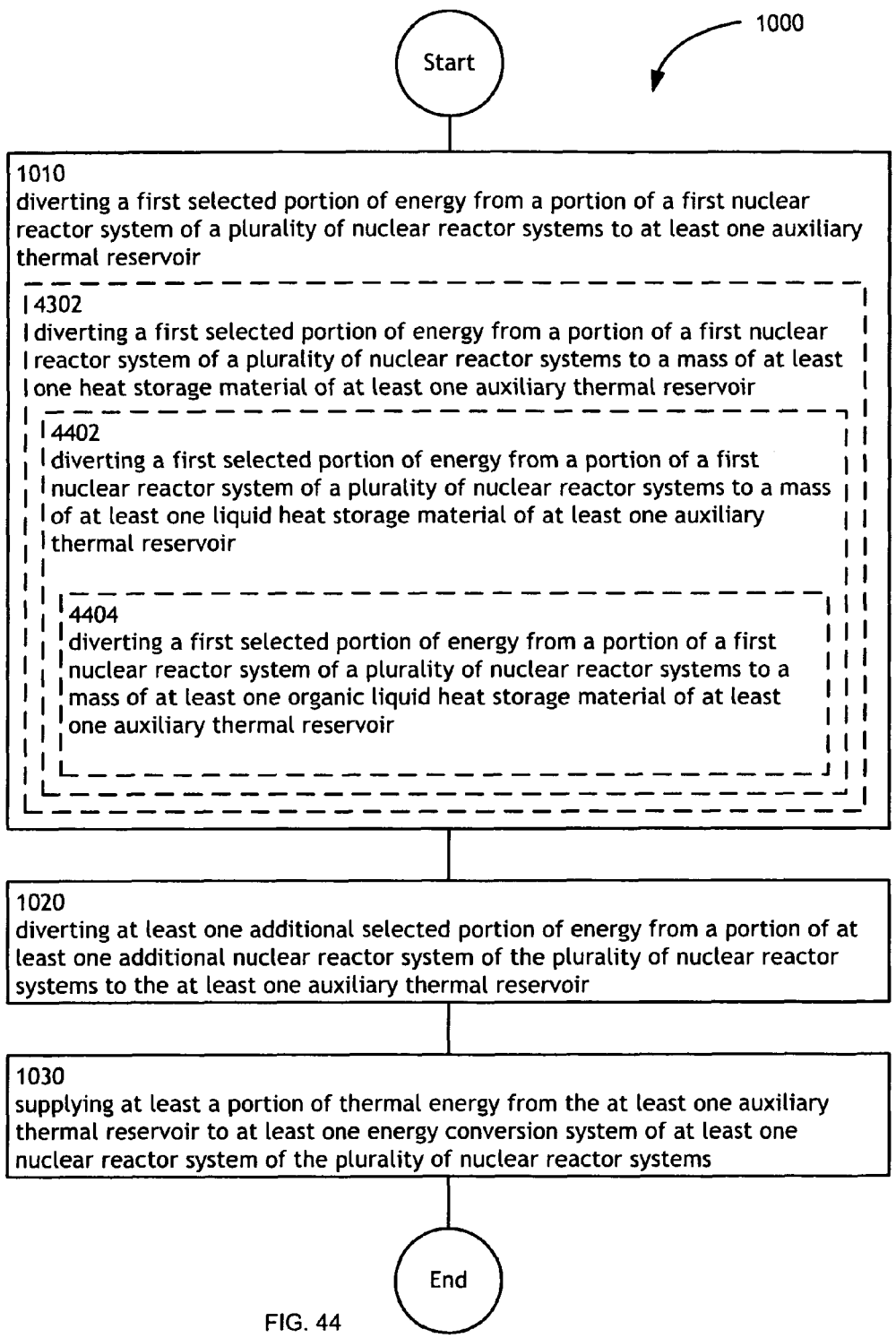
FIG. 44 is a high-level flowchart depicting an alternate implementation of FIG. 10.

FIG. 44 illustrates alternative embodiments of the example operational flow 1000 of FIG. 10. FIG. 44 illustrates example embodiments where the first diverting operation 1010 may include at least one additional operation. Additional operations may include an operation 4402, and/or an operation 4404.

Operation 4402 illustrates diverting a first selected portion of energy from a portion of a first nuclear reactor system of a plurality of nuclear reactor systems to a mass of at least one liquid heat storage material of at least one auxiliary thermal reservoir. For example, as shown in FIGS. 1 through 9D, an energy transfer system 104 may transfer a selected portion of energy from a portion of a first nuclear reactor system 106 of a plurality of nuclear reactor systems 102 to a mass of liquid material 402 (e.g., liquid metal, liquid metal salt, liquid organic, or liquid water) of an auxiliary thermal reservoir 112.

Further, the operation 4404 illustrates diverting a first selected portion of energy from a portion of a first nuclear reactor system of a plurality of nuclear reactor systems to a mass of at least one organic liquid heat storage material of at least one auxiliary thermal reservoir. For example, as shown in FIGS. 1 through 9D, an energy transfer system 104 may transfer a selected portion of energy from a portion of a first nuclear reactor system 106 of a plurality of nuclear reactor systems 102 to a mass of liquid organic material 404 (e.g., diphenyl with diphenyl oxide) of an auxiliary thermal reservoir 112.

Figure 45:
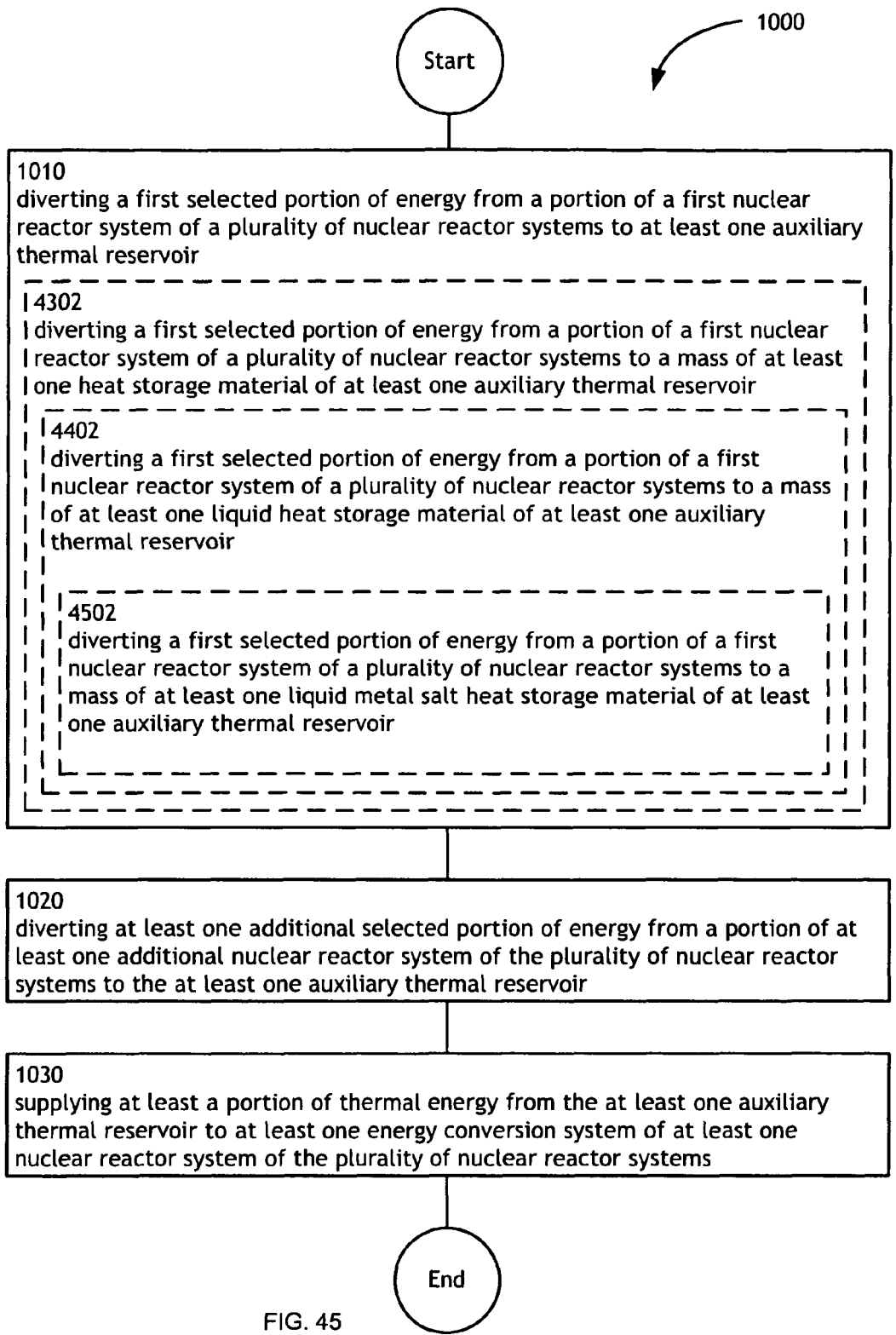
FIG. 45 is a high-level flowchart depicting an alternate implementation of FIG. 10.

FIG. 45 illustrates alternative embodiments of the example operational flow 1000 of FIG. 10. FIG. 45 illustrates example embodiments where the diverting operation 1010 may include at least one additional operation. Additional operations may include an operation 4502.

Further, the operation 4502 illustrates diverting a first selected portion of energy from a portion of a first nuclear reactor system of a plurality of nuclear reactor systems to a mass of at least one liquid metal salt heat storage material of at least one auxiliary thermal reservoir. For example, as shown in FIGS. 1 through 9D, an energy transfer system 104 may transfer a selected portion of energy from a portion of a first nuclear reactor system 106 of a plurality of nuclear reactor systems 102 to a mass of liquid metal salt 406 (e.g., lithium fluoride) of an auxiliary thermal reservoir 112.

Figure 46:
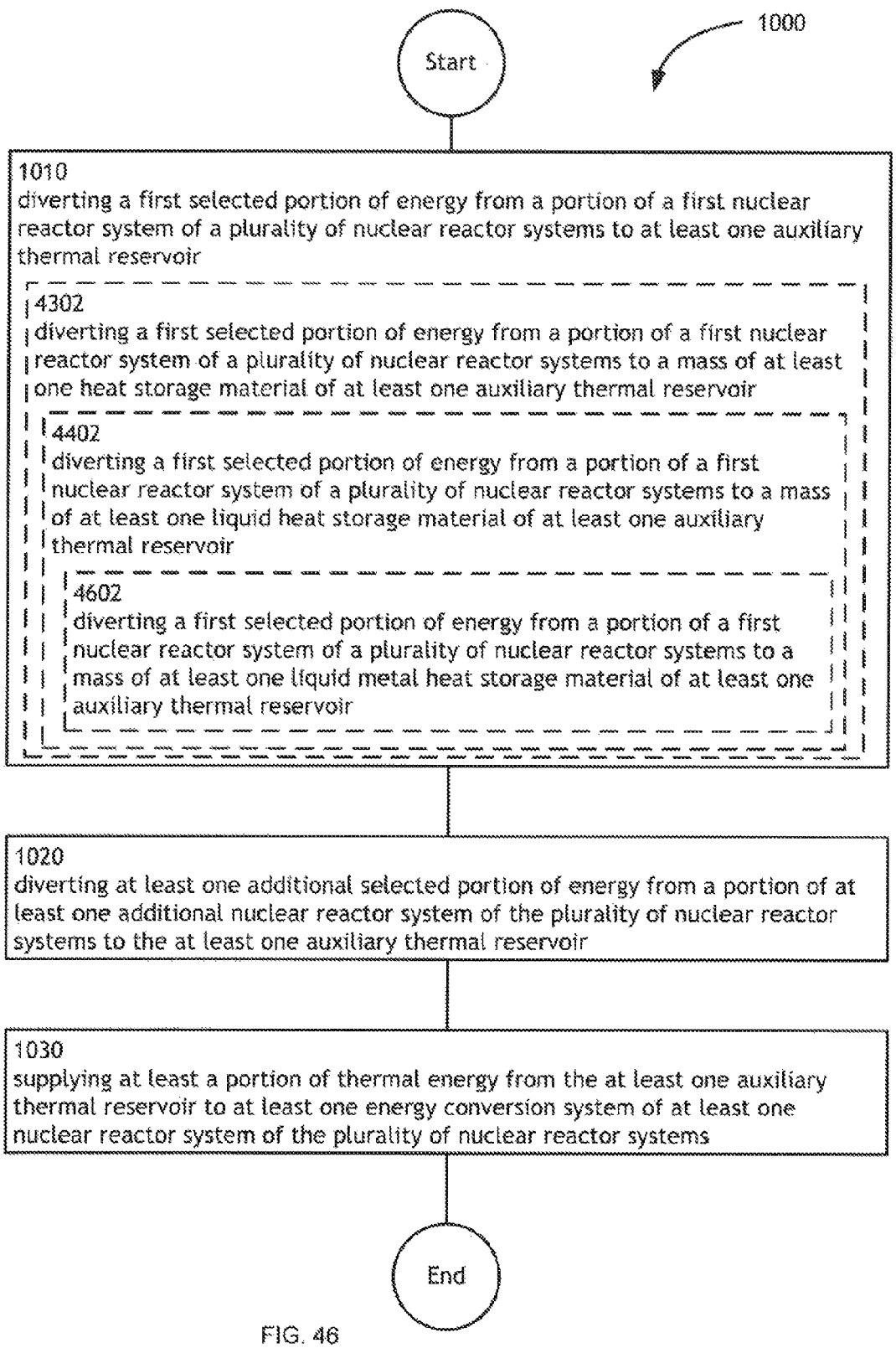
FIG. 46 is a high-level flowchart depicting an alternate implementation of FIG. 10.

FIG. 46 illustrates alternative embodiments of the example operational flow 1000 of FIG. 10. FIG. 46 illustrates example embodiments where the first diverting operation 1010 may include at least one additional operation. Additional operations may include an operation 4602.

Operation 4602 illustrates diverting a first selected portion of energy from a portion of a first nuclear reactor system of a plurality of nuclear reactor systems to a mass of at least one liquid metal heat storage material of at least one auxiliary thermal reservoir.]. For example, as shown in FIGS. 1 through 9D, an energy transfer system 104 may transfer a selected portion of energy from a portion of a first nuclear reactor system 106 of a plurality of nuclear reactor systems 102 to a mass of liquid metal 408 (e.g., sodium) of the auxiliary thermal reservoir 112.

Figure 47:
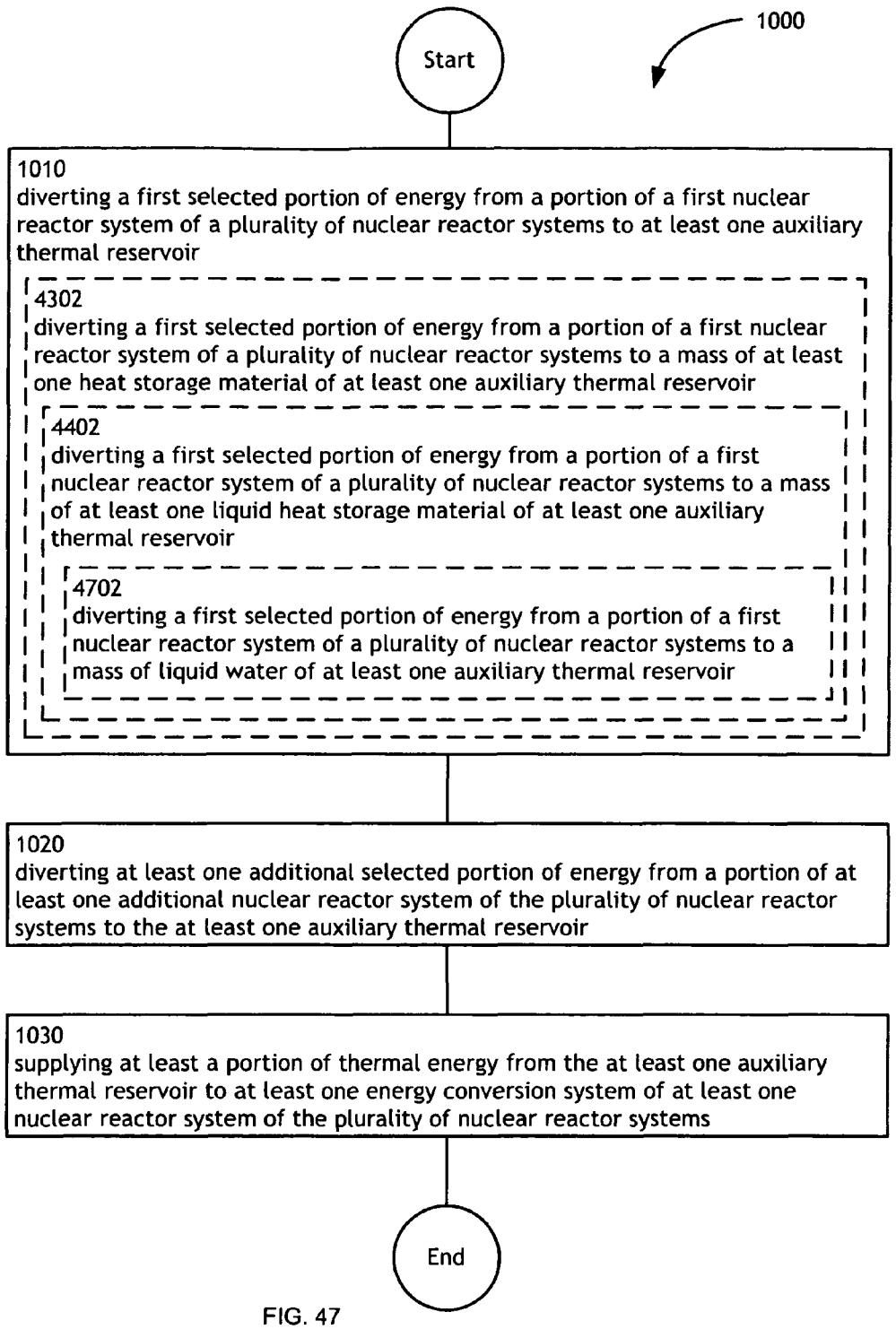
FIG. 47 is a high-level flowchart depicting an alternate implementation of FIG. 10.

FIG. 47 illustrates alternative embodiments of the example operational flow 1000 of FIG. 10. FIG. 47 illustrates example embodiments where the first diverting operation 1010 may include at least one additional operation. Additional operations may include an operation 4702.

Operation 4702 illustrates diverting a first selected portion of energy from a portion of a first nuclear reactor system of a plurality of nuclear reactor systems to a mass of liquid water of at least one auxiliary thermal reservoir. For example, as shown in FIGS. 1 through 9D, an energy transfer system 104 may transfer a selected portion of energy from a portion of a first nuclear reactor system 106 of a plurality of nuclear reactor systems 102 to a mass of liquid water 410 of an auxiliary thermal reservoir 112.

Figure 48:
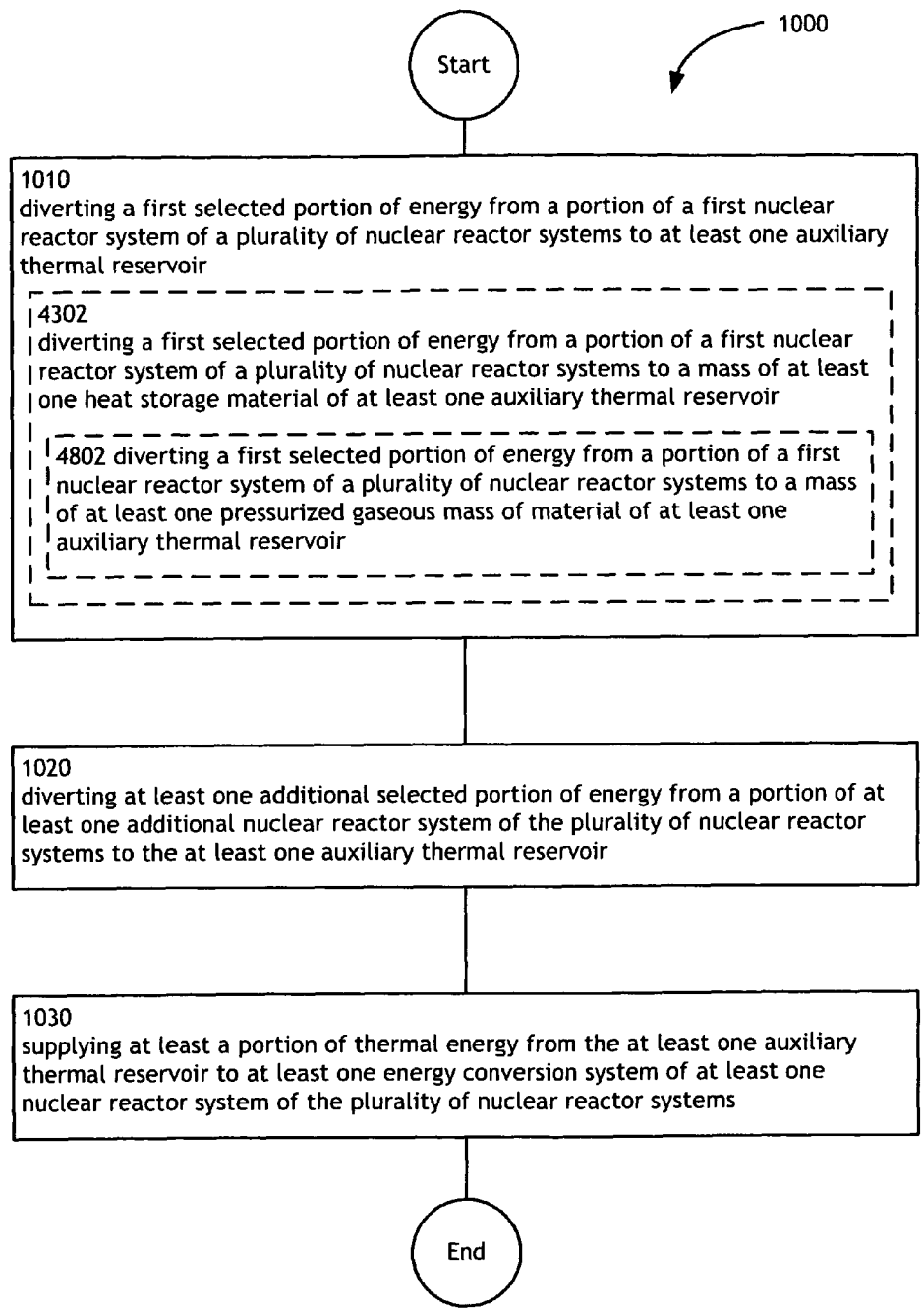
FIG. 48 is a high-level flowchart depicting an alternate implementation of FIG. 10.

FIG. 48 illustrates alternative embodiments of the example operational flow 1000 of FIG. 10. FIG. 48 illustrates example embodiments where the first diverting operation 1010 may include at least one additional operation. Additional operations may include an operation 4802.

Further, the operation 4802 illustrates diverting a first selected portion of energy from a portion of a first nuclear reactor system of a plurality of nuclear reactor systems to a mass of at least one pressurized gaseous mass of material of at least one auxiliary thermal reservoir. For example, as shown in FIGS. 1 through 9D, an energy transfer system 104 may transfer a selected portion of energy from a portion of a first nuclear reactor system 106 of a plurality of nuclear reactor systems 102 to a mass of pressurized gaseous material 412 (e.g., pressurized helium or pressurized carbon dioxide) of the auxiliary thermal reservoir 112.

Figure 49:
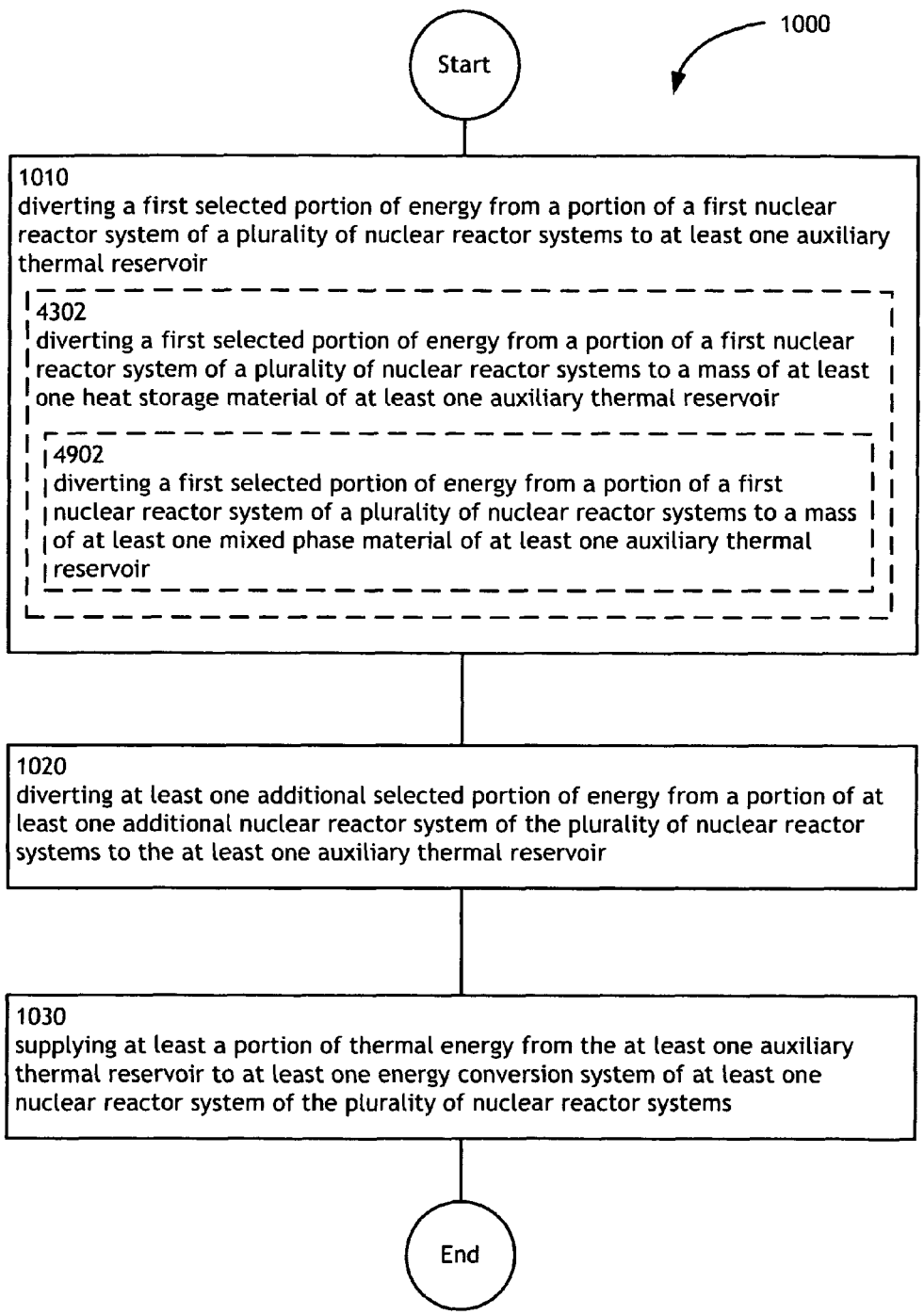
FIG. 49 is a high-level flowchart depicting an alternate implementation of FIG. 10.

FIG. 49 illustrates alternative embodiments of the example operational flow 1000 of FIG. 10. FIG. 49 illustrates example embodiments where the first diverting operation 1010 may include at least one additional operation. Additional operations may include an operation 4902.

Operation 4902 illustrates diverting a first selected portion of energy from a portion of a first nuclear reactor system of a plurality of nuclear reactor systems to a mass of at least one mixed phase material of at least one auxiliary thermal reservoir. For example, as shown in FIGS. 1 through 9D, an energy transfer system 104 may transfer a selected portion of energy from a portion of a first nuclear reactor system 106 of a plurality of nuclear reactor systems 102 to a mass of a mixed phase material 420 (e.g., steam water-liquid water) of the auxiliary thermal reservoir 112.

Figure 50:
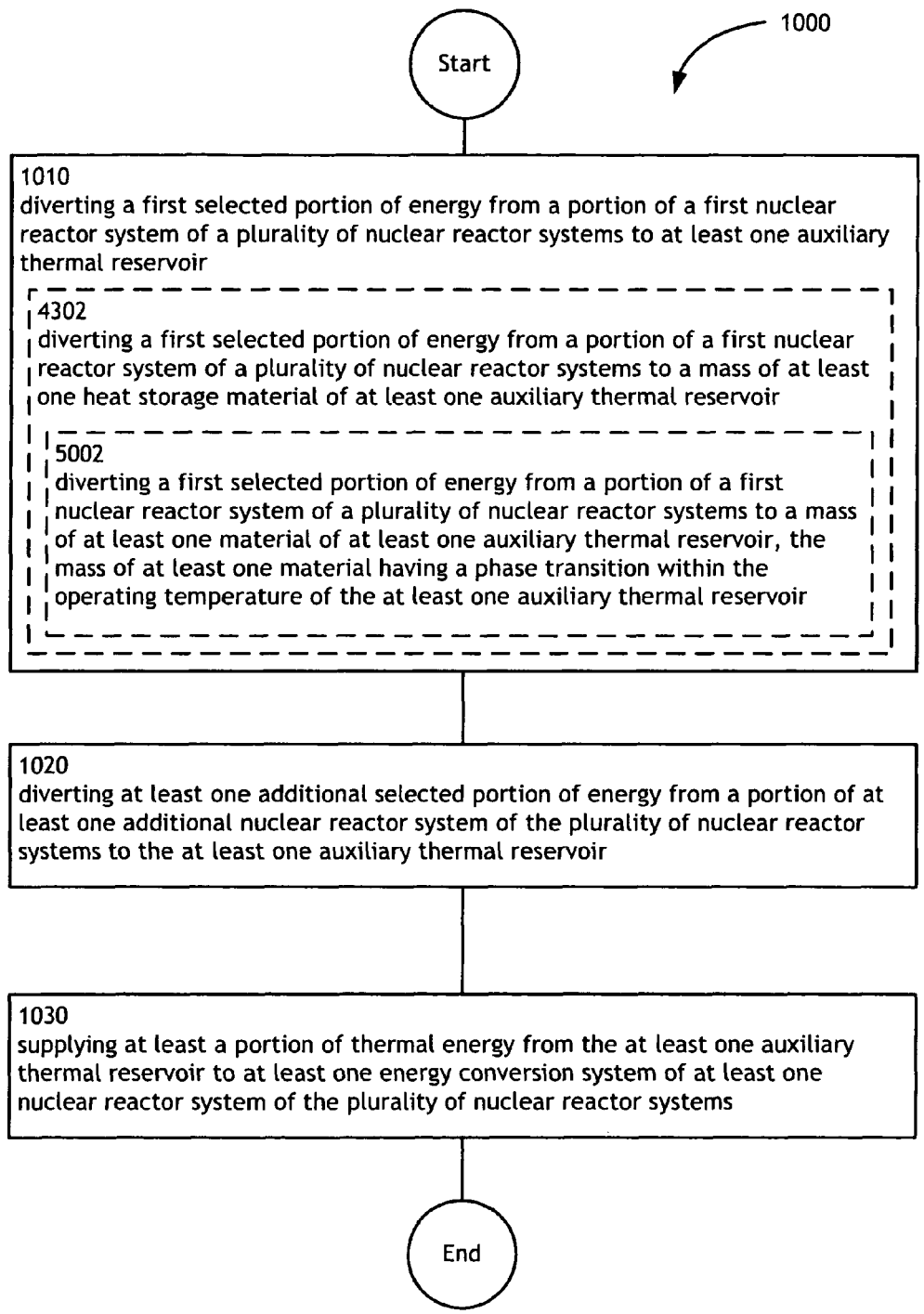
FIG. 50 is a high-level flowchart depicting an alternate implementation of FIG. 10.

FIG. 50 illustrates alternative embodiments of the example operational flow 1000 of FIG. 10. FIG. 50 illustrates example embodiments where the first diverting operation 1010 may include at least one additional operation. Additional operations may include an operation 5002.

Further, the operation 5002 illustrates diverting a first selected portion of energy from a portion of a first nuclear reactor system of a plurality of nuclear reactor systems to a mass of at least one material of at least one auxiliary thermal reservoir, the mass of at least one material having a phase transition within the operating temperature of the at least one auxiliary thermal reservoir. For example, as shown in FIGS. 1 through 9D, an energy transfer system 104 may transfer a selected portion of energy from a portion of a first nuclear reactor system 106 of a plurality of nuclear reactor systems 102 to a mass of a material having a phase transition within the operating temperature 422 of the auxiliary thermal reservoir 112.

Figure 51:
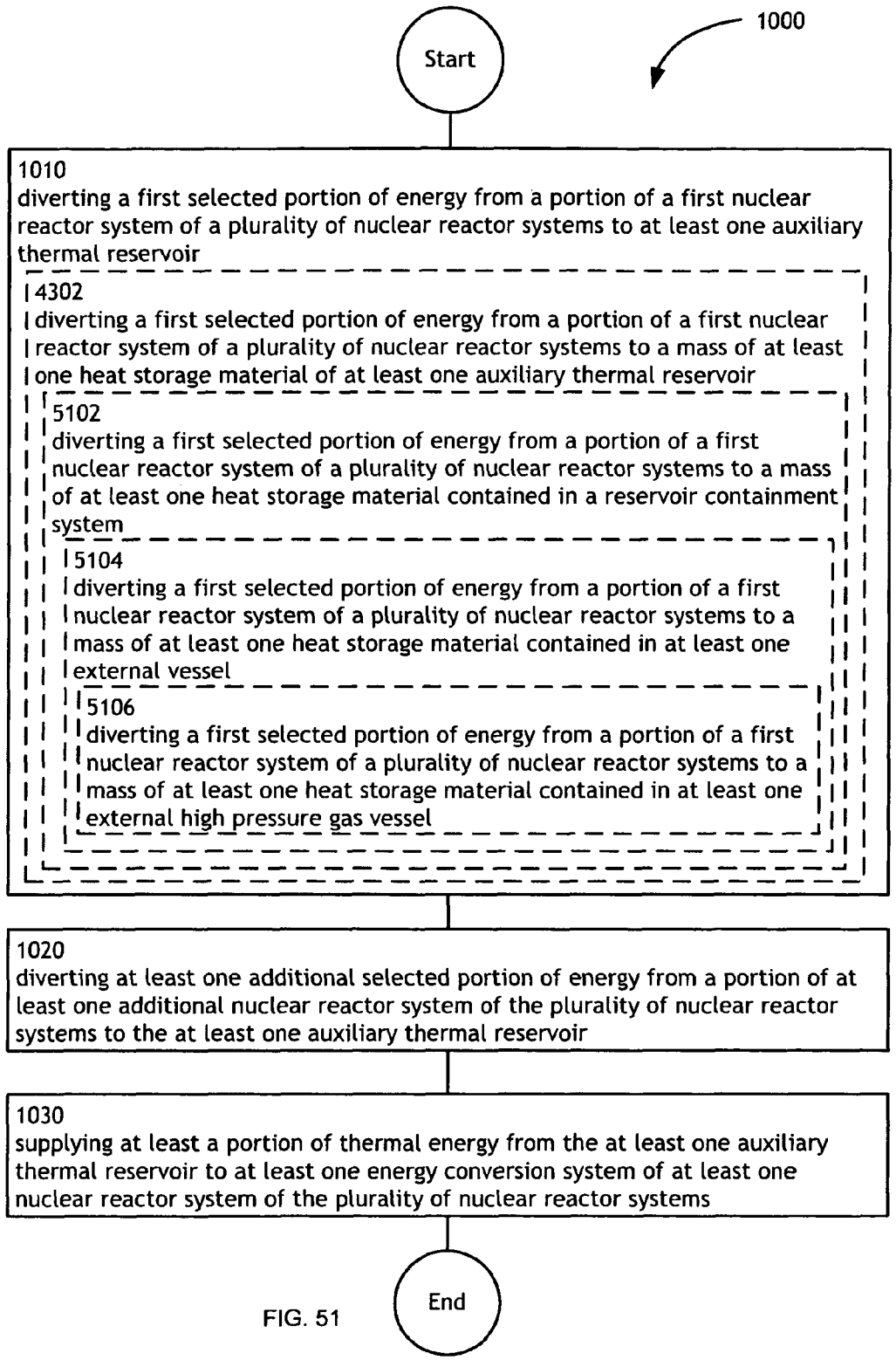
FIG. 51 is a high-level flowchart depicting an alternate implementation of FIG. 10.

FIG. 51 illustrates alternative embodiments of the example operational flow 1000 of FIG. 10. FIG. 51 illustrates example embodiments where the first diverting operation 1010 may include at least one additional operation. Additional operations may include an operation 5102, an operation 5104, and/or an operation 5106.

Operation 5102 illustrates diverting a first selected portion of energy from a portion of a first nuclear reactor system of a plurality of nuclear reactor systems to a mass of at least one heat storage material contained in a reservoir containment system. For example, as shown in FIGS. 1 through 9D, an energy transfer system 104 may transfer a selected portion of energy from a portion of a first nuclear reactor system 106 of a plurality of nuclear reactor systems 102 to a mass of heat storage material 111 of an auxiliary thermal reservoir 112 contained in a reservoir containment system 424 (e.g., vessel).

Further, the operation 5104 illustrates diverting a first selected portion of energy from a portion of a first nuclear reactor system of a plurality of nuclear reactor systems to a mass of at least one heat storage material contained in at least one external vessel. For example, as shown in FIGS. 1 through 9D, an energy transfer system 104 may transfer a selected portion of energy from a portion of a first nuclear reactor system 106 of a plurality of nuclear reactor systems 102 to a mass of heat storage material 111 of an auxiliary thermal reservoir 112 contained in an external vessel 426.

Further, the operation 5106 illustrates diverting a first selected portion of energy from a portion of a first nuclear reactor system of a plurality of nuclear reactor systems to a mass of at least one heat storage material contained in at least one external high pressure gas vessel. For example, as shown in FIGS. 1 through 9D, an energy transfer system 104 may transfer a selected portion of energy from a portion of a first nuclear reactor system 106 of a plurality of nuclear reactor systems 102 to a mass of heat storage material 111 of an auxiliary thermal reservoir 112 contained in a high pressure gas vessel 430. For instance, the energy transfer system 104 may transfer a selected portion of energy from a portion a first nuclear reactor system 106 of a plurality of nuclear reactor systems 102 to a mass of high pressurized gaseous helium contained in an external high pressure helium vessel.

Figure 52:
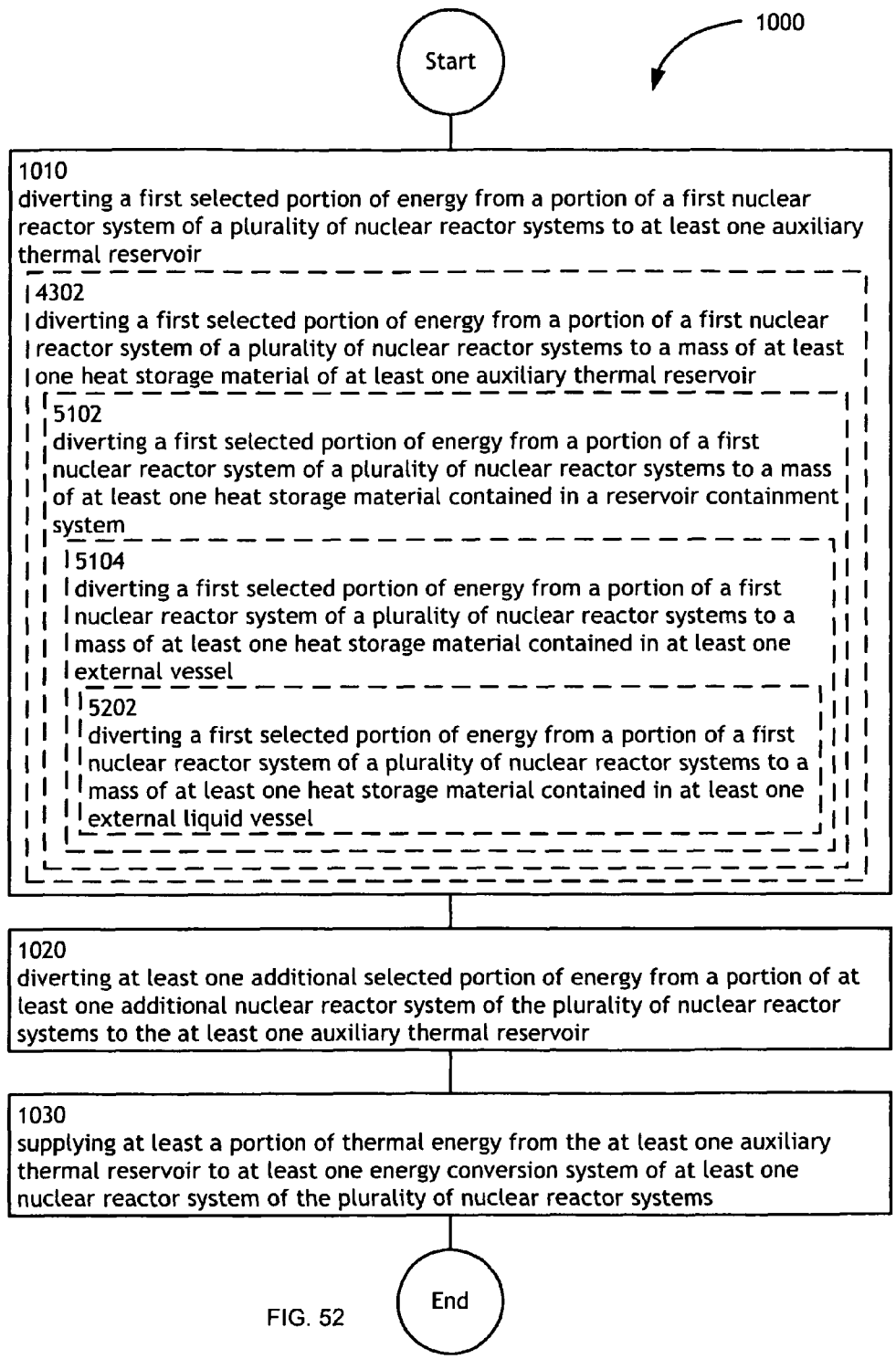
FIG. 52 is a high-level flowchart depicting an alternate implementation of FIG. 10.

FIG. 52 illustrates alternative embodiments of the example operational flow 1000 of FIG. 10. FIG. 52 illustrates example embodiments where the first diverting operation 1010 may include at least one additional operation. Additional operations may include an operation 5202.

Operation 5202 illustrates diverting a first selected portion of energy from a portion of a first nuclear reactor system of a plurality of nuclear reactor systems to a mass of at least one heat storage material contained in at least one external liquid vessel. For example, as shown in FIGS. 1 through 9D, an energy transfer system 104 may transfer a selected portion of energy from a portion of a first nuclear reactor system 106 of a plurality of nuclear reactor systems 102 to a mass of heat storage material 111 of the auxiliary thermal reservoir 112 contained in an external liquid vessel 428. For instance, the energy transfer system 104 may transfer a selected portion of energy from a portion of a first nuclear reactor system 106 of a plurality of nuclear reactor systems 102 to a mass of liquid water contained in an external water vessel.

Figure 53:
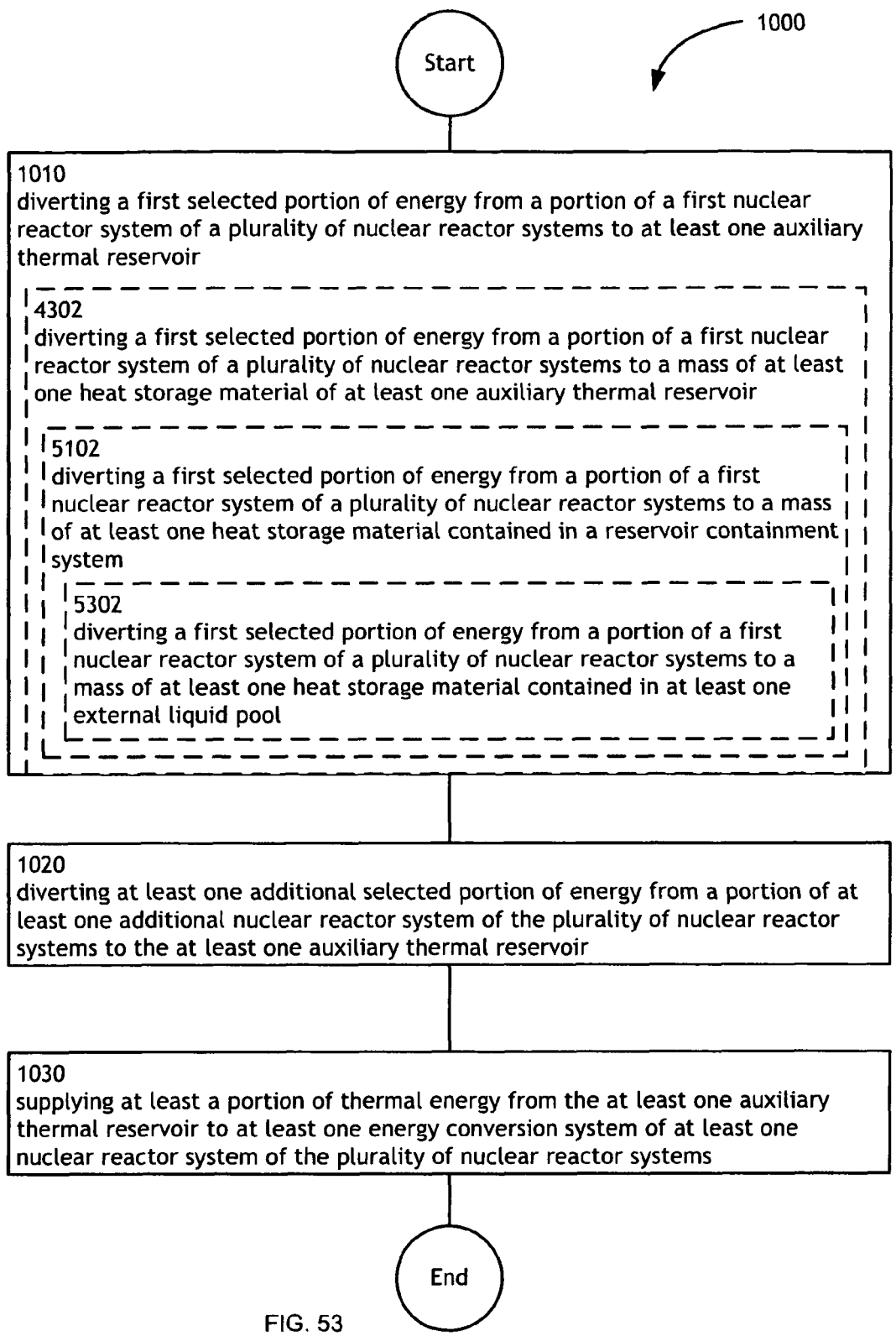
FIG. 53 is a high-level flowchart depicting an alternate implementation of FIG. 10.

FIG. 53 illustrates alternative embodiments of the example operational flow 1000 of FIG. 10. FIG. 53 illustrates example embodiments where the first diverting operation 1010 may include at least one additional operation. Additional operations may include an operation 5302.

Further, the operation 5302 illustrates diverting a first selected portion of energy from a portion of a first nuclear reactor system of a plurality of nuclear reactor systems to a mass of at least one heat storage material contained in at least one external liquid pool. For example, as shown in FIGS. 1 through 9D, the energy transfer system 104 may transfer a selected portion of energy from a portion of a first nuclear reactor system 106 of a plurality of nuclear reactor systems 102 to a mass of liquid heat storage material 402 of the auxiliary thermal reservoir 112 contained in an external liquid pool 434. For instance, the energy transfer system 104 may transfer a selected portion of energy from a portion of a first nuclear reactor system 106 of a plurality of nuclear reactor systems 102 to a mass of liquid sodium contained in an external liquid sodium pool.

Figure 54:
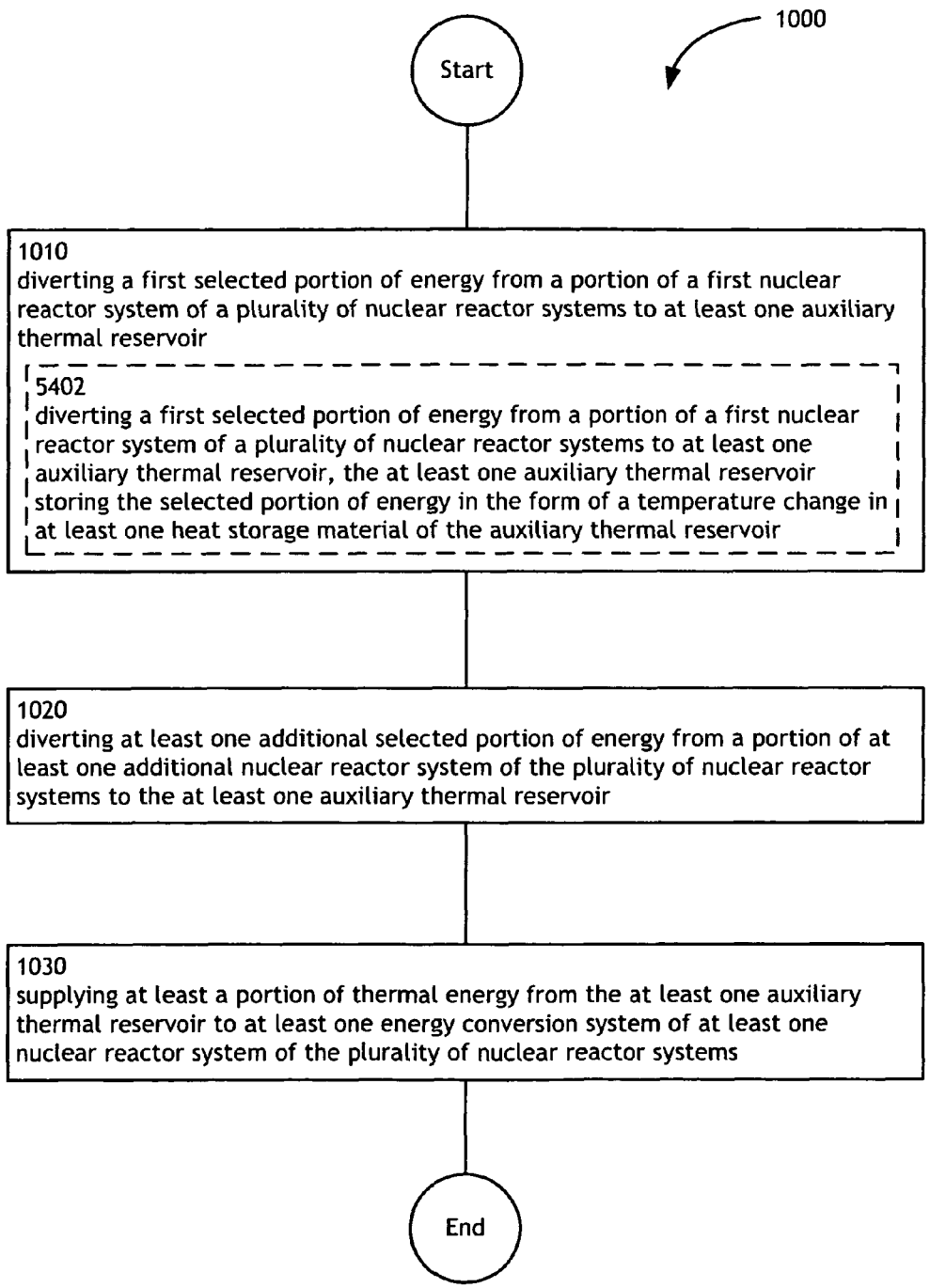
FIG. 54 is a high-level flowchart depicting an alternate implementation of FIG. 10.

FIG. 54 illustrates alternative embodiments of the example operational flow 1000 of FIG. 10. FIG. 54 illustrates example embodiments where the first diverting operation 1010 may include at least one additional operation. Additional operations may include an operation 5402.

Operation 5402 illustrates diverting a first selected portion of energy from a portion of a first nuclear reactor system of a plurality of nuclear reactor systems to at least one auxiliary thermal reservoir, the at least one auxiliary thermal reservoir storing the selected portion of energy in the form of a temperature change in at least one heat storage material of the auxiliary thermal reservoir. For example, as shown in FIGS. 1 through 9D, an energy transfer system 104 may transfer a selected portion of energy from a portion of a first nuclear reactor system 106 of a plurality of nuclear reactor systems 102 to an auxiliary thermal reservoir 112, where the auxiliary thermal reservoir stores the energy in the form of an increase in temperature of the heat storage material 436. For instance, the energy transferred to the auxiliary thermal reservoir 112 may cause a liquid heat storage material 402 to increase in temperature from 100° C. to 200° C.

Figure 55:
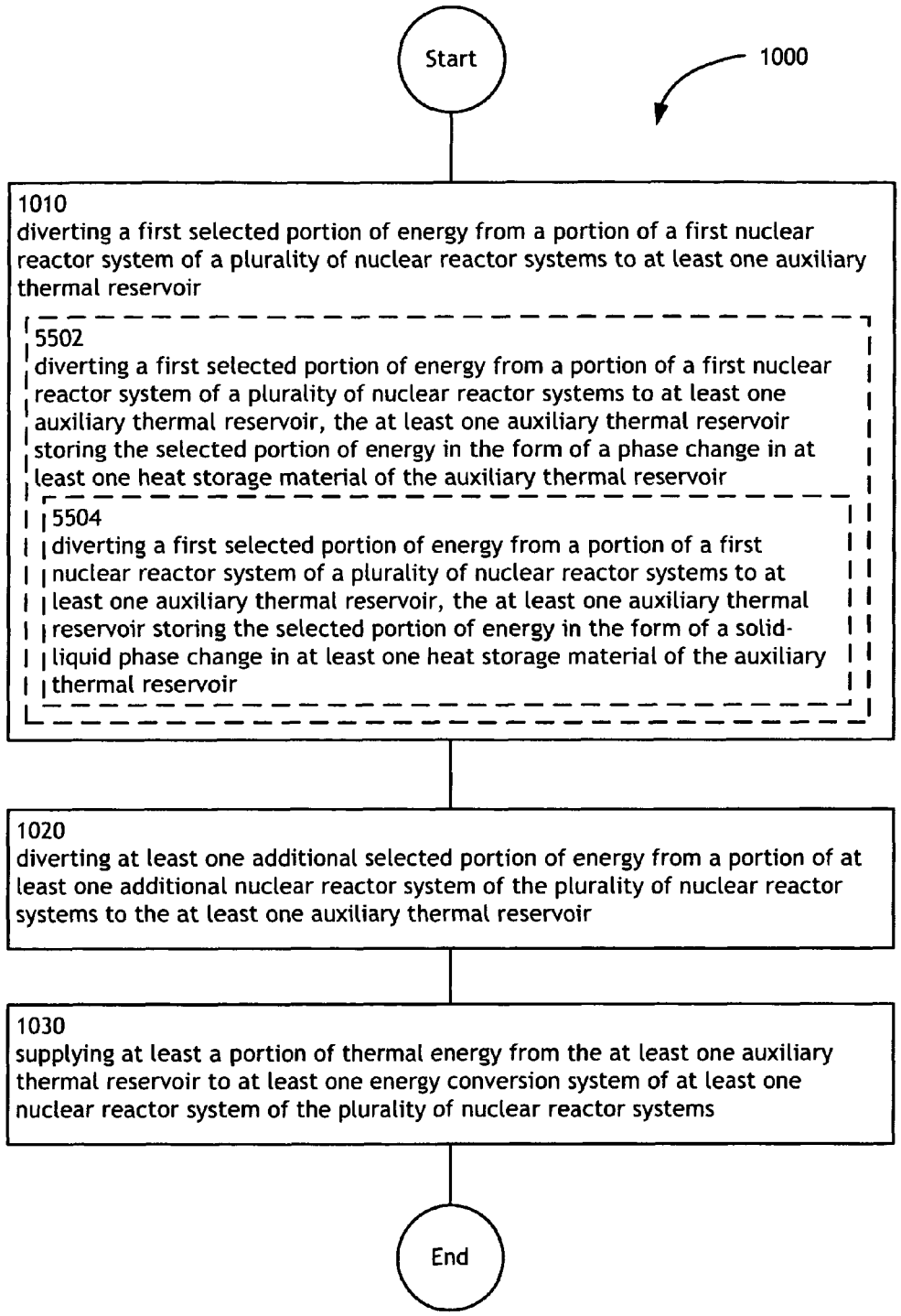
FIG. 55 is a high-level flowchart depicting an alternate implementation of FIG. 10.

FIG. 55 illustrates alternative embodiments of the example operational flow 1000 of FIG. 10. FIG. 55 illustrates example embodiments where the operation 1010 may include at least one additional operation. Additional operations may include an operation 5502, and/or an operation 5504.

Operation 5502 illustrates diverting a first selected portion of energy from a portion of a first nuclear reactor system of a plurality of nuclear reactor systems to at least one auxiliary thermal reservoir, the at least one auxiliary thermal reservoir storing the selected portion of energy in the form of a phase change in at least one heat storage material of the auxiliary thermal reservoir. For example, as shown in FIGS. 1 through 9D, an energy transfer system 104 may transfer a selected portion of energy from a portion of a first nuclear reactor system 106 of a plurality of nuclear reactor systems 102 to an auxiliary thermal reservoir 112, where the auxiliary thermal reservoir stores the energy in the form of a phase change in the heat storage material 438. For instance, the energy transferred to the auxiliary thermal reservoir 112 may cause a solid reservoir material to undergo a phase change into a liquid reservoir material, where the energy is stored in the reservoir material as a latent heat of transformation.

Further, the operation 5504 illustrates diverting a first selected portion of energy from a portion of a first nuclear reactor system of a plurality of nuclear reactor systems to at least one auxiliary thermal reservoir, the at least one auxiliary thermal reservoir storing the selected portion of energy in the form of a solid-liquid phase change in at least one heat storage material of the auxiliary thermal reservoir. For example, as shown in FIGS. 1 through 9D, an energy transfer system 104 may transfer a selected portion of energy from a portion of a first nuclear reactor system 106 of a plurality of nuclear reactor systems 102 to an auxiliary thermal reservoir 112, where the auxiliary thermal reservoir 112 stores the energy in the form of a solid-liquid phase change 440 (e.g., solid sodium-liquid sodium phase change).

Figure 56:
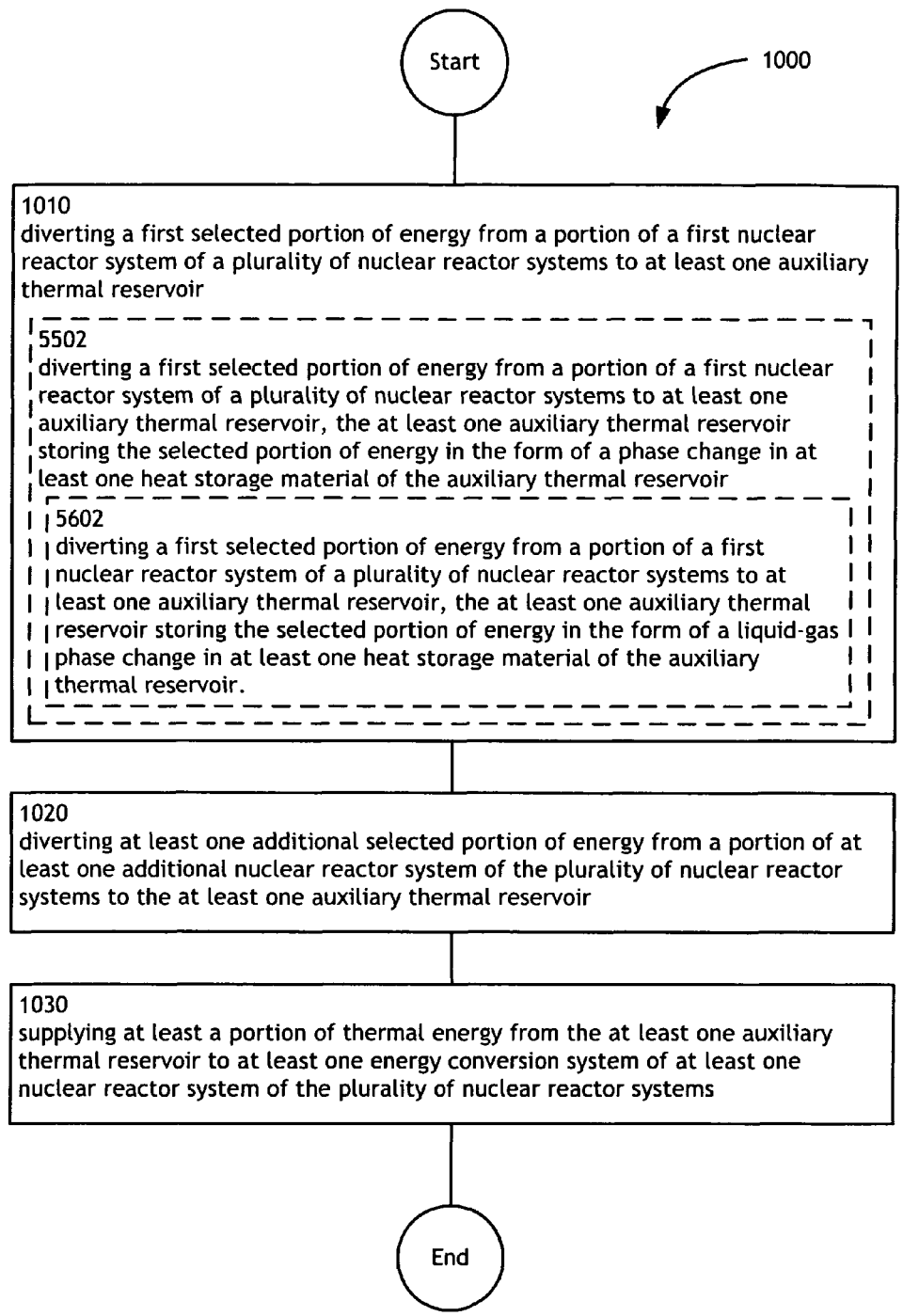
FIG. 56 is a high-level flowchart depicting an alternate implementation of FIG. 10.

FIG. 56 illustrates alternative embodiments of the example operational flow 1000 of FIG. 10. FIG. 56 illustrates example embodiments where the first diverting operation 1010 may include at least one additional operation. Additional operations may include an operation 5602.

Operation 5602 illustrates diverting a first selected portion of energy from a portion of a first nuclear reactor system of a plurality of nuclear reactor systems to at least one auxiliary thermal reservoir, the at least one auxiliary thermal reservoir storing the selected portion of energy in the form of a liquid-gas phase change in at least one heat storage material of the auxiliary thermal reservoir. For example, as shown in FIGS. 1 through 9D, the energy transfer system 104 may transfer a selected portion of energy from a portion of a first nuclear reactor system 106 of a plurality of nuclear reactor systems 102 to an auxiliary thermal reservoir 112, where the auxiliary thermal reservoir 112 stores the energy in the form of a liquid-gas phase change 442 (e.g., liquid water-steam water phase change).

Figure 57:
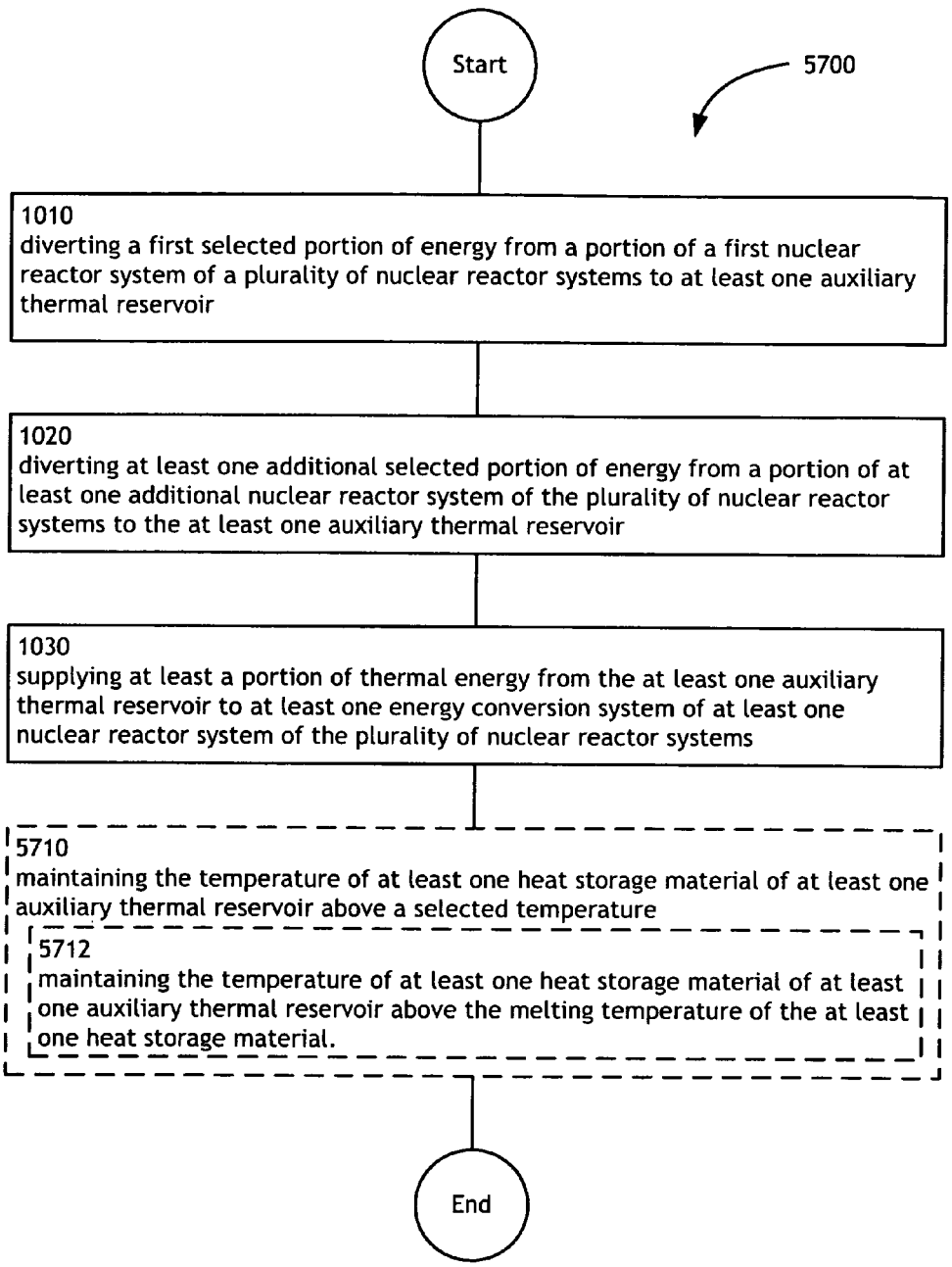
FIG. 57 is a high-level flowchart depicting an alternate implementation of FIG. 10.

FIG. 57 illustrates an operational flow 5700 representing example operations related to the storage and utilization of energy generated by a plurality of nuclear reactor systems. FIG. 57 illustrates an example embodiment where the example operational flow 1000 of FIG. 10 may include at least one additional operation. Additional operations may include an operation 5710, and/or an operation 5712.

After a start operation, a first diverting operation 1010, an additional diverting operation 1020, and a supplying operation 1030, the operational flow 5700 moves to a temperature maintaining operation 5710. Operation 5710 illustrates maintaining the temperature of at least one heat storage material of at least one auxiliary thermal reservoir above a selected temperature. For example, as shown in FIG. 4D, the temperature of a heat storage material 111 of an auxiliary thermal reservoir 112 may be maintained with a reservoir temperature control system 454 (e.g., thermostat).

The operation 5712 illustrates maintaining the temperature of at least one heat storage material of at least one auxiliary thermal reservoir above the melting temperature of the at least one heat storage material. For example, as shown in FIG. 4D, the temperature of a heat storage material 111 of an auxiliary thermal reservoir 112 may be maintained with a reservoir temperature control system 454 above a specified temperature, such as the melting temperature of the heat storage material 111.

Figure 58:
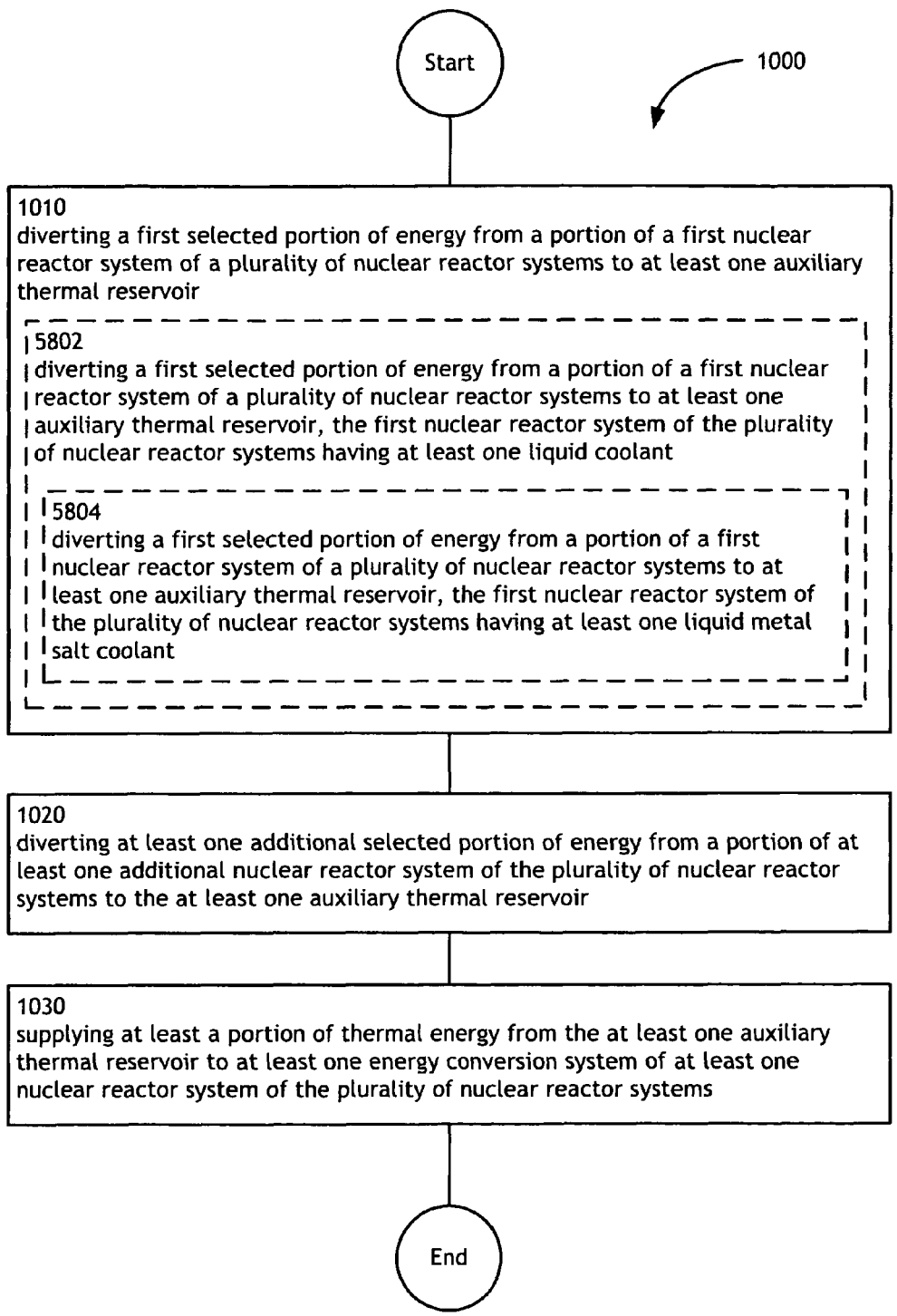
FIG. 58 is a high-level flowchart depicting an alternate implementation of FIG. 10.

FIG. 58 illustrates alternative embodiments of the example operational flow 1000 of FIG. 10. FIG. 58 illustrates example embodiments where the first diverting operation 1010 may include at least one additional operation. Additional operations may include an operation 5802, and/or an operation 5804.

The operation 5802 illustrates diverting a first selected portion of energy from a portion of a first nuclear reactor system of a plurality of nuclear reactor systems to at least one auxiliary thermal reservoir, the first nuclear reactor system of the plurality of nuclear reactor systems having at least one liquid coolant. For example, as shown in FIGS. 1 through 9D, an energy transfer system 104 may transfer a selected portion of energy from a portion of a first liquid cooled 302 nuclear reactor system 106 of a plurality of nuclear reactor systems 102 to an auxiliary thermal reservoir 112.

Further, the operation 5804 illustrates diverting a first selected portion of energy from a portion of a first nuclear reactor system of a plurality of nuclear reactor systems to at least one auxiliary thermal reservoir, the first nuclear reactor system of the plurality of nuclear reactor systems having at least one liquid metal salt coolant. For example, as shown in FIGS. 1 through 9D, an energy transfer system 104 may transfer a selected portion of energy from a portion of a first liquid metal salt (e.g., lithium fluoride or other fluoride salts) cooled 304 nuclear reactor system 106 of a plurality of nuclear reactor systems 102 to an auxiliary thermal reservoir 112.

Figure 59:
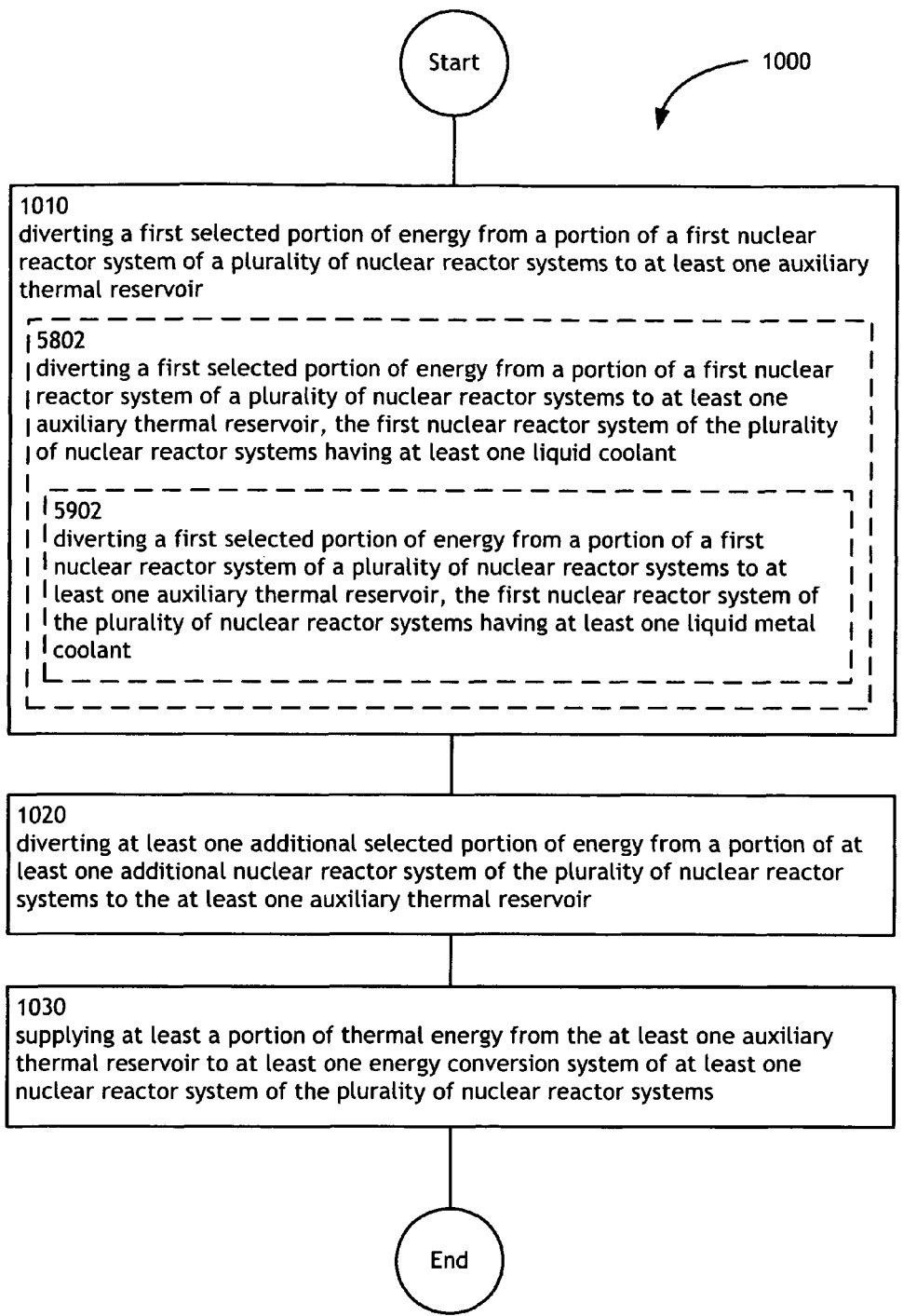
FIG. 59 is a high-level flowchart depicting an alternate implementation of FIG. 10.

FIG. 59 illustrates alternative embodiments of the example operational flow 1000 of FIG. 10. FIG. 59 illustrates example embodiments where the first diverting operation 1010 may include at least one additional operation. Additional operations may include an operation 5902.

Operation 5902 illustrates diverting a first selected portion of energy from a portion of a first nuclear reactor system of a plurality of nuclear reactor systems to at least one auxiliary thermal reservoir, the first nuclear reactor system of the plurality of nuclear reactor systems having at least one liquid metal coolant. For example, as shown in FIGS. 1 through 9D, an energy transfer system 104 may transfer a selected portion of energy from a portion of a first liquid metal (e.g., liquid sodium or liquid lead) cooled 306 nuclear reactor system 106 of a plurality of nuclear reactor systems 102 to an auxiliary thermal reservoir 112.

Figure 60:
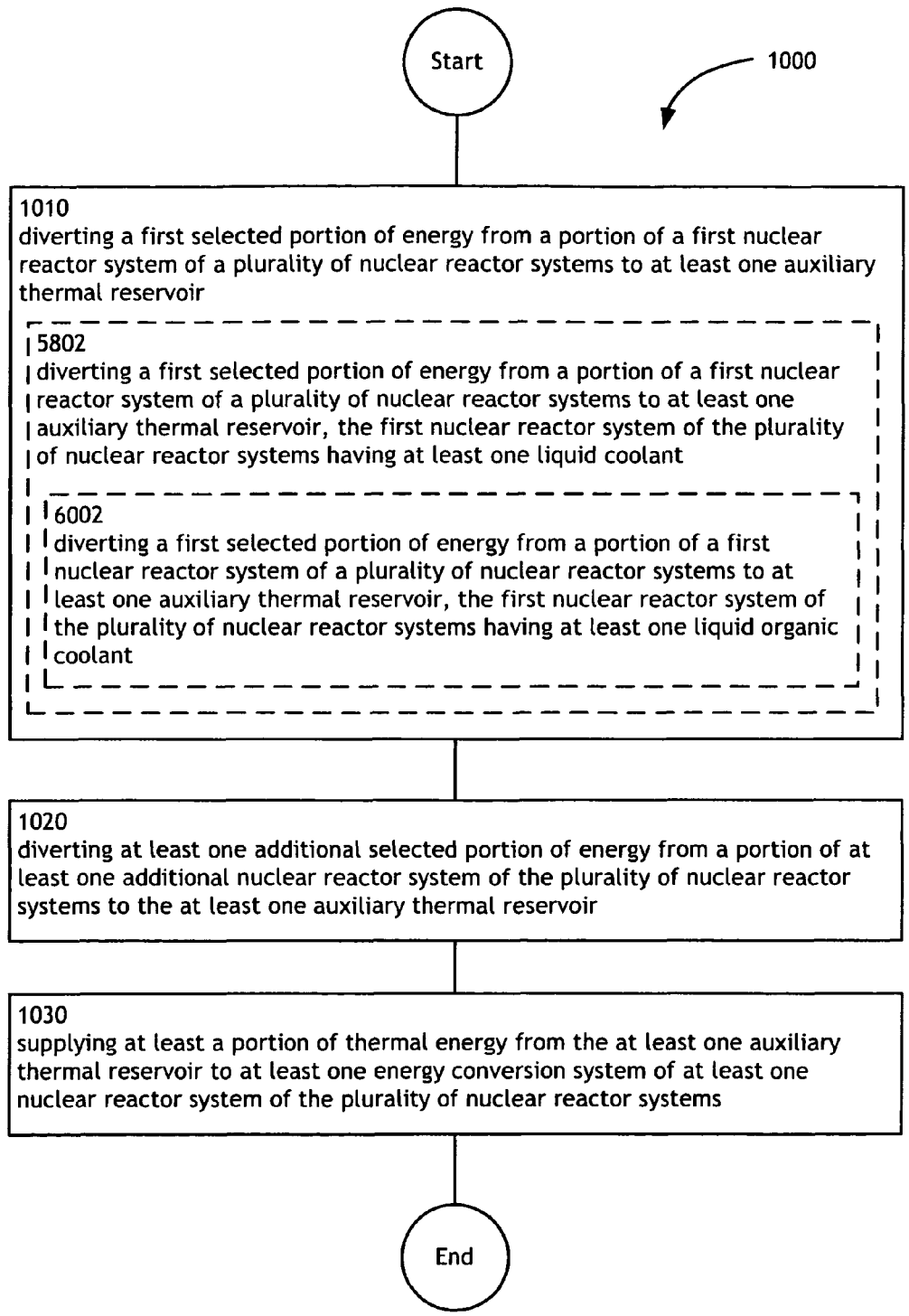
FIG. 60 is a high-level flowchart depicting an alternate implementation of FIG. 10.

FIG. 60 illustrates alternative embodiments of the example operational flow 1000 of FIG. 10. FIG. 60 illustrates example embodiments where the first diverting operation 1010 may include at least one additional operation. Additional operations may include an operation 6002.

Operation 6002 illustrates diverting a first selected portion of energy from a portion of a first nuclear reactor system of a plurality of nuclear reactor systems to at least one auxiliary thermal reservoir, the first nuclear reactor system of the plurality of nuclear reactor systems having at least one liquid organic coolant. For example, as shown in FIGS. 1 through 9D, an energy transfer system 104 may transfer a selected portion of energy from a portion of a first liquid organic (e.g., diphenyl with diphenyl oxide) cooled 308 nuclear reactor system 106 of a plurality of nuclear reactor systems 102 to an auxiliary thermal reservoir 112.

Figure 61:
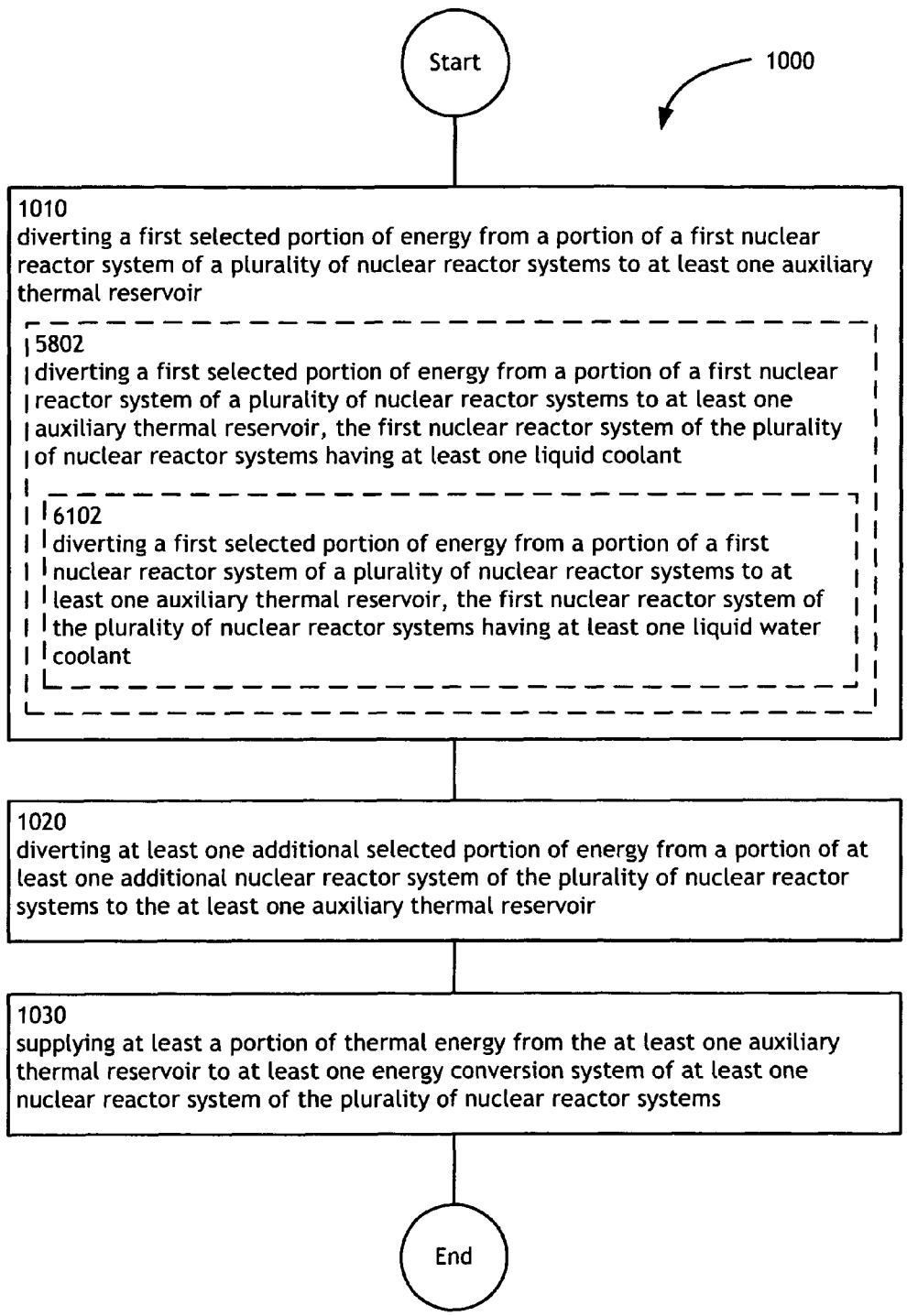
FIG. 61 is a high-level flowchart depicting an alternate implementation of FIG. 10.

FIG. 61 illustrates alternative embodiments of the example operational flow 1000 of FIG. 10. FIG. 61 illustrates example embodiments where the first diverting operation 1010 may include at least one additional operation. Additional operations may include an operation 6102.

Operation 6102 illustrates diverting a first selected portion of energy from a portion of a first nuclear reactor system of a plurality of nuclear reactor systems to at least one auxiliary thermal reservoir, the first nuclear reactor system of the plurality of nuclear reactor systems having at least one liquid water coolant. For example, as shown in FIGS. 1 through 9D, an energy transfer system 104 may transfer a selected portion of energy from a portion of a first liquid water cooled 310 nuclear reactor system 106 of a plurality of nuclear reactor systems 102 to an auxiliary thermal reservoir 112.

Figure 62:
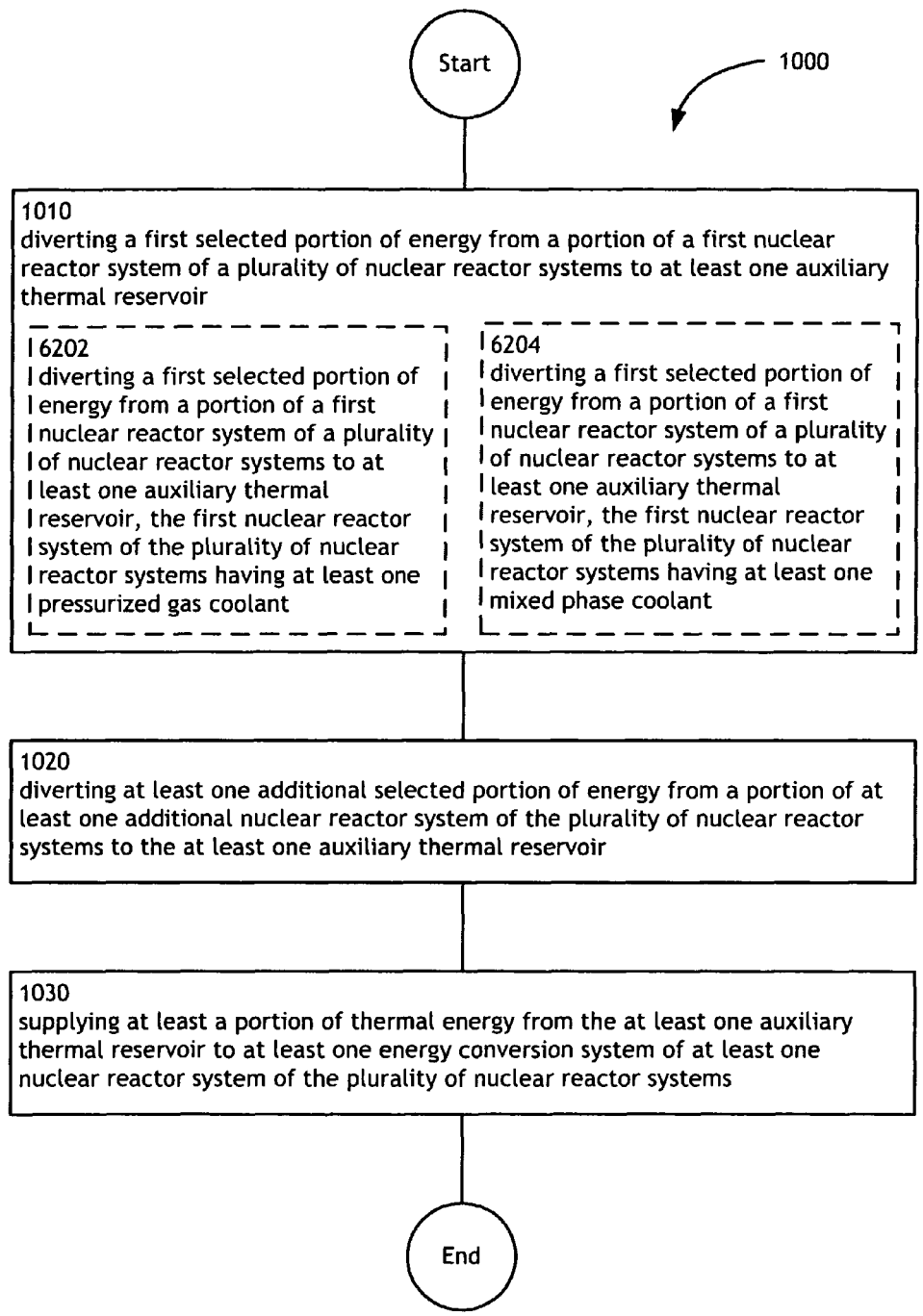
FIG. 62 is a high-level flowchart depicting an alternate implementation of FIG. 10.

FIG. 62 illustrates alternative embodiments of the example operational flow 1000 of FIG. 10. FIG. 62 illustrates example embodiments where the first diverting operation 1010 may include at least one additional operation. Additional operations may include an operation 6202, and/or an operation 6204.

Operation 6202 illustrates diverting a first selected portion of energy from a portion of a first nuclear reactor system of a plurality of nuclear reactor systems to at least one auxiliary thermal reservoir, the first nuclear reactor system of the plurality of nuclear reactor systems having at least one pressurized gas coolant. For example, as shown in FIGS. 1 through 9D, an energy transfer system 104 may transfer a selected portion of energy from a portion of a first pressurized gas (e.g., pressurized helium or carbon dioxide) cooled 312 nuclear reactor system 106 of a plurality of nuclear reactor systems 102 to an auxiliary thermal reservoir 112.

The operation 6204 illustrates diverting a first selected portion of energy from a portion of a first nuclear reactor system of a plurality of nuclear reactor systems to at least one auxiliary thermal reservoir, the first nuclear reactor system of the plurality of nuclear reactor systems having at least one mixed phase coolant. For example, as shown in FIGS. 1 through 9D, an energy transfer system 104 may transfer a selected portion of energy from a portion of a first mixed phase (e.g., liquid water-steam water) cooled 314 nuclear reactor system 106 of a plurality of nuclear reactor systems 102 to an auxiliary thermal reservoir 112.

Figure 63:
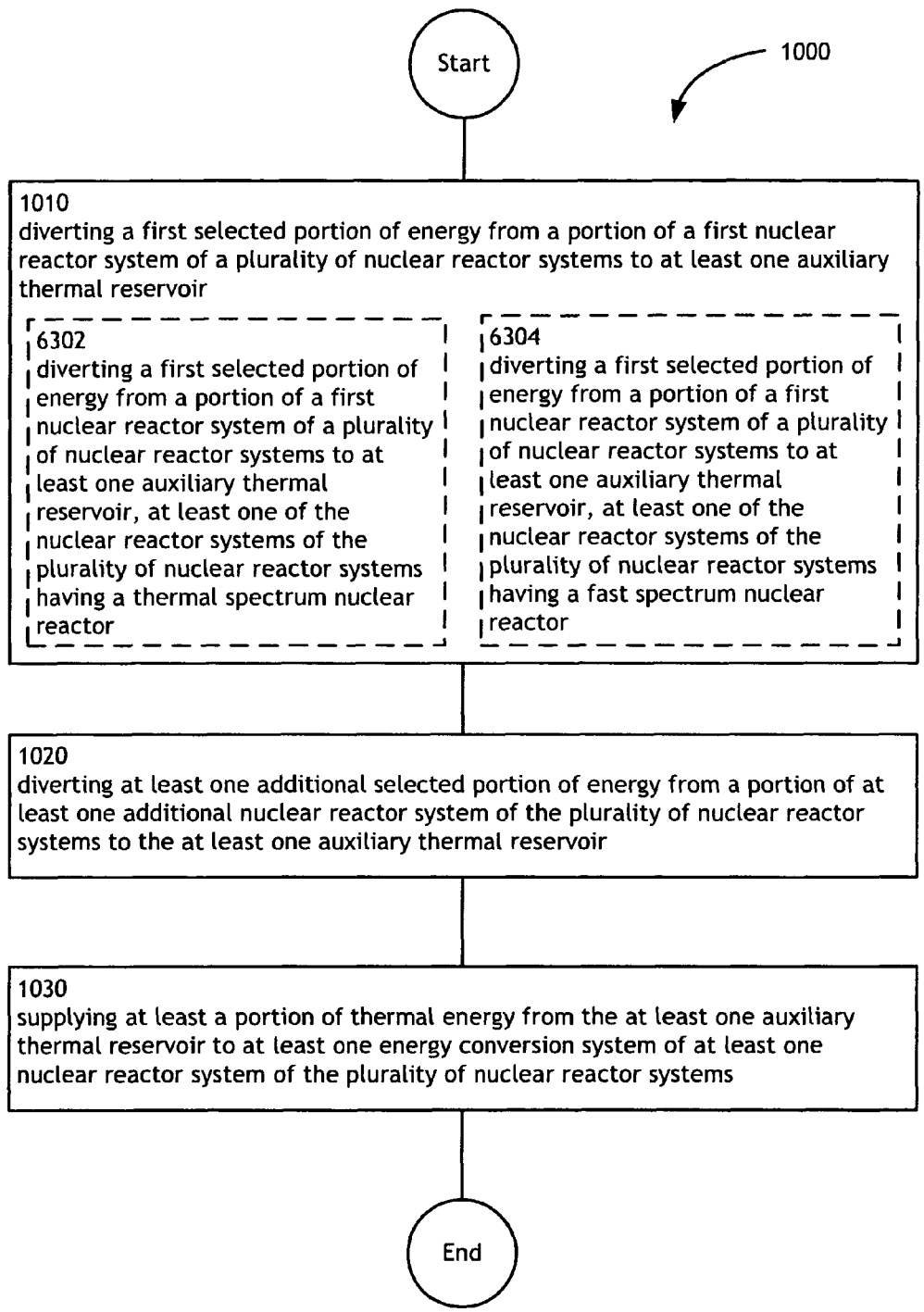
FIG. 63 is a high-level flowchart depicting an alternate implementation of FIG. 10.

FIG. 63 illustrates alternative embodiments of the example operational flow 1000 of FIG. 10. FIG. 63 illustrates example embodiments where the first diverting operation 1010 may include at least one additional operation. Additional operations may include an operation 6302, and/or an operation 6304.

Operation 6302 illustrates diverting a first selected portion of energy from a portion of a first nuclear reactor system of a plurality of nuclear reactor systems to at least one auxiliary thermal reservoir, at least one of the nuclear reactor systems of the plurality of nuclear reactor systems having a thermal spectrum nuclear reactor. For example, as shown in FIGS. 1 through 9D, an energy transfer system 104 may transfer a selected portion of energy from a portion of a first nuclear reactor system 106 of a plurality of nuclear reactor systems 202, where at least one of the nuclear reactor systems 106 (e.g., the first nuclear reactor system 106, the second nuclear reactor system 106, or up to and including the Nth nuclear reactor system 106) of the plurality of nuclear reactor systems 102 includes a thermal spectrum nuclear reactor 202.

The operation 6304 illustrates diverting a first selected portion of energy from a portion of a first nuclear reactor system of a plurality of nuclear reactor systems to at least one auxiliary thermal reservoir, at least one of the nuclear reactor systems of the plurality of nuclear reactor systems having a fast spectrum nuclear reactor. For example, as shown in FIGS. 1 through 9D, an energy transfer system 104 may transfer a selected portion of energy from a portion of a first nuclear reactor system 106 of a plurality of nuclear reactor systems 202, where at least one of the nuclear reactor systems 106 (e.g., the first nuclear reactor system 106, the second nuclear reactor system 106, or up to and including the Nth nuclear reactor system 106) of the plurality of nuclear reactor systems 102 includes a fast spectrum nuclear reactor 204.

Figure 64:
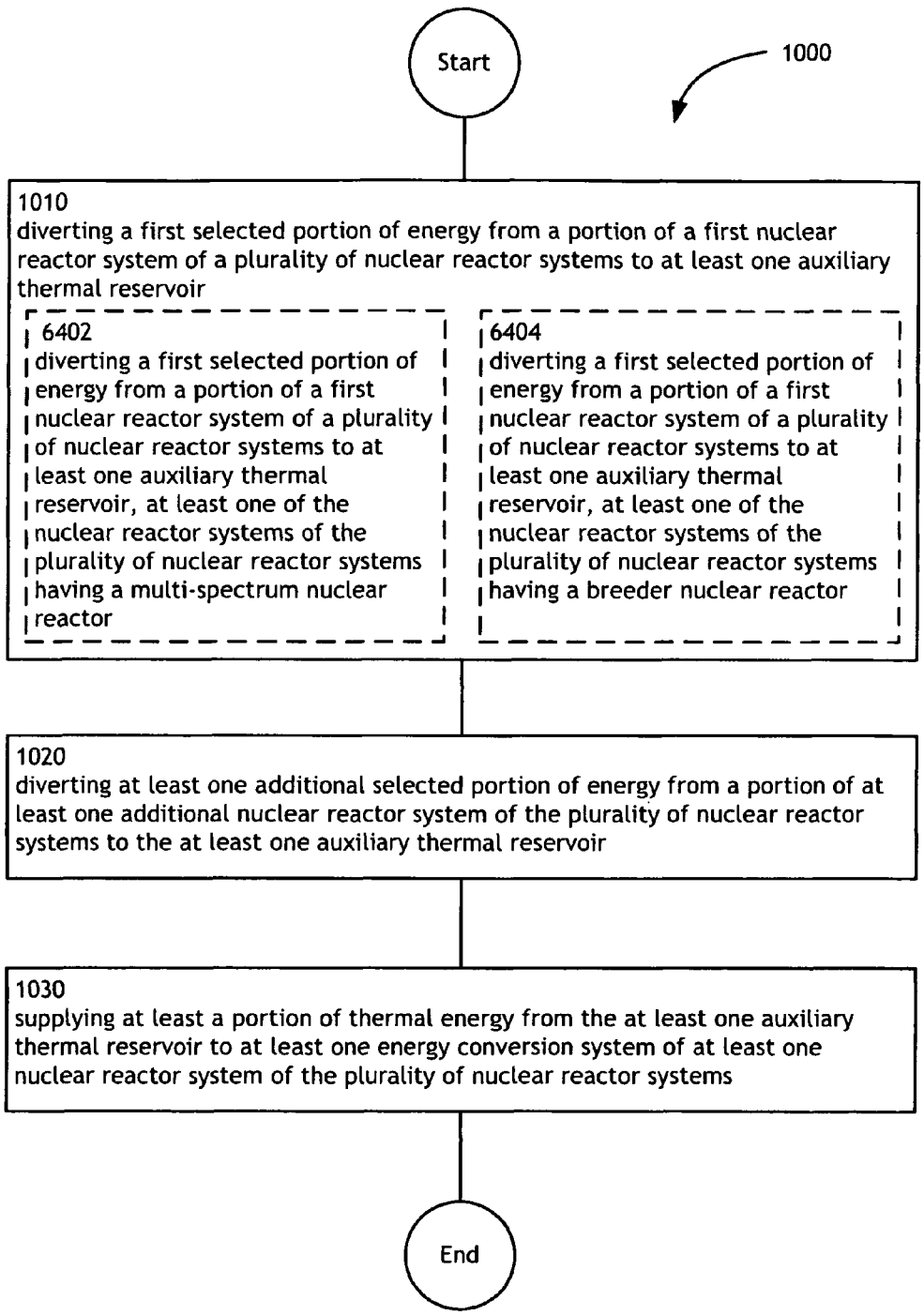
FIG. 64 is a high-level flowchart depicting an alternate implementation of FIG. 10.

FIG. 64 illustrates alternative embodiments of the example operational flow 1000 of FIG. 10. FIG. 64 illustrates example embodiments where the diverting operation 1010 may include at least one additional operation. Additional operations may include an operation 6402, and/or an operation 6404.

Operation 6402 illustrates diverting a first selected portion of energy from a portion of a first nuclear reactor system of a plurality of nuclear reactor systems to at least one auxiliary thermal reservoir, at least one of the nuclear reactor systems of the plurality of nuclear reactor systems having a multi-spectrum nuclear reactor. For example, as shown in FIGS. 1 through 9D, an energy transfer system 104 may transfer a selected portion of energy from a portion of a first nuclear reactor system 106 of a plurality of nuclear reactor systems 202, where at least one of the nuclear reactor systems 106

(e.g., the first nuclear reactor system 106, the second nuclear reactor system 106, or up to and including the Nth nuclear reactor system 106) of the plurality of nuclear reactor systems 102 includes a multi-spectrum nuclear reactor 206.

The operation 6404 illustrates diverting a first selected portion of energy from a portion of a first nuclear reactor system of a plurality of nuclear reactor systems to at least one auxiliary thermal reservoir, at least one of the nuclear reactor systems of the plurality of nuclear reactor systems having a breeder nuclear reactor. For example, as shown in FIGS. 1 through 9D, an energy transfer system 104 may transfer a selected portion of energy from a portion of a first nuclear reactor system 106 of a plurality of nuclear reactor systems 202, where at least one of the nuclear reactor systems 106 (e.g., the first nuclear reactor system 106, the second nuclear reactor system 106, or up to and including the Nth nuclear reactor system 106) of the plurality of nuclear reactor systems 102 includes a breeder nuclear reactor 208.

Figure 65:
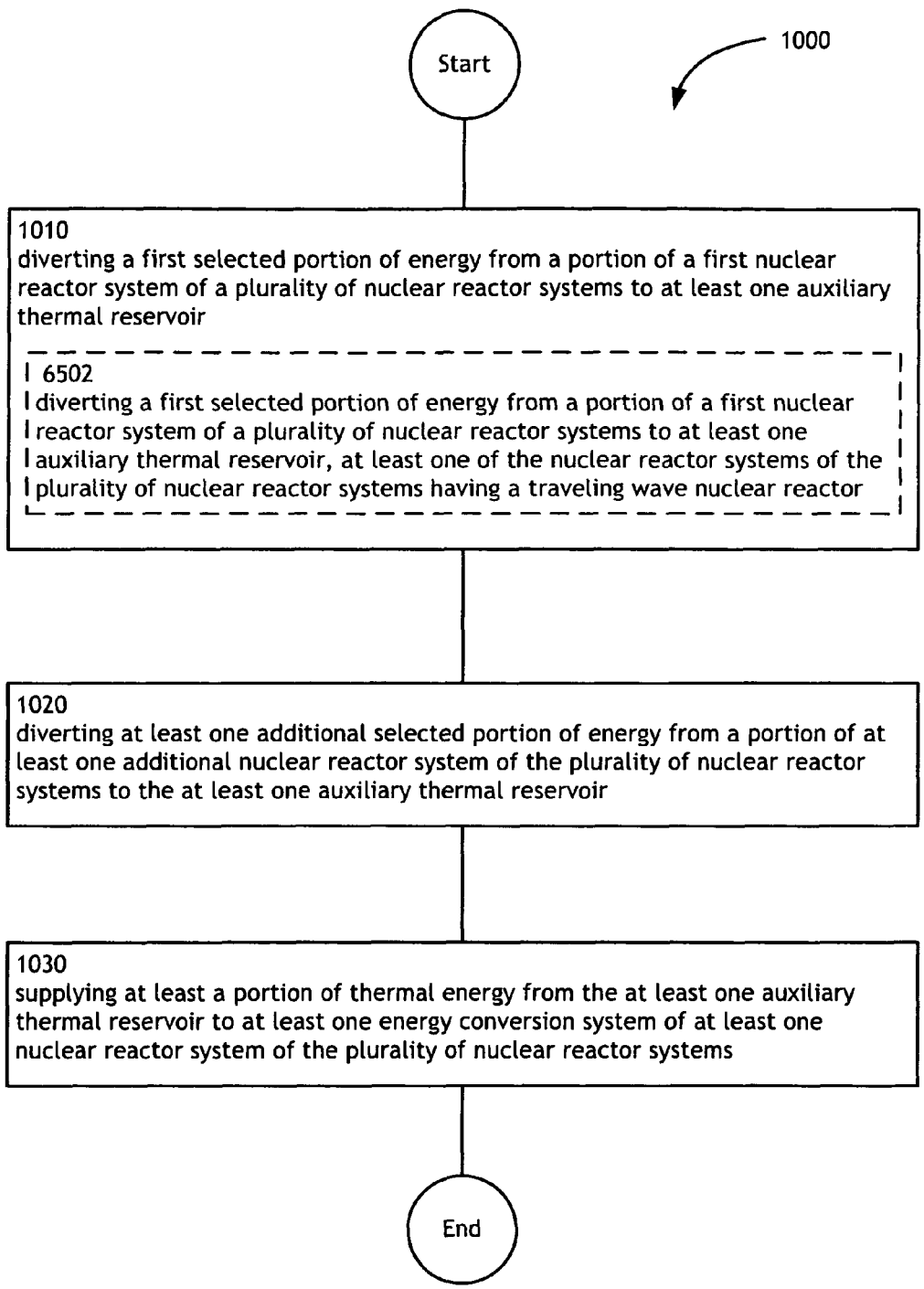
FIG. 65 is a high-level flowchart depicting an alternate implementation of FIG. 10.

FIG. 65 illustrates alternative embodiments of the example operational flow 1000 of FIG. 10. FIG. 65 illustrates example embodiments where the first diverting operation 1010 may include at least one additional operation. Additional operations may include an operation 6502.

Operation 6502 illustrates diverting a first selected portion of energy from a portion of a first nuclear reactor system of a plurality of nuclear reactor systems to at least one auxiliary thermal reservoir, at least one of the nuclear reactor systems of the plurality of nuclear reactor systems having a traveling wave nuclear reactor. For example, as shown in FIGS. 1 through 9D, an energy transfer system 104 may transfer a selected portion of energy from a portion of a first nuclear reactor system 106 of a plurality of nuclear reactor systems 202, where at least one of the nuclear reactor systems 106 (e.g., the first nuclear reactor system 106, the second nuclear reactor system 106, or up to and including the Nth nuclear reactor system 106) of the plurality of nuclear reactor systems 102 includes a traveling wave nuclear reactor 210.

Figure 66:
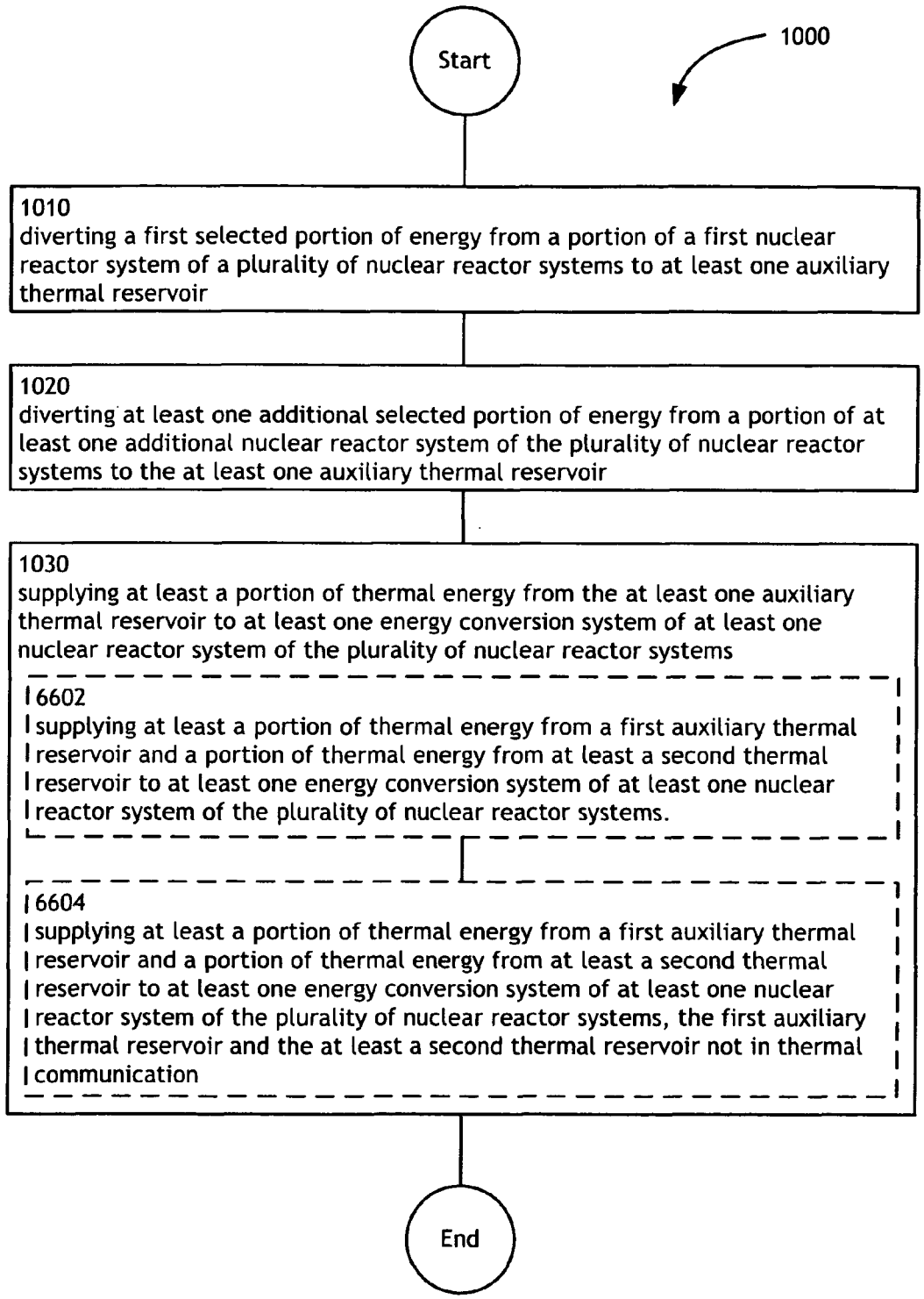
FIG. 66 is a high-level flowchart depicting an alternate implementation of FIG. 10.

FIG. 66 illustrates alternative embodiments of the example operational flow 1000 of FIG. 10. FIG. 66 illustrates example embodiments where the supplying operation 1030 may include at least one additional operation. Additional operations may include an operation 6602, and/or an operation 6604.

Operation 6602 illustrates supplying at least a portion of thermal energy from a first auxiliary thermal reservoir and a portion of thermal energy from at least a second thermal reservoir to at least one energy conversion system of at least one nuclear reactor system of the plurality of nuclear reactor systems. For example, as shown in FIGS. 1 through 9D, thermal energy stored in a first auxiliary reservoir 112 and thermal energy stored in an additional thermal reservoir (e.g., second thermal reservoir, third thermal reservoir, or up to and including an Nth thermal reservoir) may be supplied to an energy conversion system 110 of a nuclear reactor system 106 of the plurality of nuclear reactor systems 102. For instance, a first heat supply system 114 may supply thermal energy stored in the first auxiliary thermal reservoir 112 to an energy conversion system 110 and a second heat supply system 114 may supply thermal energy stored in the second auxiliary thermal reservoir 112 to the energy conversion system 110.

Further, the operation 6604 illustrates supplying at least a portion of thermal energy from a first auxiliary thermal reservoir and a portion of thermal energy from at least a second thermal reservoir to at least one energy conversion system of at least one nuclear reactor system of the plurality of nuclear reactor systems, the first auxiliary thermal reservoir and the at least a second thermal reservoir not in thermal communication. For example, as shown in FIGS. 1 through 9D, thermal energy stored in a first auxiliary reservoir 112 and thermal energy stored in an additional thermal reservoir (e.g., second thermal reservoir, third thermal reservoir, or up to and including an Nth thermal reservoir) may be supplied to an energy conversion system 110 of a nuclear reactor system 106 of the plurality of nuclear reactor systems 102, wherein the first thermal reservoir 112 and the second thermal reservoir 112 are not in thermal communication.

Figure 67:
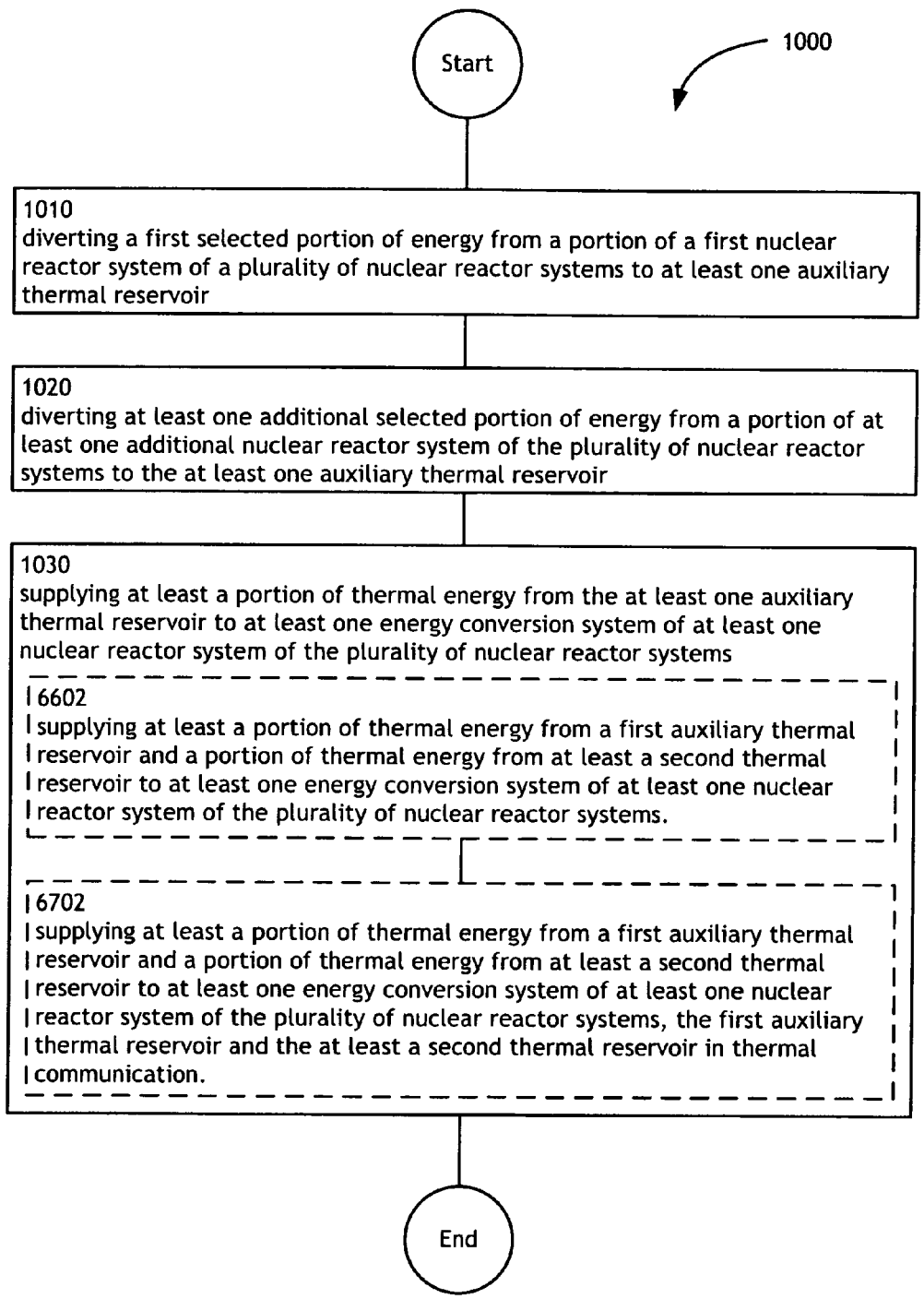
FIG. 67 is a high-level flowchart depicting an alternate implementation of FIG. 10.

FIG. 67 illustrates alternative embodiments of the example operational flow 1000 of FIG. 10. FIG. 67 illustrates example embodiments where the supply operation 1030 may include at least one additional operation. Additional operations may include an operation 6702.

Operation 6702 illustrates supplying at least a portion of thermal energy from a first auxiliary thermal reservoir and a portion of thermal energy from at least a second thermal reservoir to at least one energy conversion system of at least one nuclear reactor system of the plurality of nuclear reactor systems, the first auxiliary thermal reservoir and the at least a second thermal reservoir in thermal communication. For example, as shown in FIGS. 1 through 9D, thermal energy stored in a first auxiliary reservoir 112 and thermal energy stored in an additional thermal reservoir (e.g., second thermal reservoir, third thermal reservoir, or up to and including an Nth thermal reservoir) may be supplied to an energy conversion system 110 of a nuclear reactor system 106 of the plurality of nuclear reactor systems 102, wherein the first thermal reservoir 112 and the second thermal reservoir 112 are in thermal communication. It will be recognized by those skilled in the art that even though the first thermal reservoir 110 and the second thermal reservoir 110 are thermally coupled the two reservoirs can for practical purposes be treated as two distinct thermal reservoirs under non-steady state conditions.

Figure 68:
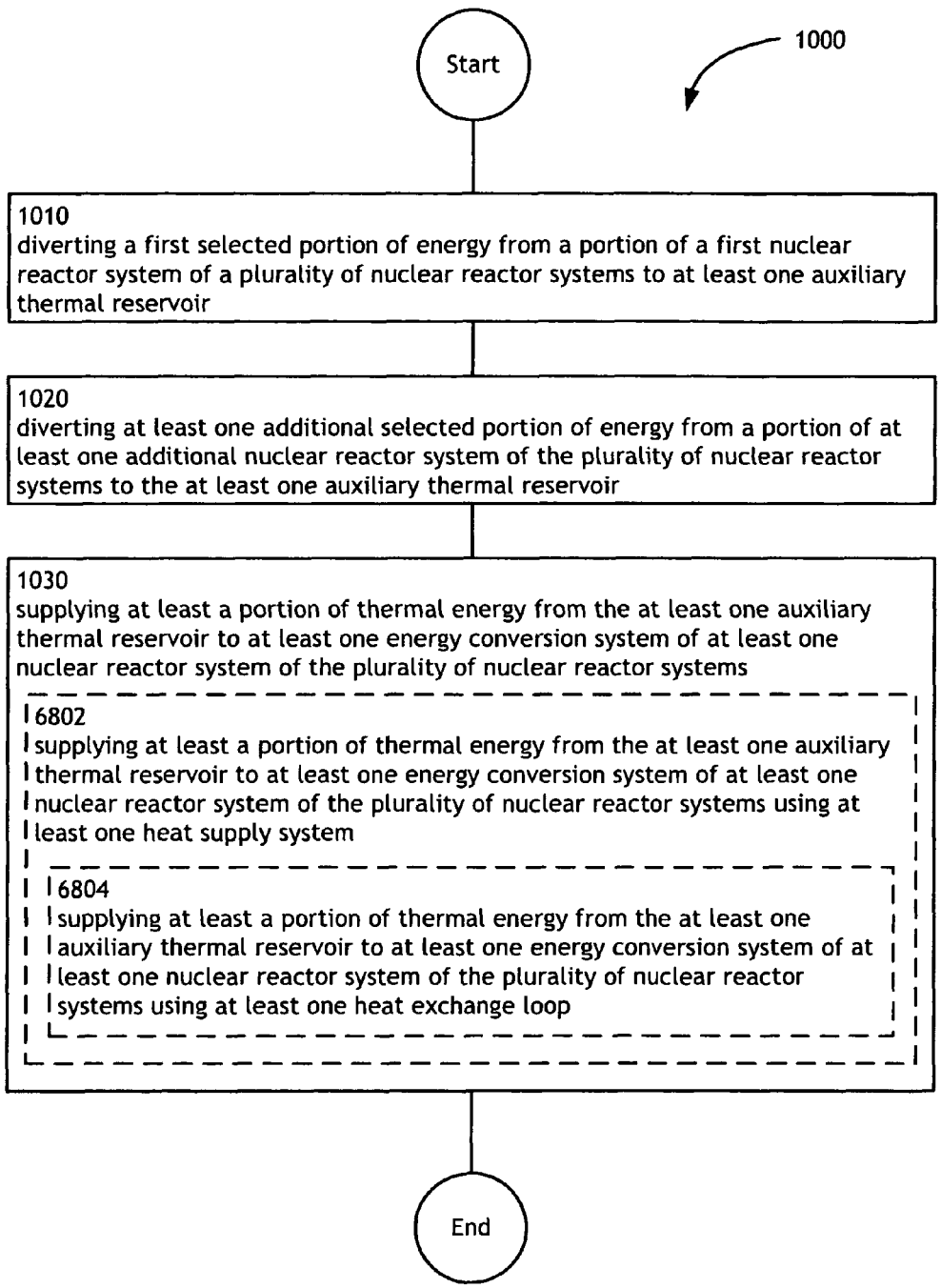
FIG. 68 is a high-level flowchart depicting an alternate implementation of FIG. 10.

FIG. 68 illustrates alternative embodiments of the example operational flow 1000 of FIG. 10. FIG. 68 illustrates example embodiments where the supplying operation 1030 may include at least one additional operation. Additional operations may include an operation 6802, and/or an operation 6804.

The operation 6802 illustrates supplying at least a portion of thermal energy from the at least one auxiliary thermal reservoir to at least one energy conversion system of at least one nuclear reactor system of the plurality of nuclear reactor systems using at least one heat supply system. For example, as shown in FIGS. 1 through 9D, a heat supply system 114 may supply a portion of the thermal energy stored in an auxiliary thermal reservoir 112 to an energy conversion system 110 (e.g., topping cycle 226 or turbine 218) of a nuclear reactor system 106 of the plurality of nuclear reactor systems 102.

Further, the operation 6804 illustrates supplying at least a portion of thermal energy from the at least one auxiliary thermal reservoir to at least one energy conversion system of at least one nuclear reactor system of the plurality of nuclear reactor systems using at least one heat exchange loop. For example, as shown in FIGS. 1 through 9D, a heat supply system 114 may supply a portion of the thermal energy stored in an auxiliary thermal reservoir 112 to an energy conversion system 110 of a nuclear reactor system 106 of the plurality of nuclear reactor systems 102 via one or more heat exchange loops 602.

Figure 69:
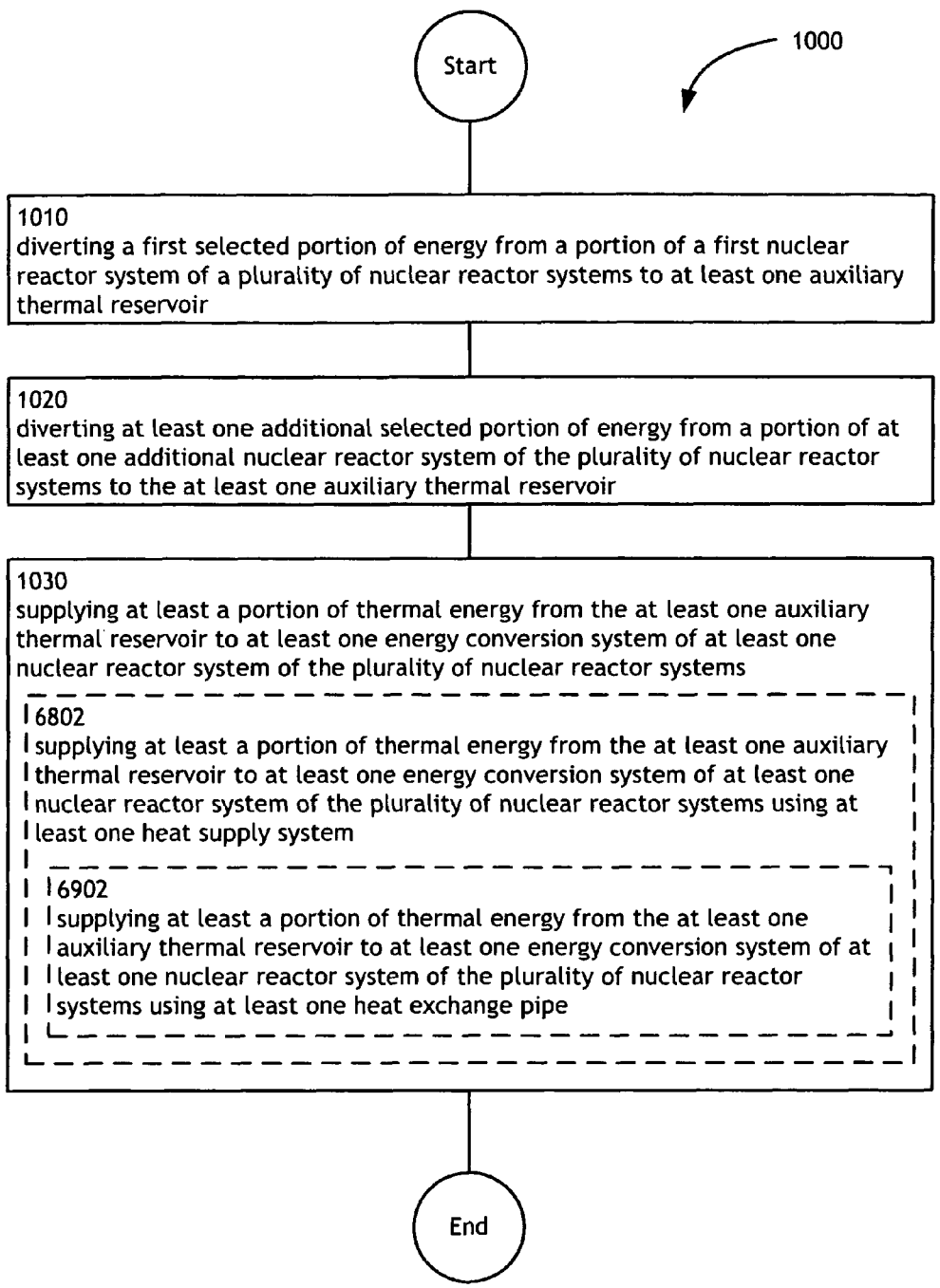
FIG. 69 is a high-level flowchart depicting an alternate implementation of FIG. 10.

FIG. 69 illustrates alternative embodiments of the example operational flow 1000 of FIG. 10. FIG. 69 illustrates example embodiments where the supplying operation 1030 may include at least one additional operation. Additional operations may include an operation 6902.

Operation 6902 illustrates supplying at least a portion of thermal energy from the at least one auxiliary thermal reservoir to at least one energy conversion system of at least one nuclear reactor system of the plurality of nuclear reactor systems using at least one heat exchange pipe. For example, as shown in FIGS. 1 through 9D, a heat supply system 114 may supply a portion of the thermal energy stored in an auxiliary thermal reservoir 112 to an energy conversion system 110 of a nuclear reactor system 106 of the plurality of nuclear reactor systems 102 via one or more heat pipes 604.

Figure 70:
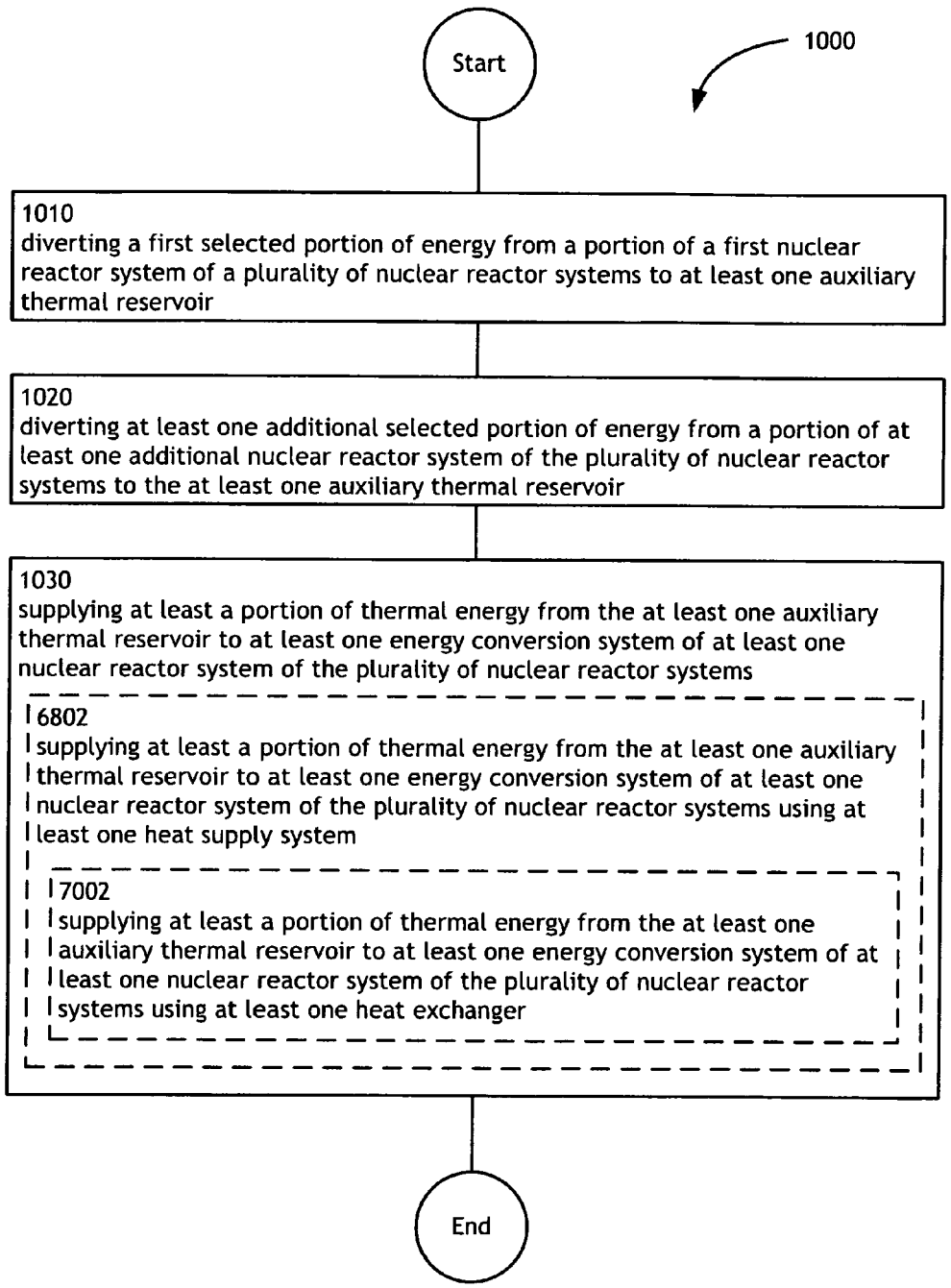
FIG. 70 is a high-level flowchart depicting an alternate implementation of FIG. 10.

FIG. 70 illustrates alternative embodiments of the example operational flow 1000 of FIG. 10. FIG. 70 illustrates example embodiments where the supplying operation 1030 may include at least one additional operation. Additional operations may include an operation 7002.

Operation 7002 illustrates supplying at least a portion of thermal energy from the at least one auxiliary thermal reservoir to at least one energy conversion system of at least one nuclear reactor system of the plurality of nuclear reactor systems using at least one heat exchanger. For example, as shown in FIGS. 1 through 9D, a heat supply system 114 may supply a portion of the thermal energy stored in an auxiliary thermal reservoir 112 to an energy conversion system 110 of a nuclear reactor system 106 of the plurality of nuclear reactor systems 102 via one or more heat exchangers 606. For instance, a first portion of a heat exchanger 606 may be in thermal communication with an auxiliary thermal reservoir 112, while the second portion of the heat exchanger 606 may be in thermal communication with an energy conversion system 110 of a nuclear reactor system 106 of the plurality of nuclear reactor systems 102.

Figure 71:
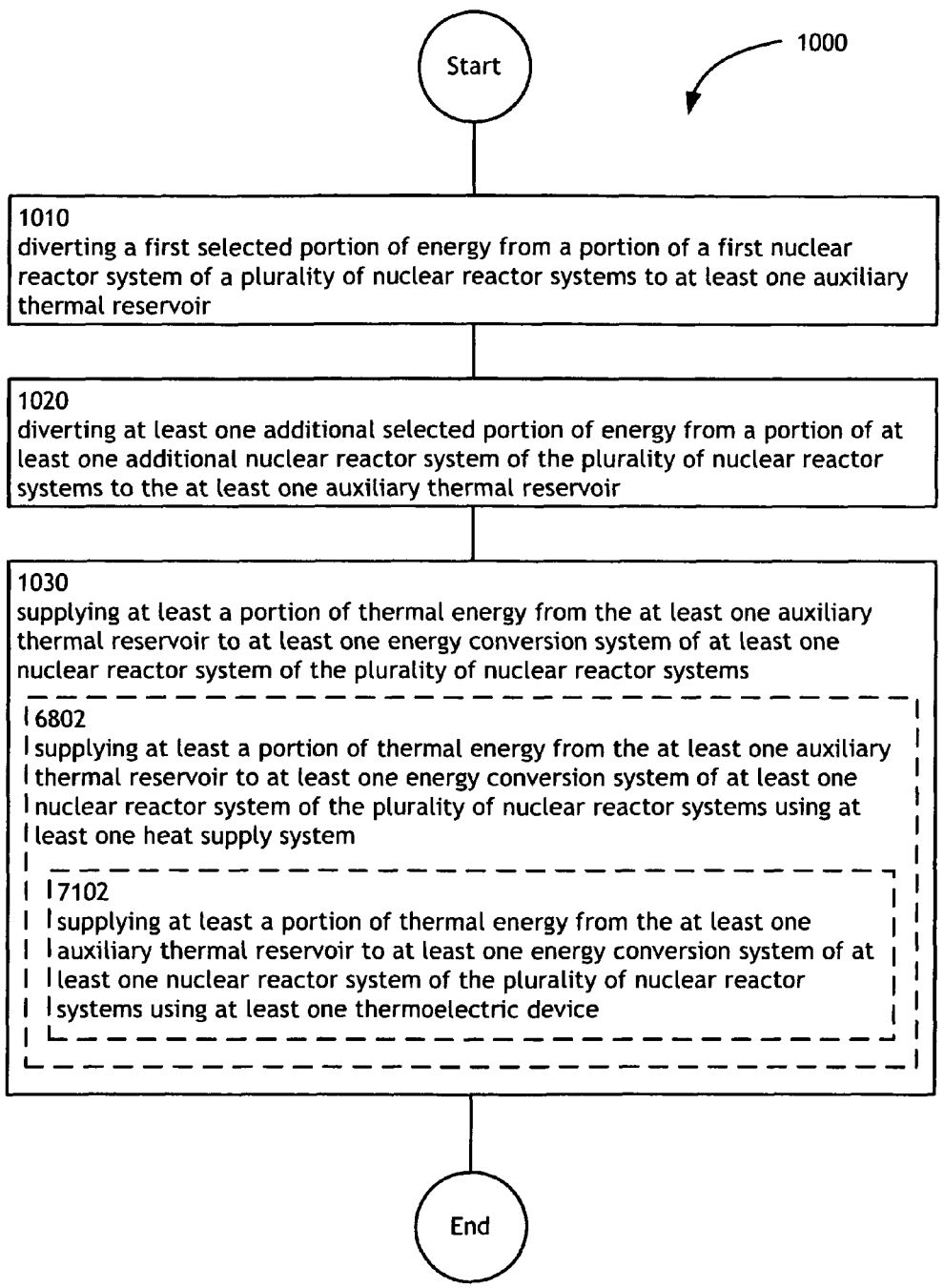
FIG. 71 is a high-level flowchart depicting an alternate implementation of FIG. 10.

FIG. 71 illustrates alternative embodiments of the example operational flow 1000 of FIG. 10. FIG. 71 illustrates example embodiments where the supply operation 1030 may include at least one additional operation. Additional operations may include an operation 7102.

Operation 7102 illustrates supplying at least a portion of thermal energy from the at least one auxiliary thermal reservoir to at least one energy conversion system of at least one nuclear reactor system of the plurality of nuclear reactor systems using at least one thermoelectric device. For example, as shown in FIGS. 1 through 9D, a heat supply system 114 may supply a portion of the thermal energy stored in an auxiliary thermal reservoir 112 to an energy conversion system 110 of a nuclear reactor system 106 of the plurality of nuclear reactor systems 102 via one or more thermoelectric devices 608. For instance, a first portion of a thermoelectric device 608 may be in thermal communication with an auxiliary thermal reservoir 112 and a second portion of the thermoelectric device 608 may be in thermal communication with a heat sink (e.g., environmental heat sink) of a nuclear reactor system 106 of the plurality of the nuclear reactor systems 102.

Figure 72:
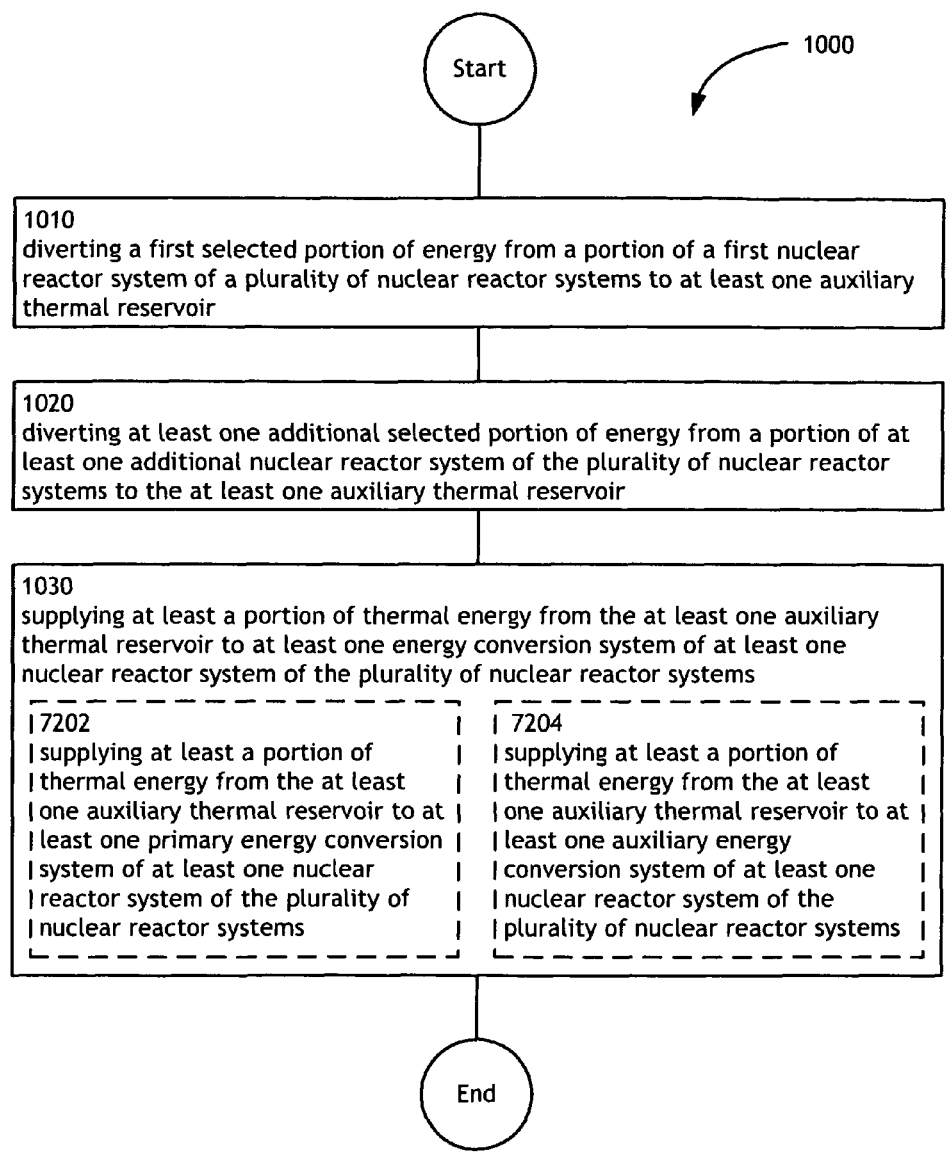
FIG. 72 is a high-level flowchart depicting an alternate implementation of FIG. 10.

FIG. 72 illustrates alternative embodiments of the example operational flow 1000 of FIG. 10. FIG. 72 illustrates example embodiments where the supplying operation 1030 may include at least one additional operation. Additional operations may include an operation 7202, and/or an operation 7204.

Operation 7202 illustrates supplying at least a portion of thermal energy from the at least one auxiliary thermal reservoir to at least one primary energy conversion system of at least one nuclear reactor system of the plurality of nuclear reactor systems. For example, as shown in FIGS. 1 through 9D, a heat supply system 114 may supply a portion of the thermal energy stored in an auxiliary thermal reservoir 112 to a primary energy conversion system 212 (e.g., energy conversion system coupled to the primary boiling loop) of a nuclear reactor system 106 of the plurality of nuclear reactor systems 102.

The operation 7204 illustrates supplying at least a portion of thermal energy from the at least one auxiliary thermal reservoir to at least one auxiliary energy conversion system of at least one nuclear reactor system of the plurality of nuclear reactor systems. For example, as shown in FIGS. 1 through 9D, a heat supply system 114 may supply a portion of the thermal energy stored in an auxiliary thermal reservoir 112 to an auxiliary energy conversion system 214 (e.g., energy conversion system coupled to a non-primary boiling) of a nuclear reactor system 106 of the plurality of nuclear reactor systems 102.

Figure 73:
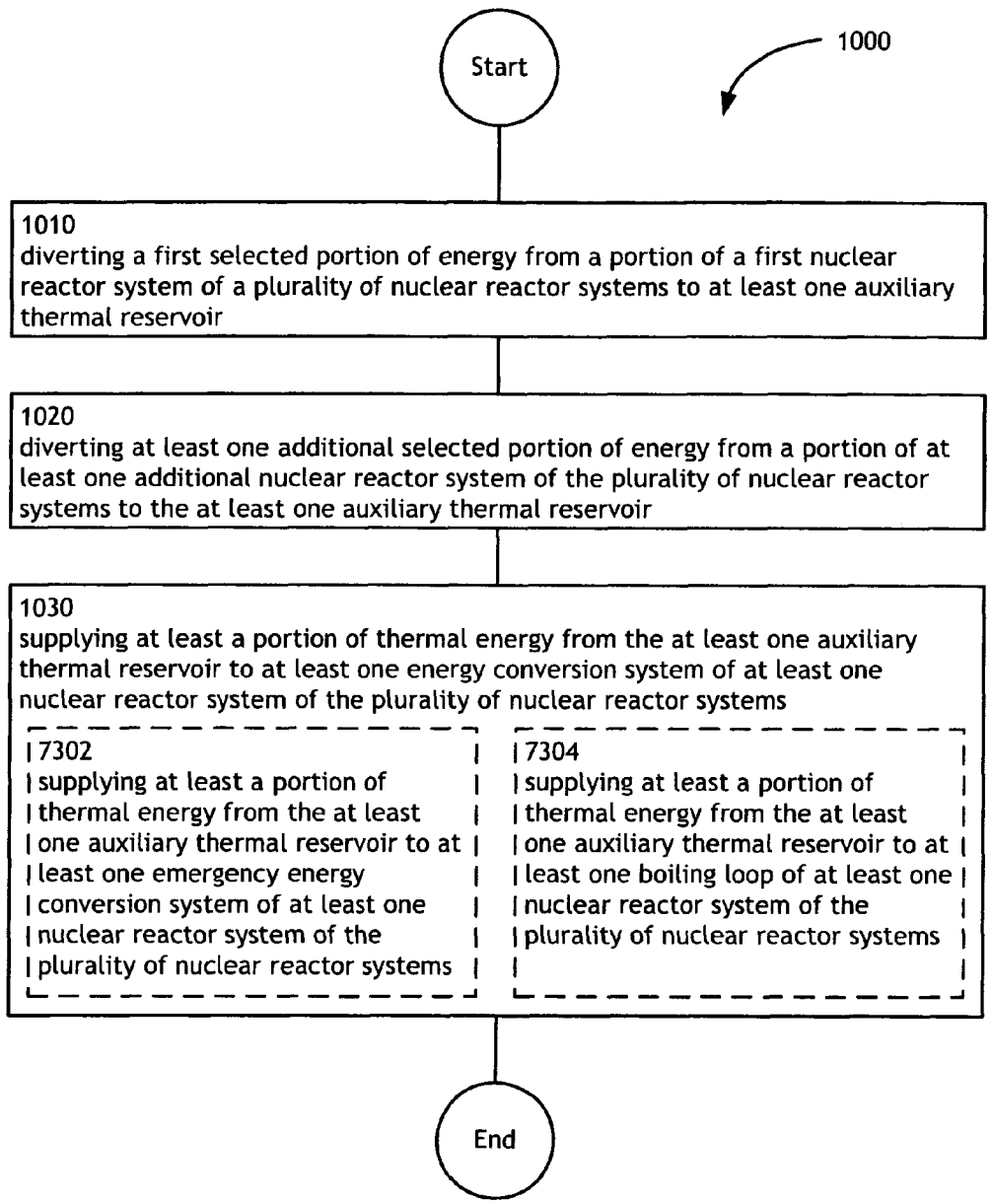
FIG. 73 is a high-level flowchart depicting an alternate implementation of FIG. 10.

FIG. 73 illustrates alternative embodiments of the example operational flow 1000 of FIG. 10. FIG. 73 illustrates example embodiments where the supplying operation 1030 may include at least one additional operation. Additional operations may include an operation 7302, and/or an operation 7304.

Operation 7302 illustrates supplying at least a portion of thermal energy from the at least one auxiliary thermal reservoir to at least one emergency energy conversion system of at least one nuclear reactor system of the plurality of nuclear reactor systems. For example, as shown in FIGS. 1 through 9D, a heat supply system 114 may supply a portion of the thermal energy stored in an auxiliary thermal reservoir 112 to an emergency energy conversion system 216 (e.g., energy conversion system supplying electric power to various operation systems of the nuclear reactor system) of a nuclear reactor system 106 of the plurality of nuclear reactor systems 102.

The operation 7304 illustrates supplying at least a portion of thermal energy from the at least one auxiliary thermal reservoir to at least one boiling loop of at least one nuclear reactor system of the plurality of nuclear reactor systems. For example, as shown in FIGS. 1 through 9D, a heat supply system 114 may supply a portion of the thermal energy stored in an auxiliary thermal reservoir 112 to a boiling loop 232 of a nuclear reactor system 106 of the plurality of nuclear reactor systems 102.

Figure 74:
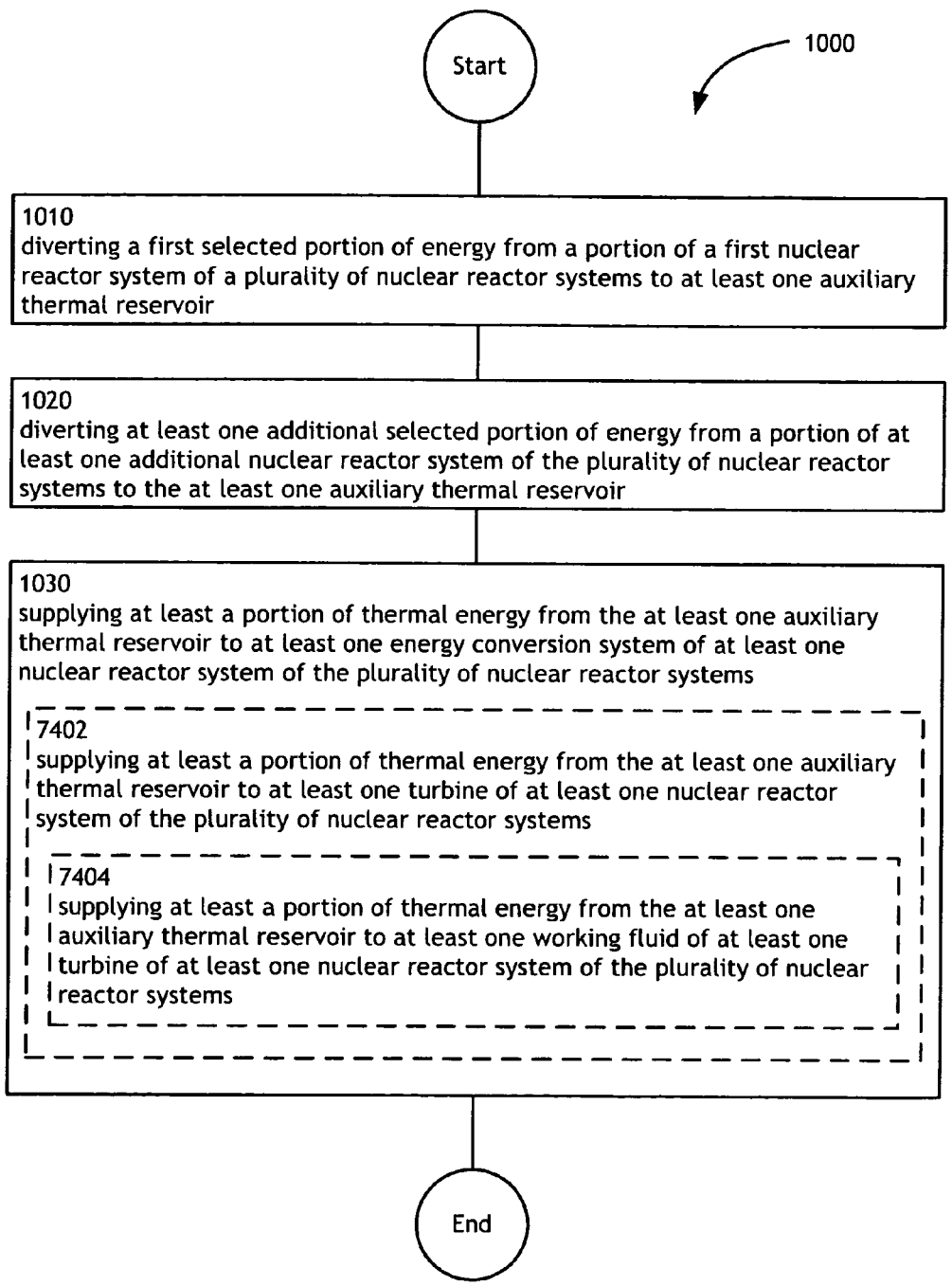
FIG. 74 is a high-level flowchart depicting an alternate implementation of FIG. 10.

FIG. 74 illustrates alternative embodiments of the example operational flow 1000 of FIG. 10. FIG. 74 illustrates example embodiments where the supply operation 1030 may include at least one additional operation. Additional operations may include an operation 7402, and/or an operation 7404.

The operation 7402 illustrates supplying at least a portion of thermal energy from the at least one auxiliary thermal reservoir to at least one turbine of at least one nuclear reactor system of the plurality of nuclear reactor systems. For example, as shown in FIGS. 1 through 9D, a heat supply system 114 may supply a portion of the thermal energy stored in an auxiliary thermal reservoir 112 to a turbine 218 of a nuclear reactor system 106 of the plurality of nuclear reactor systems 102.

Further, the operation 7404 illustrates [supplying at least a portion of thermal energy from the at least one auxiliary thermal reservoir to at least one working fluid of at least one turbine of at least one nuclear reactor system of the plurality of nuclear reactor systems. For example, as shown in FIGS. 1 through 9D, a heat supply system 114 may supply a portion of the thermal energy stored in an auxiliary thermal reservoir 112 to the working fluid of a turbine 224 of a nuclear reactor system 106 of the plurality of nuclear reactor systems 102.

Figure 75:
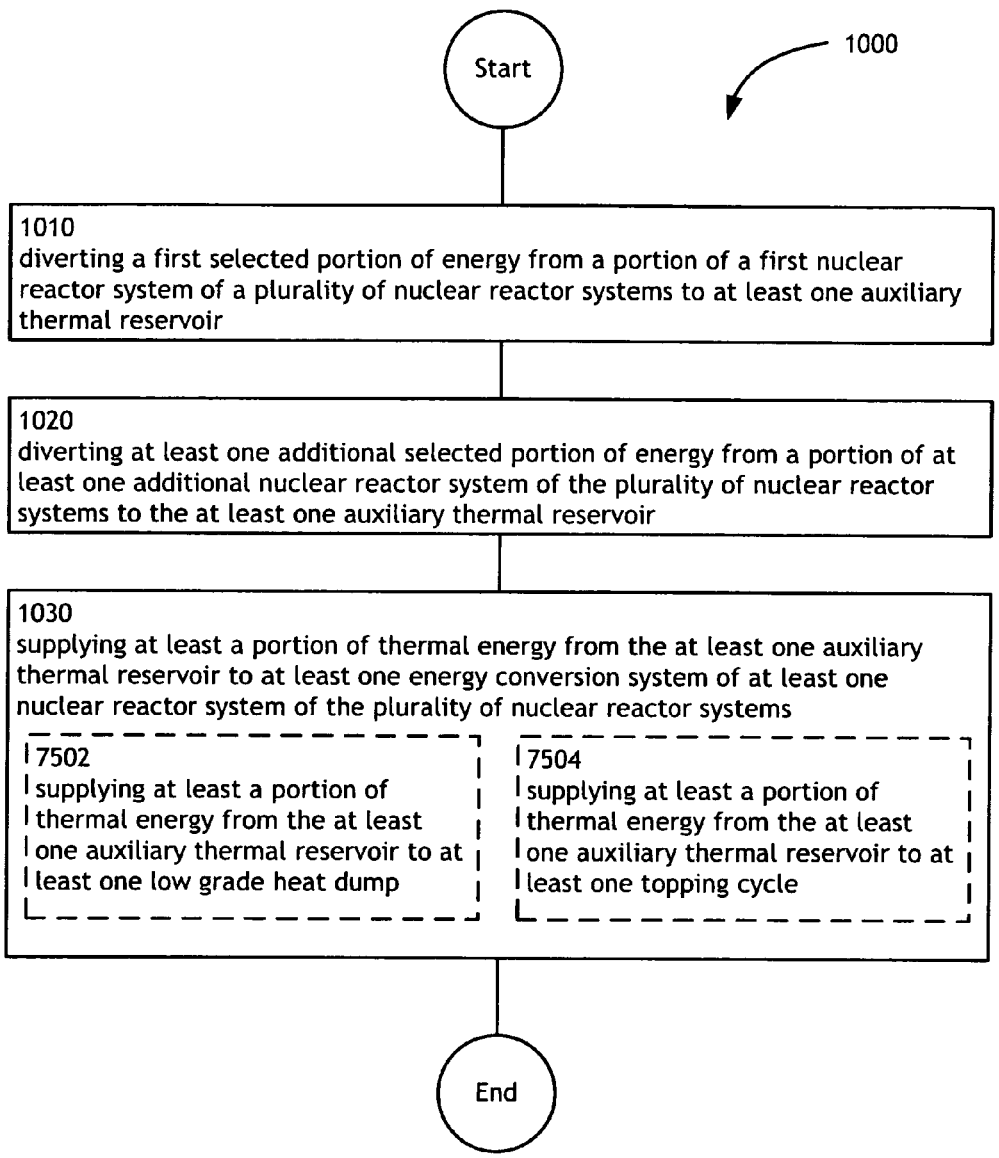
FIG. 75 is a high-level flowchart depicting an alternate implementation of FIG. 10.

FIG. 75 illustrates alternative embodiments of the example operational flow 1000 of FIG. 10. FIG. 75 illustrates example embodiments where the supplying operation 1030 may include at least one additional operation. Additional operations may include an operation 7502, and/or an operation 7504.

The operation 7502 illustrates supplying at least a portion of thermal energy from the at least one auxiliary thermal reservoir to at least one low grade heat dump. For example, as shown in FIGS. 1 through 9D, a heat supply system 114 may supply a portion of the thermal energy stored in an auxiliary thermal reservoir 112 to a low grade heat dump 230 of a nuclear reactor system 106 of the plurality of nuclear reactor systems 102.

The operation 7504 illustrates supplying at least a portion of thermal energy from the at least one auxiliary thermal reservoir to at least one topping cycle. For example, as shown in FIGS. 1 through 9D, a heat supply system 114 may supply a portion of the thermal energy stored in an auxiliary thermal reservoir 112 to a topping cycle 226 of a nuclear reactor system 106 of the plurality of nuclear reactor systems 102.

Figure 76:
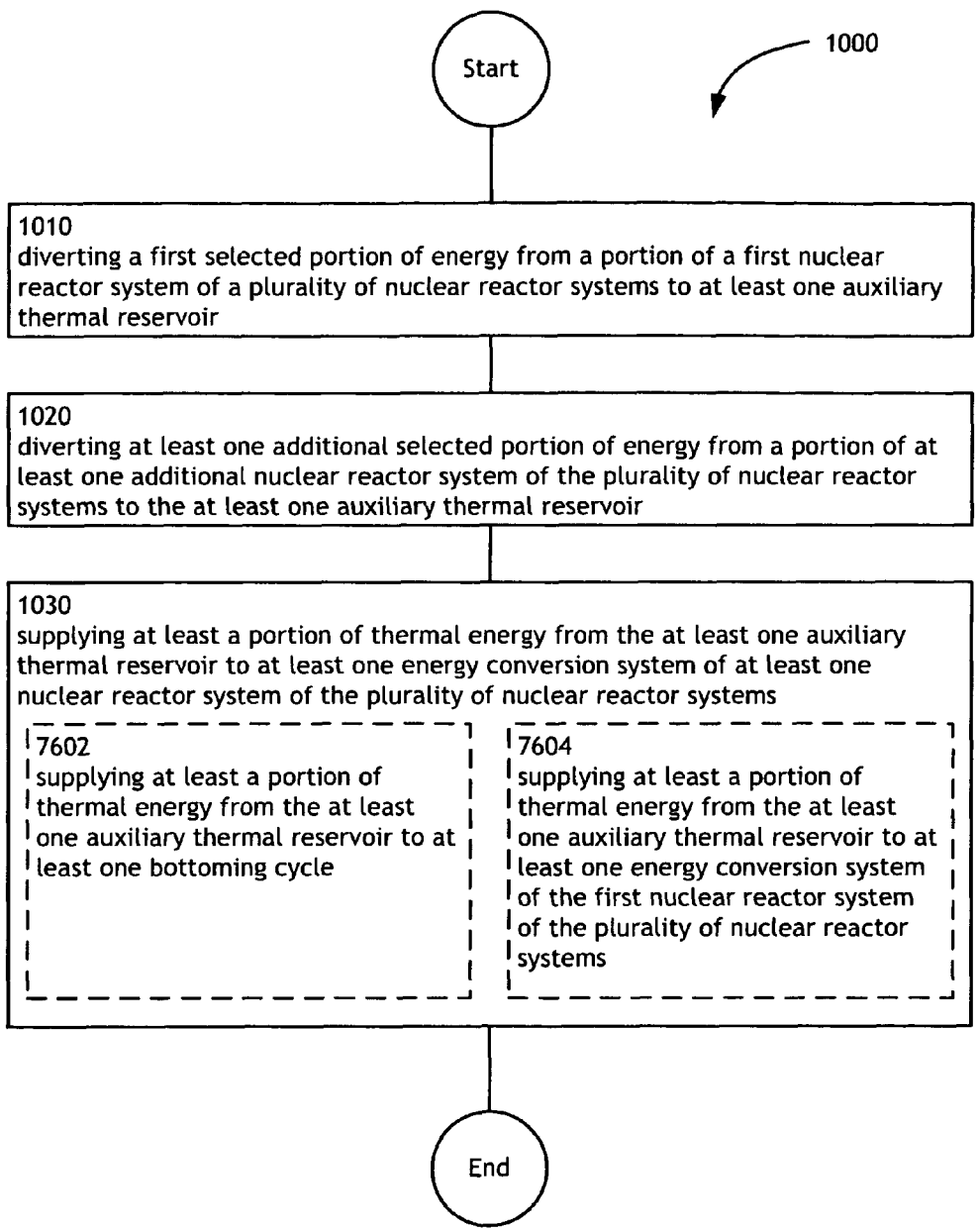
FIG. 76 is a high-level flowchart depicting an alternate implementation of FIG. 10.

FIG. 76 illustrates alternative embodiments of the example operational flow 1000 of FIG. 10. FIG. 76 illustrates example embodiments where the supplying operation 1030 may include at least one additional operation. Additional operations may include an operation 7602, and/or an operation 7604.

The operation 7602 illustrates supplying at least a portion of thermal energy from the at least one auxiliary thermal reservoir to at least one bottoming cycle. For example, as shown in FIGS. 1 through 9D, a heat supply system 114 may supply a portion of the thermal energy stored in an auxiliary thermal reservoir 112 to a bottoming cycle 228 of a nuclear reactor system 106 of the plurality of nuclear reactor systems 102.

The operation 7604 illustrates supplying at least a portion of thermal energy from the at least one auxiliary thermal reservoir to at least one energy conversion system of the first nuclear reactor system of the plurality of nuclear reactor systems. For example, as shown in FIGS. 1 through 9D, a heat supply system 114 may supply a portion of the thermal energy stored in an auxiliary thermal reservoir 112 to an energy conversion system 110 of a first nuclear reactor system 106 of the plurality of nuclear reactor systems 102.

Figure 77:
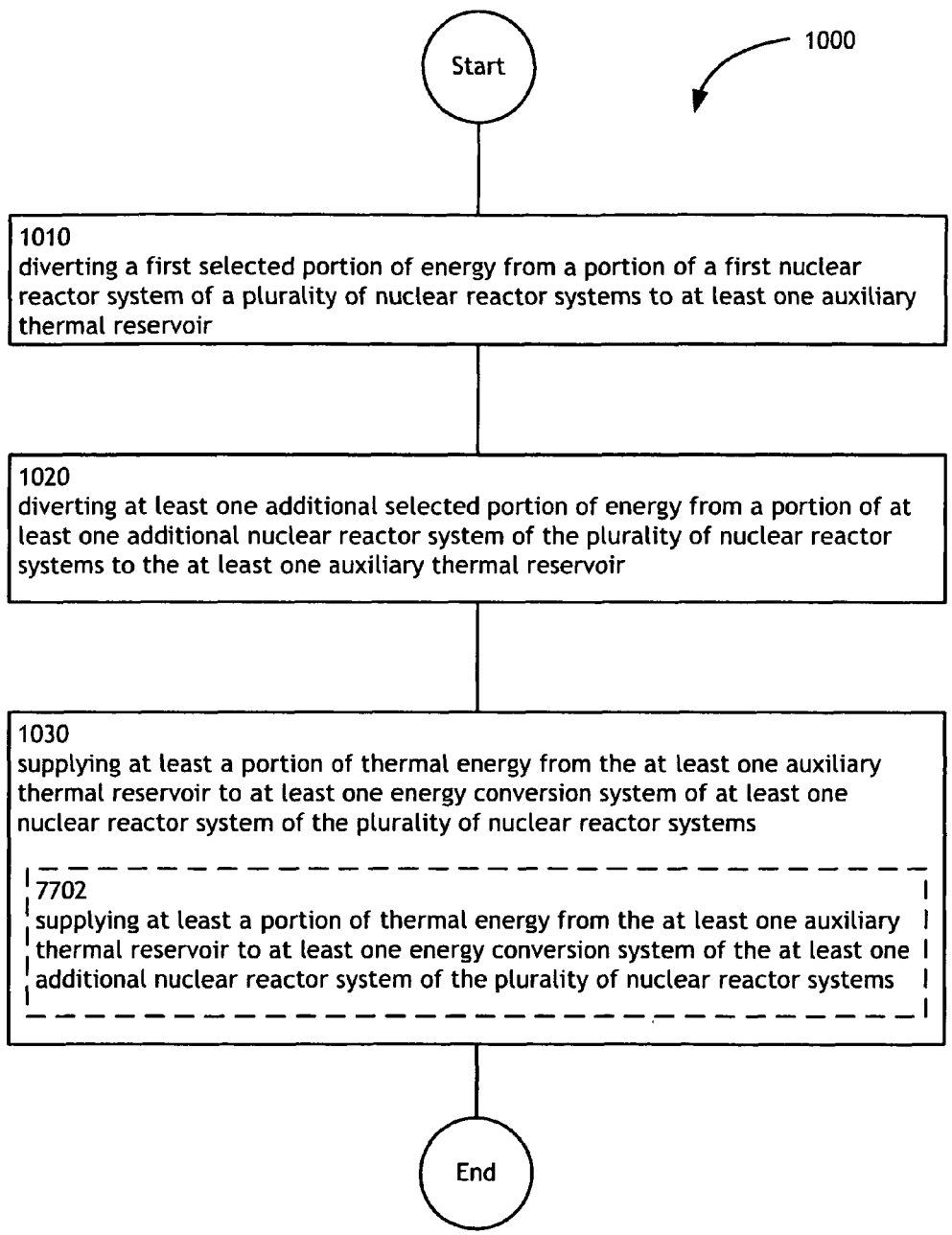
FIG. 77 is a high-level flowchart depicting an alternate implementation of FIG. 10.

FIG. 77 illustrates alternative embodiments of the example operational flow 1000 of FIG. 10. FIG. 77 illustrates example embodiments where the supplying operation 1030 may include at least one additional operation. Additional operations may include an operation 7702.

The operation 7702 illustrates supplying at least a portion of thermal energy from the at least one auxiliary thermal reservoir to at least one energy conversion system of the at least one additional nuclear reactor system of the plurality of nuclear reactor systems. For example, as shown in FIGS. 1 through 9D, a heat supply system 114 may supply a portion of the thermal energy stored in an auxiliary thermal reservoir 112 to an energy conversion system 110 of an additional nuclear reactor system 106 (e.g., a second nuclear reactor system 106, a third nuclear reactor system 106 or up to and including an Nth nuclear reactor system 106) of the plurality of nuclear reactor systems 102.

Figure 78:
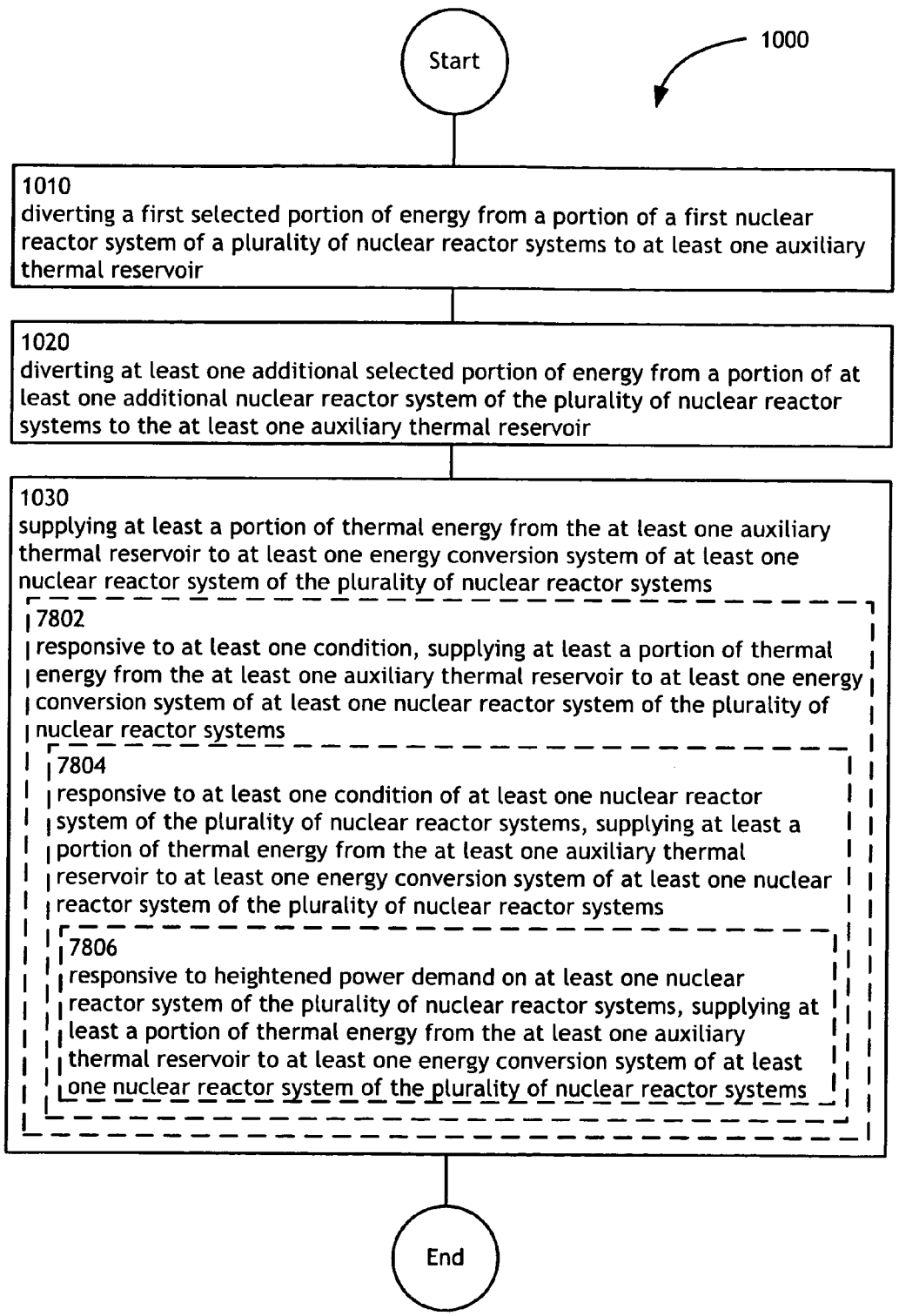
FIG. 78 is a high-level flowchart depicting an alternate implementation of FIG. 10.

FIG. 78 illustrates alternative embodiments of the example operational flow 1000 of FIG. 10. FIG. 78 illustrates example embodiments where the supplying operation 1030 may include at least one additional operation. Additional operations may include an operation 7802, an operation 7804, and/or an operation 7806.

The operation 7802 illustrates, responsive to at least one condition, supplying at least a portion of thermal energy from the at least one auxiliary thermal reservoir to at least one energy conversion system of at least one nuclear reactor system of the plurality of nuclear reactor systems. For example, as shown in FIGS. 1 through 9D, a heat supply system responsive to a condition 902 (e.g., grid demand, thermal properties of one or more of the auxiliary thermal reservoirs) may supply a portion of the thermal energy stored in an auxiliary thermal reservoir 112 to an energy conversion system of a nuclear reactor system 106 of the plurality of nuclear reactor systems 102.

Further, the operation 7804 illustrates, responsive to at least one condition of at least one nuclear reactor system of the plurality of nuclear reactor systems, supplying at least a portion of thermal energy from the at least one auxiliary thermal reservoir to at least one energy conversion system of at least one nuclear reactor system of the plurality of nuclear reactor systems. For example, as shown in FIGS. 1 through 9D, a heat supply system responsive to a condition of one or more of the nuclear reactor systems 904 may supply a portion of the thermal energy stored in an auxiliary thermal reservoir 112 to an energy conversion system of a nuclear reactor system 106 of the plurality of nuclear reactor systems 102.

Further, the operation 7806 illustrates, responsive to heightened power demand on at least one nuclear reactor system of the plurality of nuclear reactor systems, supplying at least a portion of thermal energy from the at least one auxiliary thermal reservoir to at least one energy conversion system of at least one nuclear reactor system of the plurality of nuclear reactor systems. For example, as shown in FIGS. 1 through 9D, a heat supply system responsive to heightened power demand of one or more of the nuclear reactor systems 906 may supply a portion of the thermal energy stored in an auxiliary thermal reservoir 112 to an energy conversion system of a nuclear reactor system 106 of the plurality of nuclear reactor systems 102.

Figure 79:
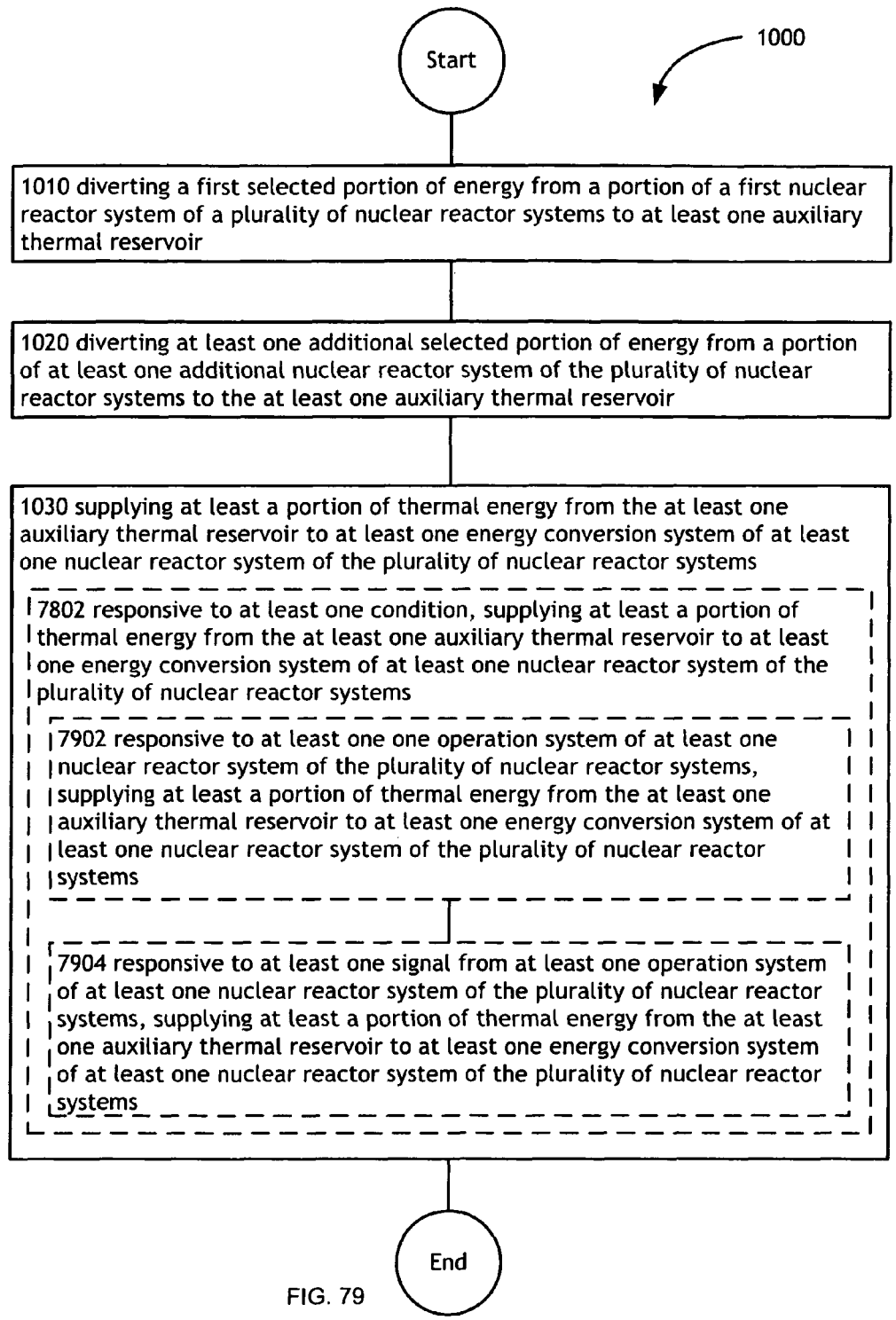
FIG. 79 is a high-level flowchart depicting an alternate implementation of FIG. 10.

FIG. 79 illustrates alternative embodiments of the example operational flow 1000 of FIG. 10. FIG. 79 illustrates example embodiments where the supplying operation 1030 may include at least one additional operation. Additional operations may include an operation 7902, and/or an operation 7904.

Operation 7902 illustrates, responsive to at least one operation system of at least one nuclear reactor system of the plurality of nuclear reactor systems, supplying at least a portion of thermal energy from the at least one auxiliary thermal reservoir to at least one energy conversion system of at least one nuclear reactor system of the plurality of nuclear reactor systems. For example, as shown in FIGS. 1 through 9D, a heat supply system responsive to an operation system (e.g., monitoring system, control system, safety system, or security system) of a nuclear reactor system 922 may supply a portion of the thermal energy stored in an auxiliary thermal reservoir 112 to an energy conversion system 110 of a nuclear reactor system 106 of the plurality of nuclear reactor systems 102.

Further, the operation 7904 illustrates, responsive to at least one signal from at least one operation system of at least one nuclear reactor system of the plurality of nuclear reactor systems, supplying at least a portion of thermal energy from the at least one auxiliary thermal reservoir to at least one energy conversion system of at least one nuclear reactor system of the plurality of nuclear reactor systems. For example, as shown in FIGS. 1 through 9D, a heat supply system responsive to a signal (e.g., wireless or wireline) from an operation system of a nuclear reactor system 924 may supply a portion of the thermal energy stored in an auxiliary thermal reservoir 112 to an energy conversion system 110 of a nuclear reactor system 106 of the plurality of nuclear reactor systems 102.

Figure 80:
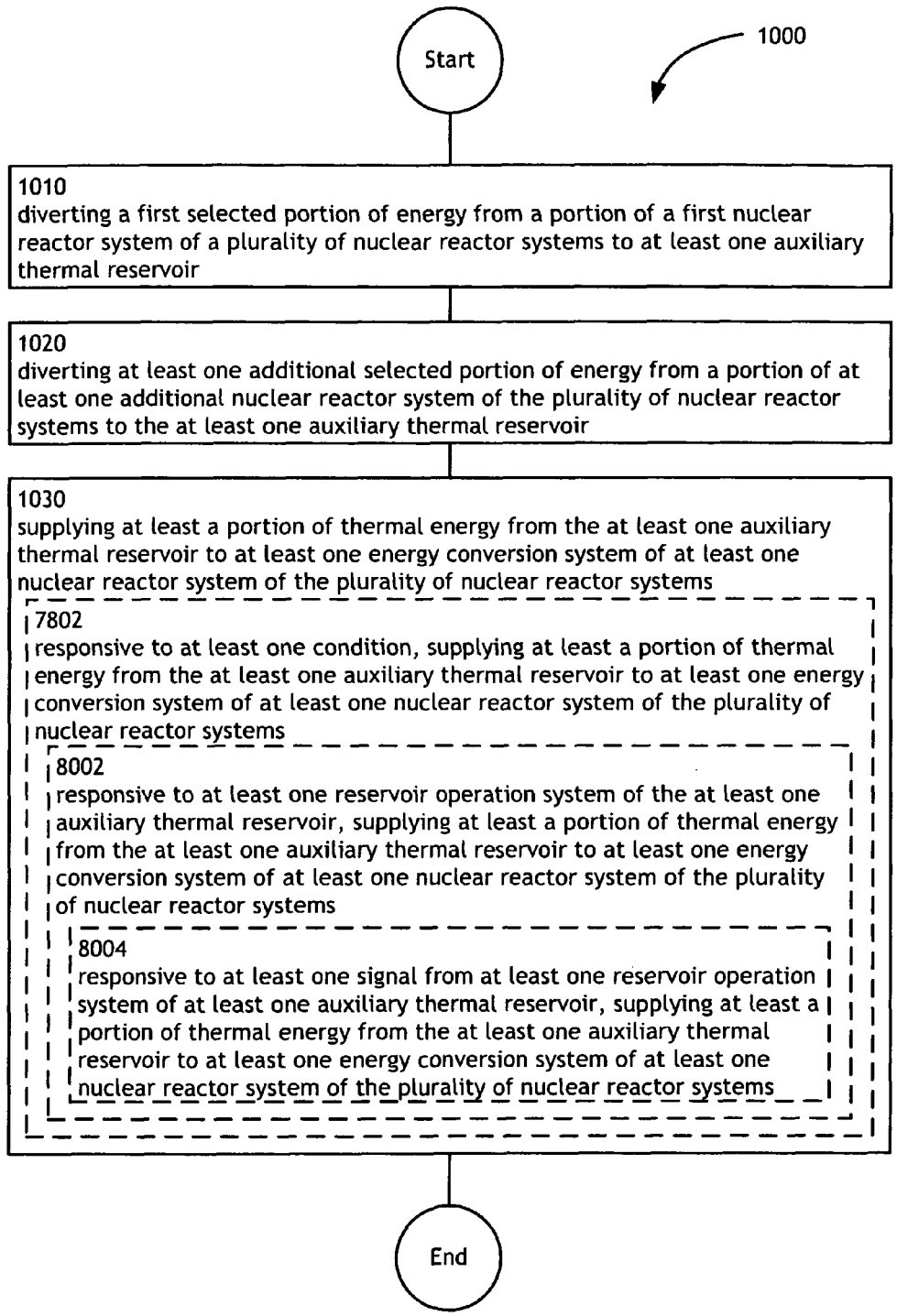
FIG. 80 is a high-level flowchart depicting an alternate implementation of FIG. 10.

FIG. 80 illustrates alternative embodiments of the example operational flow 1000 of FIG. 10. FIG. 80 illustrates example embodiments where the supplying operation 1030 may include at least one additional operation. Additional operations may include an operation 8002, and/or an operation 8004.

Operation 8002 illustrates, responsive to at least one reservoir operation system of the at least one auxiliary thermal reservoir, supplying at least a portion of thermal energy from the at least one auxiliary thermal reservoir to at least one energy conversion system of at least one nuclear reactor system of the plurality of nuclear reactor systems. For example, as shown in FIGS. 1 through 9D, a heat supply system responsive to a reservoir operation system 926 (e.g., reservoir monitoring system, reservoir control system, or reservoir safety system) may supply a portion of the thermal energy stored in an auxiliary thermal reservoir 112 to an energy conversion system 110 of a nuclear reactor system 106 of the plurality of nuclear reactor systems 102.

Further, the operation 8004 illustrates responsive to at least one signal from at least one reservoir operation system of at least one auxiliary thermal reservoir, supplying at least a portion of thermal energy from the at least one auxiliary thermal reservoir to at least one energy conversion system of at least one nuclear reactor system of the plurality of nuclear reactor systems. For example, as shown in FIGS. 1 through 9D, a heat supply system responsive to a signal (e.g., wireless or wireline) from a reservoir operation system 928 may supply a portion of the thermal energy stored in an auxiliary thermal reservoir 112 to an energy conversion system 110 of a nuclear reactor system 106 of the plurality of nuclear reactor systems 102.

Figure 81:
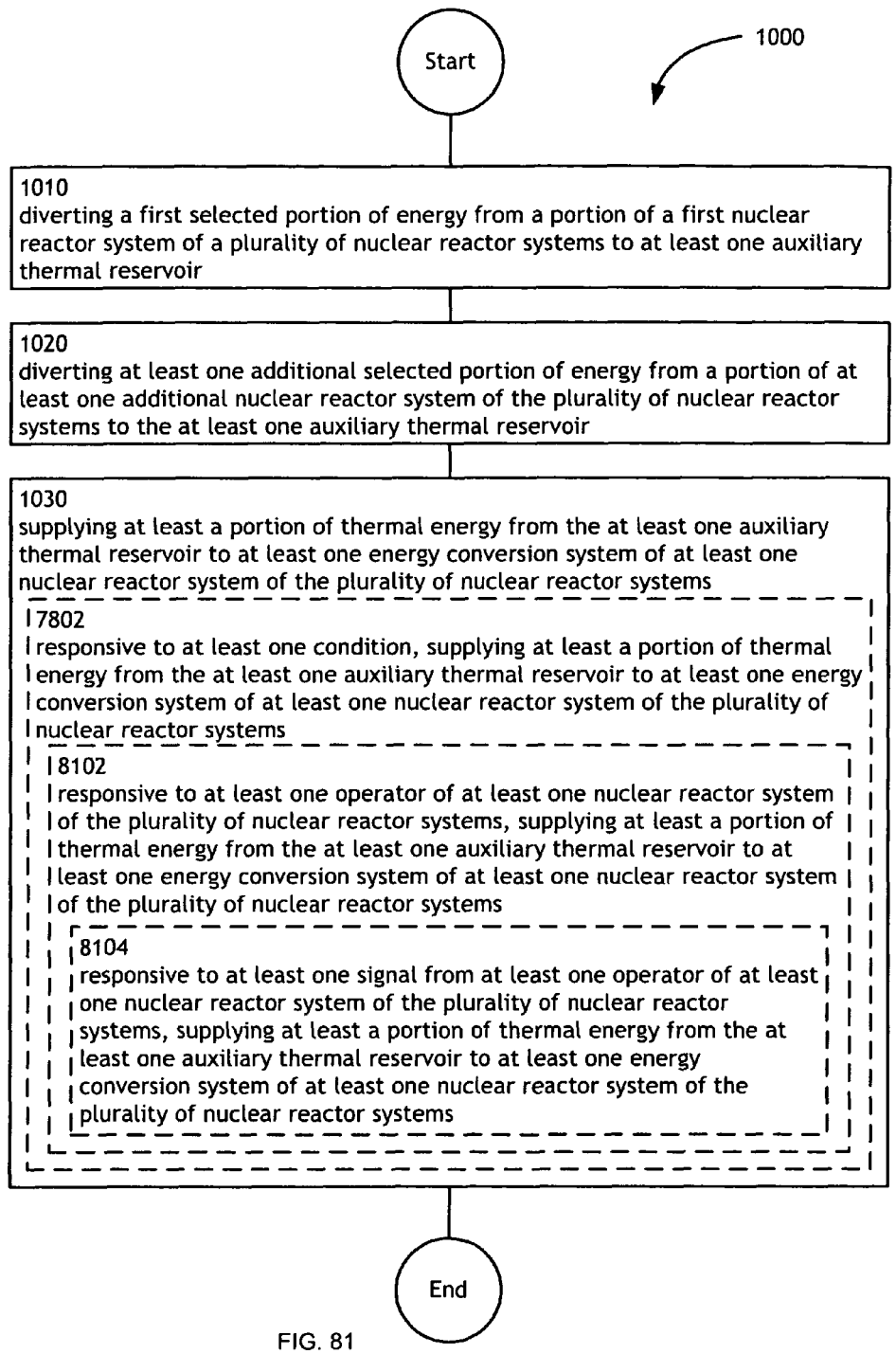
FIG. 81 is a high-level flowchart depicting an alternate implementation of FIG. 10.

FIG. 81 illustrates alternative embodiments of the example operational flow 1000 of FIG. 10. FIG. 81 illustrates example embodiments where the supplying operation 1030 may include at least one additional operation. Additional operations may include an operation 8102, and/or an operation 8104.

Operation 8102 illustrates, responsive to at least one operator of at least one nuclear reactor system of the plurality of nuclear reactor systems, supplying at least a portion of thermal energy from the at least one auxiliary thermal reservoir to at least one energy conversion system of at least one nuclear reactor system of the plurality of nuclear reactor systems. For example, as shown in FIGS. 1 through 9D, a heat supply system responsive to an operator (e.g., human or human programmed computer control system) of a nuclear reactor system of the plurality of nuclear reactor systems 930 may supply a portion of the thermal energy stored in an auxiliary thermal reservoir 112 to an energy conversion system 110 of a nuclear reactor system 106 of the plurality of nuclear reactor systems 102.

Further, the operation 8104 illustrates responsive to at least one signal from at least one operator of at least one nuclear reactor system of the plurality of nuclear reactor systems, supplying at least a portion of thermal energy from the at least one auxiliary thermal reservoir to at least one energy conversion system of at least one nuclear reactor system of the plurality of nuclear reactor systems. For example, as shown in FIGS. 1 through 9D, a heat supply system responsive to a signal from an operator of a nuclear reactor system of the plurality of nuclear reactor systems 932 may supply a portion of the thermal energy stored in an auxiliary thermal reservoir 112 to an energy conversion system 110 of a nuclear reactor system 106 of the plurality of nuclear reactor systems 102.

Figure 82:
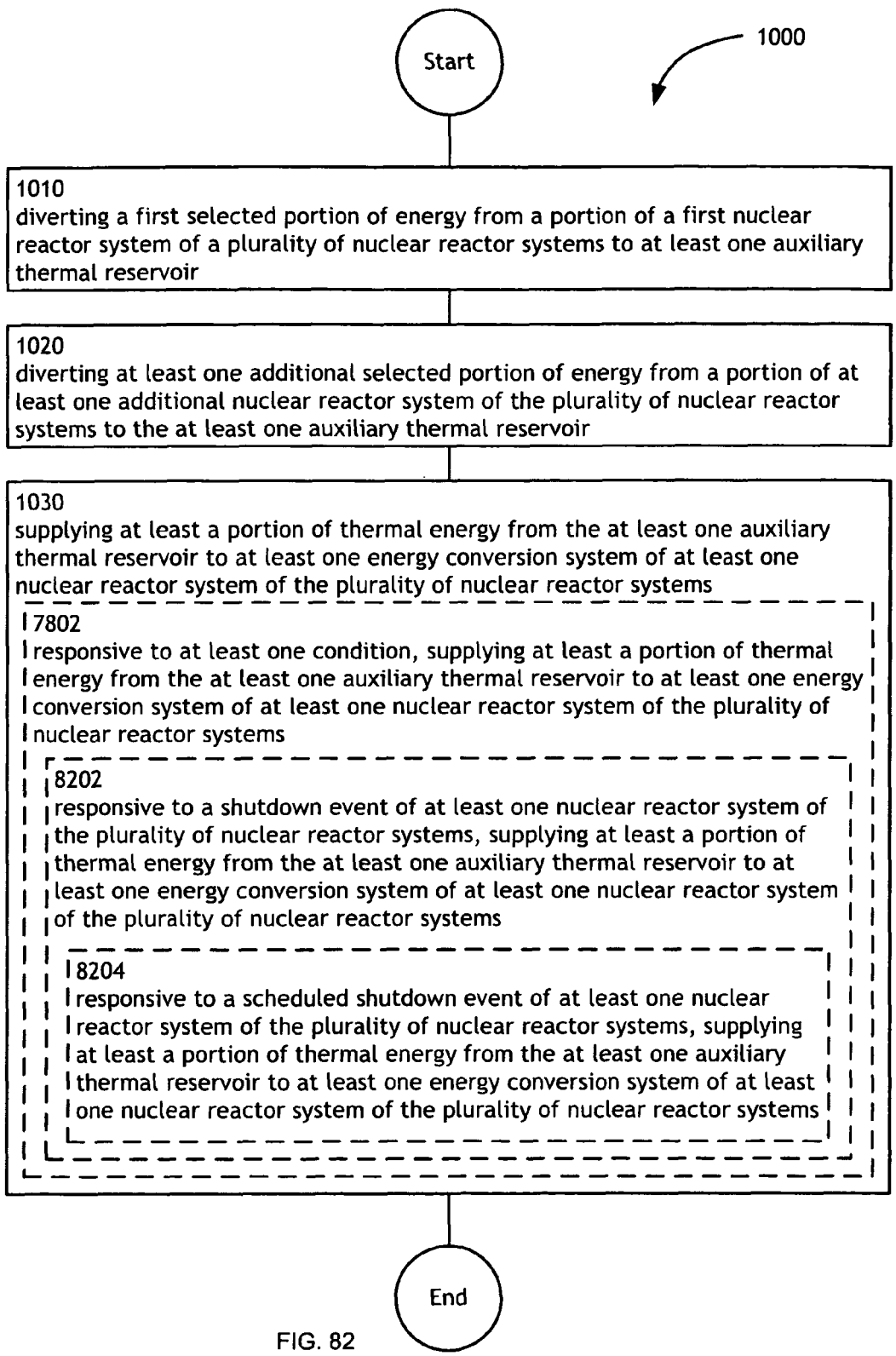
FIG. 82 is a high-level flowchart depicting an alternate implementation of FIG. 10.

FIG. 82 illustrates alternative embodiments of the example operational flow 1000 of FIG. 10. FIG. 82 illustrates example embodiments where the supplying operation 1030 may include at least one additional operation. Additional operations may include an operation 8202, and/or an operation 8204.

Operation 8202 illustrates, responsive to a shutdown event of at least one nuclear reactor system of the plurality of nuclear reactor systems, supplying at least a portion of thermal energy from the at least one auxiliary thermal reservoir to at least one energy conversion system of at least one nuclear reactor system of the plurality of nuclear reactor systems. For example, as shown in FIGS. 1 through 9D, a heat supply system responsive to a shutdown event of a nuclear reactor system of the plurality of nuclear reactor systems 908 may supply a portion of the thermal energy stored in an auxiliary thermal reservoir 112 to an energy conversion system 110 of a nuclear reactor system 106 of the plurality of nuclear reactor systems 102.

Further, the operation 8204 illustrates, responsive to a scheduled shutdown event of at least one nuclear reactor system of the plurality of nuclear reactor systems, supplying at least a portion of thermal energy from the at least one auxiliary thermal reservoir to at least one energy conversion system of at least one nuclear reactor system of the plurality of nuclear reactor systems. For example, as shown in FIGS. 1 through 9D, a heat supply system responsive to a scheduled shutdown event (e.g., shutdown for routine maintenance) of a nuclear reactor system of the plurality of nuclear reactor systems 912 may supply a portion of the thermal energy stored in an auxiliary thermal reservoir 112 to an energy conversion system 110 of a nuclear reactor system 106 of the plurality of nuclear reactor systems 102.

Figure 83:
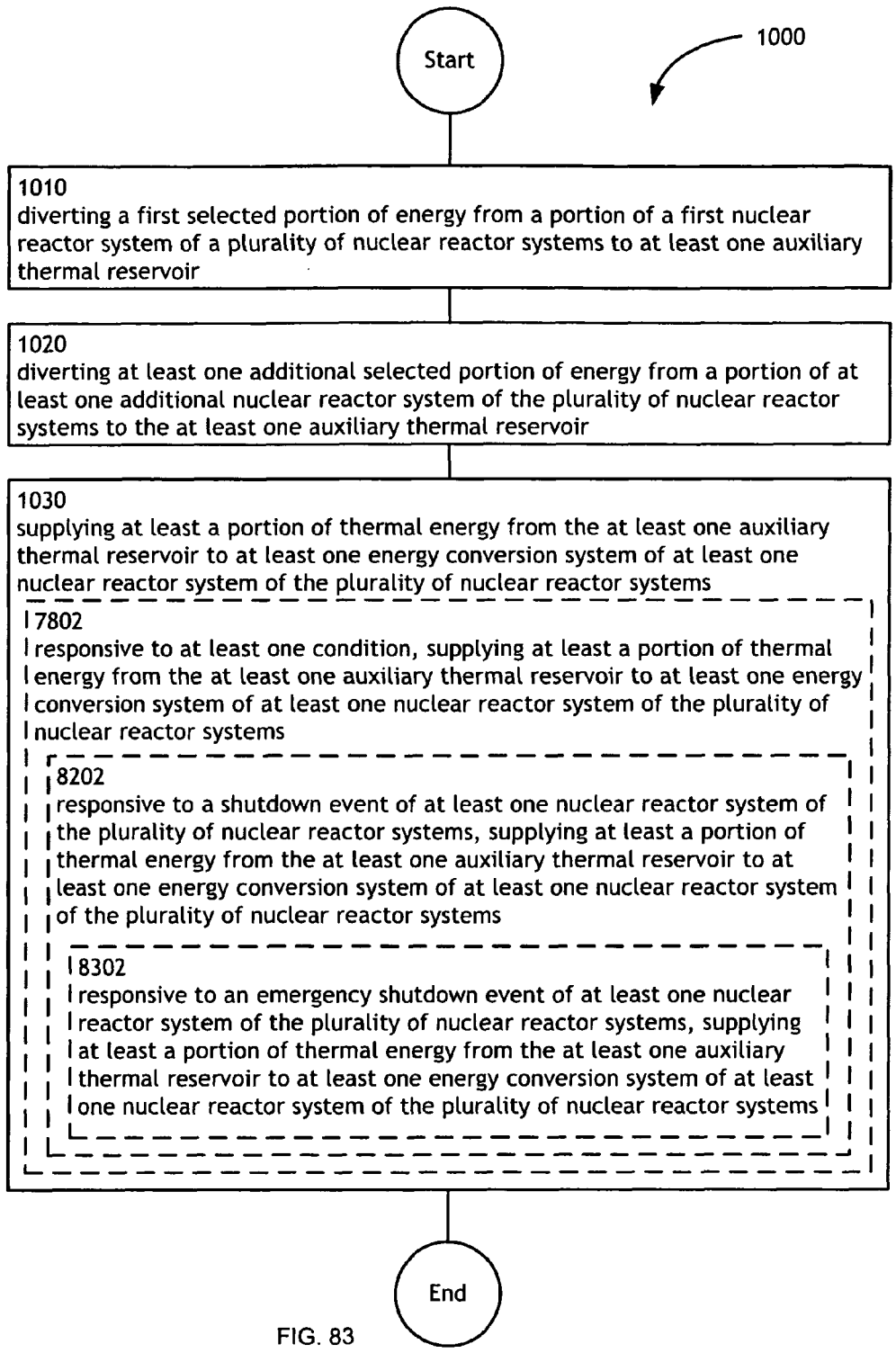
FIG. 83 is a high-level flowchart depicting an alternate implementation of FIG. 10.

FIG. 83 illustrates alternative embodiments of the example operational flow 1000 of FIG. 10. FIG. 83 illustrates example embodiments where the supplying operation 1030 may include at least one additional operation. Additional operations may include an operation 8302.

Operation 8302 illustrates, responsive to an emergency shutdown event of at least one nuclear reactor system of the plurality of nuclear reactor systems, supplying at least a portion of thermal energy from the at least one auxiliary thermal reservoir to at least one energy conversion system of at least one nuclear reactor system of the plurality of nuclear reactor systems. For example, as shown in FIGS. 1 through 9D, a heat supply system responsive to an emergency shutdown event (e.g., SCRAM) of a nuclear reactor system of the plurality of nuclear reactor systems 910 may supply a portion of the thermal energy stored in an auxiliary thermal reservoir 112 to an energy conversion system 110 of a nuclear reactor system 106 of the plurality of nuclear reactor systems 102.

Figure 84:
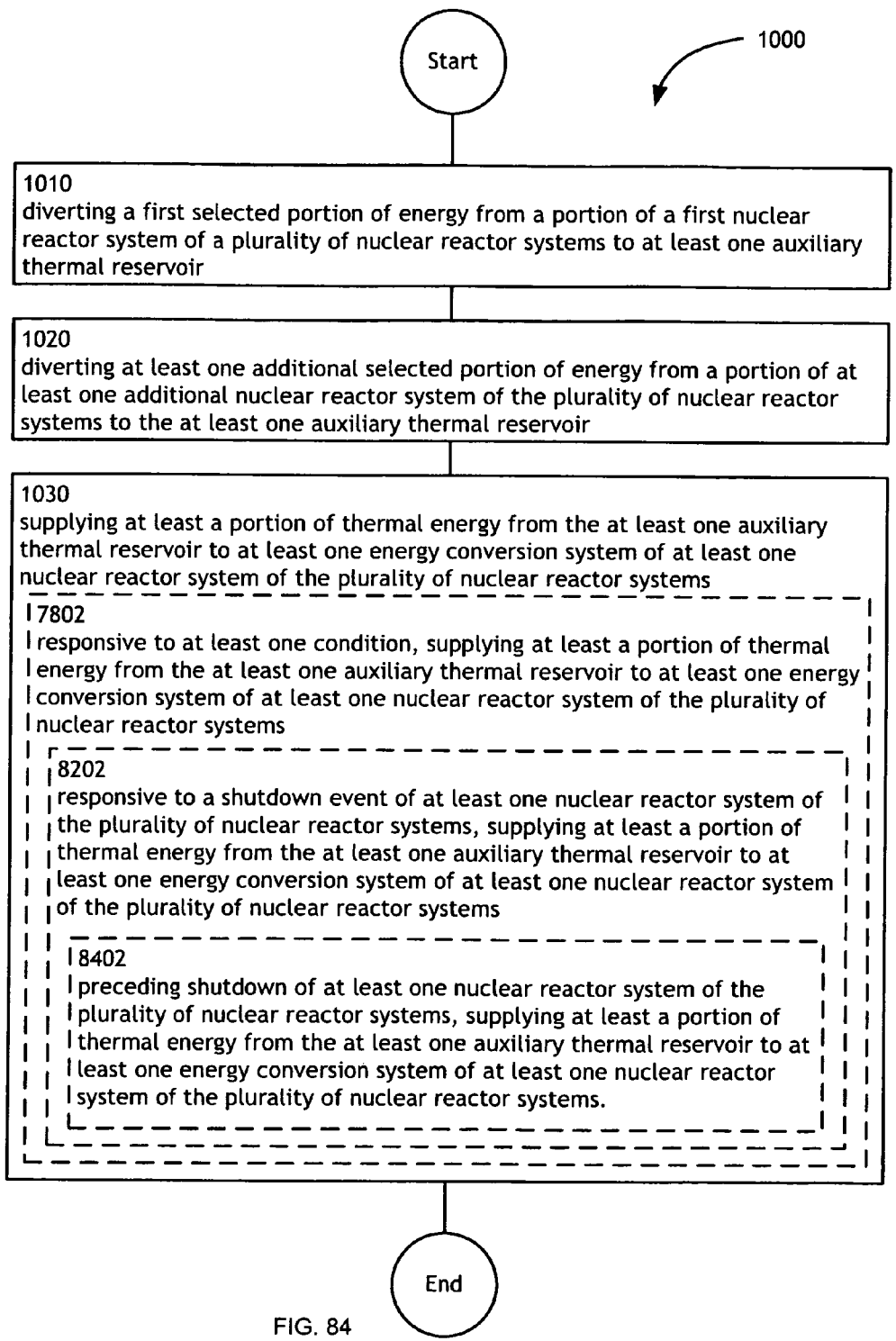
FIG. 84 is a high-level flowchart depicting an alternate implementation of FIG. 10.

FIG. 84 illustrates alternative embodiments of the example operational flow 1000 of FIG. 10. FIG. 84 illustrates example embodiments where the supplying operation 1030 may include at least one additional operation. Additional operations may include an operation 8402.

Operation 8402 illustrates, preceding shutdown of at least one nuclear reactor system of the plurality of nuclear reactor systems, supplying at least a portion of thermal energy from the at least one auxiliary thermal reservoir to at least one energy conversion system of at least one nuclear reactor system of the plurality of nuclear reactor systems. For example, as shown in FIGS. 1 through 9D, preceding the shutdown of a nuclear reactor system 106, a heat supply system responsive to a shutdown event of a nuclear reactor system of the plurality of nuclear reactor systems 908 may supply a portion of the thermal energy stored in an auxiliary thermal reservoir 112 to an energy conversion system 110 of a nuclear reactor system 106 of the plurality of nuclear reactor systems 102.

Figure 85:
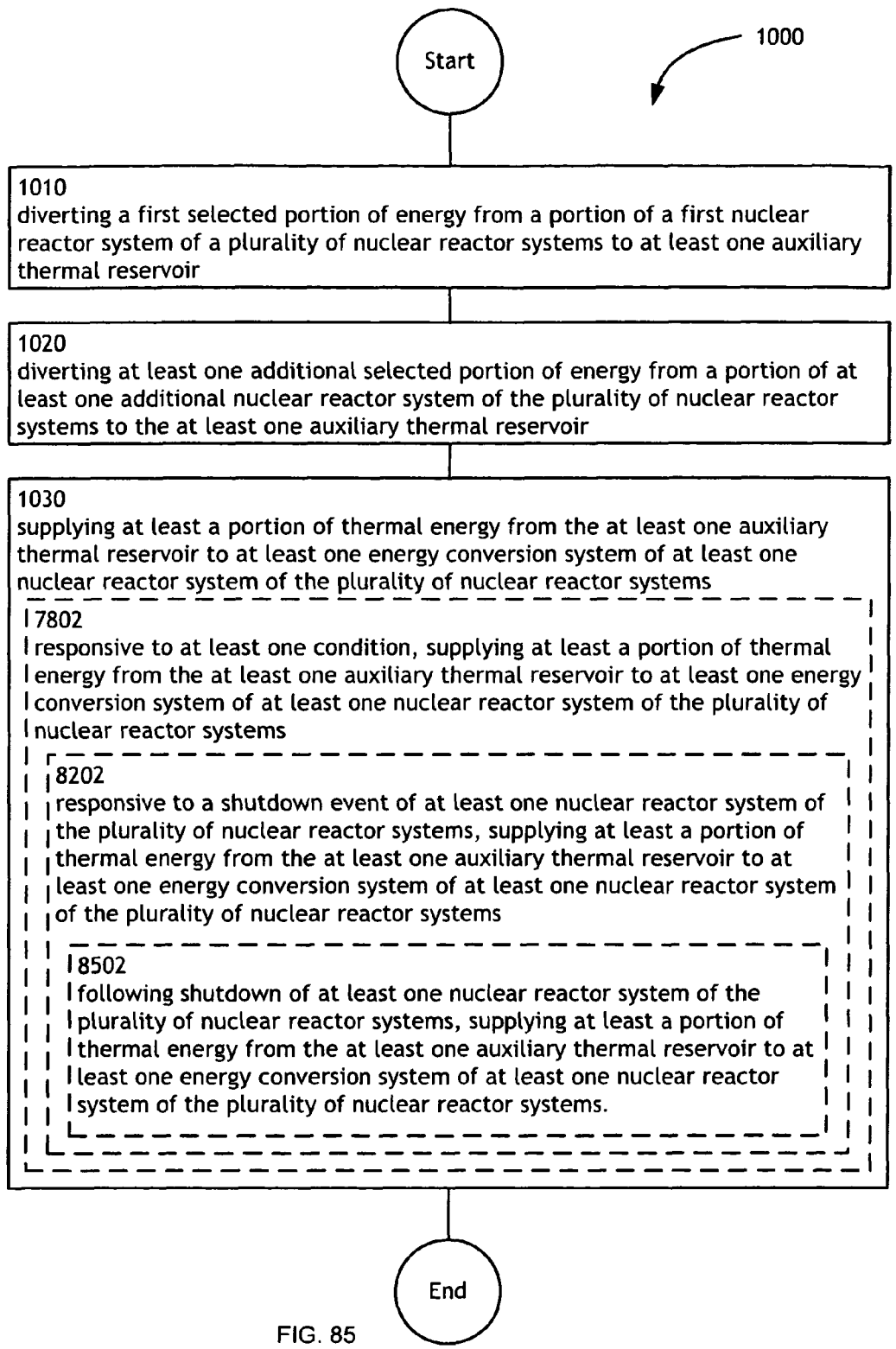
FIG. 85 is a high-level flowchart depicting an alternate implementation of FIG. 10.

FIG. 85 illustrates alternative embodiments of the example operational flow 1000 of FIG. 10. FIG. 85 illustrates example embodiments where the supplying operation 1030 may include at least one additional operation. Additional operations may include an operation 8502.

Operation 8502 illustrates, following shutdown of at least one nuclear reactor system of the plurality of nuclear reactor systems, supplying at least a portion of thermal energy from the at least one auxiliary thermal reservoir to at least one energy conversion system of at least one nuclear reactor system of the plurality of nuclear reactor systems. For example, as shown in FIGS. 1 through 9D, following the shutdown of a nuclear reactor system 106, a heat supply system responsive to a shutdown event of a nuclear reactor system of the plurality of nuclear reactor systems 908 may supply a portion of the thermal energy stored in an auxiliary thermal reservoir 112 to an energy conversion system 110 of a nuclear reactor system 106 of the plurality of nuclear reactor systems 102.

Figure 86A:
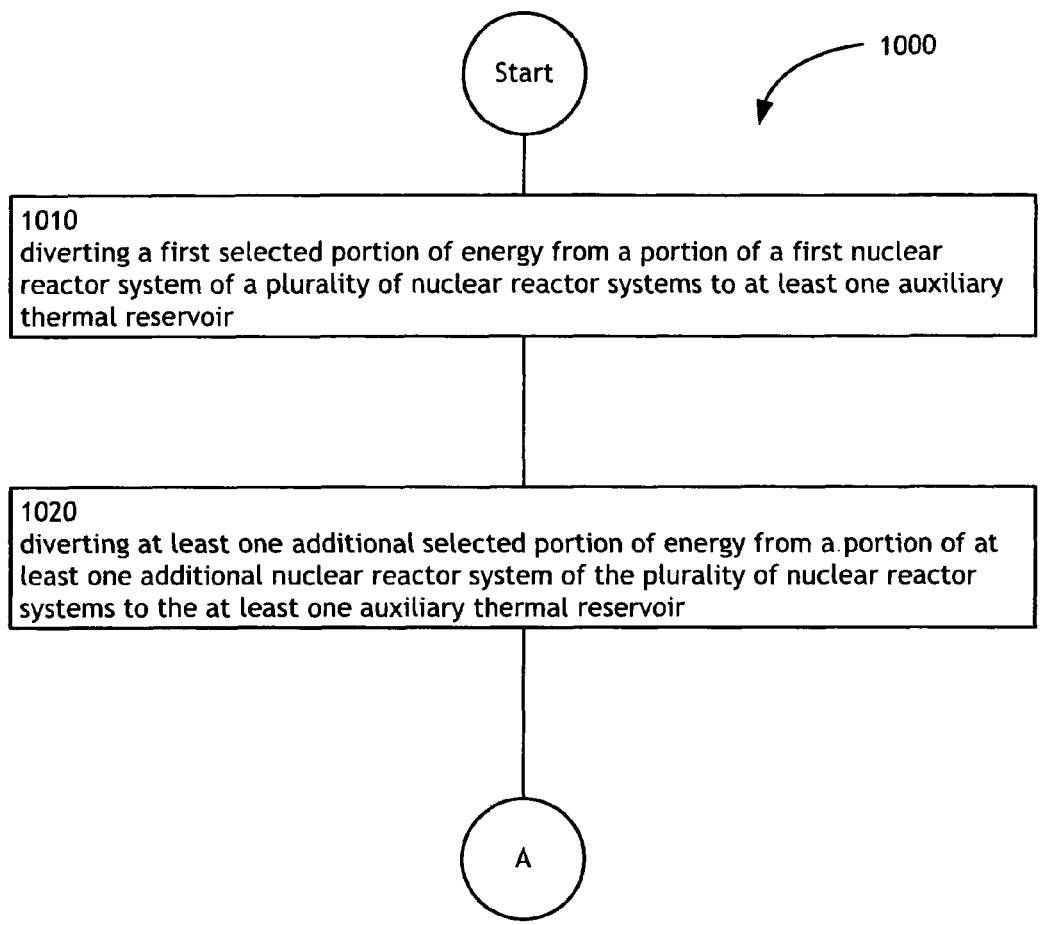
FIG. 86A is a high-level flowchart depicting an alternate implementation of FIG. 10.

FIGS. 86A and 86B illustrate alternative embodiments of the example operational flow 1000 of FIG. 10. FIG. 86 illustrates example embodiments where the supplying operation 1030 may include at least one additional operation. Additional operations may include an operation 8602, an operation 8604, an operation 8606, and/or an operation 8608.

Operation 8602 illustrates, responsive to a shutdown event established by at least one operation system of at least one nuclear reactor system of the plurality of nuclear reactor systems, supplying at least a portion of thermal energy from the at least one auxiliary thermal reservoir to at least one energy conversion system of at least one nuclear reactor system of the plurality of nuclear reactor systems. For example, as shown in FIGS. 1 through 9D, a heat supply system responsive to a shutdown event of a nuclear reactor system of the plurality of nuclear reactor systems established by an operation system of a nuclear reactor system 914 may supply a portion of the thermal energy stored in an auxiliary thermal reservoir 112 to an energy conversion system 110 of a nuclear reactor system 106 of the plurality of nuclear reactor systems 102.

Further, the operation 8604 illustrates, responsive to a shutdown event established by at least one reactor control system of at least one nuclear reactor system of the plurality of nuclear reactor systems, supplying at least a portion of thermal energy from the at least one auxiliary thermal reservoir to at least one energy conversion system of at least one nuclear reactor system of the plurality of nuclear reactor systems. For example, as shown in FIGS. 1 through 9D, a heat supply system responsive to a shutdown event of a nuclear reactor system of the plurality of nuclear reactor systems established by a reactor control system of a nuclear reactor system 916 may supply a portion of the thermal energy stored in an auxiliary thermal reservoir 112 to an energy conversion system 110 of a nuclear reactor system 106 of the plurality of nuclear reactor systems 102.

Further, the operation 8606 illustrates, responsive to a shutdown event established by at least one reactor control system responsive to at least one signal from at least one safety system of at least one nuclear reactor system of the plurality of nuclear reactor systems, supplying at least a portion of thermal energy from the at least one auxiliary thermal reservoir to at least one energy conversion system of at least one nuclear reactor system of the plurality of nuclear reactor systems. For example, as shown in FIGS. 1 through 9D, a heat supply system responsive to a shutdown event of a nuclear reactor system of the plurality of nuclear reactor systems established by a reactor control system that is responsive to a safety system of a nuclear reactor system 918 may supply a portion of the thermal energy stored in an auxiliary thermal reservoir 112 to an energy conversion system 110 of a nuclear reactor system 106 of the plurality of nuclear reactor systems 102.

Further, the operation 8608 illustrates, responsive to a shutdown event established by at least one reactor control system responsive to at least one signal from at least one safety system of at least one nuclear reactor system of the plurality of nuclear reactor systems, the safety system responsive to at least one sensed condition, supplying at least a portion of thermal energy from the at least one auxiliary thermal reservoir to at least one energy conversion system of at least one nuclear reactor system of the plurality of nuclear reactor systems. For example, as shown in FIGS. 1 through 9D, a heat supply system 920 responsive to a shutdown event of a nuclear reactor system established by a reactor control system that is responsive to a safety system, where the safety system is responsive to a sensed condition (e.g., external condition or internal condition) of a nuclear reactor system, may supply a portion of the thermal energy stored in an auxiliary thermal reservoir 112 to an energy conversion system 110 of a nuclear reactor system 106 of the plurality of nuclear reactor systems 102.

Figure 87:
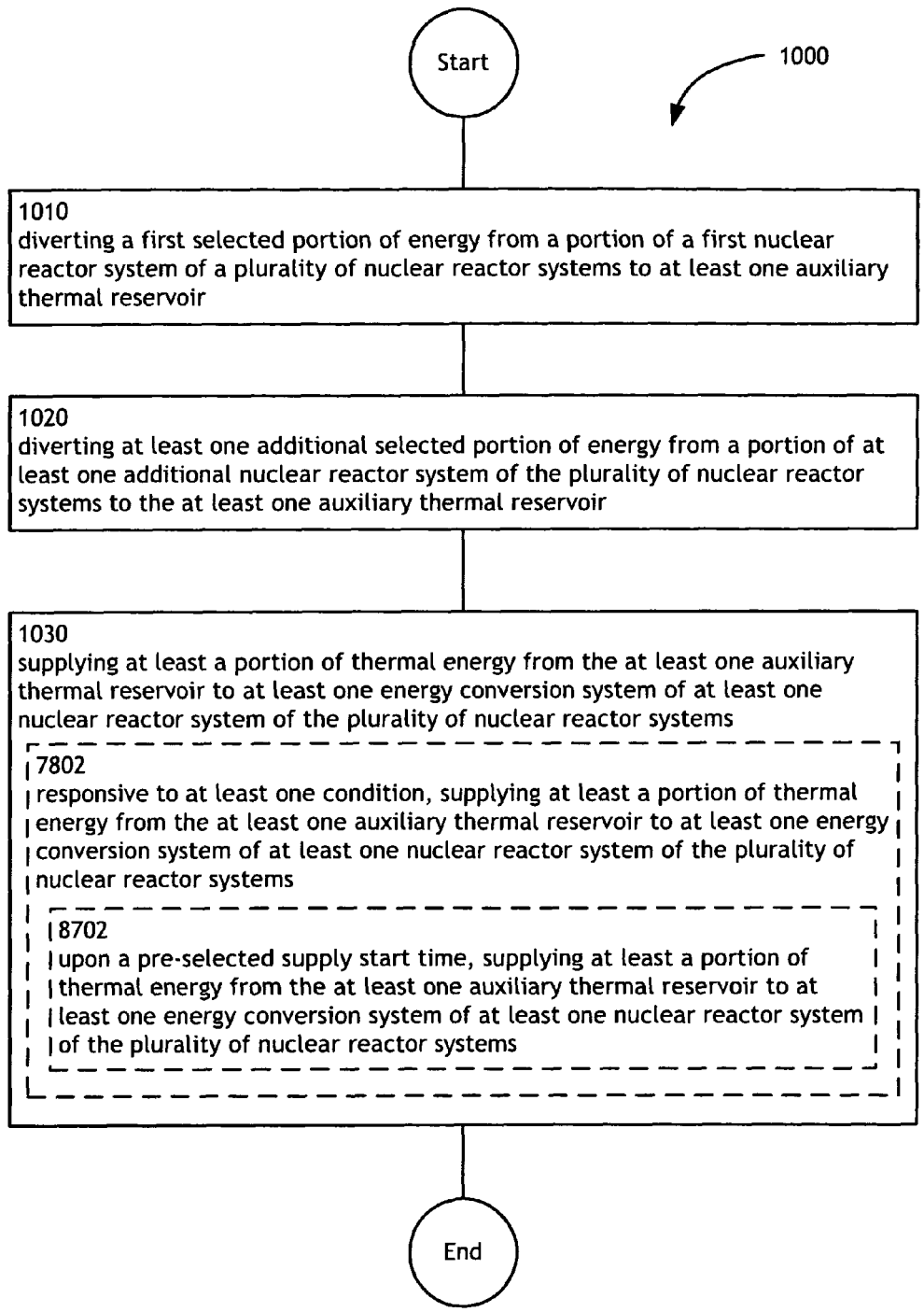
FIG. 87 is a high-level flowchart depicting an alternate implementation of FIG. 10.

FIG. 87 illustrates alternative embodiments of the example operational flow 1000 of FIG. 10. FIG. 87 illustrates example embodiments where the supplying operation 1030 may include at least one additional operation. Additional operations may include an operation 8702.

Operation 8702 illustrates, upon a pre-selected supply start time, supplying at least a portion of thermal energy from the at least one auxiliary thermal reservoir to at least one energy conversion system of at least one nuclear reactor system of the plurality of nuclear reactor systems. For example, as shown in FIGS. 1 through 9D, a heat supply system responsive to the elapse of a preselected supply start time 934 (e.g., time of elapse measured relative to the initiation of a nuclear reactor system or system shutdown event or absolute time) may supply a portion of the thermal energy stored in an auxiliary thermal reservoir 112 to an energy conversion system 110 of a nuclear reactor system 106 of the plurality of nuclear reactor systems 102.

Figure 88:
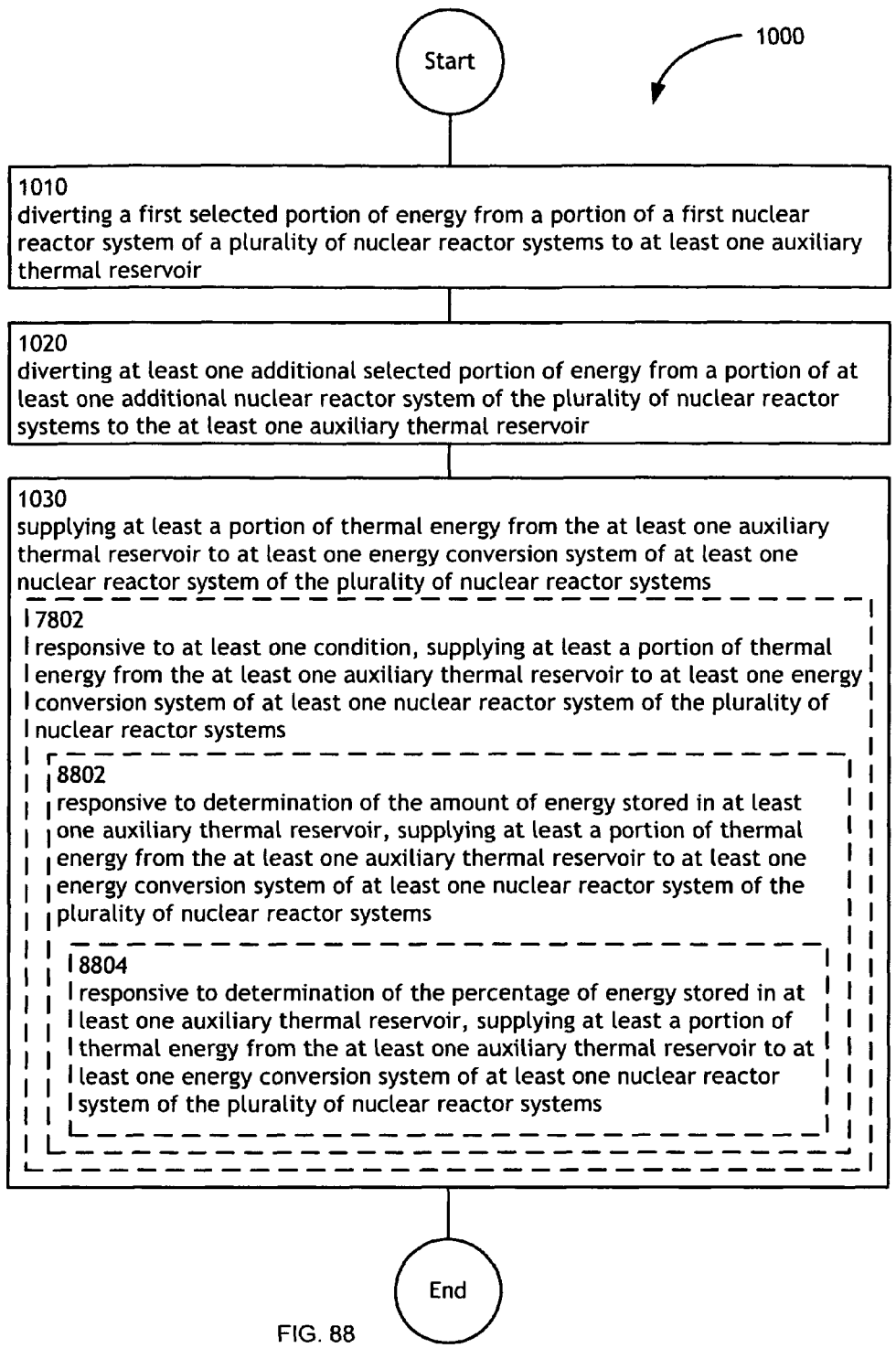
FIG. 88 is a high-level flowchart depicting an alternate implementation of FIG. 10.

FIG. 88 illustrates alternative embodiments of the example operational flow 1000 of FIG. 10. FIG. 88 illustrates example embodiments where the supplying operation 1030 may include at least one additional operation. Additional operations may include an operation 8802, and/or an operation 8804.

Further, the operation 8802 illustrates, responsive to determination of the amount of energy stored in at least one auxiliary thermal reservoir, supplying at least a portion of thermal energy from the at least one auxiliary thermal reservoir to at least one energy conversion system of at least one nuclear reactor system of the plurality of nuclear reactor systems. For example, as shown in FIGS. 1 through 9D, a heat supply system responsive to determination of the amount of energy stored in an auxiliary thermal reservoir 936 may supply a portion of the thermal energy stored in an auxiliary thermal reservoir 112 to an energy conversion system 110 of a nuclear reactor system 106 of the plurality of nuclear reactor systems 102.

Further, the operation 8804 illustrates, responsive to determination of the percentage of energy stored in at least one auxiliary thermal reservoir, supplying at least a portion of thermal energy from the at least one auxiliary thermal reservoir to at least one energy conversion system of at least one nuclear reactor system of the plurality of nuclear reactor systems. For example, as shown in FIGS. 1 through 9D, a heat supply system responsive to determination of the percentage of energy stored in an auxiliary thermal reservoir 938 may supply a portion of the thermal energy stored in an auxiliary thermal reservoir 112 to an energy conversion system 110 of a nuclear reactor system 106 of the plurality of nuclear reactor systems 102.

Figure 89:
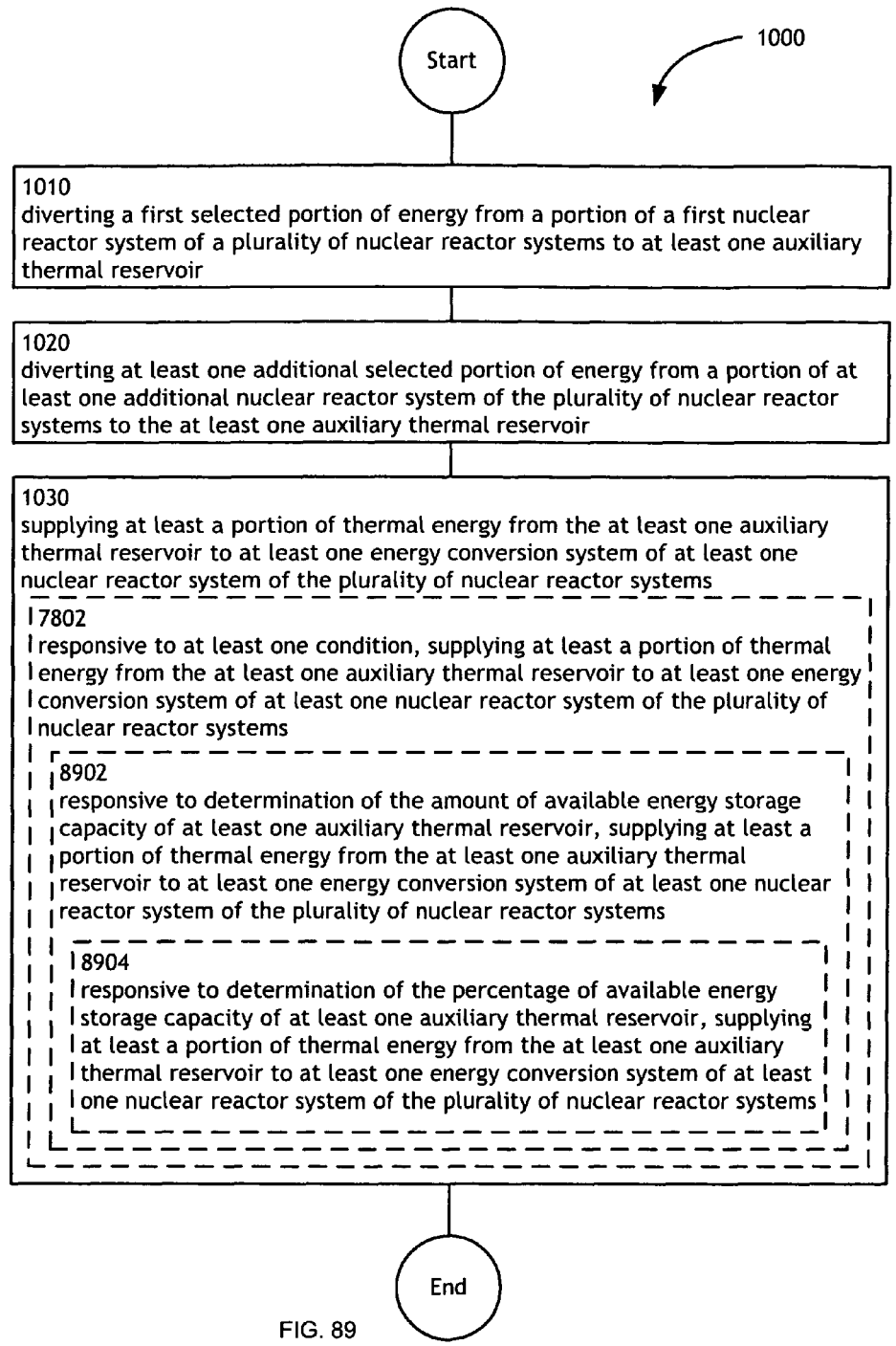
FIG. 89 is a high-level flowchart depicting an alternate implementation of FIG. 10.

FIG. 89 illustrates alternative embodiments of the example operational flow 1000 of FIG. 10. FIG. 89 illustrates example embodiments where the supplying operation 1030 may include at least one additional operation. Additional operations may include an operation 8902, and/or an operation 8904.

Operation 8902 illustrates, responsive to determination of the amount of available energy storage capacity of at least one auxiliary thermal reservoir, supplying at least a portion of thermal energy from the at least one auxiliary thermal reservoir to at least one energy conversion system of at least one nuclear reactor system of the plurality of nuclear reactor systems. For example, as shown in FIGS. 1 through 9D, a heat supply system responsive to determination of the amount of available energy storage capacity of an auxiliary thermal reservoir 940 may supply a portion of the thermal energy stored in an auxiliary thermal reservoir 112 to an energy conversion system 110 of a nuclear reactor system 106 of the plurality of nuclear reactor systems 102.

Further, the operation 8904 illustrates, responsive to determination of the percentage of available energy storage capacity of at least one auxiliary thermal reservoir, supplying at least a portion of thermal energy from the at least one auxiliary thermal reservoir to at least one energy conversion system of at least one nuclear reactor system of the plurality of nuclear reactor systems. For example, as shown in FIGS. 1 through 9D, a heat supply system responsive to determination of the percentage of available energy storage capacity of an auxiliary thermal reservoir 942 may supply a portion of the thermal energy stored in an auxiliary thermal reservoir 112 to an energy conversion system 110 of a nuclear reactor system 106 of the plurality of nuclear reactor systems 102.

Figure 90:
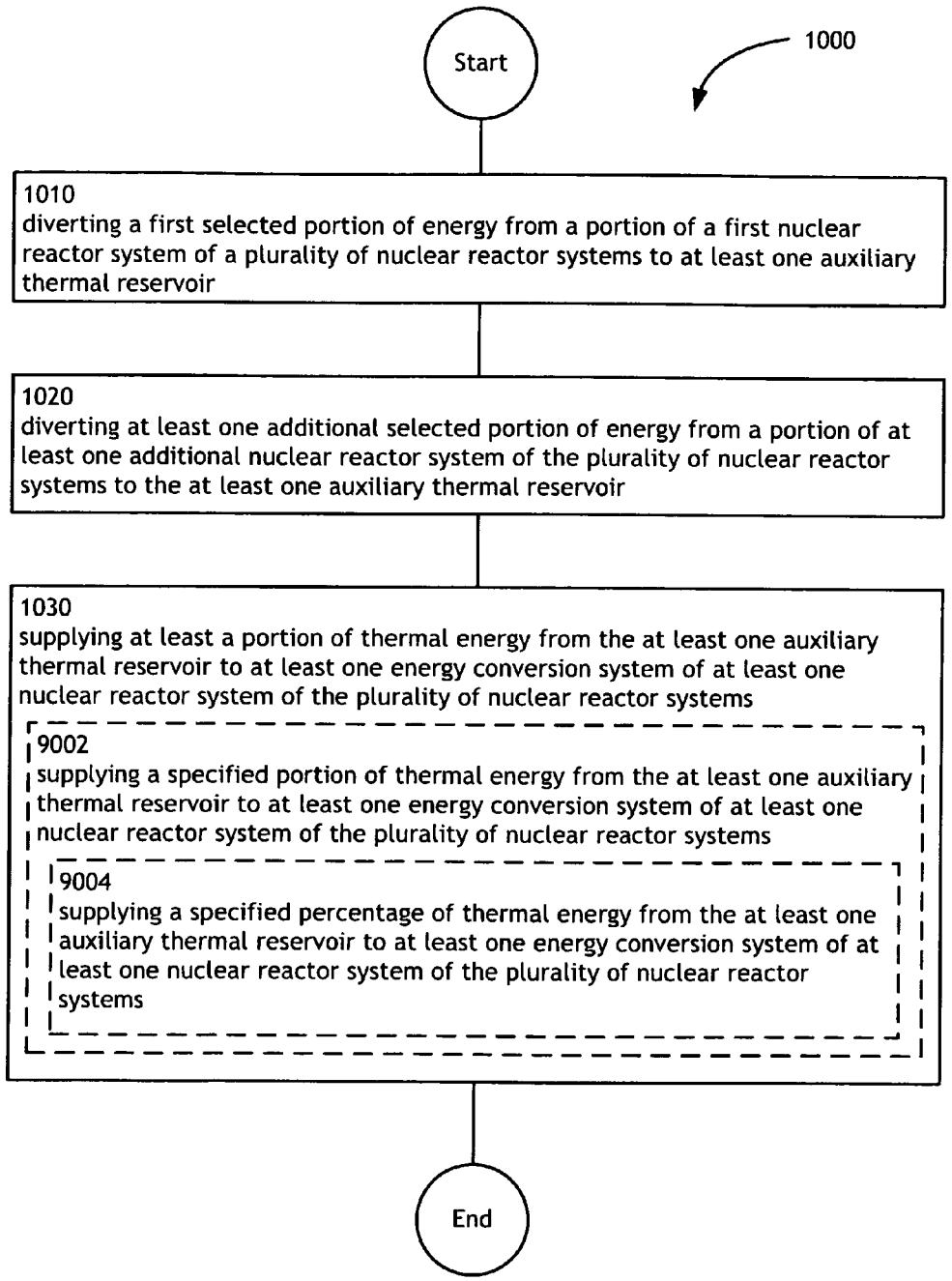
FIG. 90 is a high-level flowchart depicting an alternate implementation of FIG. 10.

FIG. 90 illustrates alternative embodiments of the example operational flow 1000 of FIG. 10. FIG. 90 illustrates example embodiments where the supplying operation 1030 may include at least one additional operation. Additional operations may include an operation 9002, and/or an operation 9004.

The operation 9002 illustrates supplying a specified portion of thermal energy from the at least one auxiliary thermal reservoir to at least one energy conversion system of at least one nuclear reactor system of the plurality of nuclear reactor systems. For example, as shown in FIGS. 1 through 9D, a heat supply system suitable for supplying a specified portion of the energy stored in an auxiliary thermal reservoir to an energy conversion system 944 of a nuclear reactor system 106 of the plurality of nuclear reactor systems 102 may initiate the transfer of a portion of the thermal energy stored in an auxiliary thermal reservoir 112 to an energy conversion system 110 of a nuclear reactor system 106 of the plurality of nuclear reactor systems 102.

Further, the operation 9004 illustrates supplying a specified percentage of thermal energy from the at least one auxiliary thermal reservoir to at least one energy conversion system of at least one nuclear reactor system of the plurality of nuclear reactor systems. For example, as shown in FIGS. 1 through 9D, a heat supply system suitable for supplying a specified percentage of the energy stored in an auxiliary thermal reservoir to an energy conversion system 946 of a nuclear reactor system 106 of the plurality of nuclear reactor systems 102 may initiate the transfer of a portion of the thermal energy stored in an auxiliary thermal reservoir 112 to an energy conversion system 110 of a nuclear reactor system 106 of the plurality of nuclear reactor systems 102.

Figure 91:
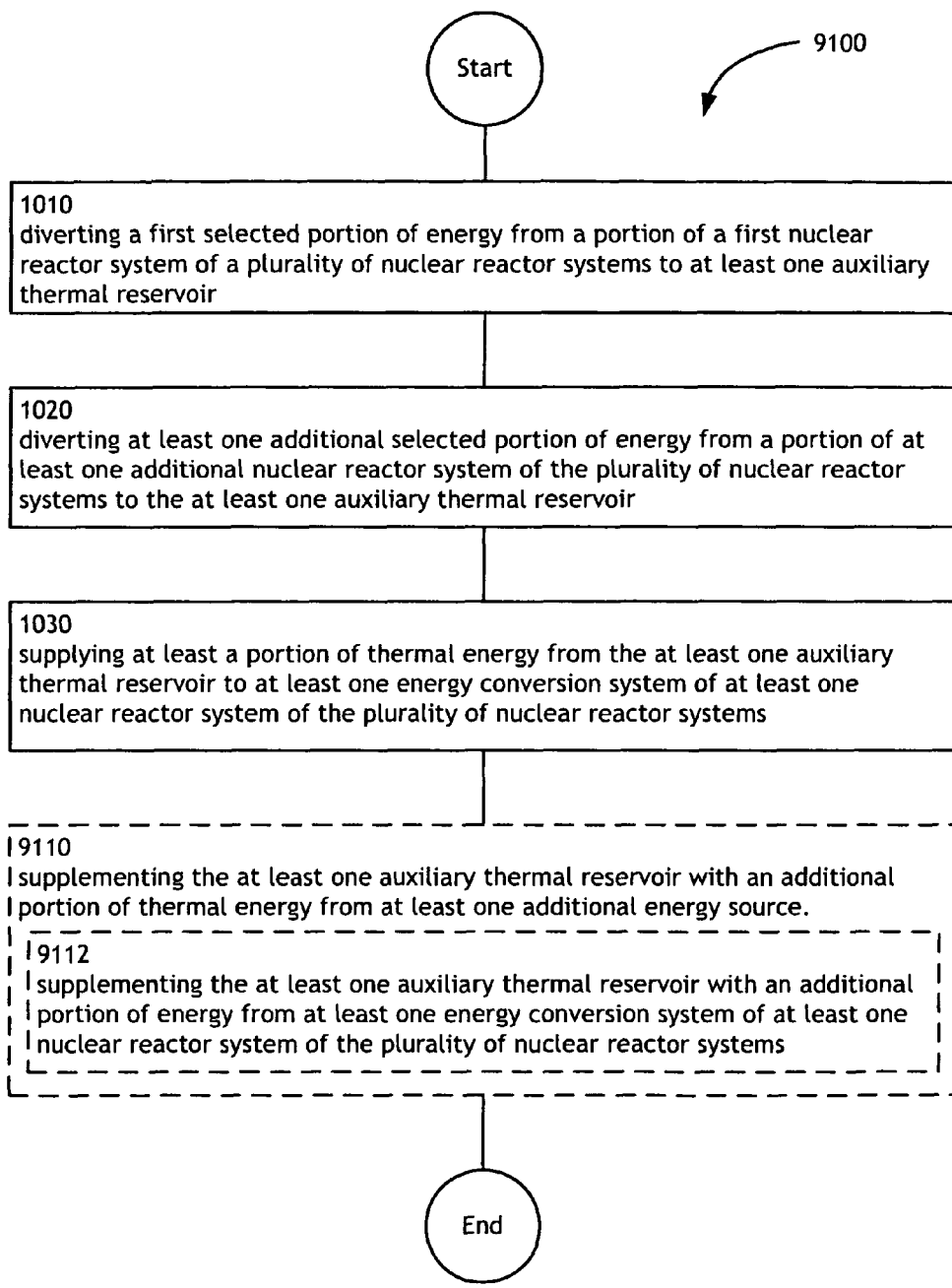
FIG. 91 is a high-level flowchart depicting an alternate implementation of FIG. 10.

FIG. 91 illustrates an operational flow 9100 representing example operations related to storage and utilization of energy generated by a plurality of nuclear reactor systems. FIG. 91 illustrates an example embodiment where the example operational flow 1000 of FIG. 10 may include at least one additional operation. Additional operations may include an operation 9110, and/or an operation 9112.

After a start operation, a first diverting operation 1010, an additional diverting operation 1020, and a supplying operation 1030, the operational flow 9100 moves to a supplementing operation 9110. Operation 9110 illustrates supplementing the at least one auxiliary thermal reservoir with an additional portion of thermal energy from at least one additional energy source. For example, as shown in FIG. 7, the thermal energy stored in an auxiliary thermal reservoir 112 may be supplemented with an additional portion of energy transferred from an additional energy source 702, such as a non-nuclear energy source (e.g., coal powered generator, diesel powered generator, or solar cell array) via a supplementary energy transfer system 706.

The operation 9112 illustrates supplementing the at least one auxiliary thermal reservoir with an additional portion of energy from at least one energy conversion system of at least one nuclear reactor system of the plurality of nuclear reactor systems. For example, as shown in FIG. 7, the thermal energy stored in an auxiliary thermal reservoir 112 may be supplemented with an additional portion of energy transferred from an energy conversion device 110 of a nuclear reactor system of the plurality of nuclear reactor systems 102 the via a supplementary energy transfer system 706.

Figure 92:
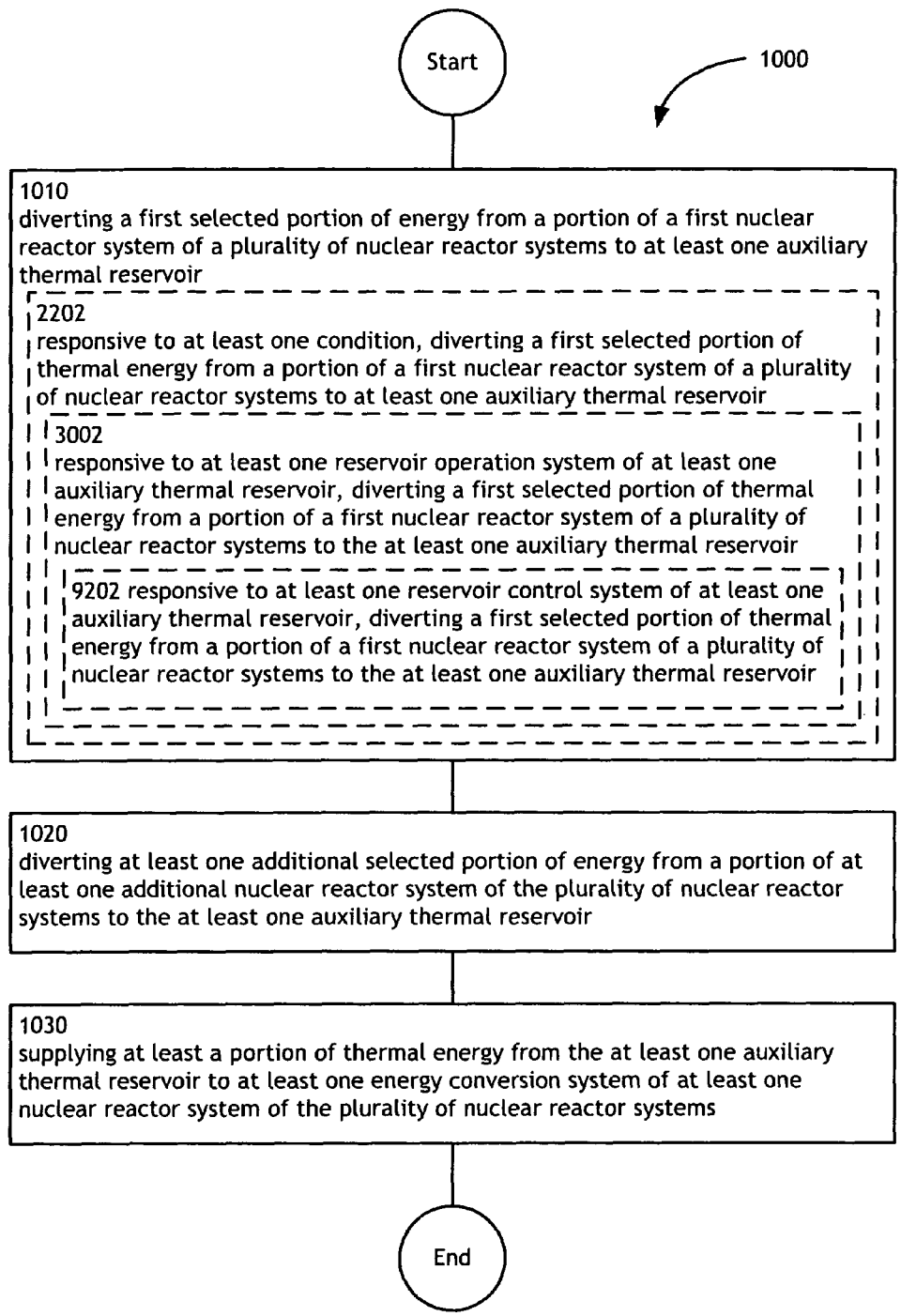
FIG. 92 is a high-level flowchart depicting an alternate implementation of FIG. 10.

FIG. 92 illustrates alternative embodiments of the example operational flow 1000 of FIG. 10. FIG. 92 illustrates example embodiments where the first diverting operation 1010 may include at least one additional operation. Additional operations may include an operation 9202.

Operation 9202 illustrates, responsive to at least one reservoir control system of at least one auxiliary thermal reservoir, diverting a first selected portion of thermal energy from a portion of a first nuclear reactor system of a plurality of nuclear reactor systems to the at least one auxiliary thermal reservoir. For example, as shown in FIGS. 1 through 9D, in response to a reservoir control system (e.g., thermal control system) of an auxiliary thermal reservoir, an energy transfer system responsive to a reservoir control system 830 may initiate transfer of energy from a portion of a first nuclear reactor system 106 of the plurality of nuclear reactor systems 102 to an auxiliary thermal reservoir 112.

Figure 93:
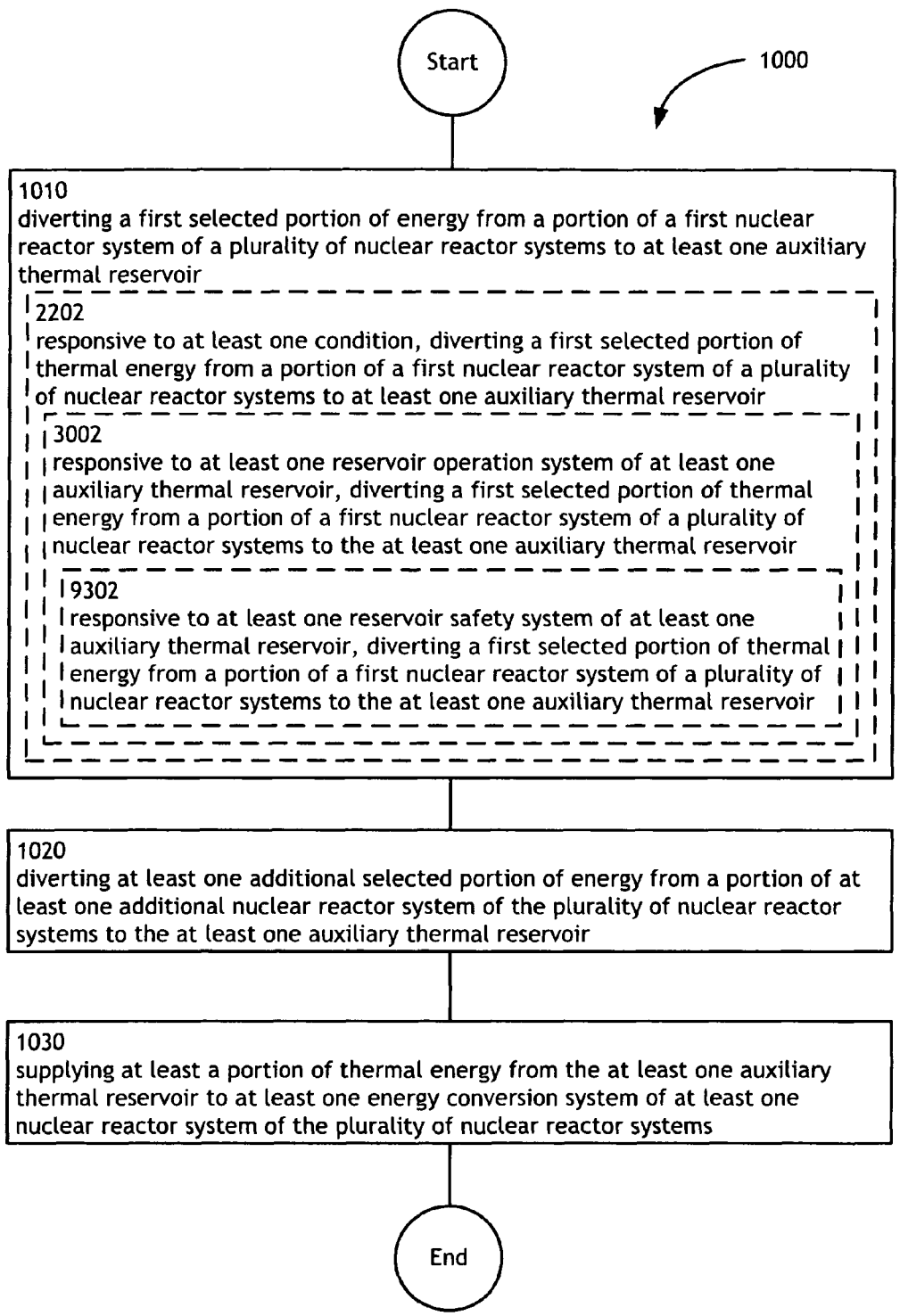
FIG. 93 is a high-level flowchart depicting an alternate implementation of FIG. 10.

FIG. 93 illustrates alternative embodiments of the example operational flow 1000 of FIG. 10. FIG. 93 illustrates example embodiments where the first diverting operation 1010 may include at least one additional operation. Additional operations may include an operation 9302.

Operation 9302 illustrates, responsive to at least one reservoir safety system of at least one auxiliary thermal reservoir, diverting a first selected portion of thermal energy from a portion of a first nuclear reactor system of a plurality of nuclear reactor systems to the at least one auxiliary thermal reservoir. For example, as shown in FIGS. 1 through 9D, in response to a reservoir safety system of an auxiliary thermal reservoir, an energy transfer system responsive to a reservoir safety system 832 may initiate transfer of energy from a portion of a first nuclear reactor system 106 of the plurality of nuclear reactor systems 102 to an auxiliary thermal reservoir 112.

Figure 94:
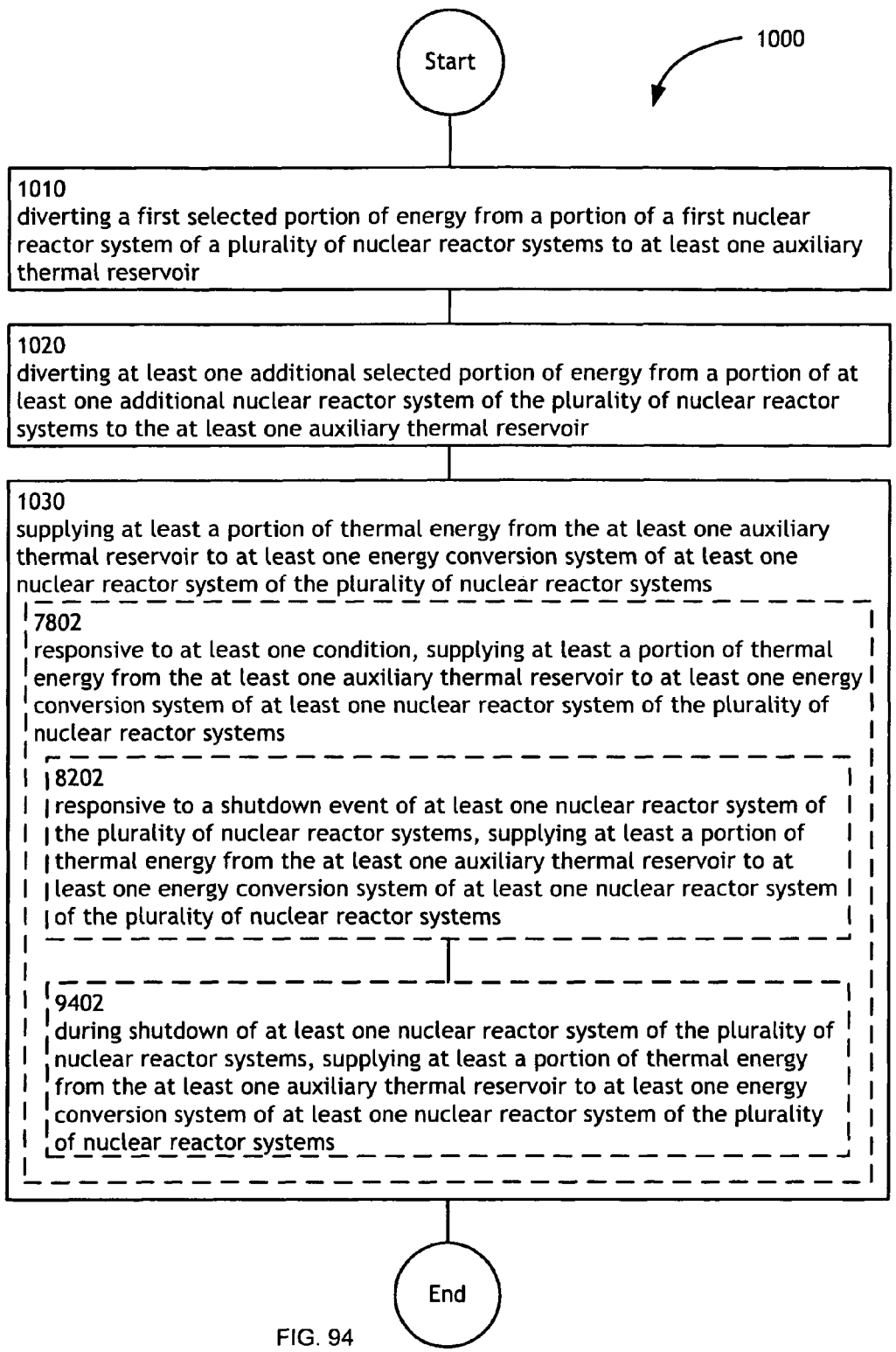
FIG. 94 is a high-level flowchart depicting an alternate implementation of FIG. 10.

FIG. 94 illustrates alternative embodiments of the example operational flow 1000 of FIG. 10. FIG. 94 illustrates example embodiments where the supplying operation 1030 may include at least one additional operation. Additional operations may include an operation 9402.

Further, the operation 9402 illustrates, during shutdown of at least one nuclear reactor system of the plurality of nuclear reactor systems, supplying at least a portion of thermal energy from the at least one auxiliary thermal reservoir to at least one energy conversion system of at least one nuclear reactor system of the plurality of nuclear reactor systems. For example, as shown in FIGS. 1 through 9D, during the shutdown of a nuclear reactor system 106, a heat supply system responsive to a shutdown event of a nuclear reactor system of the plurality of nuclear reactor systems 908 may supply a portion of the thermal energy stored in an auxiliary thermal reservoir 112 to an energy conversion system 110 of a nuclear reactor system 106 of the plurality of nuclear reactor systems 102.

Figure 95:
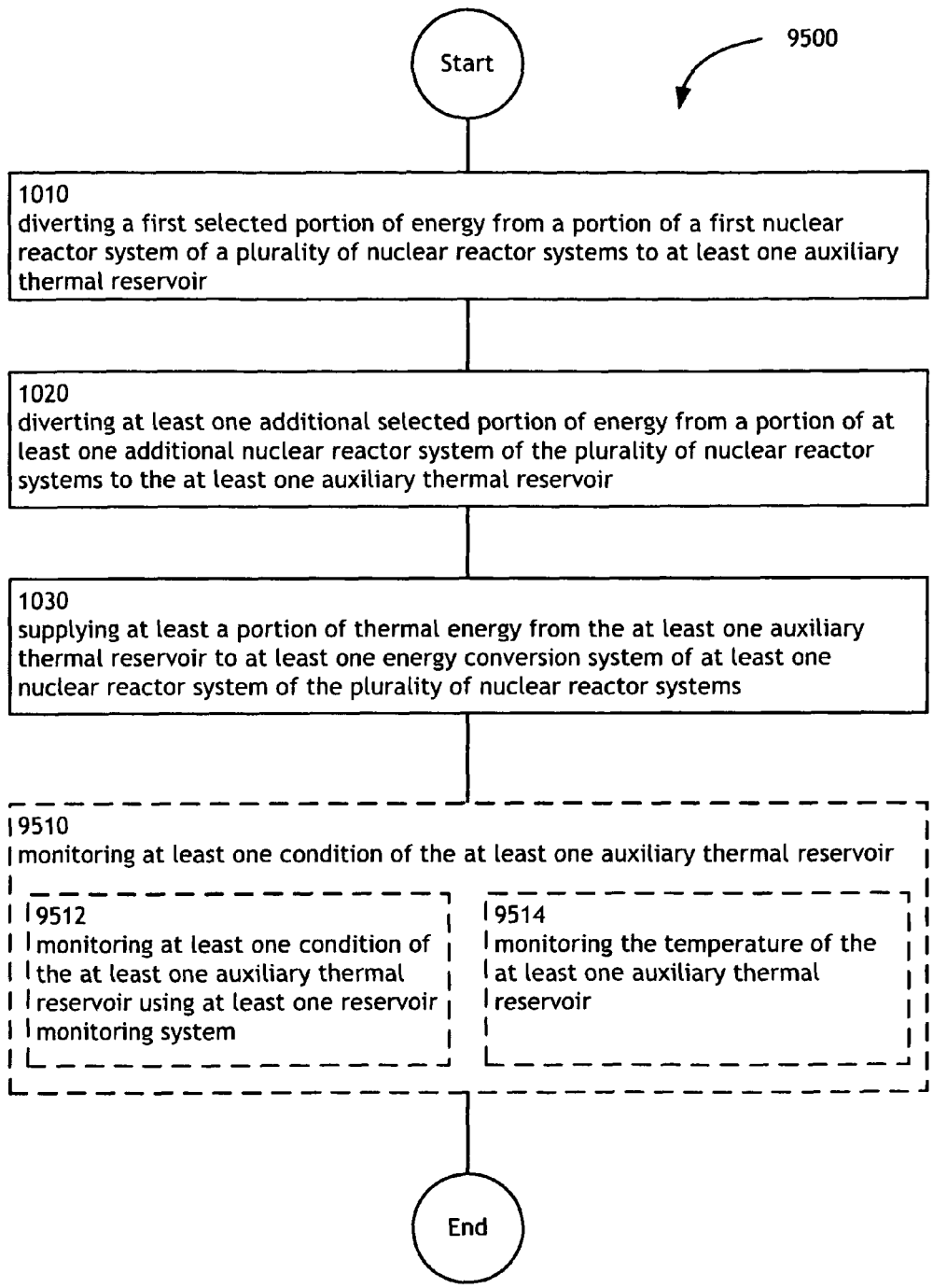
FIG. 95 is a high-level flowchart depicting an alternate implementation of FIG. 10.

FIG. 95 illustrates an operational flow 9500 representing example operations related to storage and utilization of energy generated by a plurality of nuclear reactor systems. FIG. 95 illustrates an example embodiment where the example operational flow 1000 of FIG. 10 may include at least one additional operation. Additional operations may include an operation 9510, an operation 9512, and/or an operation 9514.

After a start operation, a first diverting operation 1010, an additional diverting operation 1020, and a supplying operation 1030, the operational flow 9500 moves to a monitoring operation 9510. Operation 9510 illustrates monitoring at least one condition of the at least one auxiliary thermal reservoir. For example, as shown in FIG. 4D, a condition, such as the operational status (e.g., state of readiness, temperature pressure, or storage capacity), of an auxiliary thermal reservoir 112 may be monitored.

Further, the operation 9512 illustrates monitoring at least one condition of the at least one auxiliary thermal reservoir using at least one reservoir monitoring system. For example, as shown in FIG. 4D, a reservoir monitoring system 444 maybe used to monitor a condition of an auxiliary thermal reservoir 112.

Further, the operation 9514 illustrates monitoring the temperature of the at least one auxiliary thermal reservoir. For example, as shown in FIG. 4D, a reservoir temperature monitoring system 446 maybe used to monitor the temperature of an auxiliary thermal reservoir 112.

Figure 96:
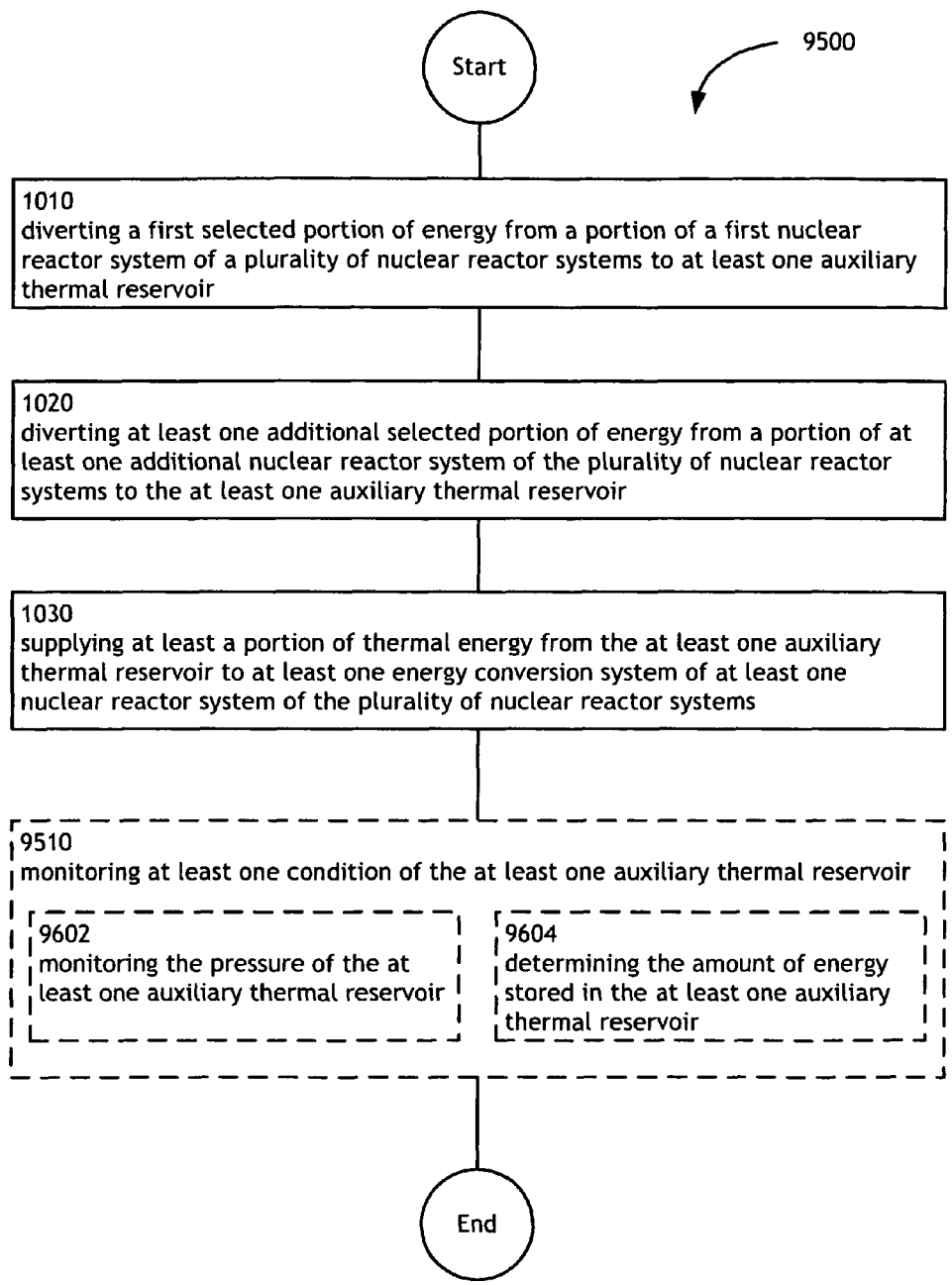
FIG. 96 is a high-level flowchart depicting an alternate implementation of FIG. 10.

FIG. 96 illustrates alternative embodiments of the example operational flow 9500 of FIG. 95. FIG. 96 illustrates example embodiments where the monitoring operation 9510 may include at least one additional operation. Additional operations may include an operation 9602, and/or an operation 9604.

The operation 9602 illustrates monitoring the pressure of the at least one auxiliary thermal reservoir. For example, as shown in FIG. 4D, a reservoir pressure monitoring system 448 maybe used to monitor the pressure of an auxiliary thermal reservoir 112.

The operation 9604 illustrates determining the amount of energy stored in the at least one auxiliary thermal reservoir. For example, as shown in FIG. 4D, a system configured to determine the amount of stored energy 450 in an auxiliary thermal reservoir 112 may be utilized to monitor the energy storage level in the auxiliary thermal reservoir 112.

Figure 97:
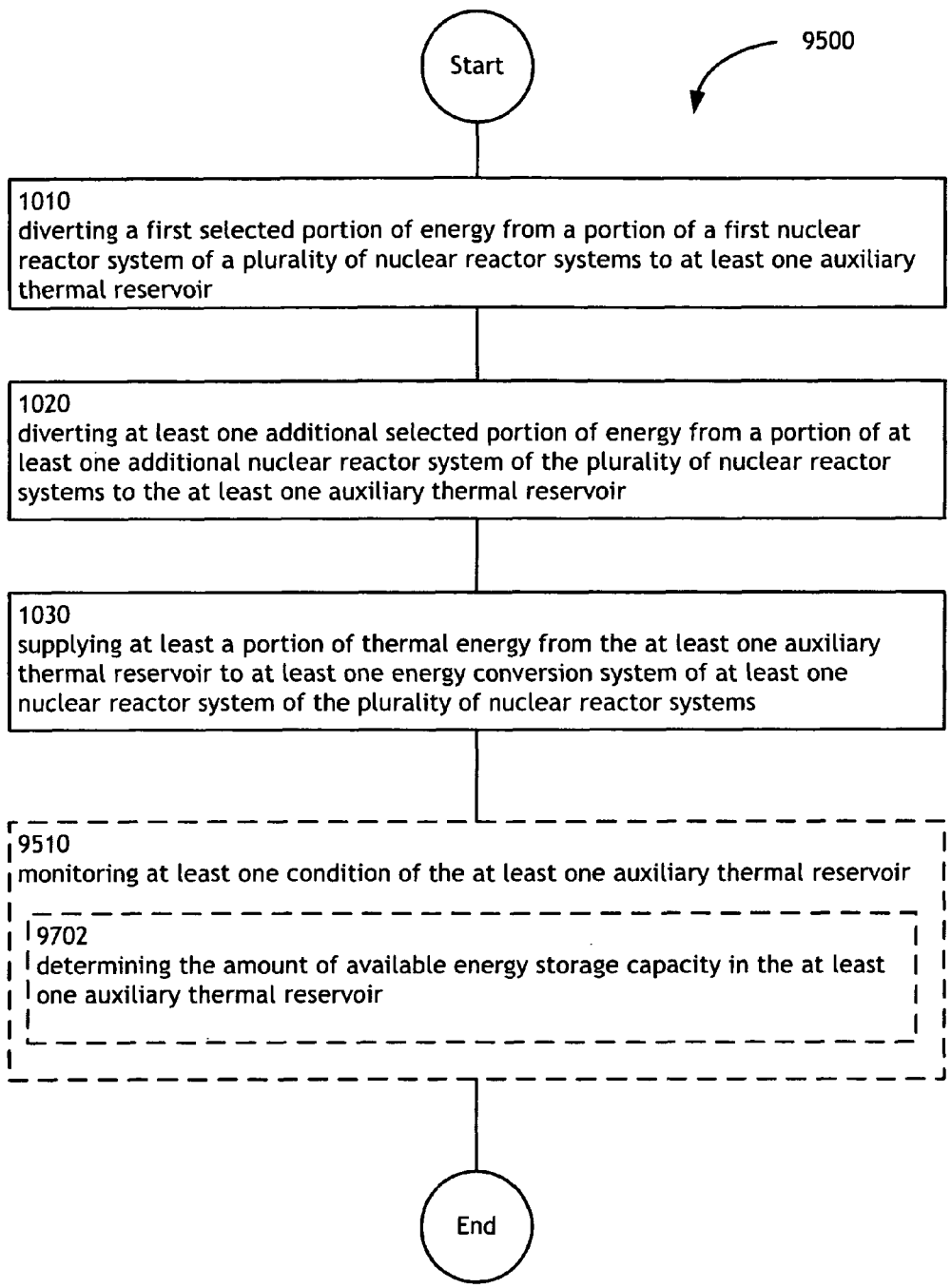
FIG. 97 is a high-level flowchart depicting an alternate implementation of FIG. 10.

FIG. 97 illustrates alternative embodiments of the example operational flow 9500 of FIG. 95. FIG. 97 illustrates example embodiments where the monitoring operation 9510 may include at least one additional operation. Additional operations may include an operation 9702.

The operation 9702 illustrates determining the amount of available energy storage capacity in the at least one auxiliary thermal reservoir. For example, as shown in FIG. 4D, a system configured to determine the amount of available energy storage capacity 452 in an auxiliary thermal reservoir 112 may be utilized to monitor the available energy storage capacity of the auxiliary thermal reservoir 112.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is shown/described herein as a single illustrated figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

The invention claimed is:

1. A method, comprising:
    diverting a first selected portion of energy from a portion of a first nuclear reactor system of a plurality of nuclear reactor systems to at least one auxiliary thermal reservoir;
    diverting at least one additional selected portion of energy from a portion of at least one additional nuclear reactor system of the plurality of nuclear reactor systems to the at least one auxiliary thermal reservoir; and
    supplying at least a portion of thermal energy from the at least one auxiliary thermal reservoir to at least one energy conversion system of at least one nuclear reactor system of the plurality of nuclear reactor systems.

2. The method of claim 1, wherein the diverting a first selected portion of energy from a portion of a first nuclear reactor system of a plurality of nuclear reactor systems to at least one auxiliary thermal reservoir comprises:
    diverting a first selected portion of energy from a portion of a first nuclear reactor system of a plurality of nuclear reactor systems to at least one auxiliary thermal reservoir using at least one energy transfer system.

3. The method of claim 2, wherein the diverting a first selected portion of energy from a portion of a first nuclear reactor system of a plurality of nuclear reactor systems to at least one auxiliary thermal reservoir using at least one energy transfer system comprises:
    diverting a first selected portion of thermal energy from a portion of a first nuclear reactor system of a plurality of nuclear reactor systems to at least one auxiliary thermal reservoir using at least one energy transfer system.

4. The method of claim 3, wherein the diverting a first selected portion of thermal energy from a portion of a first nuclear reactor system of a plurality of nuclear reactor systems to at least one auxiliary thermal reservoir using at least one energy transfer system comprises:
    diverting a first selected portion of thermal energy from a portion of a first nuclear reactor system of a plurality of nuclear reactor systems to at least one auxiliary thermal reservoir using at least one heat transfer system.

5. The method of claim 4, wherein the diverting a first selected portion of thermal energy from a portion of a first nuclear reactor system of a plurality of nuclear reactor systems to at least one auxiliary thermal reservoir using at least one heat transfer system comprises:
    diverting a first selected portion of thermal energy from a portion of a first nuclear reactor system of a plurality of nuclear reactor systems to at least one auxiliary thermal reservoir using at least one direct fluid exchange heat transfer system.

6. The method of claim 5, wherein the diverting a first selected portion of thermal energy from a portion of a first nuclear reactor system of a plurality of nuclear reactor systems to at least one auxiliary thermal reservoir using at least one direct fluid exchange heat transfer system comprises:
    intermixing at least one reservoir fluid of at least one auxiliary thermal reservoir with at least one coolant of a first nuclear reactor system of a plurality of nuclear reactor systems using at least one direct fluid exchange heat transfer system.

7. The method of claim 4, wherein the diverting a first selected portion of thermal energy from a portion of a first nuclear reactor system of a plurality of nuclear reactor systems to at least one auxiliary thermal reservoir using at least one heat transfer system comprises:
    diverting a first selected portion of thermal energy from a portion of a first nuclear reactor system of a plurality of nuclear reactor systems to at least one auxiliary thermal reservoir using at least one heat exchanger.

8. The method of claim 2, wherein the diverting a first selected portion of energy from a portion of a first nuclear reactor system of a plurality of nuclear reactor systems to at least one auxiliary thermal reservoir using at least one energy transfer system comprises:
    diverting a first selected portion of electrical energy from a portion of a first nuclear reactor system of a plurality of nuclear reactor systems to at least one auxiliary thermal reservoir using at least one energy transfer system.

9. The method of claim 8, wherein the diverting a first selected portion of electrical energy from a portion of a first nuclear reactor system of a plurality of nuclear reactor systems to at least one auxiliary thermal reservoir using at least one energy transfer system comprises:
    diverting a first selected portion of electrical energy from a portion of a first nuclear reactor system of a plurality of nuclear reactor systems to at least one auxiliary thermal reservoir using at least one electrical-to-thermal conversion system.

10. The method of claim 9, wherein the diverting a first selected portion of electrical energy from a portion of a first nuclear reactor system of a plurality of nuclear reactor systems to at least one auxiliary thermal reservoir using at least one electrical-to-thermal conversion system comprises:
    diverting a first selected portion of electrical energy from at least one energy conversion system of a first nuclear reactor system of a plurality of nuclear reactor systems to at least one auxiliary thermal reservoir using at least one electrical-to-thermal conversion system.

11. The method of claim 1, wherein the supplying at least a portion of thermal energy from the at least one auxiliary thermal reservoir to at least one energy conversion system of at least one nuclear reactor system of the plurality of nuclear reactor systems comprises:

supplying at least a portion of thermal energy from a first auxiliary thermal reservoir and a portion of thermal energy from at least a second thermal reservoir to at least one energy conversion system of at least one nuclear reactor system of the plurality of nuclear reactor systems.

12. The method of claim 1, wherein the supplying at least a portion of thermal energy from the at least one auxiliary thermal reservoir to at least one energy conversion system of at least one nuclear reactor system of the plurality of nuclear reactor systems comprises:

supplying at least a portion of thermal energy from the at least one auxiliary thermal reservoir to at least one energy conversion system of at least one nuclear reactor system of the plurality of nuclear reactor systems using at least one heat supply system.

13. The method of claim 1, further comprising:
supplementing the at least one auxiliary thermal reservoir with an additional portion of thermal energy from at least one additional energy source.

14. The method of claim 13, wherein the supplementing the at least one auxiliary thermal reservoir with an additional portion of thermal energy from at least one additional energy source comprises:

supplementing the at least one auxiliary thermal reservoir with an additional portion of energy from at least one energy conversion system of at least one nuclear reactor system of the plurality of nuclear reactor systems.

15. The method of claim 1, wherein the diverting a first selected portion of energy from a portion of a first nuclear reactor system of a plurality of nuclear reactor systems to at least one auxiliary thermal reservoir comprises:

responsive to at least one condition, diverting a first selected portion of thermal energy from a portion of a first nuclear reactor system of a plurality of nuclear reactor systems to at least one auxiliary thermal reservoir.

16. The method of claim 15, wherein the, responsive to at least one condition, diverting a first selected portion of thermal energy from a portion of a first nuclear reactor system of a plurality of nuclear reactor systems to at least one auxiliary thermal reservoir comprises:

responsive to at least one condition of a first nuclear reactor system of a plurality of nuclear reactor systems, diverting a first selected portion of thermal energy from a portion of the first nuclear reactor system of the plurality of nuclear reactor systems to at least one auxiliary thermal reservoir.

17. The method of claim 15, wherein the, responsive to at least one condition, diverting a first selected portion of thermal energy from a portion of a first nuclear reactor system of a plurality of nuclear reactor systems to at least one auxiliary thermal reservoir comprises:

responsive to at least one condition of at least one additional nuclear reactor system of a plurality of nuclear reactor systems, diverting a first selected portion of thermal energy from a portion of the first nuclear reactor system of the plurality of nuclear reactor systems to at least one auxiliary thermal reservoir.

18. The method of claim 15, wherein the, responsive to at least one condition, diverting a first selected portion of thermal energy from a portion of a first nuclear reactor system of a plurality of nuclear reactor systems to at least one auxiliary thermal reservoir comprises:

responsive to determination of excess capacity of at least one nuclear reactor system of a plurality of nuclear reactor systems, diverting a first selected portion of thermal energy from a portion of a first nuclear reactor system of the plurality of nuclear reactor systems to at least one auxiliary thermal reservoir.

19. The method of claim 15, wherein the, responsive to at least one condition, diverting a first selected portion of thermal energy from a portion of a first nuclear reactor system of a plurality of nuclear reactor systems to at least one auxiliary thermal reservoir comprises:

responsive to at least one operation system of at least one nuclear reactor system of a plurality of nuclear reactor systems, diverting a first selected portion of thermal energy from a portion of a first nuclear reactor system of the plurality of nuclear reactor systems to at least one auxiliary thermal reservoir.

20. The method of claim 19, wherein the, responsive to at least one operation system of at least one nuclear reactor system of a plurality of nuclear reactor systems, diverting a first selected portion of thermal energy from a portion of a first nuclear reactor system of the plurality of nuclear reactor systems to at least one auxiliary thermal reservoir comprises:

responsive to at least one signal from at least one operation system of at least one nuclear reactor system of a plurality of nuclear reactor systems, diverting a first selected portion of thermal energy from a portion of a first nuclear reactor system of the plurality of nuclear reactor systems to at least one auxiliary thermal reservoir.

21. The method of claim 15, wherein the, responsive to at least one condition, diverting a first selected portion of thermal energy from a portion of a first nuclear reactor system of a plurality of nuclear reactor systems to at least one auxiliary thermal reservoir comprises:

responsive to at least one reservoir operation system of at least one auxiliary thermal reservoir, diverting a first selected portion of thermal energy from a portion of a first nuclear reactor system of a plurality of nuclear reactor systems to the at least one auxiliary thermal reservoir.

22. The method of claim 21, wherein the, responsive to at least one reservoir operation system of at least one auxiliary thermal reservoir, diverting a first selected portion of thermal energy from a portion of a first nuclear reactor system of the plurality of nuclear reactor systems to the at least one auxiliary thermal reservoir comprises:

responsive to at least one signal from at least one reservoir operation system of at least one auxiliary thermal reservoir, diverting a first selected portion of thermal energy from a portion of a first nuclear reactor system of a plurality of nuclear reactor systems to the at least one auxiliary thermal reservoir.

23. The method of claim 15, wherein the, responsive to at least one condition, diverting a first selected portion of thermal energy from a portion of a first nuclear reactor system of a plurality of nuclear reactor systems to at least one auxiliary thermal reservoir comprises:

responsive to at least one signal from at least one operator of at least one nuclear reactor system of a plurality of nuclear reactor systems, diverting a first selected portion of thermal energy from a portion of a first nuclear reactor system of a plurality of nuclear reactor systems to at least one auxiliary thermal reservoir.

24. The method of claim 15, wherein the, responsive to at least one condition, diverting a first selected portion of thermal energy from a portion of a first nuclear reactor system of a plurality of nuclear reactor systems to at least one auxiliary thermal reservoir comprises:

upon a pre-selected diversion start time, diverting a first selected portion of thermal energy from a portion of a first nuclear reactor system of a plurality of nuclear reactor systems to at least one auxiliary thermal reservoir.

25. The method of claim 15, wherein the, responsive to at least one condition, diverting a first selected portion of thermal energy from a portion of a first nuclear reactor system of a plurality of nuclear reactor systems to at least one auxiliary thermal reservoir comprises:

responsive to a shutdown event of at least one nuclear reactor system of a plurality of nuclear reactor systems, diverting a first selected portion of thermal energy from a portion of a first nuclear reactor system of a plurality of nuclear reactor systems to at least one auxiliary thermal reservoir.

26. The method of claim 25, wherein the, responsive to a shutdown event of at least one nuclear reactor system of a plurality of nuclear reactor systems, diverting a first selected portion of thermal energy from a portion of a first nuclear reactor system of a plurality of nuclear reactor systems to at least one auxiliary thermal reservoir comprises:

responsive to a shutdown event of at least one nuclear reactor system of a plurality of nuclear reactor systems, establishing thermal communication between a portion of a first nuclear reactor system of the plurality of nuclear reactor systems and at least one auxiliary thermal reservoir.

27. The method of claim 15, wherein the, responsive to at least one condition, diverting a first selected portion of thermal energy from a portion of a first nuclear reactor system of a plurality of nuclear reactor systems to at least one auxiliary thermal reservoir comprises:

responsive to determination of the amount of energy stored in at least one auxiliary thermal reservoir, diverting a first selected portion of thermal energy from a portion of the first nuclear reactor system of the plurality of nuclear reactor systems to the at least one auxiliary thermal reservoir.

28. The method of claim 15, wherein the, responsive to at least one condition, diverting a first selected portion of thermal energy from a portion of a first nuclear reactor system of a plurality of nuclear reactor systems to at least one auxiliary thermal reservoir comprises:

responsive to determination of the amount of available energy storage capacity of at least one auxiliary thermal reservoir, diverting a first selected portion of thermal energy from a portion of the first nuclear reactor system of the plurality of nuclear reactor systems to the at least one auxiliary thermal reservoir.

29. The method of claim 1, wherein the supplying at least a portion of thermal energy from the at least one auxiliary thermal reservoir to at least one energy conversion system of at least one nuclear reactor system of the plurality of nuclear reactor systems comprises:

supplying at least a portion of thermal energy from the at least one auxiliary thermal reservoir to at least one energy conversion system of the first nuclear reactor system of the plurality of nuclear reactor systems.

30. The method of claim 1, wherein the supplying at least a portion of thermal energy from the at least one auxiliary thermal reservoir to at least one energy conversion system of at least one nuclear reactor system of the plurality of nuclear reactor systems comprises:

supplying at least a portion of thermal energy from the at least one auxiliary thermal reservoir to at least one energy conversion system of the at least one additional nuclear reactor system of the plurality of nuclear reactor systems.

31. The method of claim 1, wherein the supplying at least a portion of thermal energy from the at least one auxiliary thermal reservoir to at least one energy conversion system of at least one nuclear reactor system of the plurality of nuclear reactor systems comprises:

responsive to at least one condition, supplying at least a portion of thermal energy from the at least one auxiliary thermal reservoir to at least one energy conversion system of at least one nuclear reactor system of the plurality of nuclear reactor systems.

32. The method of claim 31, wherein the, responsive to at least one condition, supplying at least a portion of thermal energy from the at least one auxiliary thermal reservoir to at least one energy conversion system of at least one nuclear reactor system of the plurality of nuclear reactor systems comprises:

responsive to at least one condition of at least one nuclear reactor system of the plurality of nuclear reactor systems, supplying at least a portion of thermal energy from the at least one auxiliary thermal reservoir to at least one energy conversion system of at least one nuclear reactor system of the plurality of nuclear reactor systems.

33. The method of claim 32, wherein the, responsive to at least one condition of at least one nuclear reactor system of the plurality of nuclear reactor systems, supplying at least a portion of thermal energy from the at least one auxiliary thermal reservoir to at least one energy conversion system of at least one nuclear reactor system of the plurality of nuclear reactor systems comprises:

responsive to heightened power demand on at least one nuclear reactor system of the plurality of nuclear reactor systems, supplying at least a portion of thermal energy from the at least one auxiliary thermal reservoir to at least one energy conversion system of at least one nuclear reactor system of the plurality of nuclear reactor systems.

34. The method of claim 31, wherein the, responsive to at least one condition, supplying at least a portion of thermal energy from the at least one auxiliary thermal reservoir to at least one energy conversion system of at least one nuclear reactor system of the plurality of nuclear reactor systems comprises:

responsive to at least one operation system of at least one nuclear reactor system of the plurality of nuclear reactor systems, supplying at least a portion of thermal energy from the at least one auxiliary thermal reservoir to at least one energy conversion system of at least one nuclear reactor system of the plurality of nuclear reactor systems.

35. The method of claim 31, wherein the, responsive to at least one condition, supplying at least a portion of thermal energy from the at least one auxiliary thermal reservoir to at least one energy conversion system of at least one nuclear reactor system of the plurality of nuclear reactor systems comprises:

responsive to at least one reservoir operation system of the at least one auxiliary thermal reservoir, supplying at least a portion of thermal energy from the at least one auxiliary thermal reservoir to at least one energy conversion system of at least one nuclear reactor system of the plurality of nuclear reactor systems.

36. The method of claim 31, wherein the, responsive to at least one condition, supplying at least a portion of thermal energy from the at least one auxiliary thermal reservoir to at least one energy conversion system of at least one nuclear reactor system of the plurality of nuclear reactor systems comprises:

responsive to at least one operator of at least one nuclear reactor system of the plurality of nuclear reactor systems, supplying at least a portion of thermal energy from the at least one auxiliary thermal reservoir to at least one energy conversion system of at least one nuclear reactor system of the plurality of nuclear reactor systems.

37. The method of claim 31, wherein the, responsive to at least one condition, supplying at least a portion of thermal energy from the at least one auxiliary thermal reservoir to at least one energy conversion system of at least one nuclear reactor system of the plurality of nuclear reactor systems comprises:

responsive to a shutdown event of at least one nuclear reactor system of the plurality of nuclear reactor systems, supplying at least a portion of thermal energy from the at least one auxiliary thermal reservoir to at least one energy conversion system of at least one nuclear reactor system of the plurality of nuclear reactor systems.

38. The method of claim 37, wherein the, responsive to a shutdown event of at least one nuclear reactor system of the plurality of nuclear reactor systems, supplying at least a portion of thermal energy from the at least one auxiliary thermal reservoir to at least one energy conversion system of at least one nuclear reactor system of the plurality of nuclear reactor systems comprises:

responsive to a shutdown event established by at least one operation system of at least one nuclear reactor system of the plurality of nuclear reactor systems, supplying at least a portion of thermal energy from the at least one auxiliary thermal reservoir to at least one energy conversion system of at least one nuclear reactor system of the plurality of nuclear reactor systems.

39. The method of claim 31, wherein the, responsive to at least one condition, supplying at least a portion of thermal energy from the at least one auxiliary thermal reservoir to at least one energy conversion system of at least one nuclear reactor system of the plurality of nuclear reactor systems comprises:

upon a pre-selected supply start time, supplying at least a portion of thermal energy from the at least one auxiliary thermal reservoir to at least one energy conversion system of at least one nuclear reactor system of the plurality of nuclear reactor systems.

40. The method of claim 31, wherein the, responsive to at least one condition, supplying at least a portion of thermal energy from the at least one auxiliary thermal reservoir to at least one energy conversion system of at least one nuclear reactor system of the plurality of nuclear reactor systems comprises:

responsive to determination of the amount of energy stored in at least one auxiliary thermal reservoir, supplying at least a portion of thermal energy from the at least one auxiliary thermal reservoir to at least one energy conversion system of at least one nuclear reactor system of the plurality of nuclear reactor systems.

41. The method of claim 31, wherein the, responsive to at least one condition, supplying at least a portion of thermal energy from the at least one auxiliary thermal reservoir to at least one energy conversion system of at least one nuclear reactor system of the plurality of nuclear reactor systems comprises:

responsive to determination of the amount of available energy storage capacity of at least one auxiliary thermal reservoir, supplying at least a portion of thermal energy from the at least one auxiliary thermal reservoir to at least one energy conversion system of at least one nuclear reactor system of the plurality of nuclear reactor systems.

42. The method of claim 1, wherein the supplying at least a portion of thermal energy from the at least one auxiliary thermal reservoir to at least one energy conversion system of at least one nuclear reactor system of the plurality of nuclear reactor systems comprises:

supplying a specified portion of thermal energy from the at least one auxiliary thermal reservoir to at least one energy conversion system of at least one nuclear reactor system of the plurality of nuclear reactor systems.

43. The method of claim 1, further comprising:

monitoring at least one condition of the at least one auxiliary thermal reservoir.

44. The method of claim 43, wherein the monitoring at least one condition of the at least one auxiliary thermal reservoir comprises:

monitoring at least one condition of the at least one auxiliary thermal reservoir using at least one reservoir monitoring system.

45. The method of claim 43, wherein the monitoring at least one condition of the at least one auxiliary thermal reservoir comprises:

monitoring the temperature of the at least one auxiliary thermal reservoir.

46. The method of claim 43, wherein the monitoring at least one condition of the at least one auxiliary thermal reservoir comprises:

monitoring the pressure of the at least one auxiliary thermal reservoir.

47. The method of claim 43, wherein the monitoring at least one condition of the at least one auxiliary thermal reservoir comprises:

determining the amount of energy stored in the at least one auxiliary thermal reservoir.

48. The method of claim 43, wherein the monitoring at least one condition of the at least one auxiliary thermal reservoir comprises:

determining the amount of available energy storage capacity in the at least one auxiliary thermal reservoir.

49. The method of claim 1, wherein the diverting a first selected portion of energy from a portion of a first nuclear reactor system of a plurality of nuclear reactor systems to at least one auxiliary thermal reservoir comprises:

diverting a first selected portion of energy from a portion of a first nuclear reactor system of a plurality of nuclear reactor systems to a mass of at least one heat storage material of at least one auxiliary thermal reservoir.

50. The method of claim 49, wherein the diverting a first selected portion of energy from a portion of a first nuclear reactor system of a plurality of nuclear reactor systems to a mass of at least one heat storage material of at least one auxiliary thermal reservoir comprises:

diverting a first selected portion of energy from a portion of a first nuclear reactor system of a plurality of nuclear reactor systems to a mass of at least one solid heat storage material of at least one auxiliary thermal reservoir.

51. The method of claim 49, wherein the diverting a first selected portion of energy from a portion of a first nuclear reactor system of a plurality of nuclear reactor systems to a mass of at least one heat storage material of at least one auxiliary thermal reservoir comprises:
diverting a first selected portion of energy from a portion of a first nuclear reactor system of a plurality of nuclear reactor systems to a mass of at least one liquid heat storage material of at least one auxiliary thermal reservoir.

52. The method of claim 49, wherein the diverting a first selected portion of energy from a portion of a first nuclear reactor system of a plurality of nuclear reactor systems to a mass of at least one heat storage material of at least one auxiliary thermal reservoir comprises:
diverting a first selected portion of energy from a portion of a first nuclear reactor system of a plurality of nuclear reactor systems to a mass of at least one pressurized gaseous mass of material of at least one auxiliary thermal reservoir.

53. The method of claim 49, wherein the diverting a first selected portion of energy from a portion of a first nuclear reactor system of a plurality of nuclear reactor systems to a mass of at least one heat storage material of at least one auxiliary thermal reservoir comprises:
diverting a first selected portion of energy from a portion of a first nuclear reactor system of a plurality of nuclear reactor systems to a mass of at least one mixed phase material of at least one auxiliary thermal reservoir.

54. The method of claim 49, wherein the diverting a first selected portion of energy from a portion of a first nuclear reactor system of a plurality of nuclear reactor systems to a mass of at least one heat storage material of at least one auxiliary thermal reservoir comprises:
diverting a first selected portion of energy from a portion of a first nuclear reactor system of a plurality of nuclear reactor systems to a mass of at least one auxiliary thermal reservoir, the mass of at least one material having a phase transition within the operating temperature of the at least one auxiliary thermal reservoir.

55. The method of claim 49, wherein the diverting a first selected portion of energy from a portion of a first nuclear reactor system of a plurality of nuclear reactor systems to a mass of at least one heat storage material of at least one auxiliary thermal reservoir comprises:
diverting a first selected portion of energy from a portion of a first nuclear reactor system of a plurality of nuclear reactor systems to a mass of at least one heat storage material contained in a reservoir containment system.

56. The method of claim 55, wherein the diverting a first selected portion of energy from a portion of a first nuclear reactor system of a plurality of nuclear reactor systems to a mass of at least one heat storage material contained in a reservoir containment system comprises:
diverting a first selected portion of energy from a portion of a first nuclear reactor system of a plurality of nuclear reactor systems to a mass of at least one heat storage material contained in at least one external vessel.

57. The method of claim 55, wherein the diverting a first selected portion of energy from a portion of a first nuclear reactor system of a plurality of nuclear reactor systems to a mass of at least one heat storage material contained in a reservoir containment system comprises:
diverting a first selected portion of energy from a portion of a first nuclear reactor system of a plurality of nuclear reactor systems to a mass of at least one heat storage material contained in at least one external liquid pool.

58. The method of claim 1, further comprising:
maintaining the temperature of at least one heat storage material of at least one auxiliary thermal reservoir above a selected temperature.

59. The method of claim 58, wherein the maintaining the temperature of at least one heat storage material of at least one auxiliary thermal reservoir above a selected temperature comprises:
maintaining the temperature of at least one heat storage material of at least one auxiliary thermal reservoir above the melting temperature of the at least one heat storage material.

60. The method of claim 1, wherein the diverting a first selected portion of energy from a portion of a first nuclear reactor system of a plurality of nuclear reactor systems to at least one auxiliary thermal reservoir, comprises:
diverting a first selected portion of energy from a portion of a first nuclear reactor system of a plurality of nuclear reactor systems to at least one auxiliary thermal reservoir, the first nuclear reactor system of the plurality of nuclear reactor systems having at least one liquid coolant.

61. The method of claim 1, wherein the diverting a first selected portion of energy from a portion of a first nuclear reactor system of a plurality of nuclear reactor systems to at least one auxiliary thermal reservoir, comprises:
diverting a first selected portion of energy from a portion of a first nuclear reactor system of a plurality of nuclear reactor systems to at least one auxiliary thermal reservoir, the first nuclear reactor system of the plurality of nuclear reactor systems having at least one pressurized gas coolant.

62. The method of claim 1, wherein the diverting a first selected portion of energy from a portion of a first nuclear reactor system of a plurality of nuclear reactor systems to at least one auxiliary thermal reservoir, comprises:
diverting a first selected portion of energy from a portion of a first nuclear reactor system of a plurality of nuclear reactor systems to at least one auxiliary thermal reservoir, the first nuclear reactor system of the plurality of nuclear reactor systems having at least one mixed phase coolant.

* * * * *